United States Patent
Long et al.

(10) Patent No.: US 7,425,955 B2
(45) Date of Patent: Sep. 16, 2008

(54) METHOD FOR TRACKING DEPTHS IN A SCANLINE BASED RASTER IMAGE PROCESSOR

(75) Inventors: Timothy Merrick Long, Lindfield (AU); Scott Bradley, Fife (GB); Stephen Edward Ecob, Chatswood West (AU); Benjamin Michael Lever, Mosman (AU)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 10/553,604

(22) PCT Filed: Jun. 25, 2004

(86) PCT No.: PCT/AU2004/000842

§ 371 (c)(1),
(2), (4) Date: Jun. 23, 2006

(87) PCT Pub. No.: WO2004/114223

PCT Pub. Date: Dec. 29, 2004

(65) Prior Publication Data

US 2006/0244748 A1     Nov. 2, 2006

(30) Foreign Application Priority Data

Jun. 26, 2003     (AU)     ............... 2003903448

(51) Int. Cl.
*G06T 15/00*     (2006.01)
(52) U.S. Cl. .................... 345/421; 345/428
(58) Field of Classification Search ................ 345/619, 345/419, 421, 422, 629, 427, 428
See application file for complete search history.

(56) References Cited

U.S. PATENT DOCUMENTS

| | | | |
|---|---|---|---|
| 4,897,805 A | 1/1990 | Wang | 364/521 |
| 5,115,402 A | 5/1992 | Matsuhiro et al. | 395/141 |
| 5,295,235 A * | 3/1994 | Newman | 345/619 |
| 5,483,627 A | 1/1996 | Silverbrook et al. | 395/133 |
| 5,613,050 A | 3/1997 | Hochmuth et al. | 395/122 |
| 5,808,617 A | 9/1998 | Kenworthy et al. | 345/421 |

(Continued)

FOREIGN PATENT DOCUMENTS

JP     62-152077     7/1987

(Continued)

OTHER PUBLICATIONS

PostScript Language Reference, Third Edition, Adobe Systems Inc., "Scan Conversion Details", pp. 501-504 (Feb. 1999).

(Continued)

*Primary Examiner*—Phu K Nguyen
(74) *Attorney, Agent, or Firm*—Fitzpatrick, Cella, Harper & Scinto

(57) ABSTRACT

A method of rendering a scan line of a graphic object image in a scan line renderer for spans of pixels laying between consecutive x-ordered edges intersecting the scan line includes maintaining a set of depths present in the rendering of the scan line, with the set being maintained in depth order. For each span, the set contains at least those depths that are active in the span, and the set is subject to removal of at least one depth at a subsequent span on the scan line where the corresponding depth is no longer active.

12 Claims, 70 Drawing Sheets

U.S. PATENT DOCUMENTS

| | | | |
|---|---|---|---|
| 5,912,672 A | 6/1999 | Liguori | 345/433 |
| 5,977,987 A | 11/1999 | Duluk, Jr. | 345/441 |
| 5,990,904 A | 11/1999 | Griffin | 345/435 |
| 6,057,855 A | 5/2000 | Barkans | 345/435 |
| 6,128,000 A | 10/2000 | Jouppi et al. | 345/136 |
| 6,285,378 B1 | 9/2001 | Duluk, Jr. | 345/441 |
| 6,326,964 B1 * | 12/2001 | Snyder et al. | 345/419 |
| 6,362,818 B1 | 3/2002 | Gardiner et al. | 345/421 |
| 6,369,828 B1 | 4/2002 | Lewis | 345/611 |
| 6,369,830 B1 | 4/2002 | Brunner et al. | 345/629 |
| 6,483,519 B1 | 11/2002 | Long et al. | 345/619 |
| 6,518,965 B2 * | 2/2003 | Dye et al. | 345/419 |
| 6,891,536 B2 | 5/2005 | Smith | 345/421 |

FOREIGN PATENT DOCUMENTS

| | | |
|---|---|---|
| JP | 11-515121 | 12/1999 |
| WO | WO 01/06460 | 1/2001 |
| WO | WO 03/065310 | 8/2003 |

OTHER PUBLICATIONS

J. Foley, et al., "Scan-Line Algorithms", Computer Graphics Principles and Practice, Second Edition, pp. 680-687 (1997).

Scalable Vector Graphics, Specification, W3C Recommendation (Jan. 14, 2003).

M.D. Ercegovac, et al., "Reciprocation, Square Root, Inverse Square Root, and Some Elementary Functions Using Small Multipliers", IEEE Transactions on Computers, vol. 49, No. 7, pp. 628-637 (Jul. 2000).

T. Porter, et al., "Compositing Digital Images", Computer Graphics, vol. 18, No. 3, pp. 253-259 (Jul. 1984).

L. Carpenter, The A-Buffer, an Antialiased Hidden Surface Method, Computer Graphics, vol. 18, No. 3, pp. 103-108 (Jul. 1984).

J. Foley, et al., "Computer Graphics: Principles and Practice", Second Edition, pp. 806-812; pp. 347-469; and pp. 563-604 (1997).

E. Barkan, et al., "The Scanline Principle: Efficient, Conversion of Display Algorithms into Scanline Mode", Visual Computer, vol. 15, No. 5, pp. 249-264 ((1999).

* cited by examiner

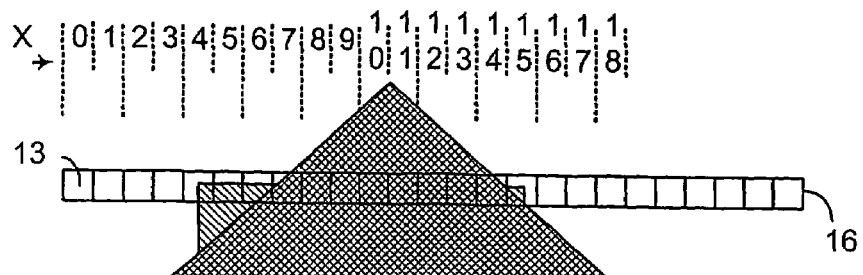
Fig. 2(a)
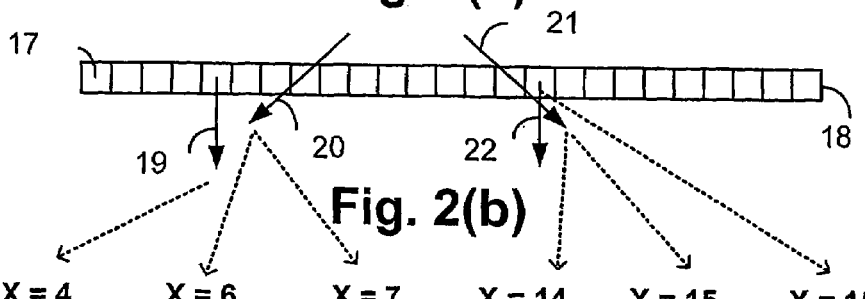
Fig. 2(b)
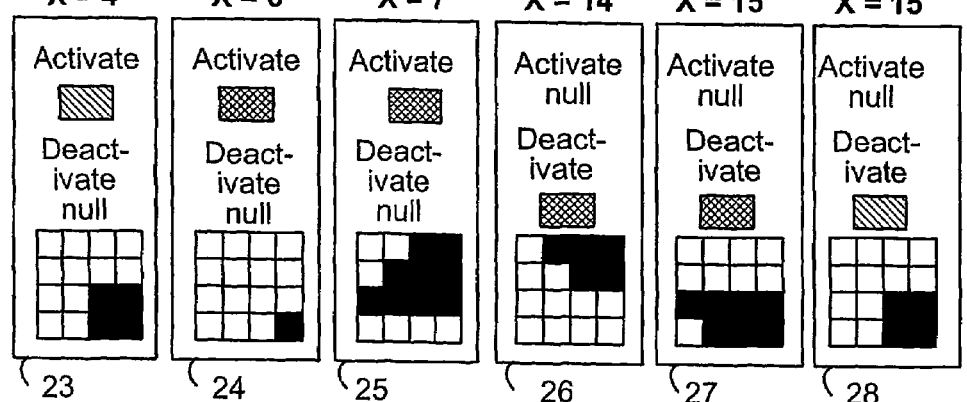
Fig. 2(c)
Fig. 2(d)

```
void
DrawLine
(
    int Xs,
    int Ys,
    int Xe,
    int Ye
)
{
    int     tx = Xe - Xs;
    int     ty = Ye - Ys;
    int     grad = tx / ty;
    int     ient = tx % ty;
    int     err = (2 * ient) - ty;
    int     delta_err1 = 2 * ient;
    int     delta_err2 = 2 * (ient - ty);
    int     x = Xs;
    int     y;

for (y = Ys; y <= Ye; y++)
    {
        SetPixel(x, y);
        if (err < 0)
        {
            err += delta_err1;
            x += grad;
        }
        else
        {
            err += delta_err2;
            x += grad + 1;
        }
    }
}
```

Fig. 5

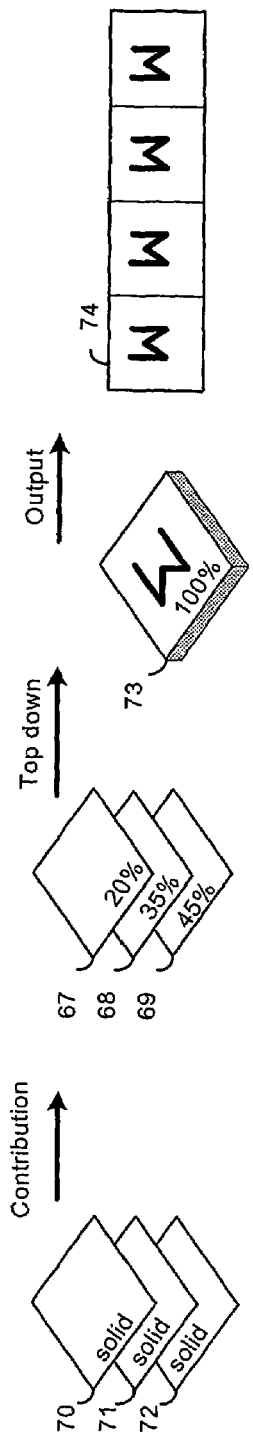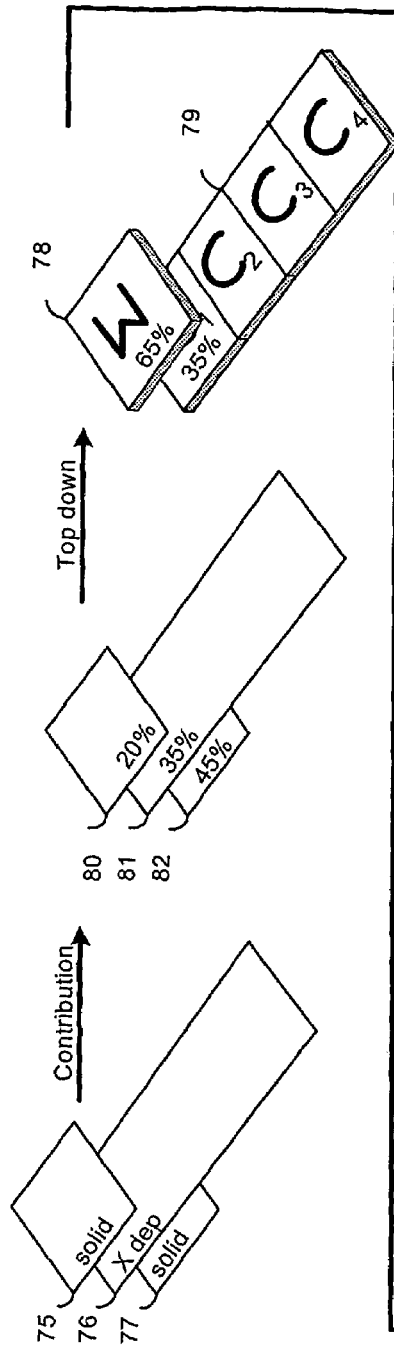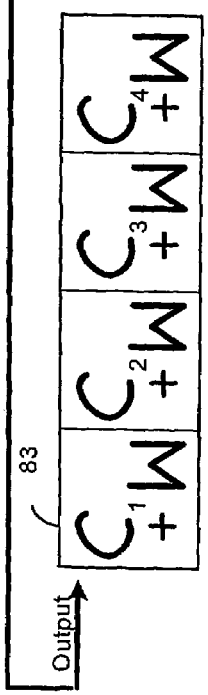
Fig. 9(a)
Fig. 9(b)

coverage

A-buffer coverage ∩ ~(coverage ∩ A-buffer)

coverage ∩ A-buffer (a) Drawing primitives z-levels in order of priority

Rendered result

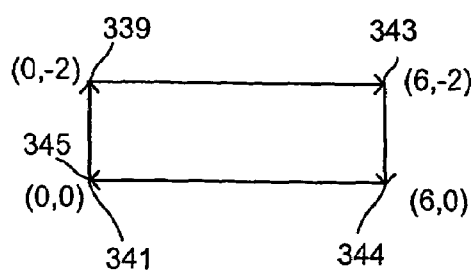
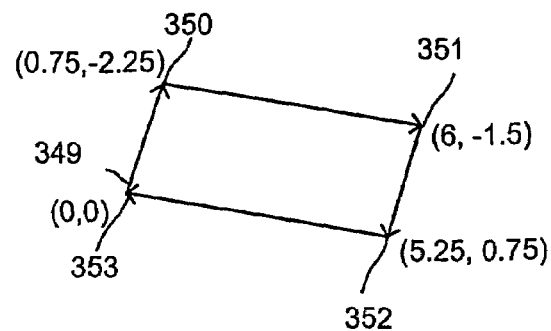
Fig. 35(a)  Fig. 35(b)
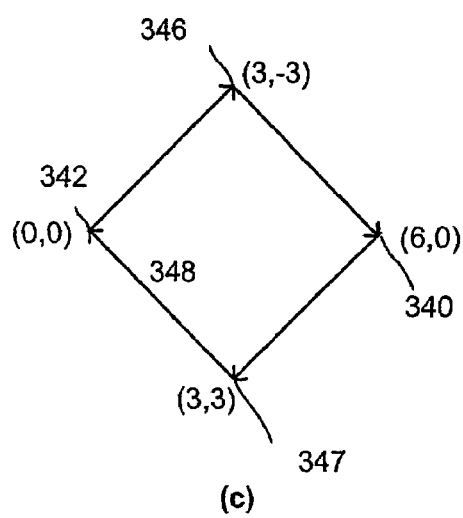
Fig. 35(c)

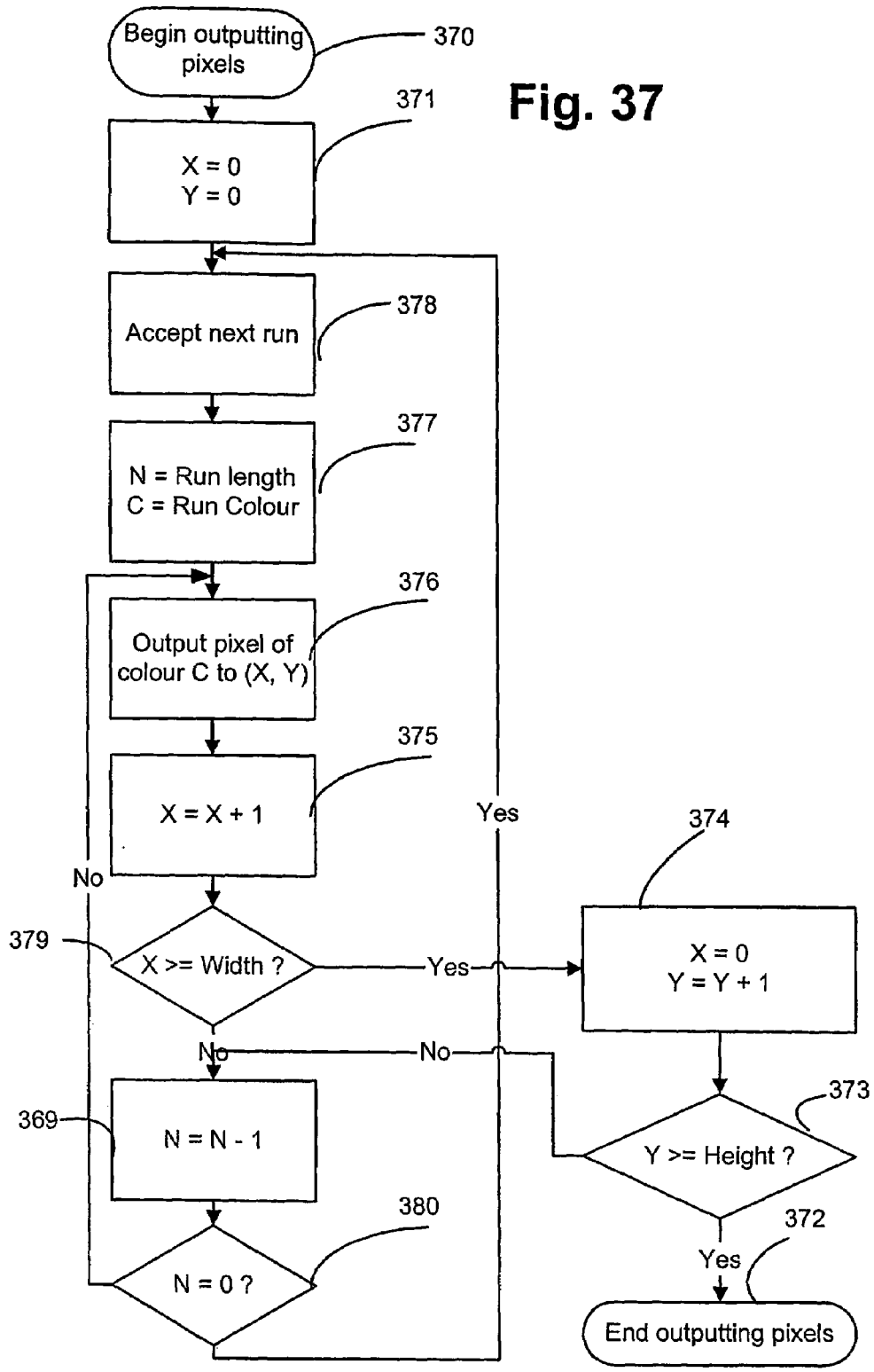

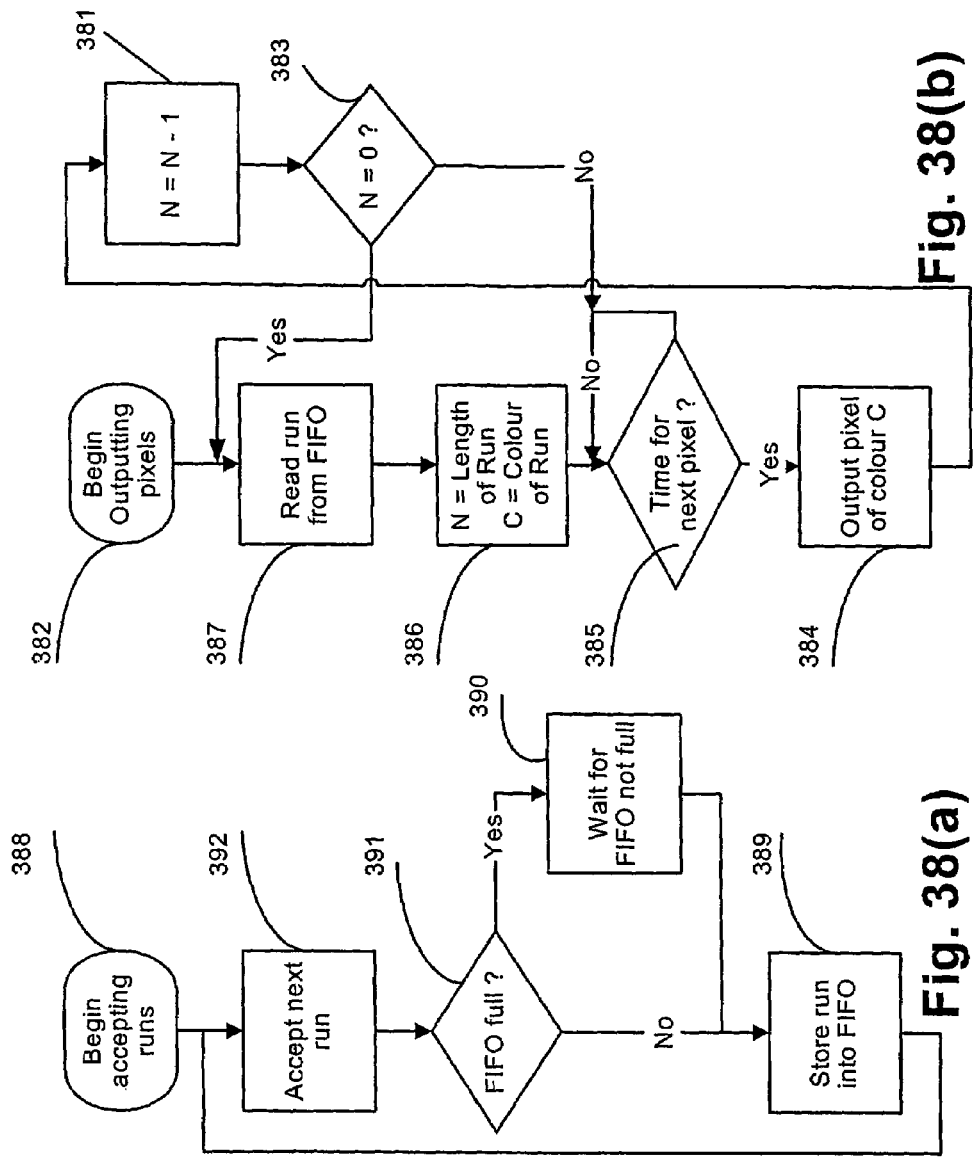

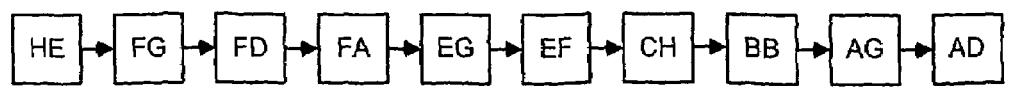
Fig. 47(a)
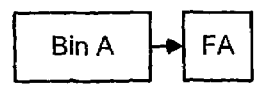
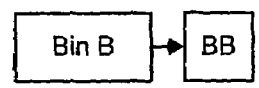
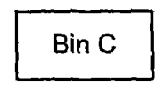
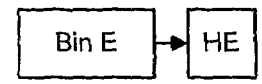
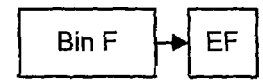
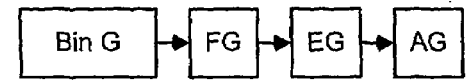
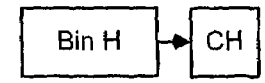
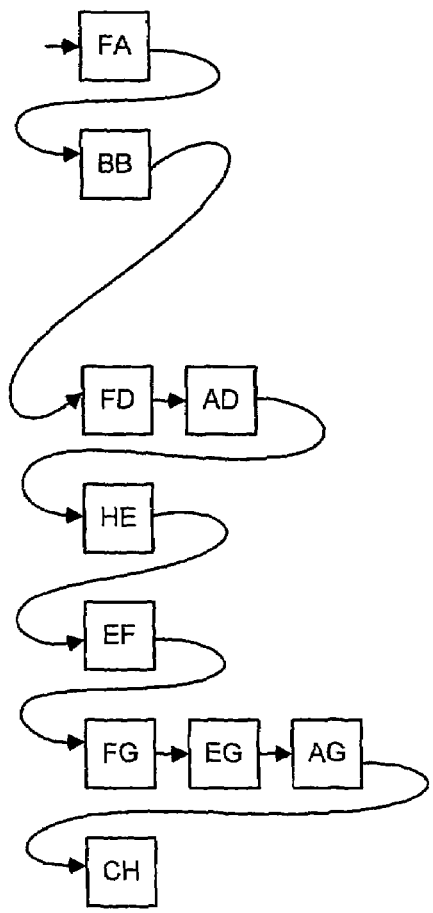
Fig. 47(b)      Fig. 47(c)

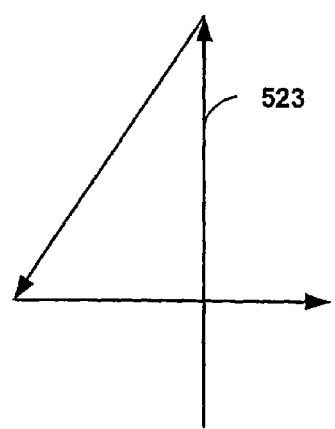
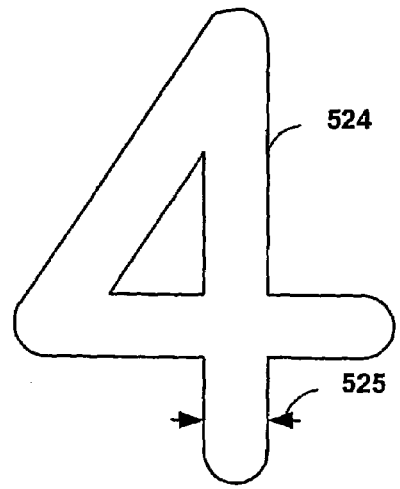
Fig. 50(a)　　　　Fig. 50(b)
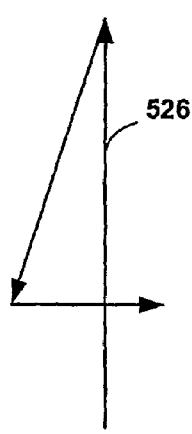
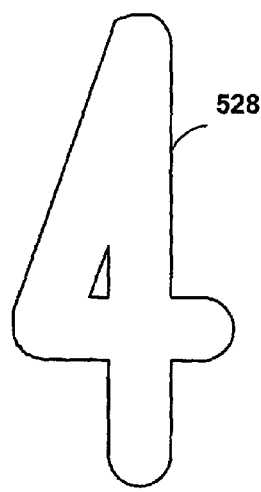
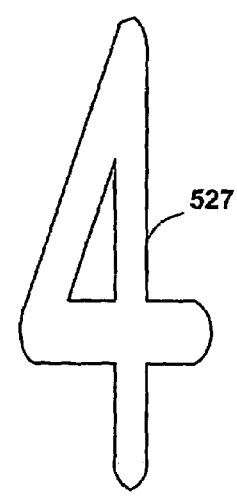
Fig. 50(c)　　Fig. 50(d)　　Fig. 50(e)

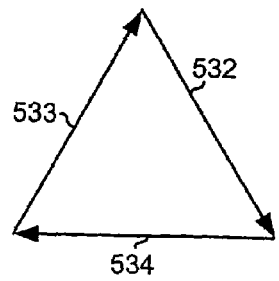
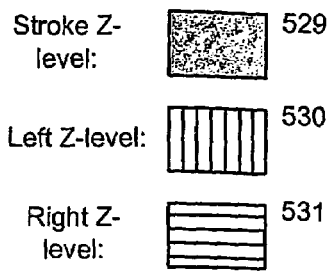
Fig 51(a)
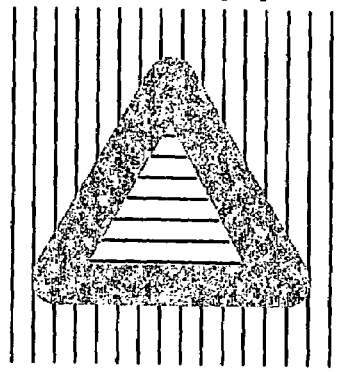
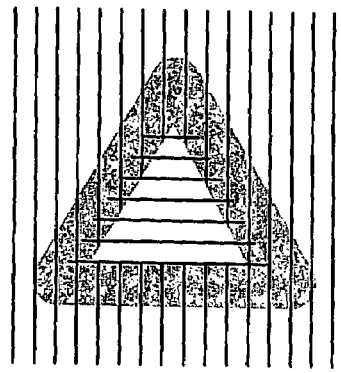
Fig 51(b)          Fig 51(c)
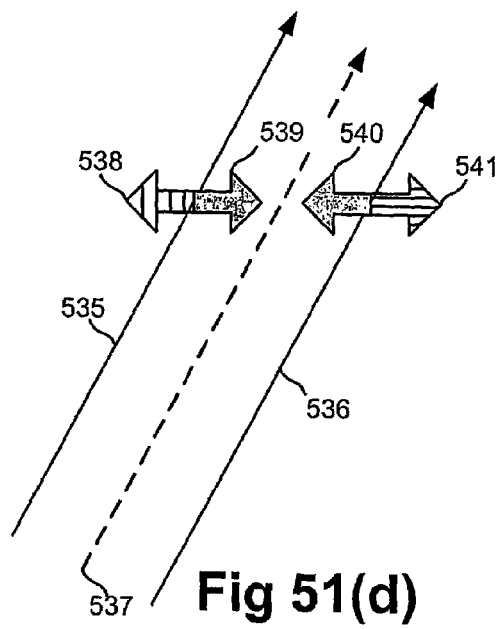
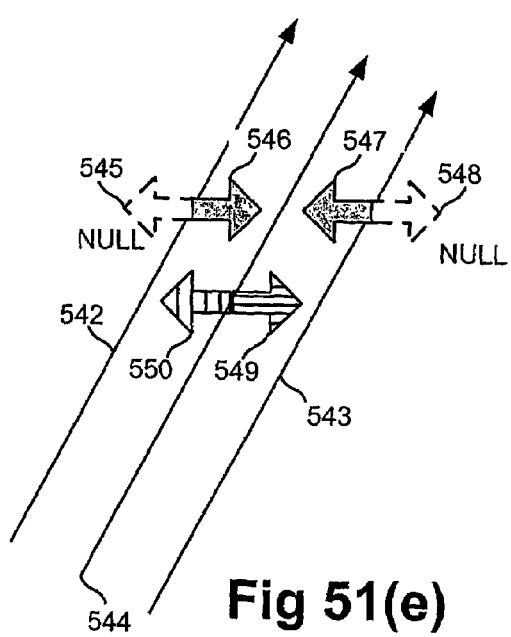
Fig 51(d)          Fig 51(e)

METHOD FOR TRACKING DEPTHS IN A SCANLINE BASED RASTER IMAGE PROCESSOR

CROSS-REFERENCE TO RELATED PATENT APPLICATIONS

This application claims the right of priority under 35 U.S.C. § 119 based on Australian Patent Application No. 2003903448 filed Jun. 26, 2003, which is incorporated by reference herein in its entirety as if fully set forth herein.

COPYRIGHT NOTICE

This patent specification contains material that is subject to copyright protection. The copyright owner has no objection to the reproduction of this patent specification or related materials from associated patent office files for the purposes of review, but otherwise reserves all copyright whatsoever.

TECHNICAL FIELD OF THE INVENTION

The present invention relates generally to rendering graphical objects and, in particular, to the resolving of z-orders of graphical objects to accelerate rendering.

BACKGROUND

Raster image processors are fundamental to the field of computer graphics. A raster image processor (RIP) takes geometric primitives as input, and produces an array of pixel values on a raster grid as output. In this document, 2D rendering systems will be considered.

Two important classes of RIPs are object based RIPs and scan line based RIPs. The difference between these two classes of RIPs lies in their inner loops—that is, which entities their algorithms iterate over. Object based RIPs iterate over all the primitives they have to render, whereas scan line based RIPs iterate over each scan line to be rendered, in raster order.

Consider the case of rendering a set of polygons, differentiated from each other by their outlines, fills and rendering depths (ie. z-order). An object based RIP would typically iterate over the set of polygons in z-order, rendering each polygon in turn. This is a "Painter's algorithm" approach. In contrast, a scan line RIP considers each scan line in turn, determining where the edges of each polygon are on the current scan line. The spans of pixels between the edges which intersect the current scan line are then filled.

A refinement to the scan line based rendering system lies in the use of an active edge list. In such an approach, instead of considering the edges of every polygon on every scan line, the scan line RIP maintains a list of only those edges that intersect the current scan line, and tracks those edges from scan line to scan line. This approach typically makes use of forward difference techniques, in which the edges are tracked by a form of Bresenham's scan-conversion algorithm.

At the start of rendering each scan line, new edges may be added to the list of active edges. Sorting is important here, as it dramatically cuts down the number of edges that need to be considered for addition to the active edge list. Specifically, the total set of edges is usually sorted in raster order of starting points. By staring point, we mean the terminal point first encountered in an entire raster scan. This allows the rapid determination of which edges, if any, are becoming active at the start of a scan line. At the end of a scan line, if an edge is determined as not intersecting the following scan line, that edge is removed from the active edge list.

Consider a typical scan line under the above RIP. Given that the x-ordinates of all the edges that intersect this scanline are known, and that it is desired to output raster image data for this scan line, the next problem to be solved is to determine the raster data content of the spans of pixels between the crossing points. That is, the span between contiguous crossing points in x-order will map from raster image space to a single set of polygons in a graphic model space. This approach is with the allowance that the RIP does not handle antialiasing. Implicit in this approach is that overlapping polygons are distinguished from each other by their depth. That is, in the set of polygons exposed in a span between crossing points, the uppermost polygon, if it is fully opaque, will be the only polygon to be rendered over that span. If the uppermost polygon less than fully opaque (ie. contains some transparency), lower polygons will contribute to the span.

Scan line rendering avoids the need for a screen (frame) buffer to accumulate the results of rendering, this being a feature and deficiency typical of object based (Painter's algorithm) rendering systems. However, a scan line rendering system can be further characterised at this point by considering how it solves the above problem. Specifically, some scan line rendering system have reduced the need for a full screen buffer down to a scan line buffer, while others have avoided the need for a scan line buffer, and can render directly to an underlying output raster data buffer.

It is appropriate to consider some different line buffer RIP models. Firstly, there are those RIPs that maintain a line buffer of raster image data. Edges are sorted in y-ordinate (ie. scan line) but not in x-ordinate (pixel location within the scan line), and spans are accumulated in a random pattern into the buffer. That is, the order in which rendering of spans occurs is not related to their x order. In such a system, there is no concept of z-order in which higher greyscale output values take precedence over lower values when a pixel is written to. The line buffer is written out to the output buffer in x-order after all spans have been accumulated for the current scanline.

A variation on the above RIP model is found in other scan line based RIPs, which maintain a line buffer of crossing points instead of raster data. Again, edges are sorted in y but not in x. For each scan line, all the crossing points are determined, and then sorted by x. In other words, a line buffer of crossing points is maintained, not a line buffer of raster data. Note again however that the line buffer of crossing messages is accumulated in random order.

A third class of scan line based RIPs do not have either a line buffer of raster data or a line buffer of crossing messages. Such are avoided by a full raster order sorting of the all edges prior to rendering. That is, all edges are sorted by starting x-ordinate as well as y-ordinate. As each pixel of a scan line is considered, the list of edges is checked for edges that are becoming active.

We will now consider the issue of determining the raster data content of a span on a given scanline—a problem common to all scan line renders that support overlapping polygons separated by depth. As introduced above, a constant set of polygon fills, ordered by depth, potentially contribute to the span. The problem can be considered in terms of fills and the depths at which they occur, assuming each polygon has a single fill which inherits the polygons depth.

In systems that consider spans in x-order, solving this problem implies the maintenance of a table of currently active depths as rendering progresses from span to span. Progress from span to span occurs on any pixel that is crossed by an edge. That is, a span is an interval on the current scanline over which the set of currently active depths is constant. By active, it is meant that a conceptual slice through all the polygons which intersect the span would include all the active depths (ie. all graphic objects that contribute or influence the final pixel value).

The set of active depths allows the determination of the raster output for a span, if the set of active depths is maintained in decreasing depth order. If fills are not allowed to include transparency, the fill at the head of the table of active depths will be uppermost and be the only fill contributing to the raster data for the fill. If transparency is allowed, the fills associated with depths following in the table may also contribute to raster output.

A solution to the problem of maintaining this table of currently active depths exist in prior art. For example, a complete status table of all the depths that exist for the page image to be rendered can be constructed. This approach is characterised by the fact that the depths exist in a linearly addressed memory in which the depths are implicit in the location in memory where fill data may be stored, if a fill exists at that depth. In other words, there is a complete set of slots for pointers to fill information, one for each depth, and the slots are arranged in depth order. Insertion of a fill into such a table is trivial as there will always be a slot for a given depth. However, the pattern of slot occupation will typically be spare. In practice, when considering the fill and depth referenced by an edge crossing, the depth of the fill is used to index this complete table of depth slots. This is an essentially an order one operation, allowing the RIP to operate at real-time rates.

A cache, which may be termed a summary table, can be used to speed up a lookup to such a complete table. This is typically necessary because the total number of depths that exist for a page may be very large. For example, some real-world PostScript print rendering jobs have extremely large numbers of depths. Another consequence of the very large size of the complete depth slot table is that hardware implementations of this RIP model cannot often maintain the complete list internally. The table must therefore be held in external memory, which is slow to reference. If more depths exist than can be accommodated by the table of depth slots, additional tables can be swapped in, at the cost of significant additional complexity.

Further, a RIP with this model is not readily suited to animation, being applications where the set of depths occupied by fills changes from frame to frame. Also, if the input to the animating renderer is not deterministic, the set of occupied depths may also not be deterministic. Many depth slots will have to be put aside for fills found on future frames. Alternatively, fills may be given different depths from frame to frame, but in the class of prior art RIPs currently being examined, a fill is a tightly coupled in combination to its corresponding depth. That is, a fill has an implied depth by being at a certain memory location. It follows that reassigning fills can entail substantial data movement, which is undesirable.

A further deficiency is found in maintaining the table of active depths in the context of compositing. Inserting a new fill into the summary table is not expensive, as it is as deep as the table of all depth slots found on the page, and each fill has a corresponding waiting slot. However, when a span is to be composited, the operation is costly, since the summary table is both very large and usually very sparse, while the set of fills that the compositor needs to consider is generally comparatively small, and is compact. In practice much complexity and silicon is expended in a depth encoder that is as deep as the status table. This encoder is then used to create a compact set of fills to be composited over the span in question, by the process of considering the set of active fills ordered by depth detailed above.

SUMMARY OF THE INVENTION

It is an object of the present invention to substantially overcome, or at least ameliorate, one or more disadvantages of existing arrangements.

According to an aspect of the invention, there is provided a method of rendering a scan line of a graphic object image in a scan line renderer for a span of pixels lying between two x-order consecutive edges intersecting said scan line, said method being characterised, for said span of pixels, by maintaining a subset of depths present in the rendering, said subset being those depths that are present on said span and being maintained in depth order and subject to removal of depths where the corresponding depth is no longer active.

Preferably, the subset of depths is maintained using a content addressable memory.

According to another aspect of the invention, there is provided an apparatus for implementing any one of the aforementioned methods.

According to another aspect of the invention there is provided a computer program product including a computer readable medium having recorded thereon a computer program for implementing any one of the methods described above.

Other aspects of the invention are also disclosed.

BRIEF DESCRIPTION OF THE DRAWINGS

At least one embodiment of the present invention will now be described with reference to the drawings, in which:

FIGS. 2(a) to 2(d) show an example of edge processing for a scan line at the sub-pixel level;

FIG. 5 shows a C language source code of a modified Bresenham's algorithm;

FIGS. 9(a), 9(b) and FIG. 10 illustrate different compositing scenarios;

FIGS. 35(a) to 35(c) depict sets of coordinates in a morphing process;

FIG. 37 is a flowchart depicting operation of the Pixel Extraction Module to output pixels to a frame buffer memory;

FIGS. 38(a) and 38(b) are flowcharts depicting operation of the Pixel Extraction Module to output directly to a display;

FIGS. 47(a) to 47(f) depict operation of the radix sort algorithm;

FIGS. 50(a) to 50(e) show examples of stroking and transforming edges;

FIGS. 51(a) to 51(e) illustrate left and right fills for stroking edges;

DETAILED DESCRIPTION INCLUDING BEST MODE

Table of Contents

Figure 56:
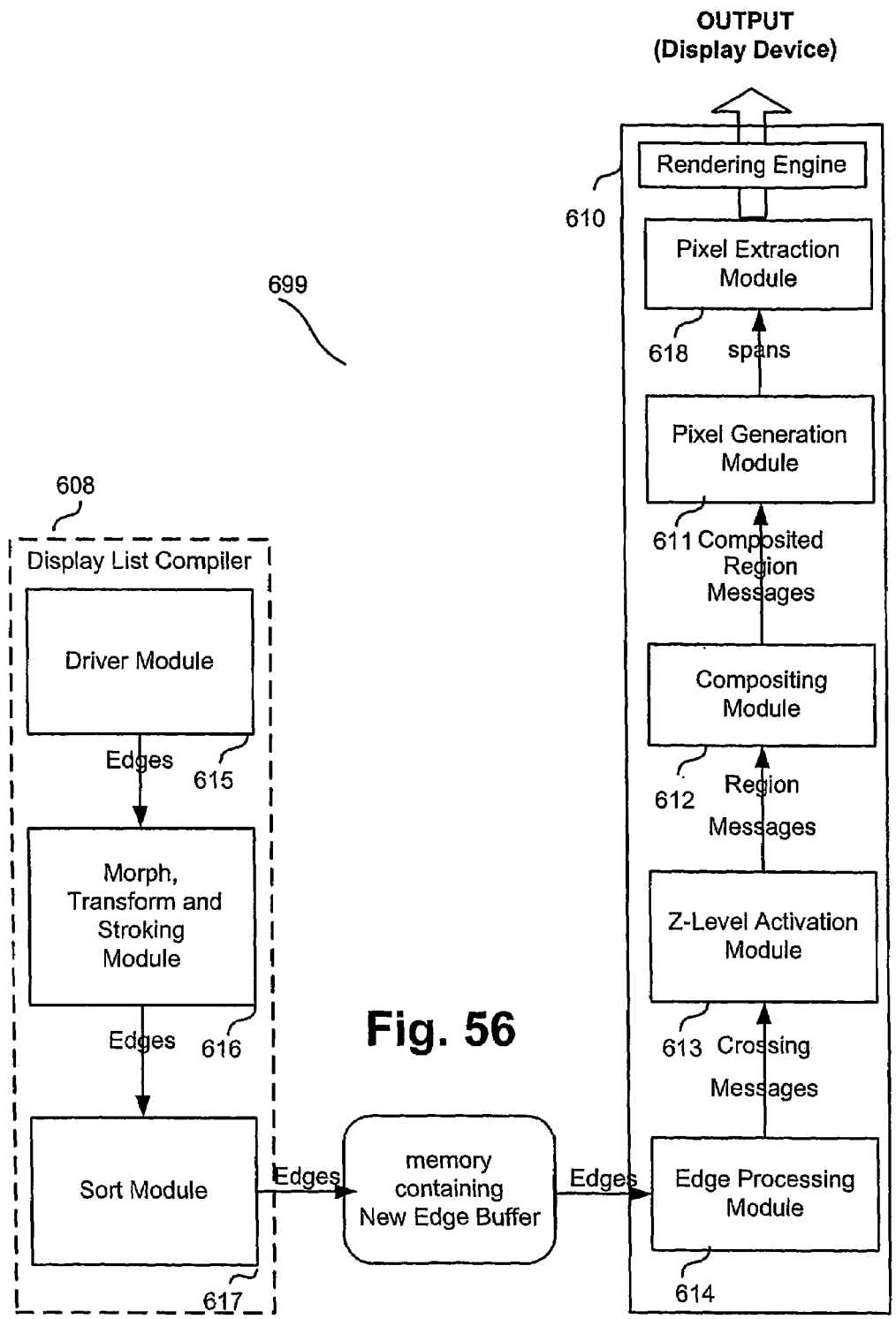
FIG. 56 is a schematic block diagram representation of thin client imaging engine according to the present disclosure.

1. Introduction
   1.1. Coordinate spaces
   1.2. Graphic objects
   1.3. Glyphs
   1.4. Z-levels
   1.5. Stroking
   1.6. Morphing
2. The Driver Module
   2.1. Sprites
      2.1.1. Sprites: transformation matrices
      2.1.2. Graphic objects and their depth
   2.2. The display list
      2.2.1. Frame rendering
      2.2.2. Graphic objects and z-levels
      2.2.3. Local depths and absolute depths
3. Transformation, Morphing and Stroking
   3.1. Morphing
   3.2. Transformation
   3.3. Generating Edges
   3.4. Decomposition of strokes into edges and z-levels
      3.4.1. Stroking a straight edge
      3.4.2. Stroking a curved edge
      3.4.3. Stroking a join
      3.4.4. Stroking Equal or Opposite Edge Joins
      3.4.5. Generating end-caps at the end of a path 3.4.6. Endcaps between stroked and unstroked edges
3.4.7. Z-level assignments for opaque strokes
3.4.8. Z-level assignments for transparent strokes
3.4.9. Transformation of Stroking Primitives
3.5. Filtering
3.6. Generating edge-tracking parameters
   3.6.1. Generating straight-edge tracking parameters
   3.6.2. Generating quadratic Bezier curve tracking parameters
   3.6.3. Determining the sign
   3.6.4. Generating Elliptic arc tracking parameters
   3.6.5. Generating Glyph edge tracking parameters
4. Sorting
5. Edge processing
  5.1. Input and output
  5.2. Top-level Operation
  5.3. Active Edge Tracking
  5.4. Example of Edge Processing
  5.5. Converting edges into active edges and edge persistence
   5.5.1. Static Edge Persistence
  5.6. Active Edge Processing
  5.7. Tracking Edges
   5.7.1. Tracking Straight Lines
   5.7.2. Tracking Quadratic Beziers
   5.7.3. Tracking Quadratic Polynomial Fragments
   5.7.4. Tracking Elliptic Arcs
   5.7.5. Tracking Glyphs
  5.8. Anti-aliasing and Crossing Message Generation
   5.8.1. Generating Crossing Messages for Glyphs
  5.9. Example of Crossing Messages
   5.9.1 Another Example
  5.10. Re-ordering of Active Edges and Crossing Messages
6. The Z-level Activation Module
  6.1. The Ordered Set of Interesting Z-levels
  6.2. The Flow of Control in the Z-level Activation Module
  6.3. Activating and Deactivating Z-levels: Winding Counts
  6.4. The Ordered Set of Interesting Z-Levels—continued
  6.5. Adding new Z-levels to the Ordered Set of Interesting Z-levels
   6.5.1. Maintaining an Ordered Set of Interesting Z-levels in Hardware
  6.6. Processing Runs
  6.7. Converting S-buffers to A-buffers: Winding Rules
  6.8. Processing Runs, Continued
7. Compositing Module
  7.1. Intermediates
  7.2. Z-level Fills
  7.3. Basic Flow
  7.4. Graphical Overview
  7.5. Contribution Calculation
  7.6. Bottom Up Composite
  7.7. Top Down Composite
  7.8. Alternative Compositing Approaches
  7.9. Top-Down Advantages
8. Pixel generation
  8.1. Linear Gradient Pixel Generation
  8.2. Radial Gradient Pixel Generation
  8.3. Bitmap Image Pixel Generation
9. Pixel Extraction
  9.1. Input data
  9.2. Output to frame buffer
  9.3. Output direct to display
  9.4. Half toning
10. Implementation 1. Introduction This document describes a Thin Client Imaging Engine (TCIE) which is a system for rendering 2D graphic objects, using minimal computing resources. Examples of where such resource levels may apply include portable devices or those with small displays, such hand-held computing devices including mobile telephone handsets and games, and office equipment such as printers and copiers. A top-level diagram of the TCIE system 699 is shown in FIG. 56 in which the TCIE system 699 is structured as a pipeline of processing modules. Each module will be described in order of the flow of data through the system. The modules are conceptually divided between a Display List Compiler 608 and a Rendering Engine 610. The Display List Compiler 608 prepares information describing the desired output, and the Rendering Engine 610 uses this information to generate that output image (e.g., rendering to a display device or frame buffer). The TCIE system 699 can be used to generate a series of temporally spaced output images, such output images referred to hereafter as 'frames'. This use of the TCIE system 699 creates the effect of an animation (or 'movie') being played on the output display.

1.1. Coordinate Spaces

Figure 34:
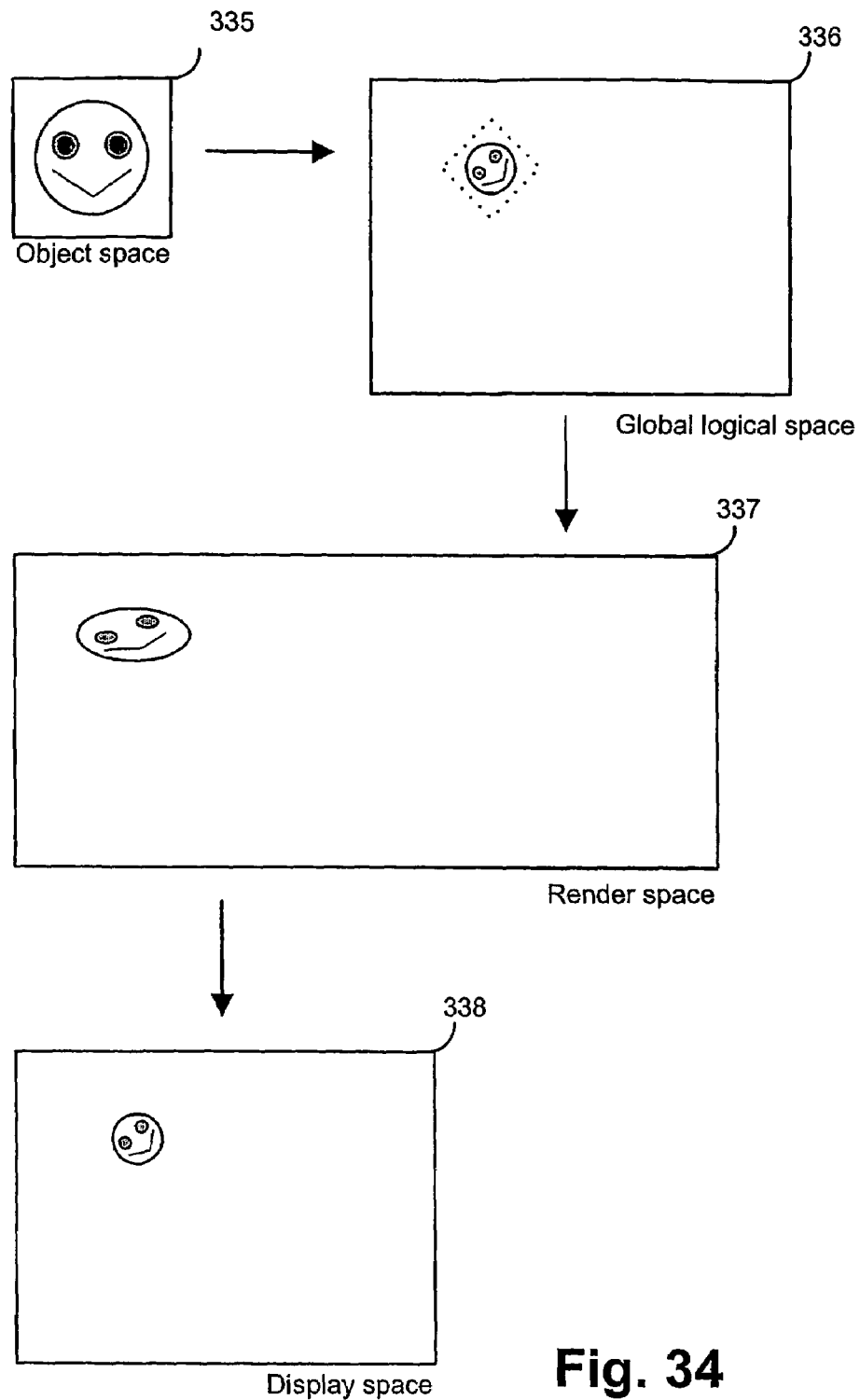
FIG. 34 depicts various image spaces used in the present rendering system.

Referring to FIG. 56, the first module of the system 699 is the Driver Module 615 which maintains collections of graphic objects and information about them. FIG. 34 describes the spaces used by the system 699. FIG. 34 initially shows a graphic object described in object space 335. Next, the same graphic object is shown transformed into global logical space 336. Next, the same graphic object is shown transformed into a render space 337, and finally the same graphic object is shown transformed into the display space 338.

The transformation from object space 335 to global logical space 336 is achieved by the graphic object's placement transform. This placement transform may be a product of a hierarchy of transformation matrices, to be described later. The transformation from global logical space 336 to render space 337 is achieved by a viewing transform which converts global logical coordinates to sub-pixels (for the purpose of anti-aliasing). The transformation from render space 337 to display space 338 is achieved by an anti-aliasing process that produces display pixels from constituent sub-pixels. In the degenerate case of one-by-one anti-aliasing, the render space 337 and display space 338 are the same, i.e., the logical space 336 can be transformed directly to the display space 338.

1.2. Graphic Objects

Figure 16A:
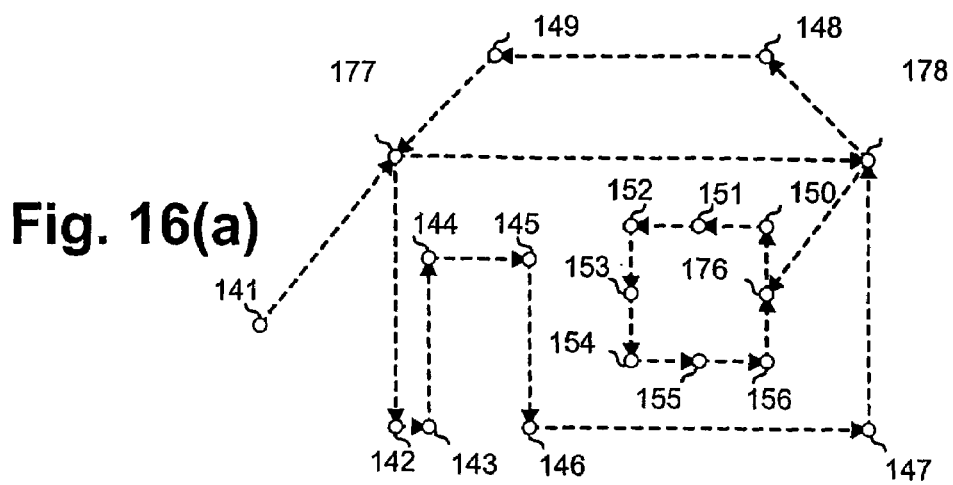
FIGS. 16(a) to 16 (c) illustrate how 2-dimensional primitives combine to form a graphical object.
Figure 16B:
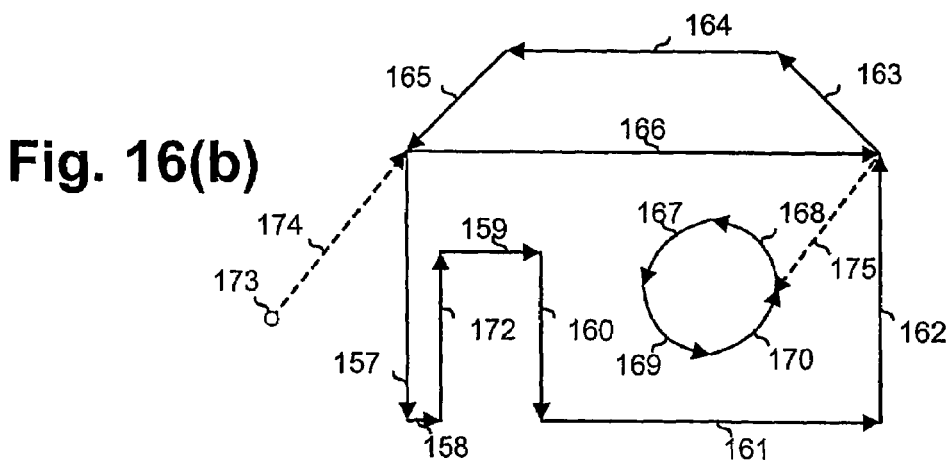
Figure 16C:

The input into the system 699 consists of a set of graphic objects and associated metadata. FIG. 16(c) shows a graphic object 171 rendered onto a display, with its corresponding components being shown in FIG. 16(a) and FIG. 16(b). Graphic objects are two-dimensional display primitives described by an ordered set of one or more of the following drawing primitives: new drawing positions, straight lines and curves. The drawing primitives describe parts of the outline of a graphic object. Each primitive is associated with one or more coordinates. New drawing positions may be specified as either an absolute offset from the object's origin or relative to the endpoint of the previous primitive. New drawing positions are described by a single coordinate, straight lines are A method of rendering a scan line of a graphic object image in a scan line renderer for spans of pixels laying between consecutive x-ordered edges intersecting the scan line includes maintaining a set of depths present in the rendering of the scan line, with the set being maintained in depth order. For each span, the set contains at least those depths that are active in the span, and the set is subject to removal of at least one depth at a subsequent span on the scan line where the corresponding depth is no longer active. described by a pair of coordinates, and curves are described by a sequence of three coordinates. Straight lines use the pair of coordinates to define the start and end points of the line. Curves are implemented as quadratic Bezier curves, wherein a first coordinate defines the start of the Bezier curve, a second coordinate defines a control point, and a third coordinate defines the end point of the Bezier curve. Bezier curves are well known to those skilled in the art.

The coordinates of edges are stored as an ordered set of relative coordinates, which reduces memory storage requirements and also determines the direction of edges. It is implied that the first co-ordinate of a straight line or curve is the last co-ordinate of the previous drawing primitive. TABLE 1 is an example of an ordered set of primitives that could form the display object shown in FIG. 16(c). In this example, Y ordinates increase downwards, and X ordinates increase to the right. Also, the terms for new drawing position, straight lines and curves are MOVETO_ABS, MOVETO_REL, LINETO and CURVETO, respectively. The start point in this example is (0, 0) 141.

TABLE 1

| Primitive Type | Coordinates (relative, unless MOVETO_ABS) |
|---|---|
| MOVETO_ABS 173 | (0, 0) 141 |
| MOVETO_REL 174 | (40, −50) 177 |
| LINETO 157 | (0, 80) 142 |
| LINETO 158 | (10, 0) 143 |
| LINETO 172 | (0, −50) 144 |
| LINETO 159 | (30, 0) 145 |
| LINETO 160 | (0, 50) 146 |
| LINETO 161 | (100, 0) 147 |
| LINETO 162 | (0, −80) 178 |
| LINETO 163 | (−30, −30) 148 |
| LINETO 164 | (−80, 0) 149 |
| LINETO 165 | (−30, 30) 177 |
| LINETO 166 | (140, 0) 178 |
| MOVETO_REL 175 | (−30, 40) 176 |
| CURVETO 168 | (0, −20) 150 then (−20, 0) 151 |
| CURVETO 167 | (−20, 0) 152 then (0, 20) 153 |
| CURVETO 169 | (0, 20) 154 then (20, 0) 155 |
| CURVETO 170 | (20, 0) 156 then (0, −20) 176 |

1.3. Glyphs

Glyphs are special types of graphics objects with the further restriction that they are always drawn directly into display space. Glyphs are designed for situations where the shape that is being rendered is:

(i) small, and
(ii) designed to be placed on exact pixel boundaries.

Examples of shapes that are well-suited to be represented by glyphs include hinted font characters.

Instead of a path, glyphs are represented by a one bit-per-pixel bitmap with two associated fills. This bitmap acts like a mask—where bits are set, the "on" fill is displayed; and where bits are not set, the "off" fill is displayed.

1.4. Z-levels

A z-level is a display primitive used to describe how part of the display enclosed by a subset of a graphic object's edges should be colored. For example, a z-level could describe the enclosed area as being filled with a solid color. A z-level is also assigned an absolute depth, this absolute depth being an integer value used to specify which z-level should appear on top of which. A z-level with a higher absolute depth is rendered on top of a z-level with a lower absolute depth.

Figure 33A:
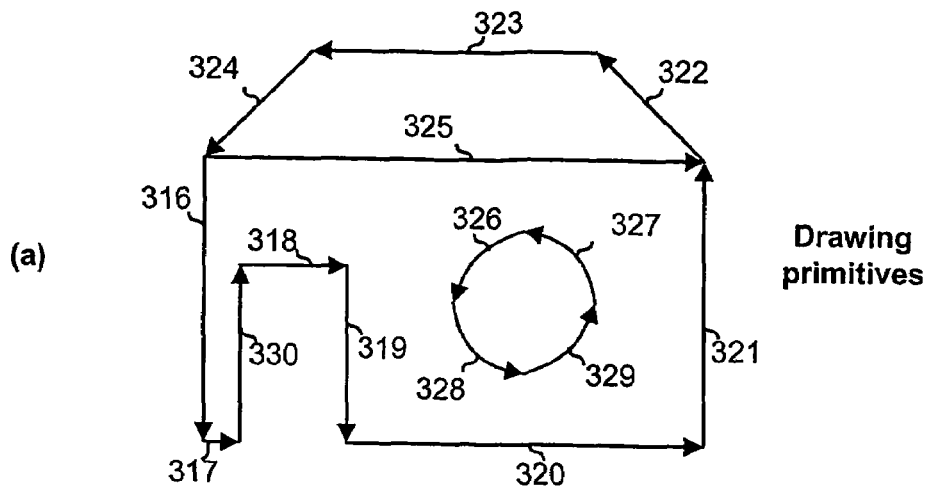
FIGS. 33(a) to 33(c) illustrate left and right fills used to create the object of FIG. 16.
Figure 33B:
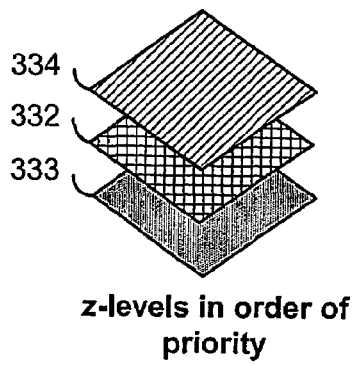
Figure 33C:
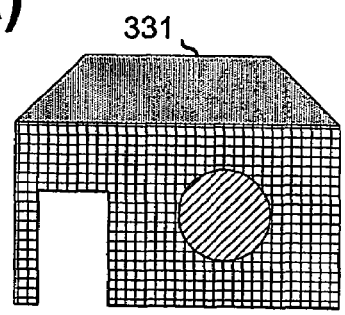

Up to two z-levels are associated with straight line and curve drawing primitives—a possible first z-level to be rendered to the left of the drawing direction of that primitive, and a possible second z-level to be rendered to the right of the drawing direction of that primitive. FIGS. 33(a) to 33(c) demonstrate this concept by describing the left and right fills used to create the graphical object 331 seen previously in FIG. 16(c) as the object 171.

FIG. 33(a) shows the drawing primitives 316 to 329. The primitives 316 to 329 reference z-levels 333, 332 and 334, shown in FIG. 33(c). The z-levels are shown in absolute depth order—that is they could have absolute depths 2, 3 and 4 respectively. TABLE 2 is a table of which z-levels the drawing primitives reference. For example, LINETO 316 is directed down the page, and has the z-level 332 to the left of its drawing direction. The rendered result is shown in FIG. 33(c).

TABLE 2

| Drawing primitive | Left z-level | Right z-level |
|---|---|---|
| 316 | 332 | None |
| 317 | 332 | None |
| 330 | 332 | None |
| 318 | 332 | None |
| 319 | 332 | None |
| 320 | 332 | None |
| 321 | 332 | None |
| 322 | 333 | None |
| 323 | 333 | None |
| 324 | 333 | None |
| 325 | 333 | 332 |
| 327 | 334 | 332 |
| 326 | 334 | 332 |
| 328 | 334 | 332 |
| 329 | 334 | 332 |

The styles of z-level may include, but are not limited to, a simple color, a linear blend described by one or more colors, a radial blend described by one or more colors, or a bitmap image. All of these z-level styles also support a transparency (alpha) channel. The z-levels 333, 332 and 334 in FIG. 33 represent simple color style z-levels. These z-levels are used unchanged through much of the pipeline.

1.5. Stroking

Drawing primitives can be associated with a pen width. Drawing primitives with a pen width are converted into multiple edges (edges have no width). These edges form closed filled shapes that represent the pen stroke. See the section titled Transform, Morphing and Stroking for a detailed discussion.

1.6. Morphing

Morphing is also well known in the art. Morphing can be defined as supplying two sets of drawing primitives for a graphic object and a ratio which specifies that the graphic object is to be drawn according to an interpolation between the two sets. This is also described in more detail in the section titled Morphing, Stroking and Transform module.

2. The Driver Module

The driver module 615 will be discussed in terms of the information it handles, and what information it passes on to the remainder of the rendering pipeline. The role of the driver module 615 is to organize collections of drawing primitives. Drawing primitives are first collected into graphic objects, as described above.

Graphical objects in turn can be collected into sprites, as described below. These sprites can be specified as having properties which apply to the whole collection. The primary role of the driver is to allow efficient high-level operations on the sprites without complicating the rest of the graphical pipeline. When the Driver Module 615 outputs drawing information for subsequent modules in the graphic pipeline, the properties of a sprite are applied to each drawing primitive of each of its graphic objects (for example, its transformation matrix). This allows subsequent modules to deal with directed edges and z-levels only.

2.1. Sprites

The Driver Module 615 accepts sprites as part of its input. Sprites are well known in the art and in the Driver Module 615 they refer to a primitive which has a transformation matrix, a depth and a list of graphic objects which exist within the context of the sprite. Sprites can contain zero or more graphic objects and zero or more other sprites. By "contain", it is meant that the transformation matrix of the sprite is applied to all of the graphic objects and sprites the sprite in question owns. The concept of a sprite containing other primitives also means that the depth of all graphic objects and sprites it contains are "local" to that sprite. Graphic objects do not contain other graphic objects or sprites.

2.1.1 Sprites: Transformation Matrices

Transformation matrices are well known in the art. A sprite's transformation matrix applies to all graphic objects owned by the sprite: it defines a local space for that sprite. In FIG. 17(b) two sprites and two graphic objects are provided and the manner in which they are to be rendered is described by a tree. Sprite 185 contains both sprite 189 and graphic object 180. That is, the links 188 and 186 represent ownership relationships. Sprite 189, in turn contains a second graphic object 182.

Figure 17A:
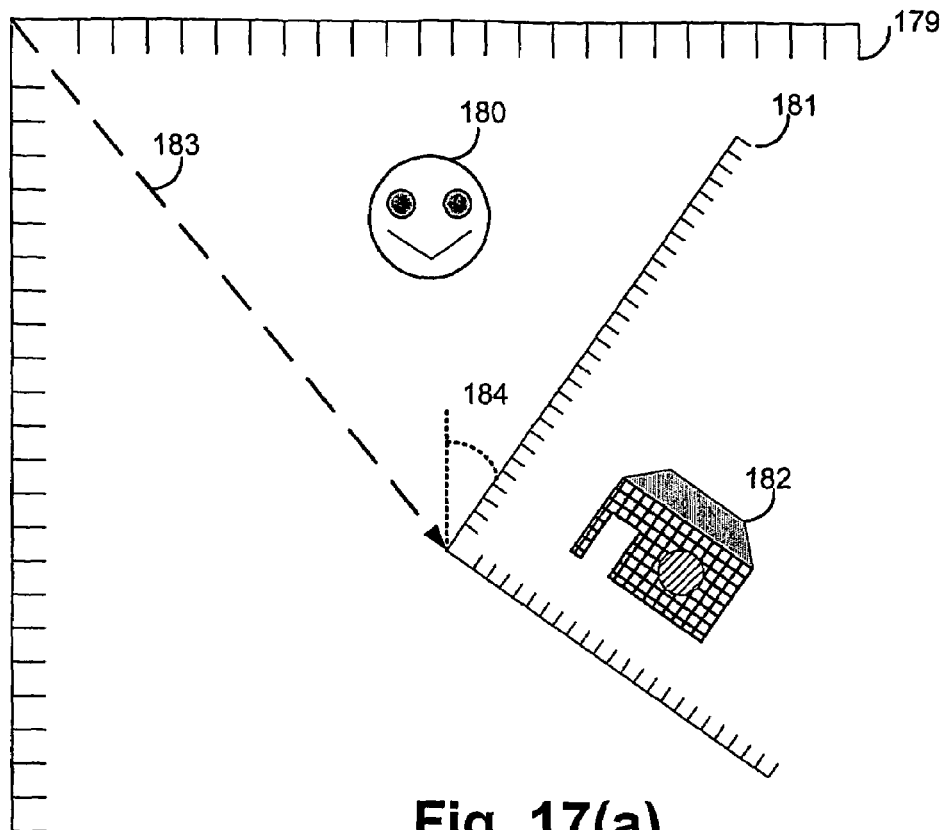
FIGS. 17(a) and 17(b) illustrate the relationship between sprites and transformation matrices.
Figure 17B:
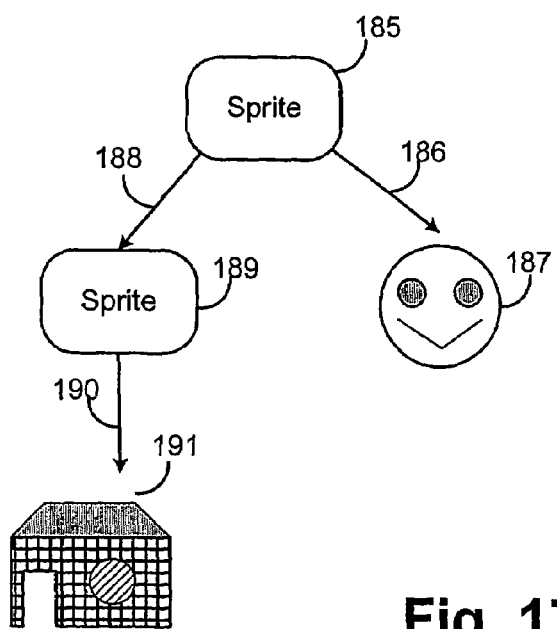

FIG. 17(a) represents the geometry of the transformation matrices which exist in this example. A space 179 contains objects within sprite 185. The object 180 is seen located within the space 179 whereby coordinates of the object's 180 constituent drawing primitives refer to the space 179. Sprite 189 in FIG. 17(b), is also located in this space 179. A space 181 represents that in which the graphic objects of sprite 189 are located.

In this example, sprite 189 has a transform which has a rotation, a translation and a scaling. The translation is represented by a dotted line 183, the rotation by an angle 184, and the scaling by the relative size of the divisions of 179 and 181, the axes used to represent the spaces of sprite 185 and sprite 189, respectively. The scaling, in this example, is the same in both axes.

Still referring to FIG. 17(a), the transformation matrices describing the placement of graphic objects owned by a sprite are concatenated with the transformation matrix describing the placement of that sprite. In the example in FIG. 17(a), the transformation matrix applied to graphic object 182 is the concatenation of the transformation matrices of sprite 189 and sprite 185. This resultant transformation matrix for the object 182 is applied to all the drawing primitives the object 182 contains.

2.1.2. Graphic Objects and their Depth

Figure 31A:
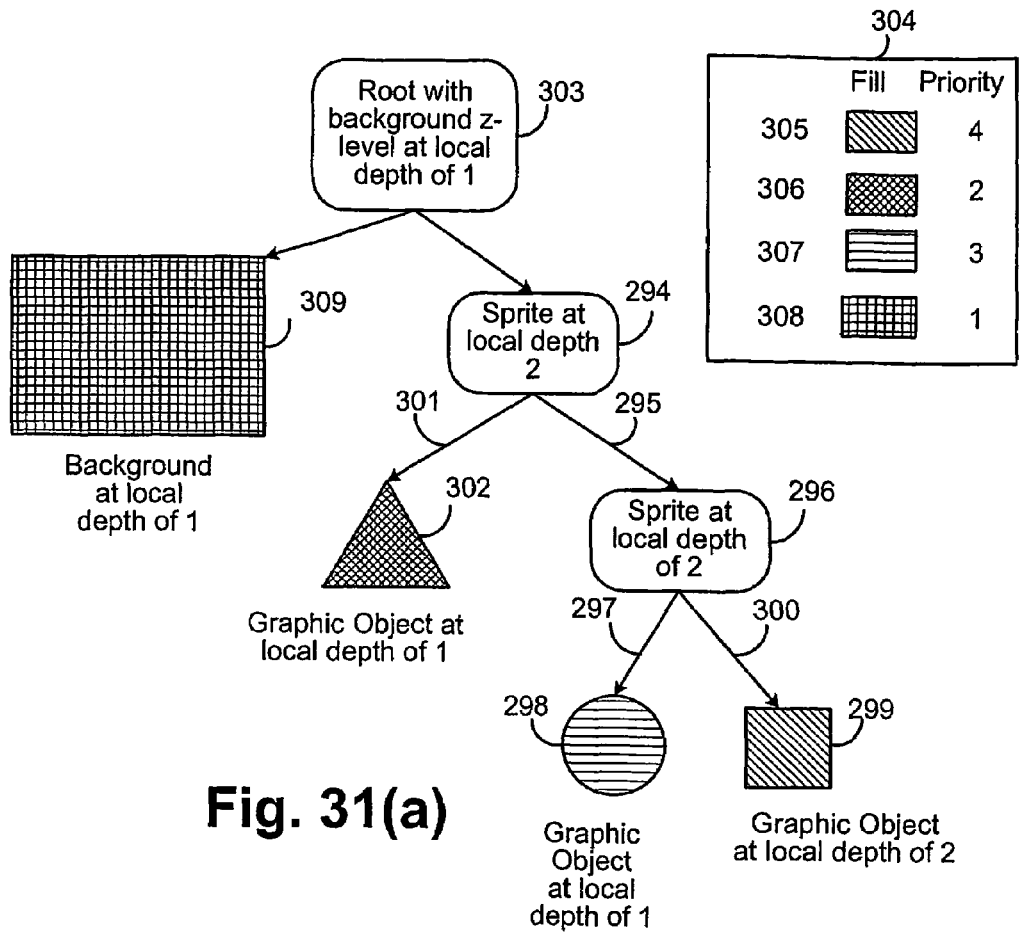
FIGS. 31(a) to 31(c) illustrate the z-level relationship between sprites and local graphic objects.
Figure 31B:
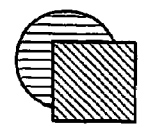
Figure 31C:
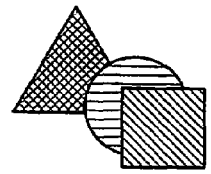

The depth of a graphic object is local to the sprite which contains the object. This is illustrated by FIGS. 31(a) to 31(c). In a rendering tree shown in FIG. 31(a), a node 294 represents a sprite which contains another sprite 296 and a graphic object 302. The ownership relationship is indicated by directed lines 295 and 301 respectively. The sprite 296 in turn contains graphic objects 298 and 299 as indicated by ownership relationships 297 and 300 respectively. TABLE 4 provides the local depths of all these primitives.

TABLE 4

| Label | Primitive | Local depth | Absolute depth |
|---|---|---|---|
| 294 | Sprite | 2 | n/a |
| 296 | Sprite | 2 | n/a |
| 298 | Graphic Object (circle) | 1 | 3 |
| 299 | Graphic Object (square) | 2 | 4 |
| 302 | Graphic Object (triangle) | 1 | 2 |
| 309 | Background z-level | 1 | 1 |

The concept of local depth can be illustrated by looking at the appearance of sub-trees in FIG. 31(a). FIG. 31(b) shows the visual appearance of the sprite 296 (being objects 298 and 299 rendered in isolation). Since object 298 has a smaller depth value than object 299, object 298 appears beneath object 299. FIG. 31(c) shows the visual appearance of graphic object 302 and sprite 296. Since graphic object 302 has the smaller depth value, it appears beneath 296. Notice that the local depths of the children of the sprite 296 are preserved according to the local depth legend 304.

The node 303 is the root of the ownership tree and represents a sprite containing all the topmost sprites. The root 303 always owns the background z-level 309 at its lowest local depth (which is also the lowest global depth). Therefore, this background z-level underlies all graphic objects.

2.2. The Display List

The list of all sprites and graphic objects for a single frame, including their ownership relationships, local depths and transforms is termed the display list. Display lists are well known in the art. The driver module 615 maintains the display list in the form of a tree. This tree collects sprites and graphic objects in terms of ownership relationships, and is ordered in terms of local depths. FIG. 31(a) also illustrates this arrangement. For example, the children of sprite 294 are ordered by local depth; the first child 302, is at the lowest local depth of 1, and the next child 296 is at a higher local depth of 2.

2.2.1. Frame Rendering

For each frame of an animation, the display list may be modified prior to being rendered to the display. The display list is retained between frames.

2.2.2. Graphic Objects and Z-levels

Just as sprites can reference multiple graphic objects, graphic objects can reference multiple z-levels. Each of these z-levels has a depth within the graphic object. For example, the graphic object FIG. 33(c) requires three z-levels with depths as shown in FIG. 33(b).

2.2.3. Local Depths and Absolute Depths

While local depths are used within the Driver Module 615, later modules require absolute depths. The Driver Module 615 assigns each z-level an absolute depth.

Absolute depths for the z-levels of graphic objects are passed from the Driver Module 615 to later modules, where they are simply termed depths: it will be understood that all later modules work with z-levels that have been assigned absolute depths. These assignments are done on a frame by frame basis, just prior to rendering. This is only done if new display objects or sprites have been inserted into the display list or old ones have been discarded.

Given that FIG. 31(a) shows all primitives for a single frame, TABLE 4 above shows absolute depths for all primitives in FIG. 31(a). The absolute depths for all z-levels for a single frame start at 1, which is assigned to the special background z-level. Z-levels are numbered by contiguous integers upwards from the background z-level. Note that sprites do not have an absolute depth per se (although they may record information about the depths of their descendants). Sprites exist as containers for information (such as a placement transform) related to the drawing objects they contain, but are not drawing objects in their own right. Later modules in the rendering pipeline do not use sprites. Graphic objects do not exist outside the driver module 615 either. The local depth of a graphic object is used to calculate the absolute depths of the z-levels referenced by the drawing primitives that make up the graphic object.

Figure 44:
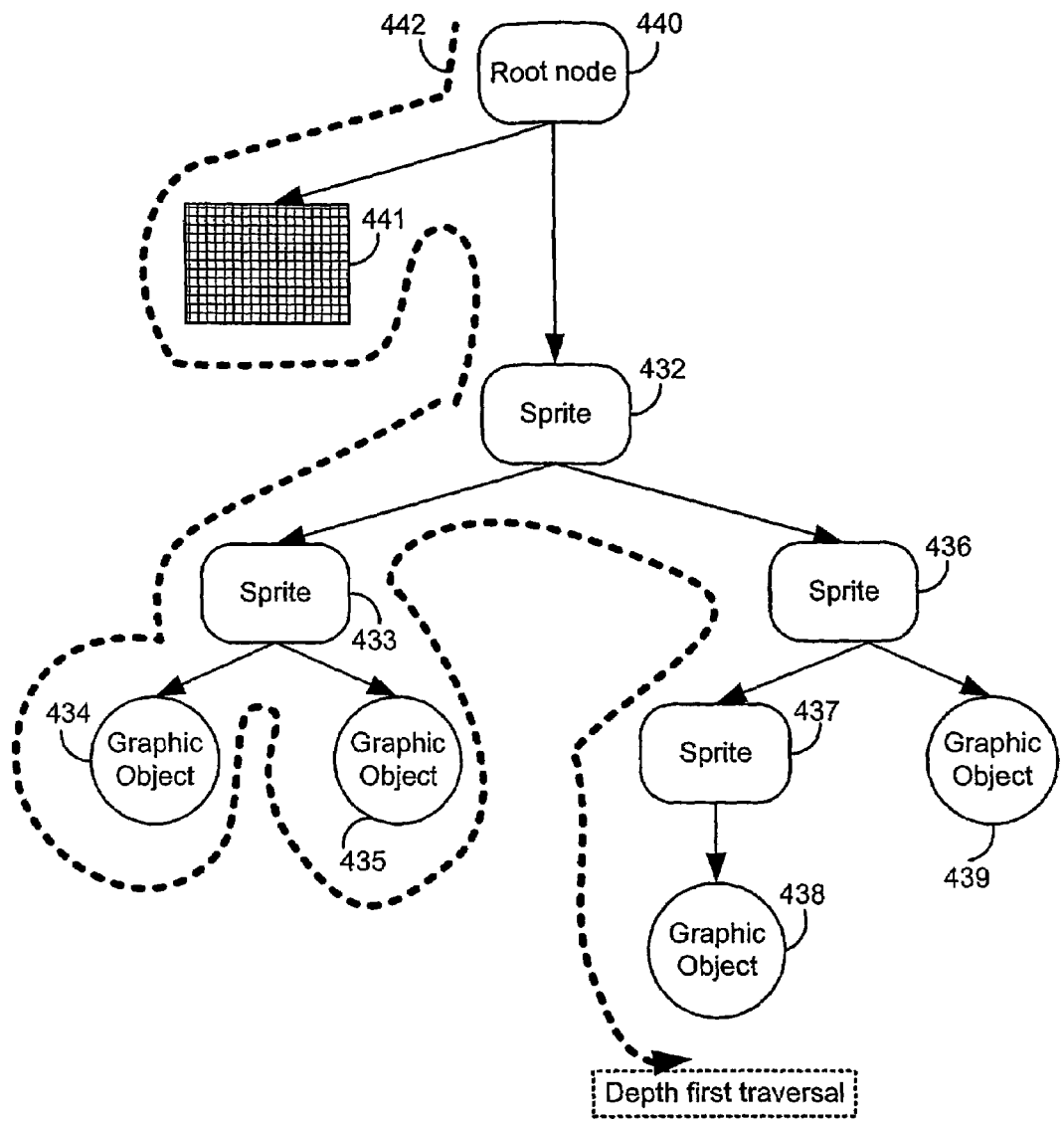
FIG. 44 illustrates calculating absolute depths in a display list.

Absolute depths are only calculated once per frame, when the contents of the display list are to be rendered. A method of calculating these absolute depths is illustrated in FIG. 44 which shows a display list tree. A root node 440 of the display list tree owns a background z-level 441 which underlies all other z-levels. That is, the background 441 has the lowest possible absolute depth of 1. Nodes 432439 make up the remainder of the display list tree.

Absolute depths are assigned to each z-level of each graphic object during a depth-first traversal of the tree, shown by dotted line 442. Assigning absolute depths to the z-levels of a graphic object commences with the lowest z-level in that graphic object and which is assigned an absolute depth one higher than the highest z-level of the immediately "preceding" graphic object. By "preceding", it is meant that the graphic object was the previous one visited in the depth first traversal. In FIG. 44, the depth first traversal is shown reaching graphic object 438. To assign an absolute depth to the lowest z-level of the object 438, it is assigned an absolute depth one higher than the highest z-level in object 435, the previous graphic object visited.

If the object 438 has further z-levels, they are allocated sequential absolute depths, from the next lowest z-level to the highest. The reader will recall that all sprites and graphic objects have independent local depth ranges, and so interleaving is not possible. Every node in the display list tree stores an absolute depth. A graphic object stores the absolute depth of its topmost z-level. A sprite stores the absolute depth of the topmost z-level of its descendants. Traversal of the tree always starts from the root.

When only part of the display list has been changed by the insertion or removal of nodes, for efficiency, a minimal update of the tree is performed. During traversal of the display list tree, updating of absolute depths is only performed starting from the first node which has changed. The z-levels of graphic objects earlier (in traversal order) than this retain their valid absolute depths. Prior to reaching the first changed node, tracking of absolute depths is achieved by noting the topmost absolute depth of each node. When the first changed node is encountered, absolute depth assignments follow from this noted value.

For example, in FIG. 44, if the object 438 was a new node in the display list tree, and this was the only change since the previous frame, the allocating absolute depths would start from object 438.

3. Transformation, Morphing and Stroking

As input, a Morph, Transform and Stroking module 616 of FIG. 56 takes one or more ordered set(s) of coordinates from the Driver Module 615 that collectively define one or more outlines of drawing objects to be rendered. Each ordered set of coordinates may be accompanied by additional parameters, including:
 morph ratio
 transformation matrix
 stroke width
 reference to a left-hand z-level
 reference to a right-hand z-level, and
 reference to a stroke color z-level.

The morph ratio, transformation matrix and stroke width parameters describe how the ordered set of coordinates describing graphic object outlines should be positioned on the display. The remaining parameters are references to z-levels that indicate the color, blend or texture for display pixels within the outlines defined by the ordered set of coordinates.

Figure 46:
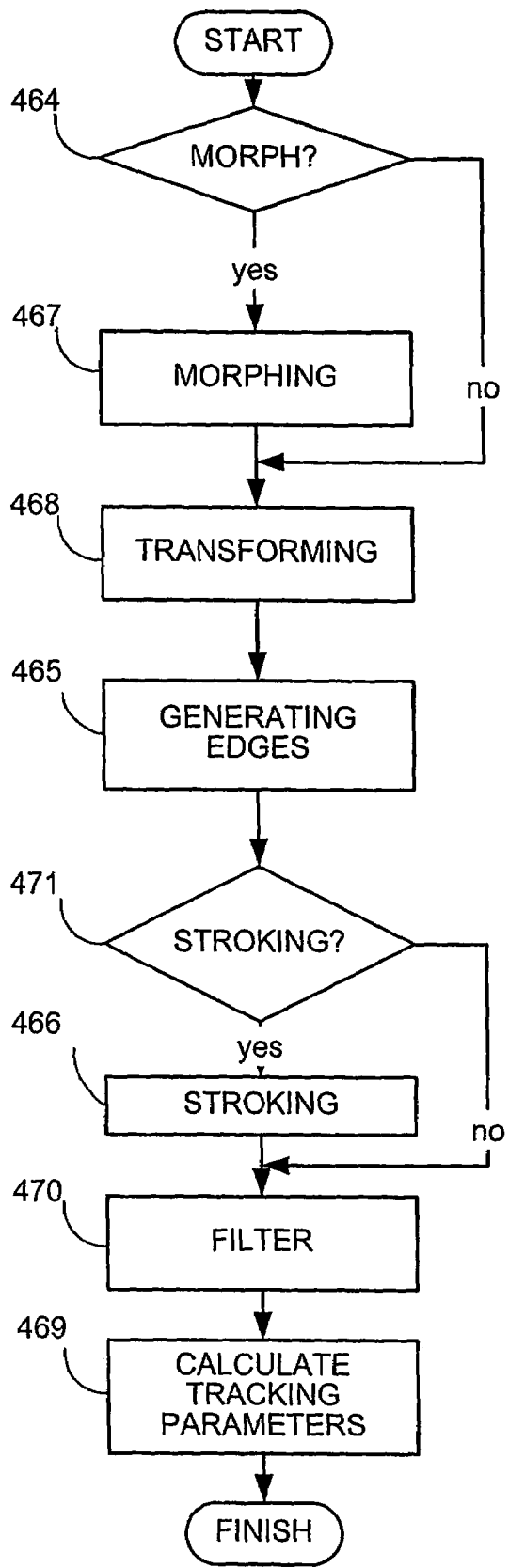
FIG. 46 is a flow diagram showing the processing performed on each ordered set of coordinates by the Morphing, Transform and Stroking module.

FIG. 46 is a flow diagram showing the processing performed on each ordered set of stepped coordinates by the module 616. The purpose of this processing is to convert each ordered set of stepped coordinates (eg. see FIG. 16(*a*)) into a corresponding ordered set of edges, where each edge of the ordered set of edges is described by at least a start coordinate and an end coordinate in render space. That is, edges have directionality. The left and right references to z-levels that edges possess is in terms of this directionality. The morph ratio, transformation matrix and stroke width parameters are used to control this processing.

In addition, the module 616 optionally accepts one or more glyph descriptions. These descriptions contain the following information:
 Glyph position,
 Glyph height and width,
 Glyph bitmap,
 Reference (possibly NULL) to an "on" z-level,
 Reference (possibly NULL) to an "off" z-level, and
 Glyph descriptions enter the pipeline at stage 470.
 3.1. Morphing If the module 616 receives an ordered set of coordinates corresponding to a morph object (ie. in FIG. 46, stage 464=yes), then two versions of each coordinate are received, along with a morph ratio parameter. One version of each received coordinate is referred to as a start version. A second version of each received coordinate is referred to as an end version. The module 616 uses the morph ratio parameter to interpolate a single intermediate version of each received coordinate at stage 467. For example, FIG. 35(*a*) and FIG. 35(*c*) illustrate an ordered set of coordinates representing a morph "start" shape and a morph "end" shape respectively. Both ordered sets of coordinates are shown to begin and end at an origin 342 in a "logical" coordinate space. The purpose of the morph process is to produce an intermediate version of the shape as shown in FIG. 35(*b*) by interpolating between the "start" version of FIG. 35(*a*) and the "end" version of FIG. 35(*c*). The versions ("start" and "end") of each coordinate are presented as an ordered set of coordinate-pairs, in this example 339 and 346 will be a first pair, followed by 343 and 340, 344 and 347, and a final pair 341 and 342. The morph ratio is used to interpolate an intermediate version from each coordinate-pair. If a morph ratio of 0 is used to represent a "start" shape of FIG. 35(*a*), and a morph ratio of 1 is used to represent an "end" shape of FIG. 35(*c*), then a morph ratio of 0.25 would correspond to the shape shown in FIG. 35(*b*). The morph process would therefore produce, as output, an ordered set of coordinates illustrated by 350, 351, 352 and 353.

3.2. Transformation

Next, in FIG. 46, the transformation matrix is applied to the coordinates at stage 468. The transformation matrix allows rotation, scaling and/or translation of coordinates (and therefore drawing objects) to be specified. In this description, the transformation matrix is said to transform the coordinates (and therefore the drawing objects they describe) from a "logical space" into a "render space".

3.3. Generating Edges

After the ordered set of coordinates have been morphed (if appropriate) and transformed, a subsequent stage 465 in the flowchart of FIG. 46 converts the ordered set of coordinates into an ordered set of edges. An example of how the stage 465 may be accomplished is given by the flowchart of FIG. 15. The example assumes that coordinates can form part of one of three types of drawing primitives, the three types being straight lines, quadratic Bezier curves and new drawing positions. The example also assumes additional information (e.g., a tag byte) is provided to indicate what type of drawing primitive follows, and when the end of the drawing primitive is reached.

Figure 15:
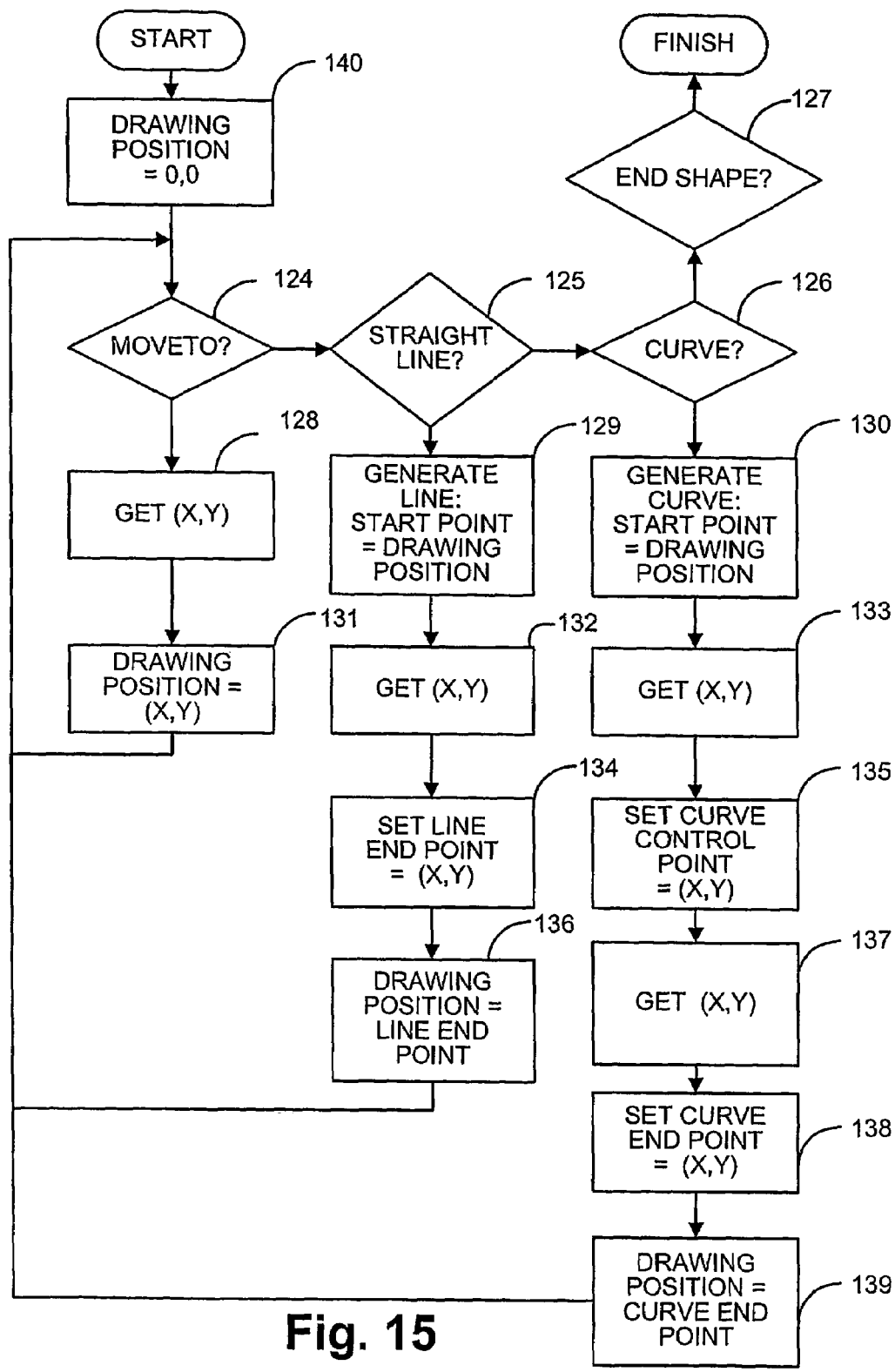
FIG. 15 is a flowchart of step 465 of FIG. 46 for converting an ordered set of coordinates into an ordered set of edges.

First as seen in FIG. 15, a current drawing position is initialized to (0,0) at step 140, then the type of the "following" drawing primitive to be next encountered is determined at steps 124, 125, 126 and 127.

If the type indicates that the following coordinate describes a new drawing position (step 124), then the coordinate is read at step 128 and used to set a new current drawing position at step 131.

If the type indicates that the following coordinate describes a straight edge (step 125), then a new straight edge is generated which is given a start coordinate equal to the current drawing position at step 129. A coordinate is then read at step 132 and this is used for both the new straight edge's end coordinate at step 134 and the new drawing position at step 136.

If the type indicates that the following two coordinates describe a (eg. a quadratic Bezier) curve (step 126), then a new curve is generated which is given a start coordinate equal to the current drawing position at step 130. A first coordinate is then read at step 133 and used as a "control point" coordinate of the new curve at step 135. A second coordinate is then read at step 137 and used as both the end coordinate of the new curve at step 138, and the new drawing position at step 139.

Processing continues until the end of the ordered set of coordinates is reached at step 127.

3.4. Decomposition of Strokes into Edges and Z-Levels

Returning to FIG. 46, the next step of processing is optionally availed at step 471 and is a stroking step 466. Stroking is the process of generating one or more outlines such that they simulate the effect that a pen of given thickness has been used to trace along a path of curves and vectors. Examples of stroking are illustrated in FIG. 50(*a*) to FIG. 50(*e*). FIG. 50(*a*) shows an ordered set of three edges 523 to be stroked. A generated stroked outline 524 is seen in FIG. 50(*b*) providing the effect that a circular-tipped pen of a given pen width 525 has traced the path of the three edges to be stroked.

Although FIG. 46 suggests that the stroking step 466 must be performed after the transformation step 468, it may also be desirable to allow the possibility of stroking to take place prior to transformation, producing different results. For example, referring again to FIG. 50(*a*), if an original shape described by the edges 523 is first transformed to produce the shape 526 shown in FIG. 50(*c*), and then stroked, the result will be the shape 528 as shown in FIG. 50(*d*). However, if the original shape described by the edges 523 is first stroked 524 and then the same transform is applied, the result becomes the shape 527 shown in FIG. 50(*e*). It is possible for the TCIE system 699 to achieve either result by optionally performing the transformation of coordinates of step 468 after stroking 466.

Note that the following discussion of stroking assumes that stroking is performed in a coordinate system with a positive Y-axis that is 90 degrees clockwise to a positive X-axis (e.g., X increases to the right, Y increases downwards).

The module 616 strokes an original ordered set of edges by iterating through the edges in the ordered set of edges. For each edge, a new left-hand edge and a new right-hand edge is generated corresponding to a left and right extent of a circular-tipped pen stroke that has been centred and traced along the path of the original edge. Elliptic arcs are used to generate joins between two successive original edges, as well as endcaps at the start and end of an original ordered-set of edges that does not form a closed shape. An ordered-set of edges is only closed if the start coordinate of the first edge of the ordered-set of edges is equal to the end coordinate of the last edge of the ordered-set of edges.

The arcs are placed as circular arcs in object space, and then transformed via processes described in later sections to elliptic arcs in display space. Although this primitive is currently only used internally, it should be noted that arcs could readily be exposed as drawing primitives available to the user.

3.4.1. Stroking a Straight Edge

Figures 49A, 49D, 49G:
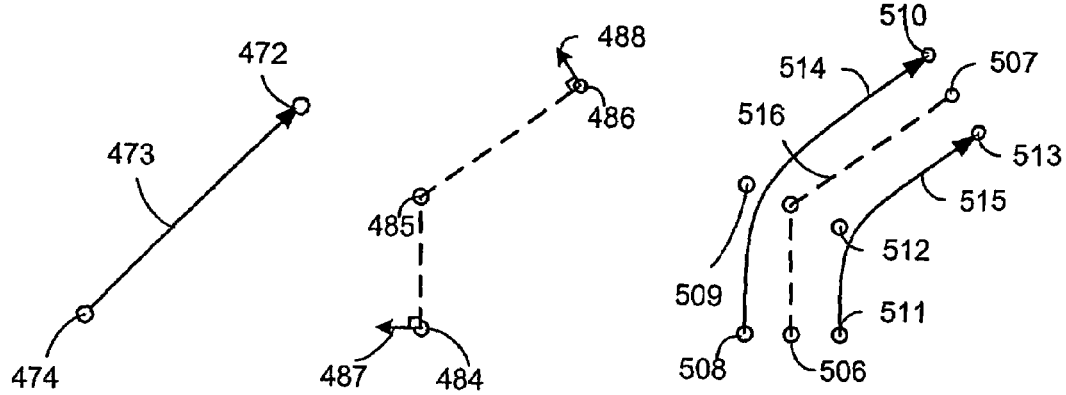
FIGS. 49(a) to 49(h) show examples of stroking edges.
Figures 49B, 49E, 49H:
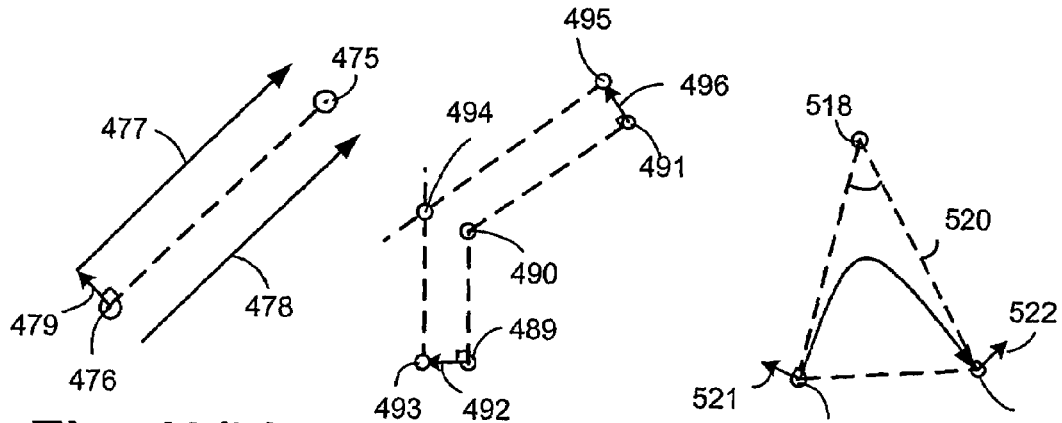
Figures 49C, 49F:
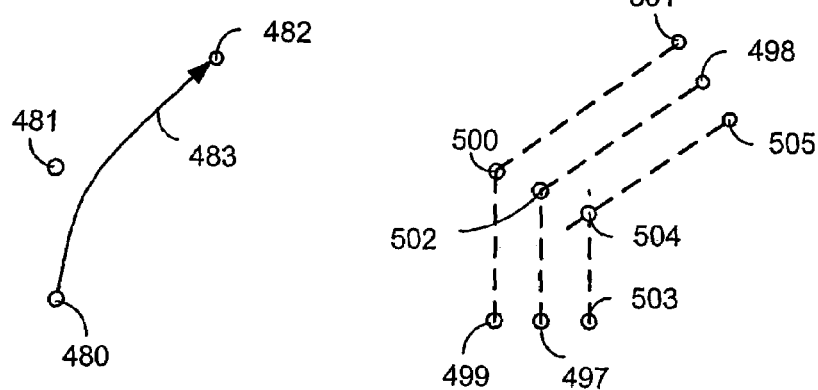

FIG. 49(*a*) shows an example of straight edge 473 to be stroked, described by a start coordinate 474 and an end coordinate 472. FIG. 49(*b*) shows the desired result of stroking the straight edge 473, the result comprising a left-hand edge 477 and a right hand edge 478.

To stroke a straight edge, a left-normal vector 479 is generated which:

has a direction that is 90 degrees anti-clockwise to the direction of the straight edge, and has a length equal to half the pen width of the stroke.

A left-hand stroke edge and a right-hand stroke edge are then calculated using the coordinates of the straight edge 473, 474 ($X_s$, $Y_s$) and 472 ($X_e$, $Y_e$), and the left-normal vector 479 ($X_n$, $Y_n$).

For the left-hand stroke edge 477, a start coordinate ($X_{s\_left}$, $Y_{s\_left}$) and end coordinate ($X_{e\_left}$, $Y_{e\_left}$) are calculated as follows:

$$X_{s\_left} = X_s + X_n$$

$$Y_{s\_left} = Y_s + Y_n$$

$$X_{e\_left} = X_e + X_n$$

$$Y_{e\_left} = Y_e + Y_n$$

A right-hand stroked edge 478 is generated by subtracting the normal vector from the coordinates of the current edge:

$$X_{s\_right} = X_s - X_n$$

$$Y_{s\_right} = Y_s - Y_n$$

$$X_{e\_right} = X_e - X_n$$

$$Y_{e\_right} = Y_e - Y_n$$

3.4.2 Stroking a Curved Edge

FIG. 49(*c*) shows a curved edge 483 to be stroked. Curved edges (quadratic Bezier curves or Quadratic Polynomial Fragments—QPFs) are described by a start point 480, a control point 481 and an end point 482.

FIG. 49(*d*) shows the two left-normal vectors 487 and 488 that must be generated to stroke this edge. Both of the two left-normal vectors have a length equal to half the pen width of the stroke. The first of the two left-normal vectors 487 is 90 degrees anti-clockwise to the vector that runs from the start point 480 to the control point 481. The second of the two left-normal vectors 488 is 90 degrees anti-clockwise to the vector that runs from the control point 481 to the end point 482.

With reference to the FIG. 49(*e*), a curved left-hand stroke edge is generated that has a start point 493, control point 494 and end point 495. The start point 493 of the left-hand stroke edge ($X_{s\_left}$, $Y_{s\_left}$) is calculated by translating 480, the start coordinate of the curved edge ($X_s$, $Y_s$), by the first left-normal vector 487 ($X_{n1}$, $Y_{n1}$):

$$X_{s\_left} = X_s + X_{n1}$$

$$Y_{s\_left} = Y_s + Y_{n1}$$

The end point of the left-hand stroke edge ($X_{e\_left}$, $Y_{e\_left}$) is calculated by translating 482, the end coordinate of the curved edge ($X_e$, $Y_e$), by the second left-normal vector 488 ($X_{n2}$, $Y_{n2}$):

$$X_{e\_left} = X_e + X_{n2}$$

$$Y_{e\_left} = Y_e + Y_{n2}$$

The control point 494 of the left-hand stroke edge is calculated using the intersection of two straight lines. The first straight line runs through the left-hand stroke edge start point 493, and is parallel to the straight line running from the curve edge start point 480, to the curved edge control point 481. The second straight line runs through the left-hand stroke edge end point 495, and is parallel to the straight line running from—the curve edge end point 482 to the curved edge control point 481.

A curved right-hand stroke edge is generated similarly, as shown in the example FIG. 49(*f*) wherein a start point 503, control point 504 and an end point 505 are drawn. The start point coordinate ($X_{s\_right}$, $Y_{s\_right}$) and end point coordinate ($X_{e\_right}$, $Y_{e\_right}$) of the right-hand stroke edge are calculated by:

$$X_{s\_right} = X_s - X_{n1}$$

$$Y_{s\_right} = Y_s - Y_{n1}$$

$$X_{e\_right} = X_e - X_{n2}$$

$$Y_{e\_right} = Y_e - Y_{n2}$$

The control point 504 of the right-hand stroke edge is calculated using the intersection of two straight lines. The first straight line runs through the right-hand stroke edge start point 503, and is parallel to the straight line running from the curve edge start point 480, to the curved edge control point 481. The second straight line runs through the right-hand stroke edge end point 505, and is parallel to the straight line running from the curve edge end point 482 to the curved edge control point 481.

FIG. 49(*g*) shows the resulting left-hand stroke edge 514 and right-hand stroke edge 515 drawn with respect to the various control points.

Note that the technique described above is an approximation of stroking a curve, and is unsuitable for tight-angled curves such as the curve 520 shown in FIG. 49(*h*). In the triangle formed by the start point 517, control point 518 and end point 519 of the curve, the control angle is defined to be the angle subtended by (i.e., opposite to) the straight-line joining start 517 and end 519 points. If the control angle is less than or equal to 120 degrees, then the curve may be considered tight-angled. A convenient test is to use the magnitude of the dot-product of the two left-normal vectors 521 ($X_{n1}$, $Y_{n1}$) and 522 ($X_{n2}$, $Y_{n2}$):

If $(X_{n1}X_{n2} + Y_{n1}Y_{n2})^2 < \frac{1}{2}(X_{n1}^2 + Y_{n1}^2) * (X_{n2}^2 + Y_{n2}^2)$, then curve is tight-angled.

Methods of bisecting Quadratic Bezier curves described by a start, control and end point are known in the art. Curved edges that are determined to be tight-angled are first bisected into two equivalent curved edges, thence bisected again, resulting in a total of four curved edges. The outer two new edges (those not adjacent to the original tight angle) are then stroked using the process described above. The inner two new edges are vectorized into a path of approximating straight edges using techniques well known in the art. This path is then stroked using the process described in Section 3.4.1.

3.4.3. Stroking a Join

Figure 45A:
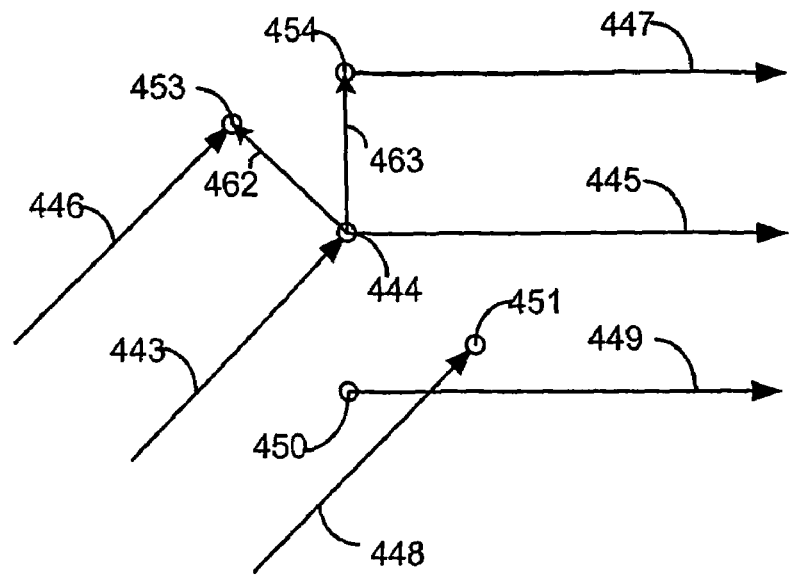
FIGS. 45(a) and 45(b) depict edge management for stroking a join.
Figure 45B:
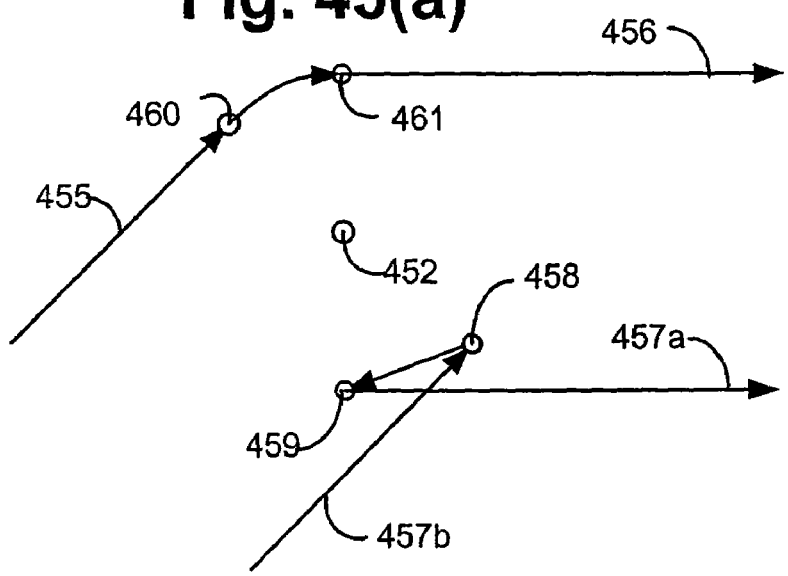

Additional curves need to be generated to stroke the area where edges of a path join. A join is defined to have an entering edge and an exiting edge. FIG. 45(*a*) shows two straight edges forming a join 444, where edge 443 is an entering edge since the join forms its end point, and edge 445 is the exiting edge since the join forms its start point. Left hand stroke edges 446 and 447, and right hand stroke edges 448 and 449 have been generated using the process described above. Left-normal vectors will have been determined for the end of the entering edge 462 and the start of the exiting edge 463. Considering the left-hand side first, a test is made to determine if it is necessary to generate a curve outline for the join that connects the end of the entering edge 453 with the start of the exiting edge 454. Given that a left-normal vector 462 with components ($X_{n1}$, $Y_{n1}$) is already known for the end of the entering edge to be stroked, and a left-normal vector 463 with components ($X_{n2}$, $Y_{n2}$) is already known for the start of the exiting edge to be stroked, then the following test can be used to determine the necessity of generating the curve outline:

If $Y_{n1}X_{n2} < Y_{n2}X_{n1}$, then a curved edge is used to link the left-hand edges of the stroke, and a straight edge is used to link the right-hand edges of the stroke.

Similarly, if $Y_{n1}X_{n2} > Y_{n2}X_{n1}$, then a curved edge is used to link the right-hand edges of the stroke, and a straight edge is used to link the left-hand edges of the stroke.

If $Y_{n1}X_{n2} = Y_{n2}X_{n1}$ then the edges forming the join have either equal or opposite direction at the join. The process for such a case is given in the Section 3.4.4 below.

In the example shown in FIG. 45(*a*), the above test would indicate that a curved edge must be generated for the left-hand side of the join. This curved edge will be an exact circular arc with the following properties:

- the start point and end points of the arc are points 453 and 454;
- the radius of the arc is the length of the left-hand vector 462;
- the center of the arc is the original path point 444; and
- the arc proceeds in a clockwise fashion from start point to end point (the arc would proceed counter-clockwise if the right-hand side of the join were being processed).

These values are used to generate an elliptical arc edge, the further processing of which is described below.

Continuing the example shown in FIG. 45(*a*), the above test would indicate that a straight edge must be generated for the right-hand side of the join, linking the end point of a first right-hand edge 451 to the start point of a second right hand edge 450.

FIG. 45(*b*) shows a situation where edges 455 and 456 of the same side of different stroke paths do not join. A new edge can be created to extend from corresponding vertices 460 and 461 and which is curved about a control or focal point 452 associated with the edges 455 and 456. FIG. 45(*b*) also shows the corresponding opposite edges 457*b* and 457*a* which do not join. A new edge is inserted between the vertices 458 and 459 to provide closure for the path. This is a straight edge as its effect on stroke fill is nil.

3.4.4. Stroking Equal or Opposite Edge Joins

In the description of the technique of stroking a join above, a test was described for indicating when two original edges forming a join to be stroked had either equal or opposite direction:

$$Y_{n1}X_{n2}=Y_{n2}X_{n1}$$

where $(X_{n1}, Y_{n1})$ is the left-normal vector for the end of an entering edge to be stroked, and $(X_{n2}, Y_{n2})$ is a left-normal vector for the start of an exiting edge to be stroked.

Further, if $X_{n2}=X_{n1}$ then the left-normal vectors are equal and therefore the entering and exiting edges have the same direction at the join. No additional edges are required for stroking the join.

If $Y_{n1}X_{n2}=Y_{n2}X_{n1}$ but $X_{n2}\neq X_{n1}$ then the entering and exiting edges have opposite directions at the join, and therefore an end-cap must be generated for the join, as described below.

3.4.5. Generating End-Caps at the End of a Path

End-caps are generated for the terminating points of an unclosed path to be stroked. End-caps also have to be generated for joins between edges where the entering edge and exiting edge are opposite in direction (as described above).

Figure 18A:
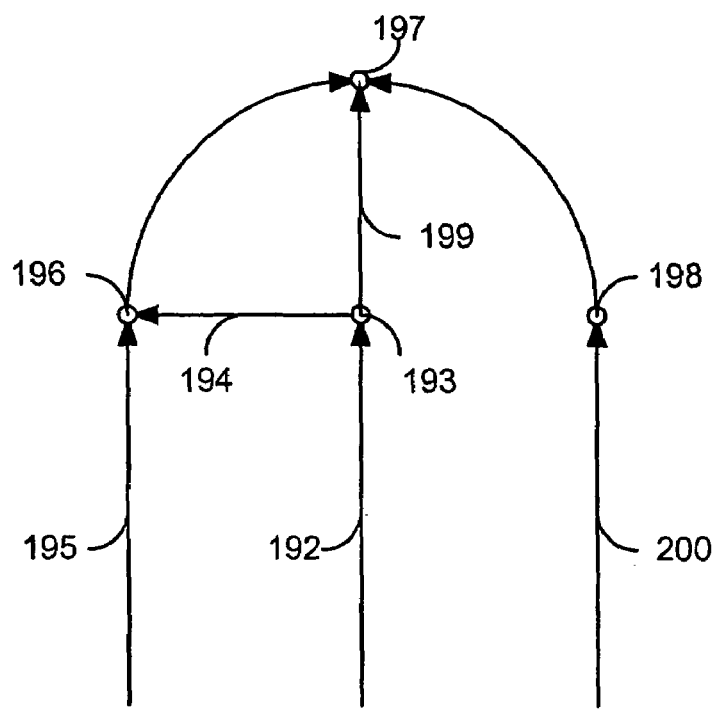
FIGS. 18(a) and 18(b) illustrate end-caps of a stroke.

The process generates an end-cap for a terminating point using an elliptic arc. An example of an end-cap of a stroke is given in FIG. 18(a), showing an original edge of a path to be stroked 192, terminating at a point 193. The left-hand stroke edge 195 and right-hand stroke edge 200 are drawn terminating at end points 196 and 198 respectively. A left-normal vector 194 with components $(X_n, Y_n)$ for the end point of the terminating edge is shown.

To generate the end-cap, an elliptic arc is placed with the following properties:
 the arc begins at the left-hand end point 196 and terminates at the right-hand end point 198;
 the centre of the arc is the original path point 193;
 the radius of the arc is the length of the left-normal vector 194; and
 the arc moves around the circle clockwise.

When stroking a path that has a valid left z-level reference and/or a valid right z-level reference (in addition to a valid stroke z-level reference), then this indicates the stroked path also forms part of an enclosed area to be filled. For such a path, it is necessary to add an additional two straight edges to any end-caps.

In this case, a new left-normal vector 199 with components $(X_{n\_knee}, Y_{n\_knee})$ is created such that it is equal to the left-normal vector for the end point of the terminating edge rotated 90 degrees clockwise. A knee coordinate 197 $(X_{knee}, Y_{knee})$ is then generated using the coordinate of the terminating point 193 $(X_j, Y_j)$ and the new left-normal vector 199 with components $(X_{n\_knee}, Y_{n\_knee})$:

$$X_{knee}=X_j+X_{n\_knee}, Y_{knee}=Y_j+Y_{n\_knee}.$$

Figure 18B:
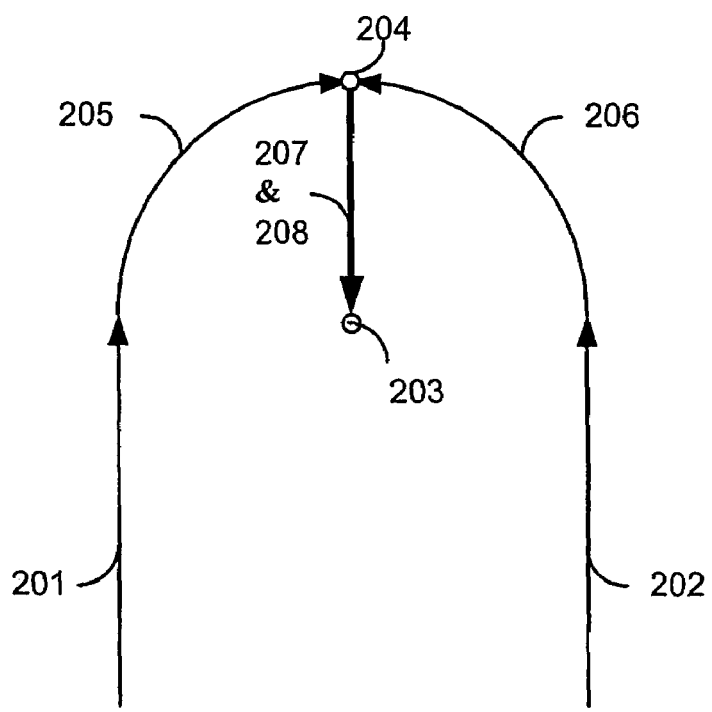

FIG. 18(b) depicts the additional two edges, 207a and 207b, which both start at the knee point 197, and both end at the terminating point of the original edge to be stroked 193. A first additional edge 207a is an additional left-hand stroked edge, and a second additional edge 207b is an additional right-hand stroked edge. A description of how z-level references are assigned to left-hand stroked edges and right-hand stroked edges is given below.

3.4.6. Endcaps Between Stroked and Unstroked Edges

Figure 28A:
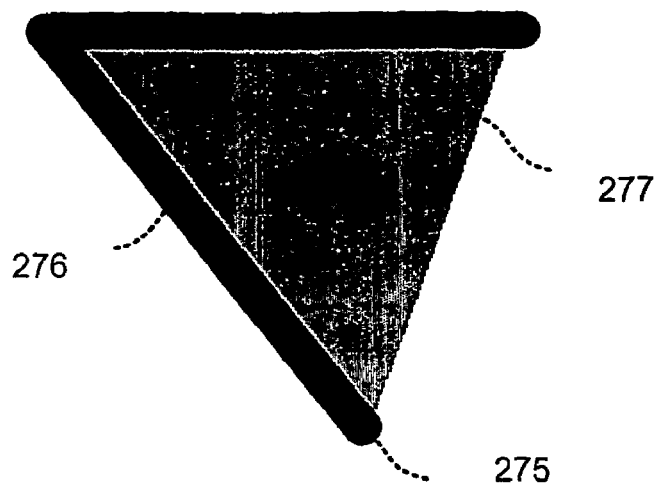
FIGS. 28(a) and 28(b) illustrate various fills for types of end caps.

End caps are also generated when an edge referencing a stroke fill is followed in the path by an edge which does not reference a stroke fill. FIG. 28(a) shows a triangular-shape that is partially stroked. Vertex 275 is where stroked edge 276 joins non-stroked edge 277. An end cap is generated at vertex 275.

This end cap is constructed by the same method as shown in the previous section—that is, by the same method used for end caps generated at the end of the path, and additional steps as described below. The results of applying this method are shown in detail in FIG. 28(b).

Consider the interior fill of the shape, which is the left hand fill referenced by edge 278. From this, it can be seen that the addition of the small end cap edge 280 ensures the interior fill is completely bounded by a closed set of edges. Edges 279, 280, 282, 278 are the in the set of edges that enclose the shape fill in the region of the join. Additional edges not shown in the diagram enclose the fill in regions not in the join. It is well known in the art that methods of filling shapes rely on those shapes being closed—particularly when winding rules and winding counts are used to fill areas bounded by edges.

Figure 28B:
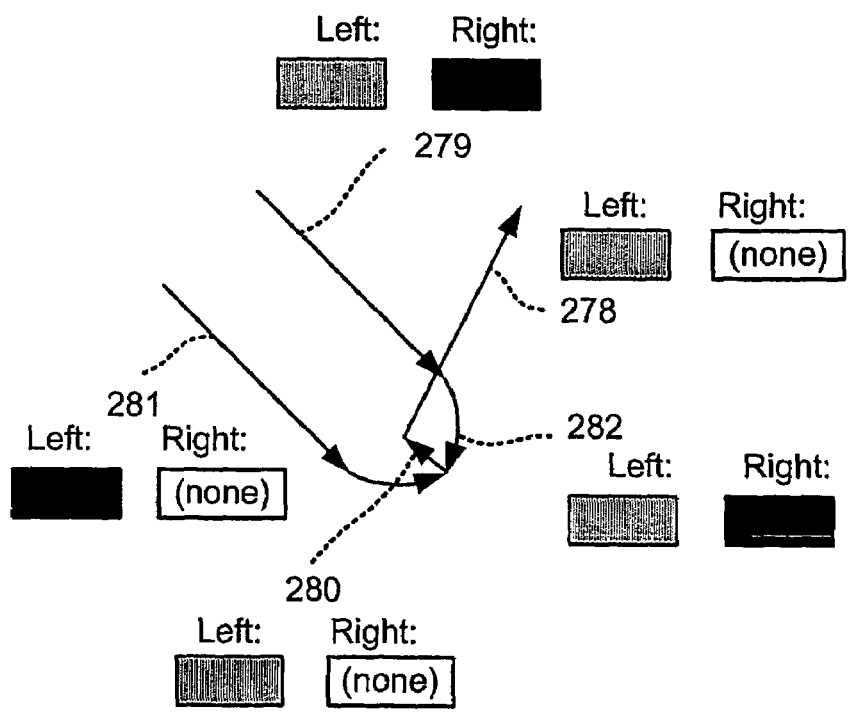

Edge 278 is the only edge shown in FIG. 28(b) that was not generated by the stroking method—it taken from the set of input edges and included in the set of output edges.

3.4.7. Z-level Assignments for Opaque Strokes

When an ordered set of coordinates are provided as input, and that ordered set of coordinates are to form a stroked path, then a valid stroke z-level reference and a pen width will be required as input in addition to a left z-level reference and a right z-level reference. There is no difference between the format of a z-level that is used for a stroke and a z-level that is used to fill a path. Once the ordered set of coordinates have been processed into an ordered set of edges they can be stroked using the technique described above. The module 616 produces a set of left-hand stroke edges and a set of right-hand stroke edges. Given that the module 616 received a left z-level, right z-level and stroke z-level as input, and the stroke z-level is determined to be opaque, then the produced left-hand stroke edges are assigned:
 a left z-level reference that references the left z-level received as input;
 a right z-level reference that references the stroke z-level received as input;

and the produced right-hand stroke edges are assigned:
 a left z-level reference that references the stroke z-level received as input;
 a right z-level reference that references the right z-level received as input.

In this section, a reference to a left or right stroke edge is a reference to an edge on the outer boundary of a stroked edge as seen following the direction of the edge. In this regard, a left stroke edge will appear on the right side of the edge when the edge is directed from a top-left of the display to the bottom-right of the display.

When this z-level assignment is used, the original edges of the stroked path are discarded and therefore completely replaced by the produced left-hand stroke edges and right-hand stroke edges.

An example is shown in FIGS. 51(a) to 51(e). FIG. 51(a) shows a set of input edges for the stroking method given above, and which define a closed path. Edges 533, 532 and 534 are all associated with left z-level 530, right z-level 531 and stroke z-level 529. In the case of an opaque stroke, the edges output from the stroking method for input edge 533 are shown in FIG. 51(d), together with their z-level assignments. The visual result of stroking the path given in FIG. 51(a) is shown in FIG. 51(b).

Note that the produced left hand stroke edge 535 has a left z-level reference 538 that references the left z-level 530 provided as input, and has a right z-level reference 539 that references the stroke z-level 529 provided as input. Also, the produced right hand stroke edge 536 has a left z-level reference 540 that references the stroke z-level 529 provided as input, and a right z-level reference 541 that references the right z-level 531 provided as input. The original stoke edge 533 is discarded.

3.4.8. Z-level Assignments for Transparent Strokes

An alternative z-level assignment to the above is now given. The assignment is particularly suited to the stroking of an ordered set of edges that has a stroke z-level having some degree of transparency. In the z-level assignment, the produced left-hand stroke edges are assigned:

a null left z-level reference, a right z-level reference that references the stroke z-level received as input;

and the produced right-hand stroke edges are assigned:

a left z-level reference that references the stroke z-level received as input, a null right z-level reference.

When this z-level assignment is used, the original edges are not discarded—the output of the stroking process is the union of the set of original edges, the set of produced left-hand stroke edges and the set of produced right-hand stroke edges. The original edges are assigned a left z-level reference provided as the input left z-level reference and a right z-level reference provided as the input right z-level reference.

FIG. 51(*a*) shows a set of input edges for the stroking method given above. Edges 533, 532 and 534 are all associated with left z-level 530, right z-level 531 and stroke z-level 529. In the case of a transparent stroke, the edges output from the stroking method for input edge 533 are shown in FIG. 51(*e*), together with their z-level assignments. The visual result of stroking the path given in FIG. 51(*a*) is shown in FIG. 51(*c*).

Note that the produced left hand edge 542 has a left z-level reference 545 that is null, and has a right z-level reference 546 that references the stroke z-level 529 provided as input. The original edge 533 is not discarded, and has a left z-level reference 550 which references the left z-level 530 provided as input, and a right z-level reference 549 which references the right z-level 531 provided as input. Also, the produced right hand edge 543 has a left z-level reference 547 that references the stroke z-level 529 provided as input, and a right z-level reference 548 that references that is null.

Figure 63:
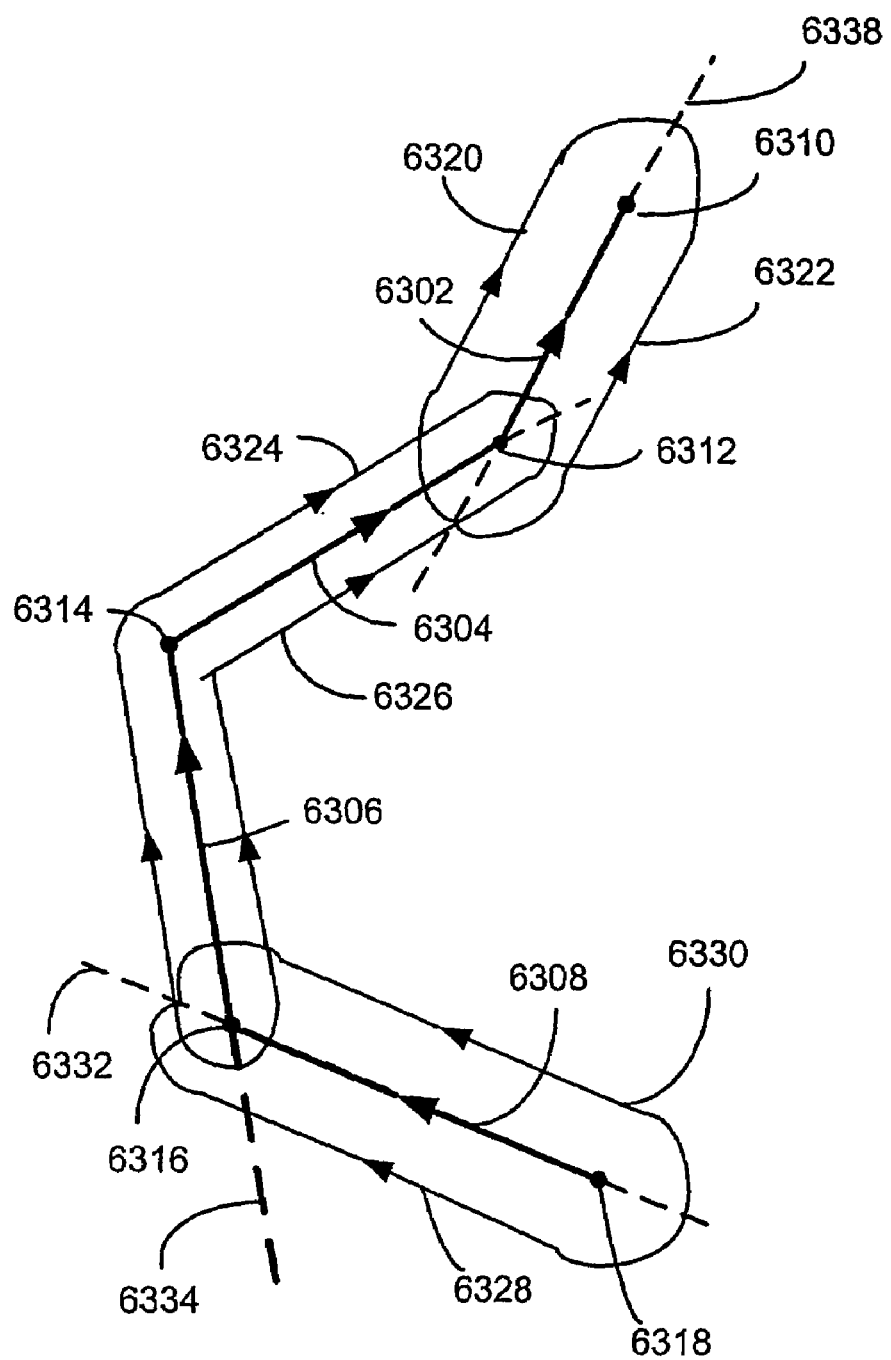
FIG. 63 shows different stoke being applied to discrete portions of a path.

FIG. 63 illustrates a path 6300 which is desired to be stroked and which is formed by a number of directed edges 6302, 6304, 6306 and 6308. As seen, the directed edges extend from and join by virtue of vertices 6310, 6312, 6314, 6316 and 6318.

In this example, it is desired for the path 6300 to be stroked according to stroke widths associated with each of the directed edges 6302-6308. In this regard, it is noted that the directed edges 6304 and 6306 have the same stroke width and color and as such, those two edges collectively define a discrete portion of the original path 6300 which is to be stroked.

As indicated previously with respect to FIG. 18(*a*) and FIG. 18(*b*), artifacts can occur when stroking the end of an edge. Specifically, as illustrated in FIG. 63, where edges having different stroke widths intersect (eg: at the vertices 6312 and 6316), it is essential that accurate stroking take place for all edges so that accurate compositing may be performed from the edge information. In this regard, the different stroke widths may result in one stroke being composited over the other and such can provide substantial errors where opaque strokes are used. Further, less substantial but still significant errors may occur when transparent strokes are used. In order to ensure that the path 6300 is accurately stroked it is necessary to ensure that the individual stroke paths formed by the discrete edge portions of the path 6300 are accurately reproduced.

This is initially performed by identifying those vertices of the original stroke path 6300 at which the stroke width changes. From FIG. 63, it is seen that stroke widths change at the vertices 6312 and 6316. At all other vertices, the stroke width is constant and corresponds to that of the corresponding stroke path to be created. Further, identifying the vertices where the stroke width changes, allows for those other vertices where there is no change (eg: the vertex 6314) to be accurately stroked. With the vertices appropriately identified, separate stroke paths can then be created for each of the discrete portions of the original path 6300. For a first discrete portion, defined by the edge 6302, stroke paths 6320 and 6322 are each originating from the vertex 6312 and being directed toward an apex located on an extension 6338 of the directed edge 6302 and extending from the vertex 6310. The stroking of the paths 6320 and 6322 about the vertex 6310 may be performed in the fashion shown previously described in FIG. 18(*a*). The stroking of the paths 6320 and 6322 about the vertex 6312 is performed in the fashion previously described with reference to FIG. 18(*b*) and it is noted that FIG. 63 exaggerates the paths 6320 and 6322 extending from the vertex 6312 (cf. the edges 207*a* and 207*b* seen in FIG. 18(*b*)). Notably, the stroke paths 6320 and 6322 collectively envelop the corresponding discrete portion (formed by the edge 6302) of the original path 6300.

A similar approach is performed for the stroke path associated with the edges 6304 and 6306. In this particular case, each of the ends of the path defined by the vertices 6312 and 6316 incorporate arrangements corresponding to that previously described in FIG. 18(*b*). Stroke paths 6328 and 6330 associated with the edge 6308 are created in a similar fashion to those for the edge 6302. Significantly, in each of these examples it is necessary for the stroke paths to transit the vertices identified as being at a point on the path where the stroke width changes.

An extension of the arrangement of FIG. 63 can now be understood with reference to FIGS. 51(*b*) or 51(*c*), where a closed path is shown. The arrangement of FIG. 63 enables a closed path incorporating discrete portions to be stroked such that an interior of the path can be accurately filled using the negative winding rule and the fill rules previously described with reference to FIGS. 51(*a*)-51(*e*). In this fashion, the previously described method of replacing edges of the original path with edges defining the stroke path having left and right fill can be used to define the interior of the closed path and the consequential fill levels for the stroked portions thereof and the interior.

3.4.9. Transformation of Stroking Primitives

If stroking is performed in render space, then the lines, Bezier curves and arcs produced by the stroking module do not need to be transformed. However, if stroking is performed in object space, then these primitives must undergo the same transformation as the original edges of the shape.

Stroke lines and Bezier lines are transformed in a similar manner to shape lines and Bezier curves, as discussed in Section 3.2. Stroke end-caps and joins, on the other hand, must undergo a separate procedure, as the result of applying an affine transformation to a circle arc is a generalized elliptic arc.

Figure 19:
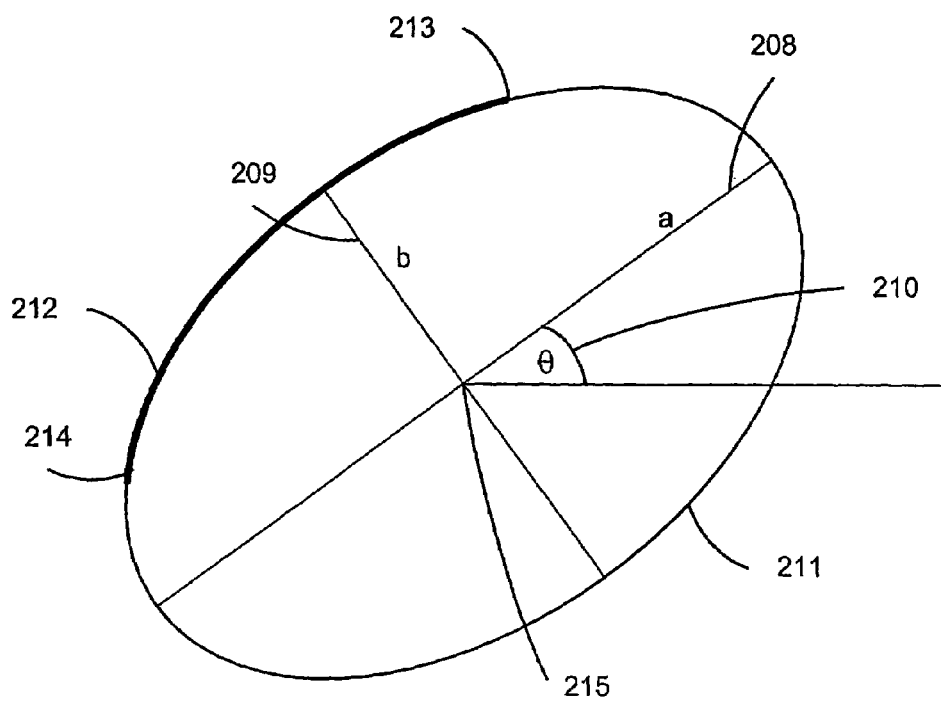
FIG. 19 shows a generalized ellipse.

A generalized elliptic arc is shown in FIG. 19. The underlying ellipse 211 can be described by a major axis 208, a minor axis 209, a center point 215, and an angle of rotation

210. The elliptic arc fragment 212 that lies on this ellipse is fully described by the further provision of start Y coordinate 213, end Y coordinate 214, and fragment direction (clockwise or counter-clockwise). In the case of ellipse fragment 212, the direction is counter-clockwise.

There are several approaches towards retrieving elliptic coordinates from an underlying circle and a transformation. One approach is to find the two solutions mod $\pi$ of the following equation:

$$\tan(2\theta) = \frac{2ab + 2cd}{a^2 - b^2 + c^2 - d^2}$$

where $$\Gamma = \begin{pmatrix} a & b \\ c & d \end{pmatrix}$$

is the non-translating part of the transformation matrix.

The normalized major and minor axis vectors (relative to the center of the ellipse and for a unit circle) are then given by:

$$A = \Gamma \begin{pmatrix} \cos\theta \\ \sin\theta \end{pmatrix}$$

for the two solutions of $\theta$. One of these normalized axes (or its inverse) A' will lie in the first quadrant. The length of this axis vector multiplied by the radius of the pre-transformed circle gives the length of the major axis of the post-transformed ellipse. The angle of this axis vector from horizontal gives the rotation of the ellipse. The length of the other axis vector multiplied by the radius of the circle gives the length of the minor axis of the ellipse.

The center of the ellipse is found by applying the user-supplied transformation to the center of the circle. The start and end coordinates of the elliptic arc are found by applying this same transformation to the start and end coordinates of the original circle.

It is possible that the user-supplied transformation is inverting in one dimension. If this is the case, then the direction of the arc fragment must be changed. To test whether the transformation is inverting, it is sufficient to take vectors $$\begin{pmatrix} 1 \\ 0 \end{pmatrix} \text{ and } \begin{pmatrix} 0 \\ 1 \end{pmatrix},$$

apply $\Gamma$ to them, and determine the rotation from horizontal of the resulting vectors. The two vectors will inscribe an angle that is less than 180°. If $$\Gamma \begin{pmatrix} 1 \\ 0 \end{pmatrix}$$

is on the counter-clockwise side of this angle, then the transformation is an inverting one; else it is not.

3.5. Filtering

Having generated coordinates that describe an edge in terms of a start coordinate $(X_s, Y_s)$, end coordinate $(X_e, Y_e)$, and for curves only, an additional control coordinate $(X_c, Y_c)$ the next process is to discard edges that clearly do not affect the output frame, this being a filtering process 470 seen in FIG. 46. At this stage in the processing, all the coordinates of an edge are in "render space" (since they have been transformed) and therefore can be directly compared with the bounding coordinates of the display. For example, if the frame has a width of w and a height of h, the top-left of the frame described by (0,0) and the bottom-right of the frame described by (w−1,h−1), then a straight edge can safely be filtered (i.e., discarded) if:

$(X_s>=w)$ AND $(X_e>=w)$//off to the right
OR
$(Y_s<0)$ AND $(Y_e<0)$//off the top
OR
$(Y_s>=h)$ AND $(Y_e>=h)$//off the bottom For the purposes of filtering, glyphs are treated as if they were straight edges that stretched from the top-left corner to the bottom-right corner of the glyph. A similar test for curves (which have the additional control coordinate) is:

$(X_s>=w)$ AND $(X_c>=w)$ AND $(X_e>=w)$//off to the right
OR
$(Y_s<0)$ AND $(Y_c<0)$ AND $(Y_e<0)$//off the top
OR
$(Y_s>=h)$ AND $(Y_c>=h)$ AND $(Y_e>=h)$//off the bottom Straight edges that are horizontal (ie. Ys=Ye) are also filtered.

It should be noted that edges which are completely off to the left of the display are not discarded—such edges do affect the display output.

3.6. Generating Edge-tracking Parameters

In FIG. 46, the purpose of the following process 469 is to convert the edges into a modified representation, which may include the calculation of tracking parameters. This modified representation is more suitable for processing by subsequent modules, and the modified representation contains at least:

a start coordinate (X,Y),
a reference to a left z-level and/or a reference to a right z-level,
an end Y ordinate, and
tracking parameters.

The term "tracking parameters" is used herein to describe one or more parameters that allow the X-ordinate of an edge to be calculated incrementally with respect to unit increments of Y, unless contrary intentions are indicated. For example, a straight line can be described by a start coordinate $(X_s, Y_s)$, an end Y-ordinate $Y_e$, and a delta-X term that represents a change in X-ordinate corresponding to a unit step change in Y-ordinate (i.e., a gradient). The delta-X term would be a single tracking parameter for the edge.

Because the TCIE system 699 always renders from top left to bottom right, edges (straight-lines or curves) are required to be specified such that they have an end Y-ordinate that is greater than the start Y-ordinate. This can be ensured by comparing the start and end Y-ordinates, and swapping the start and end coordinates if appropriate. If the start and end coordinates are swapped, then the left and right z-level references must also be swapped.

3.6.1. Generating Straight-edge Tracking Parameters

It has already been indicated that a straight line can be described using a delta-X term as a tracking parameter. However, delta-X will often be required to contain fractional data. As an alternative to representing delta-X using floating-point or fixed-point format, a more accurate representation is to store an integer part and a remainder part for the gradient.

In a software implementation, this process may be implemented in C-language code to calculate the two parts of the gradient:

$$Grad=(X_e-X_s)/(Y_e-Y_s)$$

$$Ient=(X_e-X_s)\%(Y_e-Y_s)$$

where $(X_s, Y_s)$ are the start coordinates of the edge, and $(X_e, Y_e)$ are the end coordinates of the edge.

For the edge to be accurately described in a suitable format, the Grad and Ient terms above are provided, along with a start coordinate $(X_s, Y_s)$, an end Y-ordinate $(Y_e)$, left and right z-level references, and additionally, a left flag (Boolean value), where:

$$\text{Left flag} = \text{TRUE if}(X_e < X_s)$$
$$= \text{FALSE if}(X_e >= X_s)$$

3.6.2. Generating Quadratic Bezier Curve Tracking Parameters

Step 465 of FIG. 46, as described above generates, for each curve:
a start coordinate,
a control coordinate, and
an end coordinate.

Figure 7:
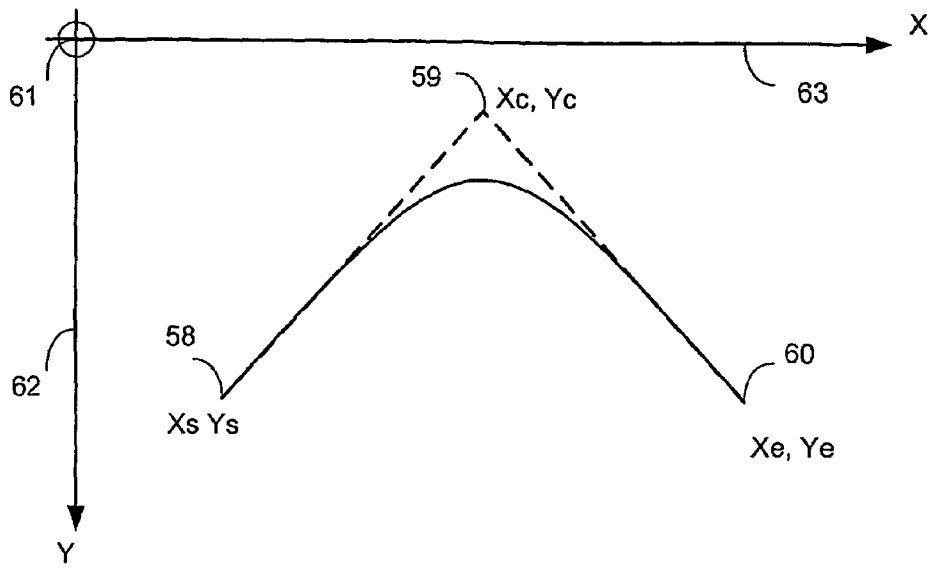
FIG. 7 shows an example Bezier curve related to the tracking parameter generation process of FIG. 41.

Because the coordinates of the curve have already been transformed (during processing of the corresponding ordered set of coordinates in step 468), the coordinates of the curve relate to positions in "render space". FIG. 7 shows an example of a Bezier curve represented by a start coordinate 58, a control coordinate 59 and an end coordinate 60 in a render space indicated by an origin (representing the top-left of a frame of animation 61) and X and Y axes (63 and 62 respectively). The process of generating tracking parameters for quadratic Bezier curves from a start coordinate 58 $(X_s, Y_s)$, control coordinate 59 $(X_c, Y_c)$ and end coordinate 60 $(X_e, Y_e)$ is now described with respect to FIG. 41.

Figure 41:
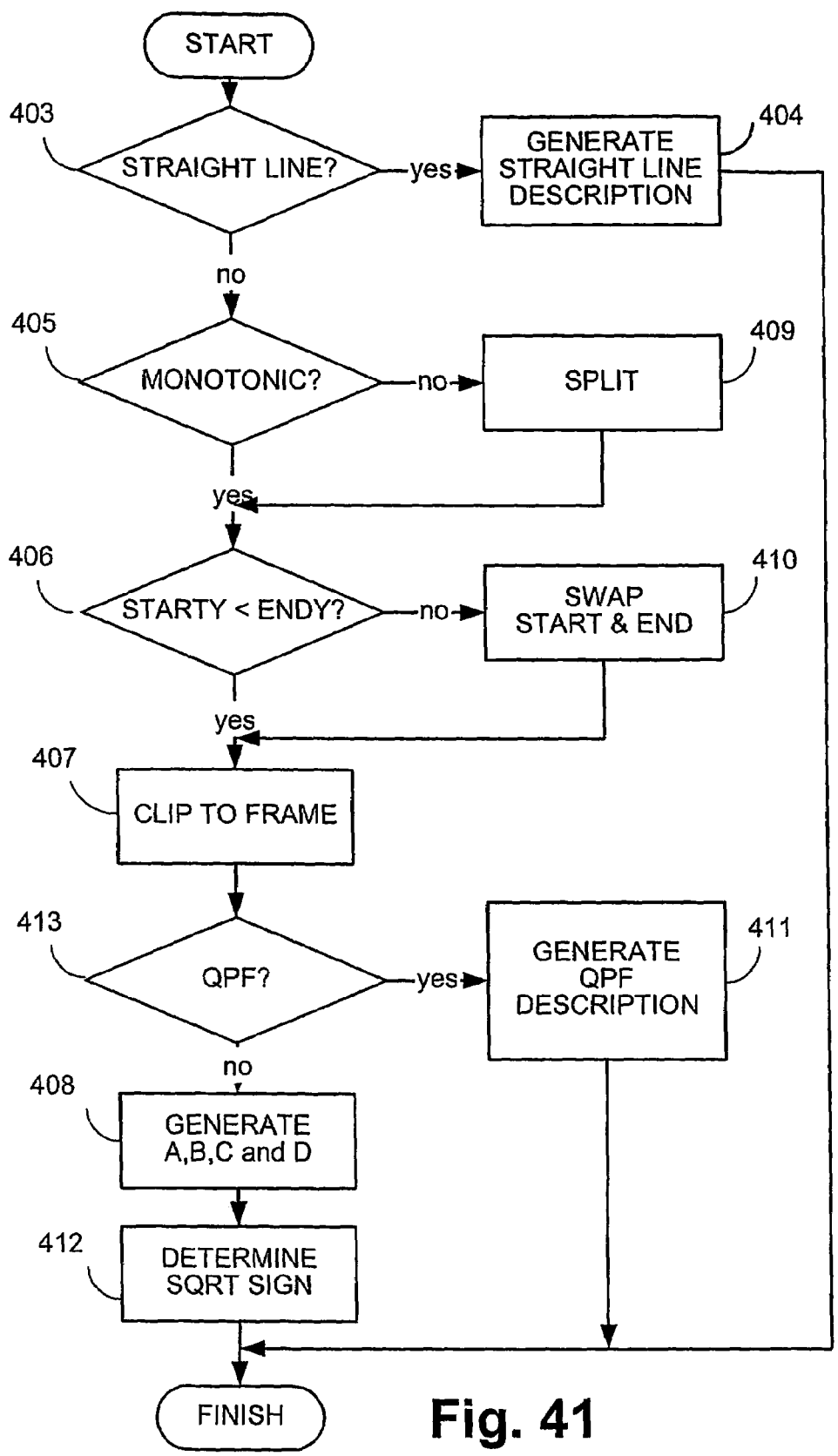
FIG. 41 is a flowchart for the generation of tracking parameters for quadratic Bezier curves.

In FIG. 41, a first step 403 tests for the case where the start, control and end coordinates are co-linear. If this is the case then the control coordinate is ignored and tracking parameters for the edge are calculated as described for straight-edges in step 404.

A next step 405 checks the quadratic Bezier curve to see if it is monotonic in Y (that is to say that for each Y ordinate, there is only one corresponding X ordinate through which the curve passes). For example, the Bezier curve in FIG. 7 is clearly non-monotonic in Y. It is required that such non-monotonic quadratic Bezier curves be described using two equivalent curved edges that are monotonic in Y. The following logic can be used to determine whether or not a quadratic Bezier curve defined by the start point $(X_s, Y_s)$, control point $(X_c, Y_c)$ and end point $(X_e, Y_e)$ requires two curved edges:

Let sign( ) be a function that returns a Boolean value TRUE if the operand is positive (and FALSE if the operand is negative) and if:

$$(\text{sign}(Y_s-Y_c)=\text{sign}(Y_s-2Y_c+Y_e))$$

AND $$(|Y_s-Y_c|<|Y_s-2Y_c+Y_e|)$$

then the Bezier requires two curved edges.

In the case where it is determined that two curved edges are required, a point $(X_{split}, Y_{split})$ on the original non-monotonic Bezier is calculated using the formulae:

$$X_{split} = \frac{X_s(Y_e-Y_c)^2 + 2X_c(Y_s-Y_c)(Y_e-Y_c) + X_e(Y_s-Y_c)^2}{(Y_s-2Y_c+Y_e)^2}$$

$$Y_{split} = \frac{Y_sY_e-Y_c^2}{Y_s-2Y_c+Y_e}$$

Two monotonic curved edges that represent the original non-monotonic quadratic Bezier are then created in step 409 using:
a first curved edge with:
start coordinate=start coordinate $(X_s, Y_s)$ of original non-monotonic quadratic Bezier, and
end coordinate=$(X_{split}, Y_{split})$; and
a second curved edge with:
start coordinate=$(X_{split}, Y_{split})$; and
end coordinate=end coordinate $(X_e, Y_e)$ of original non-monotonic quadratic Bezier.

It has already been indicated that edges (straight-lines or curves) are required to be specified such that they have an end Y-ordinate that is greater than the start Y-ordinate. This can now be ensured by comparing the start and end Y-ordinates of each curve in step 406, and swapping the start and end coordinates if appropriate in step 410. If the start and end coordinates are swapped, then the left and right z-level references must also be swapped.

The next step 407 operates to "clip" the curve if part of the curve is above the frame being rendered (i.e., it has a start Y-ordinate $Y_s$ that is less than 0, where Y=0 represents the top of the frame). A top-most ordinate $Y_{top}$ is determined by:

$$Y_{top}=\max(0, Y_s)$$

where max(a,b) is a function that returns the largest of the two operands a or b.

The next test determines whether or not, for each curve, it is necessary to describe that curve as a quadratic polynomial fragment (QPF). This is necessary to avoid a divide by zero in solving subsequent quadratic equations. A quick test for this situation based on the start, end and control points, is performed in step 413 as given below:

$$Y_s+Y_e=2Y_c,$$

implies that the curve is a QPF.

If it is determined that the curve is a QPF, then three tracking parameters A, C and D are generated in step 411. These are derived from the start, end and control points of the curve, and the top-most coordinate $Y_{top}$, as follows:

Given intermediate values:

$$A_i = \frac{Y_e(X_sY_e-X_cY_s) + Y_s(X_eY_s-X_cY_e)}{(Y_e-Y_s)^2}$$

$$C_i = \frac{(4X_cY_c-2X_sY_e-2X_eY_s)}{(Y_e-Y_s)^2}$$

$$D_i = \frac{(X_s+X_e-2X_c)}{(Y_e-Y_s)^2}$$

A, C and D are then derived thus:

$$A=A_i+C_iY_{top}+D_iY_{top}^2$$

$$C=C_i+D_i(2Y_{top}+1)$$

$$D=2D_i$$

If it is determined in step 413 that the curve is not a QPF, then tracking parameters A, B, C and D are generated in step 408. A, B, C and D are derived from the start, end, control coordinates, and the top-most ordinate $Y_{top}$, by the following calculations:

Let:

$$X_g = X_s - X_e$$

$$Y_g = Y_s - Y_e$$

$$X_h = X_c - X_e$$

$$Y_h = Y_c - Y_e$$

$$Y_{term} = Y_g - 2Y_h$$

$$\text{mix} = X_g Y_h - X_h Y_g$$

Then:

$$B = \frac{X_g - 2X_h}{Y_{term}^2}$$

$$A = \frac{2\text{mix} \times Y_h}{Y_{term}^2} + B(Y_{top} - Y_e) + X_e$$

$$D = \frac{Y_{term} \times \text{mix}^2}{Y_{term}^4}$$

$$C = \frac{\text{mix} \times Y_h^2}{Y_{term}^4} + D(Y_{top} - Y_e)$$

3.6.3. Determining the Sign

The parameters A, B, C, D are used by a later process to track the X-ordinate of a quadratic Bezier curve using an equation of the form:

$$x = A \pm 2\sqrt{C}$$

The last step 412 of FIG. 41 in preparing the tracking parameters is to determine if the square-root term should be added or subtracted from A. The following pseudo-code can be used based on A, $X_s$, $Y_s$, $X_e$, $Y_e$ and D, where the result "sign=+1" indicates addition of square-root term and "sign=−1" indicates subtraction of square-root term:

```
if (A > 0) sign = -1;
else if (A < 0) sign = +1;
    else
    {
        if (Ys < Ye) sign = -1;
        else sign = +1;
        if (D < 0) sign = -sign;
        if (Xs < Xe) sign = -sign;
    }
```

3.6.4. Generating Elliptic Arc Tracking Parameters

Step 466 (described above with respect to FIG. 46) generates, for each arc:

Ellipse major and minor axis radii 'a' and 'b';
Ellipse angle (of axis a) from horizontal 'θ';
Ellipse center (x, y);
Arc start and end coordinates ($x_s$, $y_s$) and ($x_e$, $y_e$); and
Left and right Z-levels references.

Ellipses can be described as circles skewed only with respect to Y and scaled only with respect to X. Hence, to simplify ellipse-tracking, the TCIE system 699 treats all ellipses as transformed circles.

Figure 20:
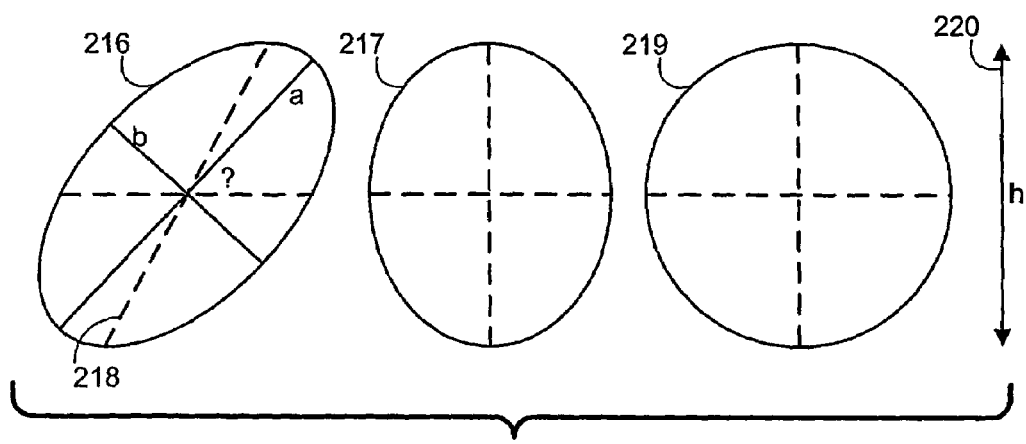
FIG. 20 illustrates determining the circle that underlies an ellipse.

The first step that the calculation of tracking parameters 469 must take when converting ellipse edges is to determine the circle that underlies the ellipse. FIG. 20 demonstrates this process. Ellipse 216 is related to rectilinear ellipse 217 by a skew factor. The magnitude of this skew is the gradient of line 218, which is not an axis of 216, but is instead a line from the lowest extent of the ellipse to the highest extent.

The height of this line (from lowest point to center) can be calculated by the formula:

$$h = \sqrt{b^2 \cos^2(\theta) + a^2 \sin^2(\theta)}$$

The width of this line (again from lowest point to center) is given by:

$$w = \frac{\cos(\theta)\sin(\theta)(b^2 - a^2)}{h}$$

The skew 'e' is therefore:

$$\frac{w}{h}.$$

Ellipse 217 is then converted into a circle 219, with height h. This is simply achieved by applying a scale factor:

$$f = \frac{h^2}{ab}$$

to the ellipse 217.

For ellipses which are much wider than they are long (i.e. for which a>>b and θ is small), transforming the generated circle does not give sufficient resolution, and the resulting ellipse appears blocky. This problem is solved by supersampling—circles of a much larger radius are tracked, and results from several lines are summed together before transformation.

A conservative approach for determining the size of the circle for supersampling is to continue doubling a scale factor (initialized to 1) while a>2*scale*b. This approach assumes that a>=b and −90<θ<90, and is only necessary if −45<θ<45.

As described below, circles are tracked using a modification of Bresenham's circle algorithm. Because of the nature of real-time object rendering, only fragments which monotonically increase in Y are handled. Hence, the second step performed by step 469 of FIG. 46 is to split arc fragments that traverse the upper or lower apex of an ellipse into two or more fragments.

One possible implementation of this split is described here. First, the elliptic start and end coordinates are converted into circular start and end coordinates by applying skew 'e' and scale 'f'. Next, the following algorithm is executed. This algorithm accepts start and end points (S) and (E) and the direction (d) (clockwise or counter-clockwise). Further inputs are the topmost (T) and bottommost (B) points of the circle, given by ($x_c$, $y_c$−h) and ($x_c$, $y_c$+h) respectively. The algorithm produces a list of fragments that consist of a start y-ordinate, an end y-ordinate, and a circle 'side' (left or right).

Figure 67:
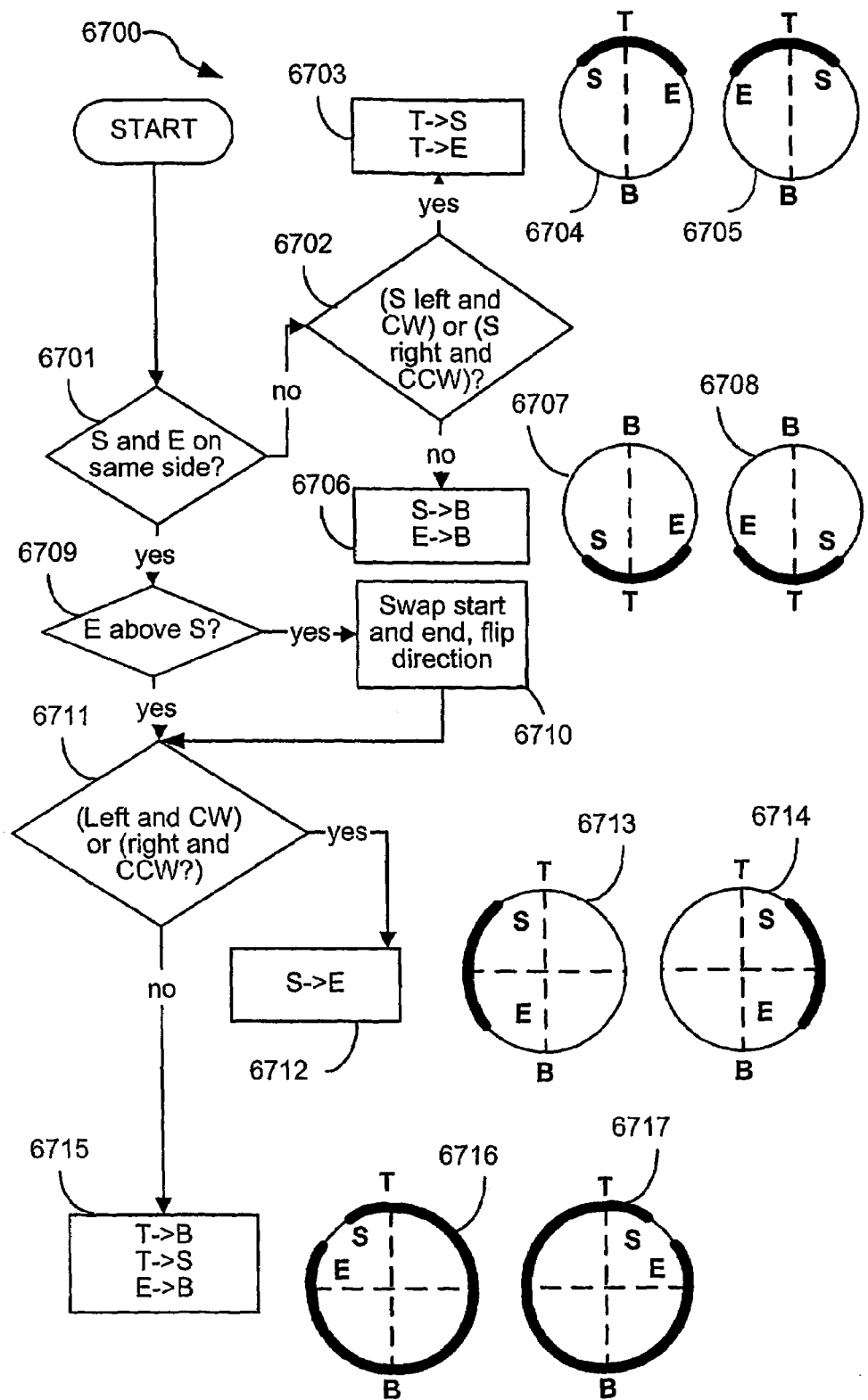
FIG. 67 illustrates a process for splitting an ellipse segment into segments monotonic in y-ordinate.

Considering FIG. 67, the x-ordinate of S and E are compared in step 6701 to the x-ordinate of the circle's centre ($x_c$, $y_c$). If S and E lie on opposite sides, then a test is made at step 6702 to see if the top or the bottom of the circle is crossed. The test is: does S lie on the left and d is clockwise or does S lie on the right and d is counter-clockwise? If true, the top of the circle is crossed and the output will be as indicated at 6703 (T→S, T→E). Circle side follows from the side of the lowest point in the segment, so for the case shown in 6704, the output will be (T→S(L), T→E(R)). In FIGS. 67, 6704 and 6705 are the possible arrangements, related by symmetry. In the remainder of this discussion, it is understood that every output will inherit the side of the lowest point in that segment. If at step 6702 the test shows that the bottom of the circle was crossed, the output is indicated at 6706 and the possible arrangements are seen at 6707 and 6708. If S and E were found to be on the same side of the circle in step 6701, if E is above S as determined at step 6709, then the endpoints and direction of the segment are swapped as indicated at step 6710, thereby simplifying further considerations.

Continuing with the case of S and E on the same side of the circle, it is determined at step 6711 if S and E cross both T and B or neither. The condition is: do S and E lie on the left with d clockwise, or do S and E lie on the right with d counter clockwise. If true, as indicated at 6712, the output is (S→E) and the possible arrangements are shown at 6713 and 6714. If false, as indicated at step 6715 the output is (T→B, T→S, E→B). In this case, the T→B segment will lie on the opposite side to S and E. The possible arrangements are shown at 6716 and 6717.

3.6.5. Generating Glyph Edge Tracking Parameters

Glyphs are treated as specialized edges by lower parts of the TCIE system pipeline 699. Hence, the Stroking Morphing and Transformation module 616 has to convert a glyph description into an edge description.

The TCIE system 699 tracks glyphs by their right edge rather than their left edge. Hence, if $(S_x, S_y)$ is the top-left coordinate of the glyph as provided to the Stroke Morph & Transform module 616, W is the width of the glyph, and H is the height of the glyph:

- the start coordinate of the glyph edge is $(S_x+W-1, S_y)$;
- the reference to the left z-level is set to be the "in" z-level;
- the reference to the right z-level is set to be the "out" z-level; and
- the end Y ordinate is $S_y+H$.

The glyph-specific tracking parameters consist of the bitmap representing the glyph, and the width of the glyph.

4. Sorting

The set of edges produced by the morphing, stroking and transform module 616 are supplied to the sorting module 617 in FIG. 56. The sorting module 617 reorders these edges so that they are ordered primarily with ascending values in the Y axis and secondarily with ascending values in the X axis (that is, the edges are strictly sorted in Y; within each subset of edges that share a Y value they are sorted in X). It is necessary for the edges to be ordered in this manner so that later stages of the rendering process can be carried out "pixel sequentially". Pixel sequentially means that rendering is performed one pixel at a time, starting with the pixel at the top left of the screen and proceeding from left to right across each line of pixels before stepping down to the next line of pixels—the last pixel processed is the pixel at the bottom right of the screen. Pixel sequential rendering removes the need for the random access frame store used by conventional rendering systems, reducing memory usage and typically increasing rendering speed. It should be apparent to one skilled it the art that the convention used herein regarding the direction and precedence of the X and Y axes can be exchanged for any alternate (but orthogonal) convention without detriment to the operation of the described system 699.

The sorting module 617 achieves its function by the use of the well known radix sort algorithm. The radix sort algorithm sorts a set of elements by performing a sequence of partial sorts on them. Each partial sort is performed by sorting with respect to only a portion of the sorting index for each element (the portion of the sorting index used at each stage has a length in bits equal to the logarithm base two of the radix). This portion of the sorting index is used to select which sorting bin to place the element in. The number of sorting bins required is equal to the number of the radix (that is, the number of sorting bins required is equal to the total number of possible values expressible by each portion of the sorting index). As elements are placed in each sorting bin their pre-existing order is maintained within each sorting bin, whilst being broken across bins—this ensures that subsequent partial sorts do not undo the useful sorting work performed by earlier partial sorts. At the conclusion of each partial sort the contents of all bins are concatenated together in order, restoring the set of elements being sorted to a (new) simple sequence. The first partial sort works with the least significant bits of the sorting indices, whilst subsequent partial sorts work with successively more significant portions of the sorting indices.

Figure 47D:
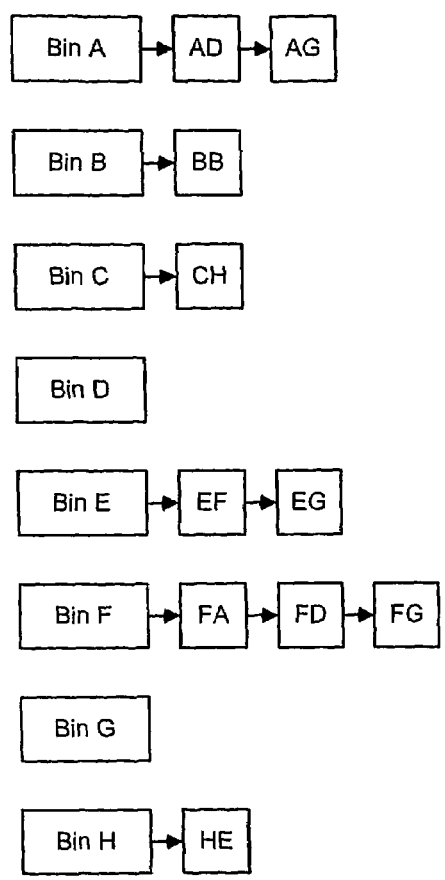
Figure 47E:
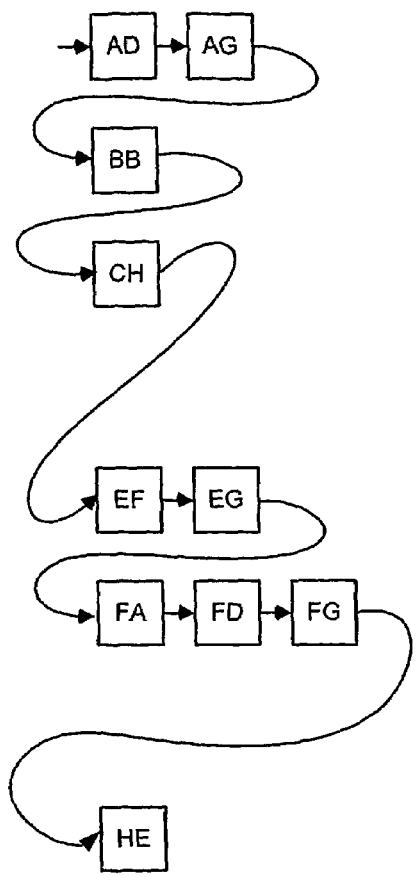

The radix sort algorithm is exemplified by FIG. 47(*a*) to FIG. 47(*f*).

FIG. 47(*a*) shows a sequence of ten elements requiring sorting. Each element has a two digit octal sorting index. Note that the octal digits "0, 1, 2, 3, 4, 5, 6, 7" are replaced with the symbols "A, B, C, D, E, F, G, H" to avoid confusion with the figure numbers.

FIG. 47(*b*) shows the application of the first stage of a radix eight sort to the sequence of elements described in FIG. 47(*a*). Eight sort bins are used, and elements are placed in these bins according to the first portion of their sort indices. The portion of the sort indices used for this first partial sort is the least significant three bits (recall that a radix R sort works with portions of the sorting indices with length in bits equal to the logarithm base two of R; in this case three bits). The least significant three bits of a sort index corresponds to its least significant octal digit, so the first partial sort can be described as a traversal of the sequence of elements requiring sorting, apportioning each element to the sorting bin corresponding to the rightmost octal digit of that element's sorting index.

FIG. 47(*c*) shows the second stage of the sort. In this stage the contents of all eight sorting bins are concatenated starting with the contents of the first bin and proceeding sequentially until the last bin. This results in a new sequence of the ten elements requiring sorting. Note that this resultant sequence is correctly ordered with respect to the rightmost octal digit; it is not correctly ordered with respect to the most significant octal digit.

FIG. 47(*d*) shows the third stage of the sort. This stage is a repetition of the first stage except that the input sequence is the sequence described by FIG. 47(*c*) and the portion of the sort indices used is the second three bits, namely the left hand octal digit (most significant octal digit). As this portion of the sort indices includes the most significant bit this partial sorting stage is the last one required. This stage can be described as a traversal of the sequence of elements requiring sorting, apportioning each element to the sorting bin corresponding to the leftmost octal digit of that element's sorting index.

Figure 47F:
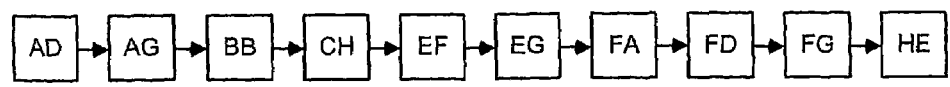

FIG. 47(*e*) shows the fourth stage of the sort. This stage is a repetition of the second stage except that the contents of the sorting bins have changed, now being as depicted in FIG. 47(*d*). The contents of all eight sorting bins are again concatenated, starting with the contents of the first bin and proceeding sequentially until the last bin. This results in another new sequence of the ten elements requiring sorting. This resultant sequence is correctly ordered with respect to the leftmost (most significant) octal digit, but not correctly ordered with respect to the rightmost (least significant) octal digit. Note, however, that within subsequences of this new sequence that share identical leftmost octal digits the order of the rightmost octal digits is correct. Consequently, this new sequence is correctly ordered according to the sorting indices. The sequence is redrawn in FIG. 47(f) for clarity.

FIG. 47(a) to FIG. 47(f) exemplify a radix eight sort of a sequence of ten elements with sort indices of six bits each. Extension of the principles of the radix sort algorithm to other integral power of two radices, other sort index sizes and other sequence lengths should be apparent to one skilled in the art. Note that larger radix sizes reduce the number of partial sorts required (the number of partial sorts required equals the bit size of the sort indices divided by the logarithm base two of the radix, rounded up). Smaller radix sizes reduce the number of sorting bins required (the number of sorting bins required is equal to the number of the radix). The choice of radix size for a particular sorting task involves a trade off between sorting speed and the memory consumed by the sorting bins, so the optimal radix size will vary from operating environment to operating environment.

In applying the radix sort algorithm to the graphics rendering system being described, the sorting indices used are made by concatenating the Y and X coordinates of the starting point of the edges. Concatenation of the X ordinate after the Y ordinate ensures that the sorting operation sorts primarily in Y and only secondarily in X. After the edges are thus sorted, the desired pixel sequential rendering can readily be carried out.

In order to accommodate anti-aliasing, the rendering system 610 may describe edge coordinates with sub-pixel accuracy. Anti-aliasing is described in detail elsewhere in this document, but is mentioned here because the representation of edge coordinates affects the sorting operation. Sorting is performed to facilitate pixel sequential rendering, so sub-pixel detail of edge coordinates is discarded when creating sorting indices. In the case that coordinates are represented with a fixed-point representation wherein sub-pixel accuracy is contained within the fractional digits, this is readily achieved by right shifting those coordinates by a number of digits equal to the number of fractional digits.

The operation of the radix sort algorithm can be somewhat accelerated by a simple optimization. This optimization involves partially overlapping the operation of the sorting module 617 with the operation of the previous module (the Transform, Morph and Stroking module 616). In an un-optimized system that strictly separates the operation of these modules, the interaction of the modules can be described as follows. The Transform, Morph and Stroking module 616 creates a set of edges. These edges are created in whatever order is convenient for the Transform, Morph and Stroking module 616 and concatenated to a sequence in that order. When this sequence of edges is complete it is supplied to the sorting module 617 en masse for application of the radix sort. A system possessing the abovementioned optimization modifies the interaction of the modules as described in the following text. The Transform, Morph and Stroking module 616 produces edges as previously described, but does not concatenate them. Instead of concatenating the edges they are supplied directly to the sorting module 617 which processes them by application of the first partial sort (that is, the edges are distributed to sorting bins according to their least significant bits). The subsequent partial sort operations are performed after the Transform, Morph and Stroking module 616 finishes supplying edges to the sorting module 617. This optimization is possible because the first partial sort of a radix sort may be performed "on the fly" as a set of objects requiring sorting is being developed, whilst the subsequent partial sorts can only be performed after the set of objects is finalized.

5. Edge Processing

As can be seen in FIG. 56, the output of the Display List Compiler 608 is an ordered set of edges describing the desired output (for a single frame) on the screen. The Rendering Engine 610 takes these ordered set of edges as input. Note that a double buffer 609 can be used to allow the Rendering Engine 610 to process edges for one frame whilst the Display List Compiler 608 prepares edges for a successive frame.

5.1. Input and Output

Figure 22A:
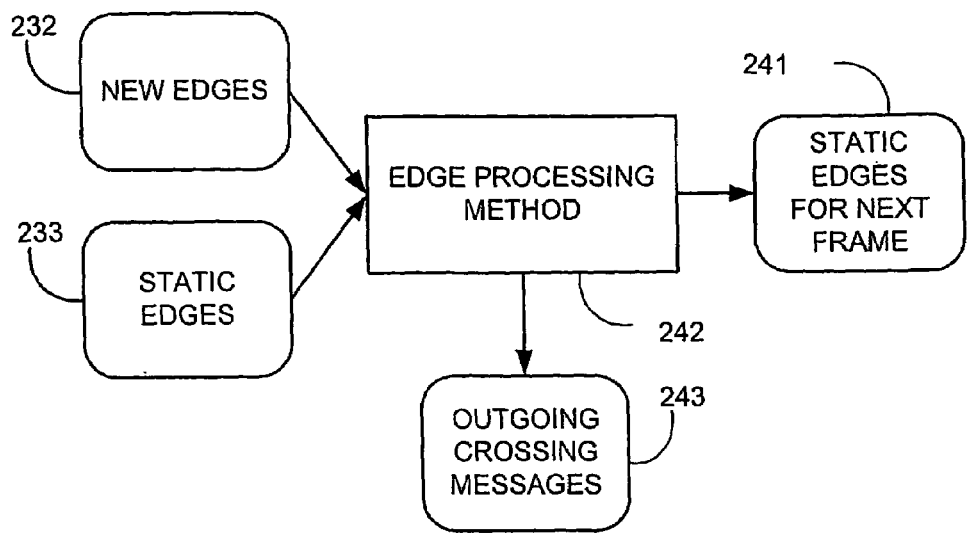
FIGS. 22(a) and 22(b) depict data flow for the edge processing module of FIG. 56.
Figure 22B:
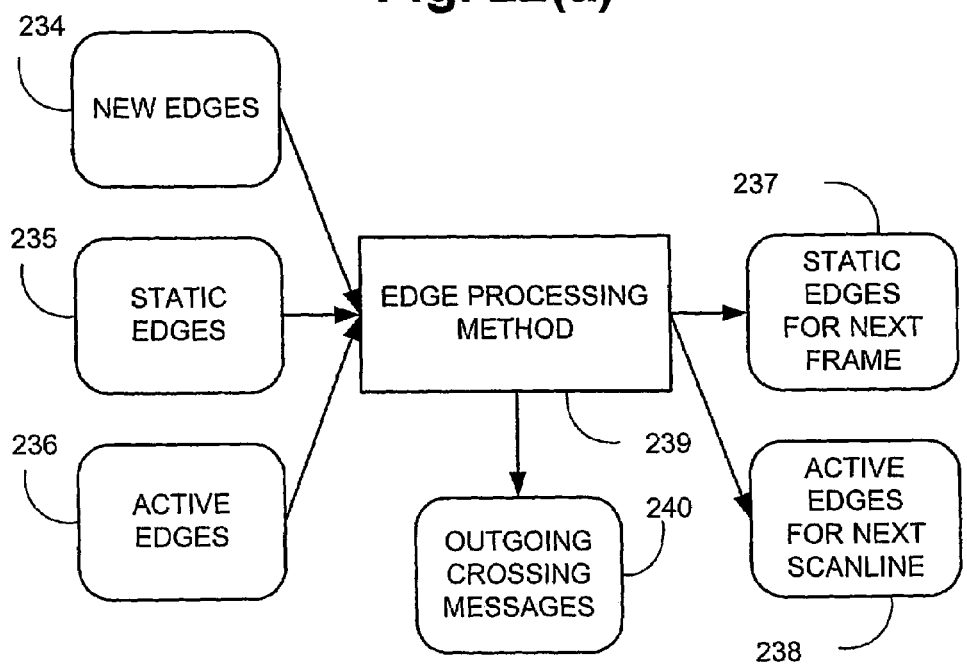

The flow of display data through the rendering engine 610 begins with operation of an Edge Processing Module 614, whose data flow parameters are summarized in FIGS. 22(a) and 22(b). A current frame in an animated movie is described by an ordered set of new edges 232 and an ordered set of static edges 233. The ordered set of new edges 232 comprises those edges that were generated by the Display List Compiler 608 (described previously) for the current frame. These new edges 232 describe display objects that were either not present on the previous frame, or have been moved to a new position since the previous frame. The ordered set of static edges 233 describes objects that have persisted (and not moved) since they were introduced as new edges on a previous frame.

After Edge Processing 242 has processed all the edges (both new 232 and static 233) for a frame, Edge Processing 242 will have generated, as output, an ordered set of crossing messages 243 provided as input to the Z-level Activation Module 613, and an ordered set of static edges 241 which will be used by Edge Processing 239 for the next frame (i.e. the set 241 becomes the set 233 at the start of the next frame).

Edge Processing 242 is also responsible for discarding edges that will no longer contribute to the output display after the current frame. Such edges must be marked for removal. This removal mark is placed by an external entity (for example, a driver) and is outside the scope of this document. As each edge is retrieved from either the ordered set of new edges or the ordered set of static edges, the Edge Processing 242 checks to see if that edge has been marked for removal. If so, the edge is not transferred to the ordered set of static edges for the next frame 241.

5.2. Top-level Operation

Figure 24:
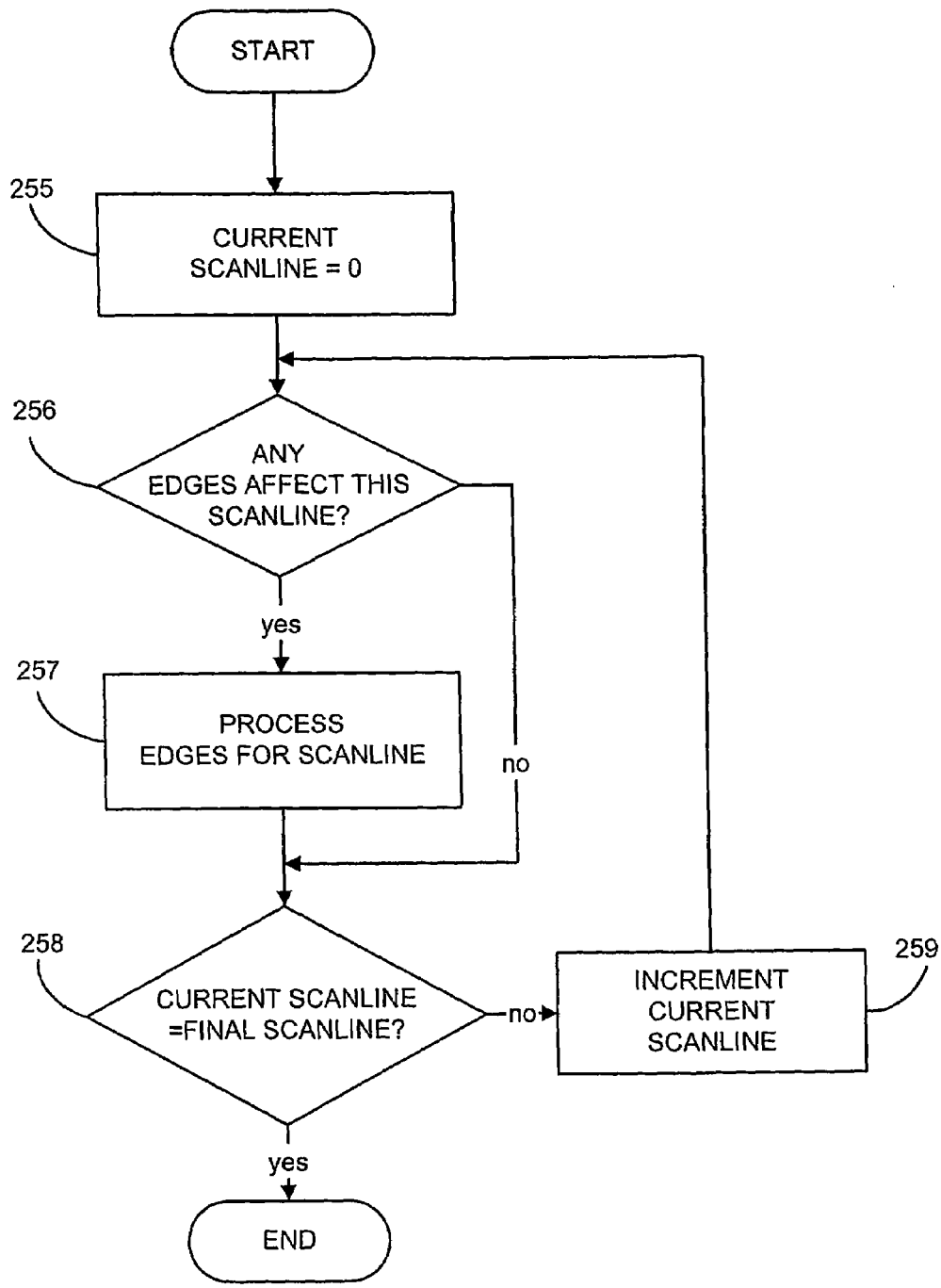
FIG. 24 is a flowchart showing edge processing for a single frame.

A summary of Edge Processing 242 for a single frame is given in FIG. 24. For each frame to be rendered, Edge Processing 242 operates by iterating from scan line to scan line (row to row) down the display, and calculating the position at which any edge in the ordered set of new edges or the ordered set of static edges intersects the current scan line. To one skilled in the art, the fundamental algorithm is applicable to other scan directions.

Referring to FIG. 24, at the start of processing a frame, a current scan line counter is initialized to 0 (e.g. the top-most scan line) at step 255. If any edges intersect the current scan line, as determined at step 256, then those edges are processed at step 257. If the current scan line counter indicates that the final scan line has been processed (step 258=yes) then processing is finished for the frame, otherwise the current scan line counter is incremented at step 259 and processing of edges for subsequent scan lines is performed.

5.3. Active Edge Tracking

FIG. 22(b) gives an overview of the flow of data through Edge Processing 239 when processing edges for a current scan line 257. Edges that intersect the current scan line (and therefore require processing) are referred to as active edges and are stored in scan-order in an ordered set of active edges

236. Edge Processing 239 generates an active edge from a new edge 234 or a static edge 235 when the start co-ordinate of the new edge or static edge intersects the current scan line. Active edges have a slightly different format than that of new or static edges—for example, instead of having a start coordinate $(X_s, Y_s)$, active edges have a current_X field which gets updated from scan line to scan line. The current_X field corresponds to where the edge intersects (crosses) the current scan line. After each active edge is processed, if it is determined that the active edge will also intersect the following scan line, then that active edge is placed, in scan-order, into the ordered set of active edges for the next scan line 238.

Figure 23:
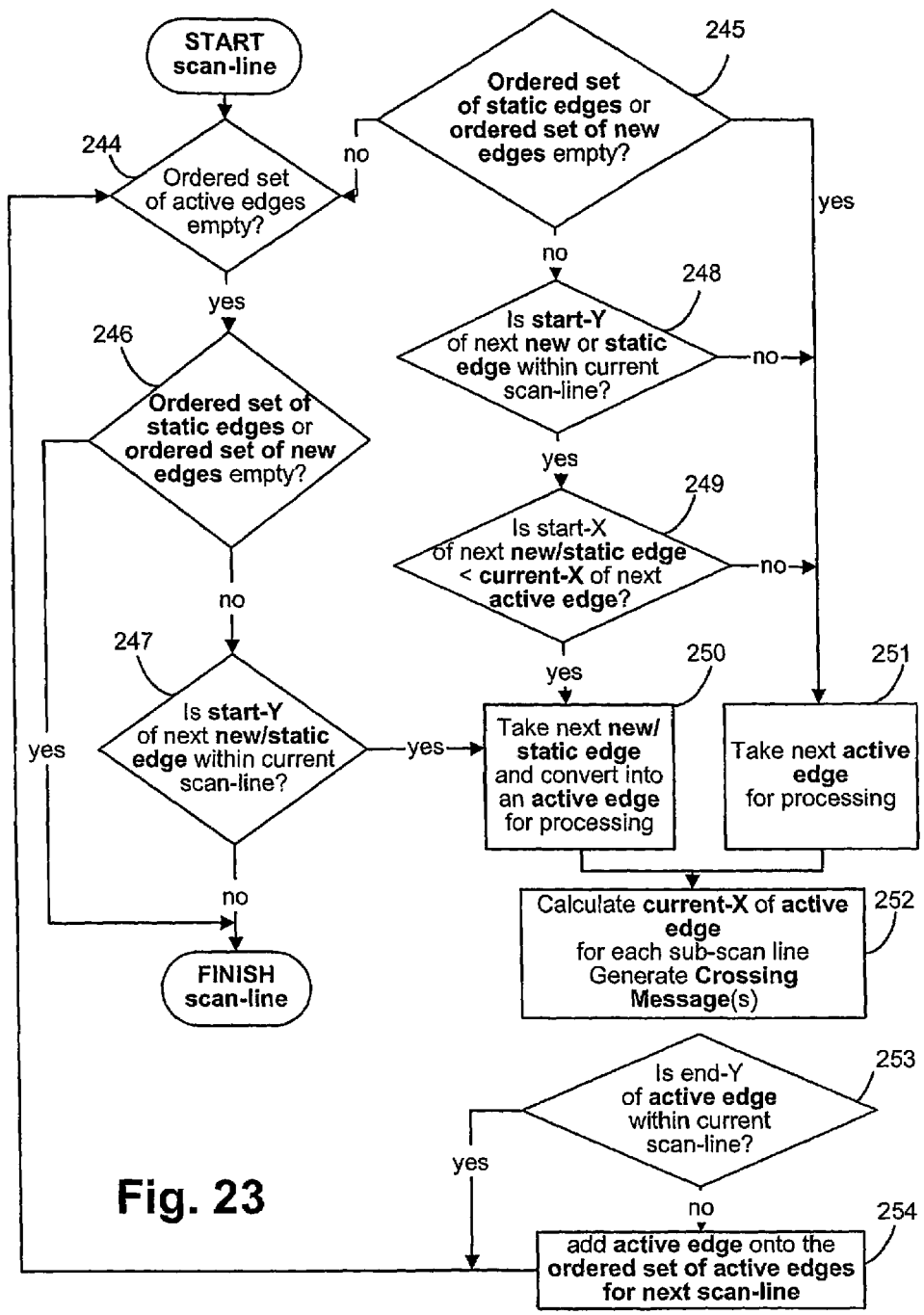
FIG. 23 is a flowchart of step 257 of FIG. 24 showing edge processing for a single scan line.

FIG. 23 provides more detail of the operation of Edge Processing 239 for a single scan line (corresponding to step 257 of FIG. 24). Before rendering the first scan line of the display, the ordered set of active edges 236 will be empty. This ordered set will remain empty until Edge Processing 239 processes a scan line which is intersected by the start (top) of a new edge in the ordered set of new edges 232 or a static edge in the ordered set of static edges 233. Until such a scan line is reached, Edge Processing 239 has nothing to do—i.e. the ordered set of active edges is empty (determined at step 244=yes), and either there are no remaining static or new edges (step 246=yes), or all static or new edges don't start until a later scan line (step 247=no).

If the ordered set of active edges is empty (step 244=yes) and it is determined that a new edge or static edge does start somewhere on the current scan line (step 246=no and step 247=yes), then the new or static edge will be removed from the corresponding static or new ordered set and converted at step 250 into an active edge for processing.

Edge Processing 239 must always process edges in scan-order (increasing X ordinate) along the scan line. There may already be active edges in the ordered set of active edges as a result of processing a previous scan line (ie. step 244=no). If there are already active edges, and there are any new or static edges (step 245=no) that start on the current scan line (step 248=yes), then an X-ordinate of the next new/static edge must be compared at step 249 with an X-ordinate of the next active edge to determine which should be processed next. By virtue of the fact that the three sources of edges (new, static and active) are stored in scan-order, the next edge for processing can always be determined by considering the next available edge of each source 14 (see FIG. 2(*a*)).

5.4. Example of Edge Processing

The example in FIG. 2(*a*) shows the desired output of a first frame of a movie showing a rectangle shape 14 overlapped and occluded by a triangle shape 15. A current scan line 16 of display pixels has been superimposed for the purpose of this example. The left most display pixel of the current scan line is 13. This display pixel corresponds to an X-ordinate of 0, and the subsequent pixel to the right corresponds to an X-ordinate of 1, etc.

Prior to Edge Processing 239 generating any output for the frame shown in FIG. 2(*a*), the Display List Compiler 608 will have generated an ordered set of new edges containing four new edges that describe the desired output for this frame (recall that horizontal edges are filtered out). These four edges are shown intersecting the current scan line 16 in FIG. 2(*b*). The edges 19 and 22 activate and de-activate the z-level corresponding to the rectangle, respectively. The edges 20 and 21 activate and de-activate the z-level corresponding to the triangle, respectively.

By the time Edge Processing 239 is processing the current scan line shown in FIG. 2(*b*), the edges 19 and 22 will be present in the ordered set of new edges, and edges 20 and 21 will be present in the ordered set of active edges. Edges 20 and 21 will have already been converted from new edges into active edges on a previous (higher) scan line.

The edges will be processed for the current scan line as outlined in FIG. 23. In summary, this will involve, for this example, processing edge 19 first (since it has least X). Edge 19 will first be converted into an active edge before any crossing messages are generated from it. Edges 20 and 21 will be processed next, and finally edge 22 will be converted into an active edge then processed. In this example, processing of the four edges for the current scan line generates the set of crossing messages shown in FIG. 2(*c*). The generation and format of these will be described in more detail in Section 5.8.

5.5. Converting Edges into Active Edges and Edge Persistence

Returning now to FIG. 23, if the next edge for processing originates in the new or static edge ordered sets, then that edge must first be converted in step 250 into an active edge for the benefit of processing, otherwise the next active edge is taken at step 251. If the next edge for processing is a new or static edge, and that new or static edge has not been marked for removal, then that new or static edge will be placed into the ordered set of static edges 237 for next the frame. By this means, edges can persist over multiple frames. There are various ways of implementing a mechanism to allow removal of edges on a particular frame. One technique is to assign an identifying field to every edge, and for each frame, allowing for the provision of a set of identifying fields corresponding to edges that should be removed on that frame. An alternative technique is to provide flags within a z-level referenced by edges to indicate that all referencing edges are to be removed.

5.5.1 Static Edge Persistence

Figure 68A:
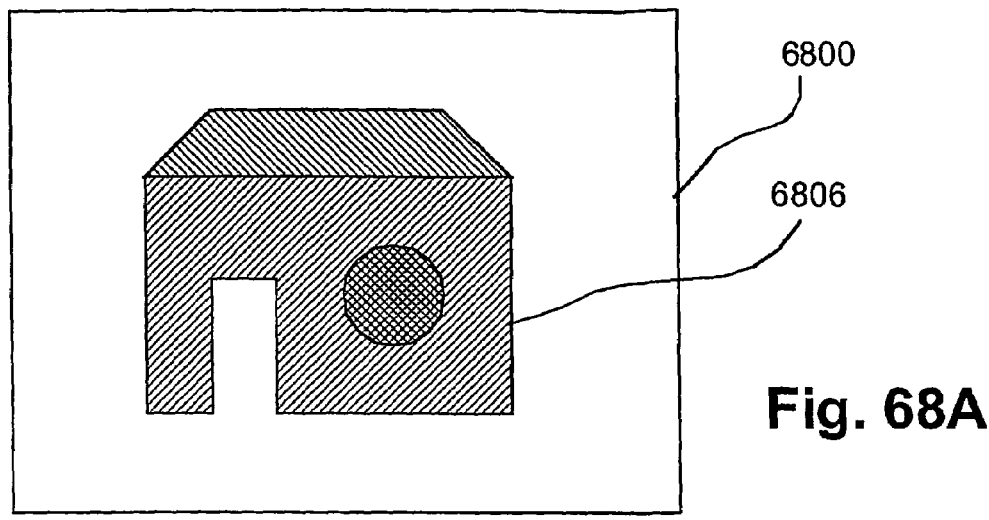
FIGS. 68A to 68C illustrate an animation sequence of image frames.
Figure 68B:
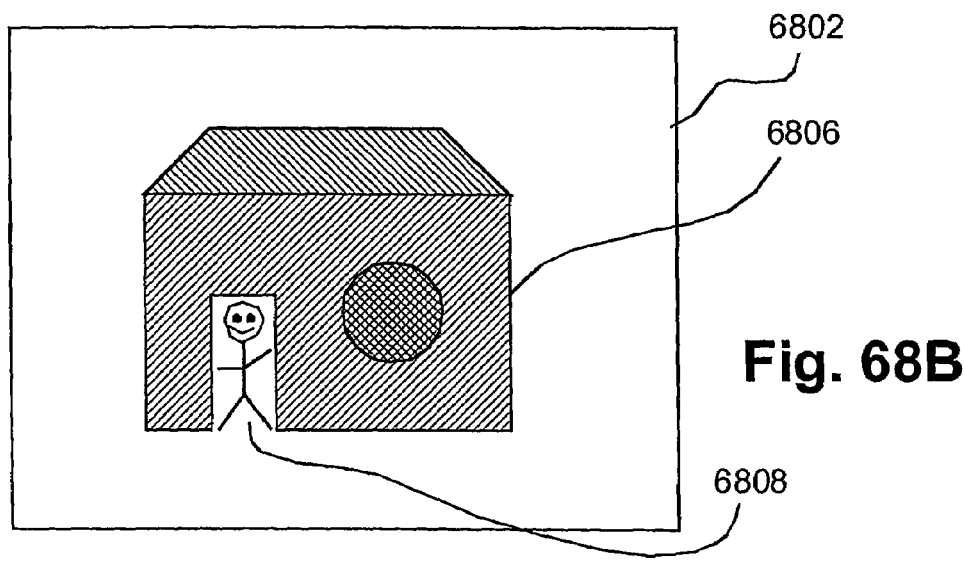
Figure 68C:
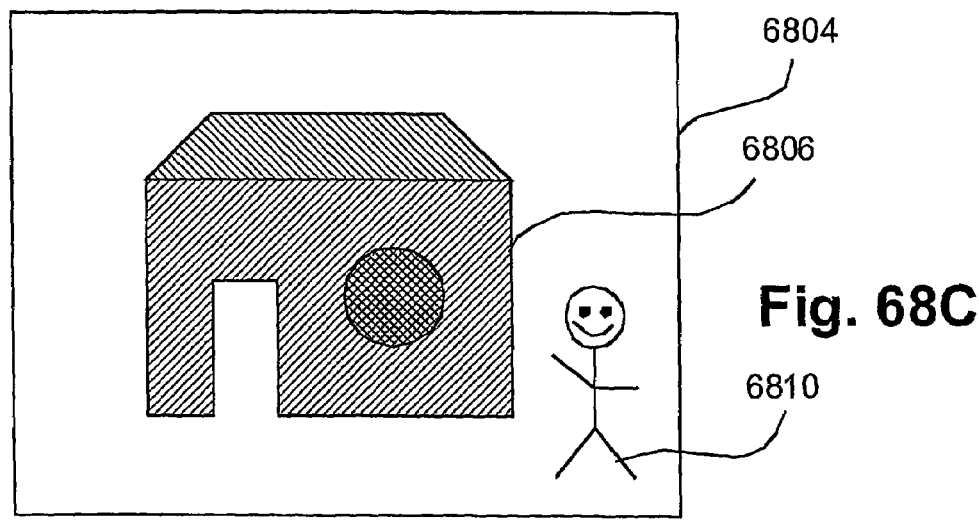

An example of the operation of the static edge buffers is given in FIGS. 68A-68C and FIGS. 69A-69C. FIGS. 68A-68C shows three frames 6800, 6802 and 6804 of an animation sequence. FIG. 68A shows the initial frame 6800, which consists of a house 6806. FIG. 68B shows the second frame 6802, which retains the house 6806 from the previous frame 6800 but adds a person 6800 standing in the doorway of the house 6806. FIG. 68C shows the third frame 6804, which again retains the house 6806 but now moves the person from the doorway of the house to a position 6810 to the right of the house 6806.

Figure 69A:
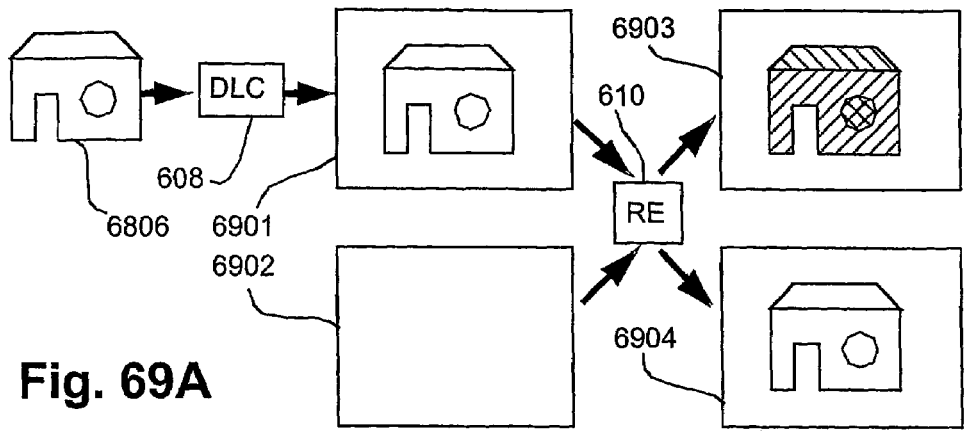
FIGS. 69A to 69C illustrates the processing of new and static edge buffers for the production of the animation sequence of FIGS. 68A to 68C.
Figure 69B:
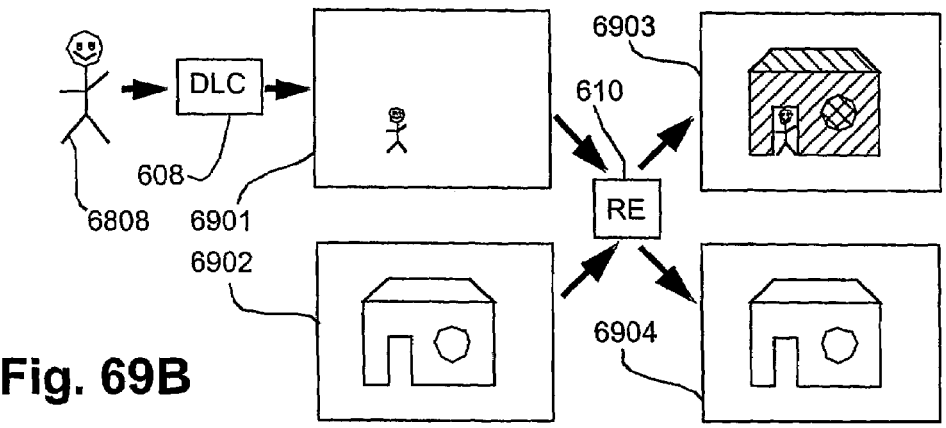
Figure 69C:
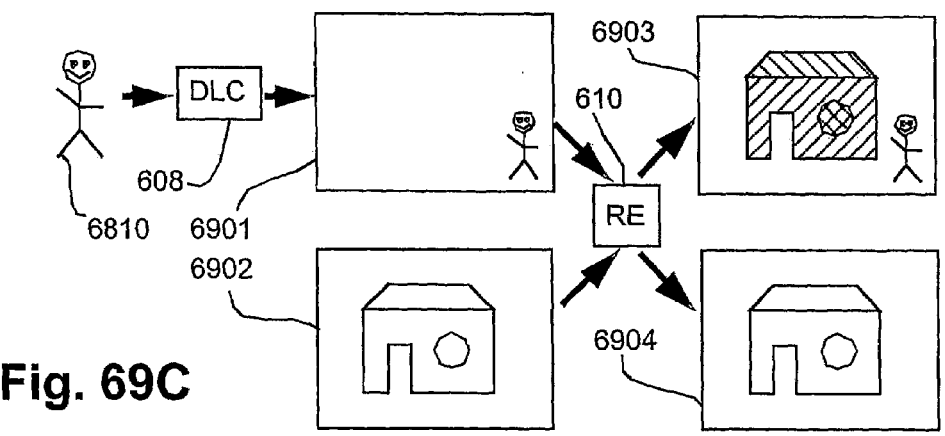

FIGS. 69A-69C illustrate, respectively, the time sequence of processing operations that are required to produce the frames seen in FIGS. 68A-68C. As seen in FIG. 68A, an object representing the house 6806 is initially input to the Display List Compiler 608 to produce a New Edge Buffer 6901, which contains the new edges that are to be added to the current frame 6800. FIG. 16(*a*), described elsewhere, refers to the coordinates that outline the house shape, and how those coordinates are interpreted to produce the edges retained by the New Edge Buffer 6901. An Incoming Static Edge Buffer 6902, contains the static edges that are to be retained from the previous frame. The buffers 6901 and 6902 are then rendered via the rendering engine 610 to output a rendered display 6903 of the current frame 6800. FIG. 69A also shows the Outgoing Static Edge Buffer 6904, which contains the static edges that are to be retained for the subsequent frame.

In FIG. 69A, the Display List Compiler 608 processes the coordinates FIG. 16(*a*) by transforming, stroking, morphing and sorting them. In this particular instance no morphing or stroking is required, but the Display List Compiler 608 still expends processing time in transforming the coordinates to the correct screen position and in sorting the edges into screen order. The processed edges are placed into the new edge buffer 6901, in preparation for the rendering operation. The incoming static edge buffer 6902 is empty, as this is the first frame 6800 in the animation (and therefore no edges can be retained from a previous frame). Now that the edge buffers 6901 and 6902 are ready, the Display List Compiler 608 ceases operation for this frame 6800 and the rendering engine 610 commences operation for this frame 6800. The rendering engine 610 merges the edges from the edge buffers 6901 and 6902 and renders them to the display 6903, outputting the edges that are to be retained for the subsequent frame into the outgoing static edge buffer 6904. Processing of the first frame 6800 of the animation is now complete.

In FIGS. 68B and 68C, references 6808 and 6810 respectively refer to the coordinates that outline the person shape that is to be rendered to the second and third animation frames 6802 and 6804.

In FIG. 69B, the processing of the second frame 6802 of the animation is performed. Note that the incoming static edge buffer 6902 of FIG. 69B is the same as the outgoing static edge buffer 6904 of FIG. 69A. This is possible because the incoming and outgoing static edge buffers are swapped between frames in a "ping-pong" manner. The outgoing static edge buffer 6904 of FIG. 69B is cleared immediately after the "ping pong" swap.

The Display List Compiler 608 processes the coordinates 6808 of the new edges that are to be added for this frame 6802, placing the processed edges in the new edge buffer 6901. The edges of the house 6806 do not require any processing by the Display List Compiler 608 because they are retained from the previous frame in an already processed form. This is the reason that the static edge technique reduces the processing time required.

As in the processing of the previous frame, the Display List Compiler 608 is now halted, and the rendering engine 610 commences its processing of this frame 6802. The contents of the edge buffers 6901 and 6902 are merged and rendered to the display 6903 and the edges that are to be retained for the next frame 6804 are stored in the outgoing static edge buffer 6904.

In FIG. 69C, the processing of the third frame 6804 of the animation is performed. The Display List Compiler 608 processes the coordinates 6810 of the new edges that are to be added for this frame 6804 placing the processed edges in the new edge buffer 6901. As in the previous frame 6802, the edges of the house 6806 do not require any processing by the Display List Compiler 608 because they are retained from that previous frame 6802 in an already processed form. The edges of the person shape do require processing, however, as the person shape 6810 has moved and become larger when compared to the previous frame. Thus, the Display List Compiler 608 processes the coordinates 6810, placing the processed edges of the person shape in the new edge buffer 6901.

As previously, the Display List Compiler 608 is now halted, and the rendering engine 610 commences its processing of this frame 6804. The contents of the edge buffers 6901 and 6902 are merged and rendered to the display 6903 and the edges that are to be retained for the next frame are stored in the outgoing static edge buffer 6904. Note that it is herein assumed that the house object 6806 is to be retained unaltered for inclusion in a fourth frame of the animation; if that were not the case then the house shape would not be included in the outgoing static edge buffer 6904.

5.6. Active Edge Processing

Processing of a next active edge in step 252 involves generating one or more crossing messages to be passed onto a subsequent module, the Z-level Activation Module 613. Each message includes the current-X ordinate of the active edge, along with the edge's left and right z-level reference.

If it is determined that the active edge continues down the display screen at least into the next scan line (in FIG. 23, step 253=no), then that active edge is added in step 254 to the ordered set of active edges for processing during the next scan line.

5.7. Tracking Edges

This process of tracking the X ordinate of an edge from scan line to scan line, as performed in step 252 of FIG. 23, is often referred to in prior art as "edge tracking". In the described system 699, edges can be straight lines, Quadratic Bezier curves, elliptic arcs or Quadratic Polynomial Fragments. The edge tracking technique for each of the four edge types is described below.

5.7.1. Tracking Straight Lines

Bresenham's line algorithm is well known in the art as a method for drawing straight lines. Edge Processing 239 uses a modified Bresenham's algorithm to calculate the X-ordinate of an active straight-line edge for each scan line in step 252. The C language source code in FIG. 5 shows an example of the modified Bresenham's algorithm being used to track (and draw) a straight-line from a start coordinate $(X_s, Y_s)$ to an end coordinate $(X_e, Y_e)$. The example shows an X-ordinate of the line being calculated incrementally for each Y-ordinate in the range $Y_s$ to $Y_e$, based on three pre-calculated values: err, delta_err1 and delta_err2.

When data for an edge that is a straight line is generated by the Display List Compiler 608 (see Section 3.6.1—Generating straight-edge tracking parameters), it is generated such that it contains, at least:

a start coordinate $(X_s, Y_s)$
an end Y-ordinate $(Y_e)$,
an integer gradient term (grad),
a remainder gradient term (ient),
left flag, and
references to left and/or right z-levels.

When the straight-line edge is converted into an active straight-line edge in step 250, then the ient term is replaced by err, delta_err1 and delta_err2 which are calculated from the data of the straight edge as follows:

Let:

$$ty = Y_e - Y_s$$

Then:

$$err = (2 \times ient) - ty$$

$$delta\_err1 = 2 \times ient$$

$$delta\_err2 = 2 \times (ient - ty)$$

Then on each scan line, a new current-X ordinate for the active edge can be calculated according to step 252 from the existing current-X ordinate and the grad, err, delta_err1 and delta_err2 parameters using the modified Bresenham's algorithm as follows:

If the err is less than 0, then:

$$err = err + delta\_err1$$

$$current\_X = current\_X + grad$$

Else $$err = err + delta\_err2$$

$$current\_X = current\_X + grad$$

If left flag is TRUE, then:

$$current\_X = current\_X - 1$$

Else $$current\_X = current\_X + 1$$

5.7.2. Tracking Quadratic Beziers

Quadratic Beziers are described by a start, end and control point as shown in the example FIG. 7. When data for an edge that is a quadratic Bezier curve is processed by the Display List Compiler 608 (see Section 3.6.2—Generating quadratic Bezier curve tracking parameters), the quadratic Bezier edge description is reformatted and presented to Edge Processing 239 such that it contains, at least:

- a start coordinate $(X_s, Y_s)$,
- an end Y-ordinate $(Y_e)$,
- tracking parameters A, B, C and D,
- sign Flag (+1 or −1), and
- references to left and/or right z-levels.

For each scan line, the current_X position of the Bezier curve is recalculated in step 252 of FIG. 23 based on A, B, C and D as follows:

$$A=A+B$$

$$C=C+D$$

If sign flag is +1, then:

$$\text{Current\_}X=A+2\sqrt{C}$$

Else $$\text{Current\_}X=A-2\sqrt{C}.$$

5.7.3. Tracking Quadratic Polynomial Fragments

The Display List Compiler 608 (see Section 3.6.2—Generating quadratic Bezier curve tracking parameters) produces edge descriptions for Quadratic Polynomial Fragments, so that they contain, at least:

- a start coordinate $(X_s, Y_s)$,
- an end Y-ordinate $(Y_e)$,
- tracking parameters A, C and D, and
- references to left and/or right z-levels.

For each scan line, the current_X position of the Quadratic Polynomial Fragment is recalculated in step 252 based on A, C and D as follows:

$$A=A+C$$

$$C=C+D$$

$$\text{Current\_}X=A.$$

5.7.4. Tracking Elliptic Arcs

The Display List Compiler 608 produces edge descriptions for elliptic arcs that contain at least:

- equivalent circle centre $(C_x, C_y)$,
- equivalent circle radius 'R',
- equivalent circle start coordinates $(S_x, S_y)$,
- start error value 'E',
- circle to ellipse transformation (skew 'e'+scale 'f'),
- end Y ordinate '$E_y$', and
- a left or right orientation.

When step 250 of FIG. 23 converts this data into an active elliptic arc, current coordinates, a current error value and a current mode (described below) are initialized from this data.

The tracking algorithm tracks coordinates relative to the center of the circle. Hence the current coordinates are set to be the start coordinate minus the equivalent circle centre. The current error value is set to be the error value provided by the Display List Compiler 608. The mode is used to keep track of the octant currently being scanned, and is initialized based on the start coordinate provided to step 250.

Note that at any stage, absolute ellipse coordinates can be derived from relative current coordinates $(c_x, c_y)$ using the following formula:

$$(SE_x, SE_y) = (fc_x + ec_y + C_x, c_y + C_y)$$

Figure 14:
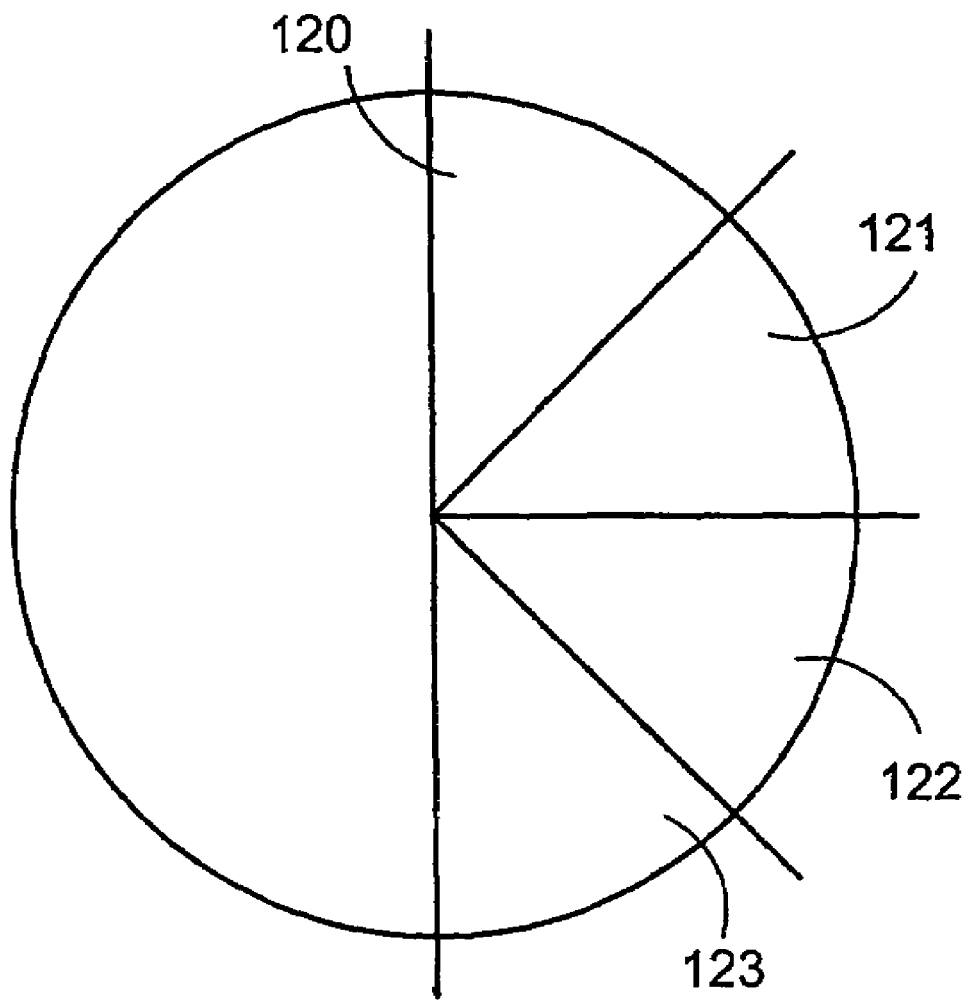
FIG. 14 is a circle that illustrates operation of Bresenham's algorithm.

Circles are tracked using Bresenham's circle algorithm to iteratively update the current coordinates and error value. This algorithm, which is well known in the art, tracks only the top-right octant of a circle (octant 120 of FIG. 14), and uses a sequence of reflections to generate the other 7 octants. Further details can be found in "*Computer Graphics: Principles and Practice*"; *Foley & Van Dam Second Edition; Section* 3.3. *Scan Converting Circles.*

5.7.5. Tracking Glyphs

Active glyph objects maintain a current pointer into the glyph bitmap. This pointer is incremented row-by-row as the glyph edge is tracked. Because the left-hand edge of a glyph is vertical, the current X position does not need to be updated as the edge is tracked.

5.8. Anti-aliasing and Crossing Message Generation

Anti-aliasing is achieved by tracking edges using additional (sub-pixel) resolution. As is known in the art, this additional resolution can be used to determine what fraction of each pixel is occupied by a graphical primitive. This fraction (referred to in some prior art as pixel coverage) can be used to attenuate the contribution of the graphical primitive to the color of each output pixel, producing greatly improved rendering results. For example, the coordinates of edges can be provided with an additional 2 bits of resolution in both X and Y, thereby providing four times the resolution in both X and Y.

Figure 1A:
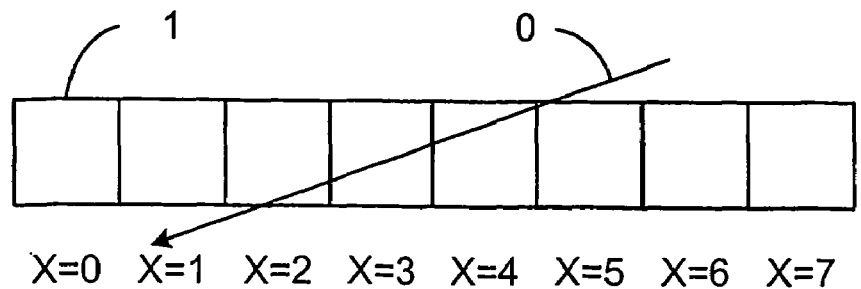
FIGS. 1(a) to 1(c) illustrate active edge determination at the sub-pixel level.
Figure 1B:
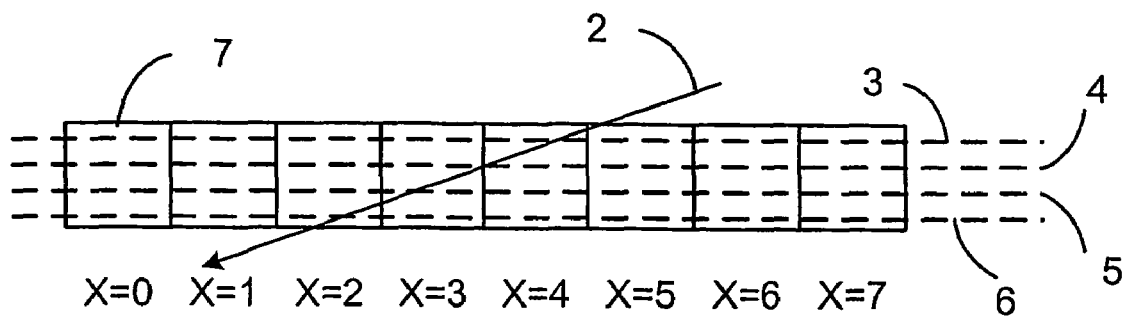
Figure 1C:
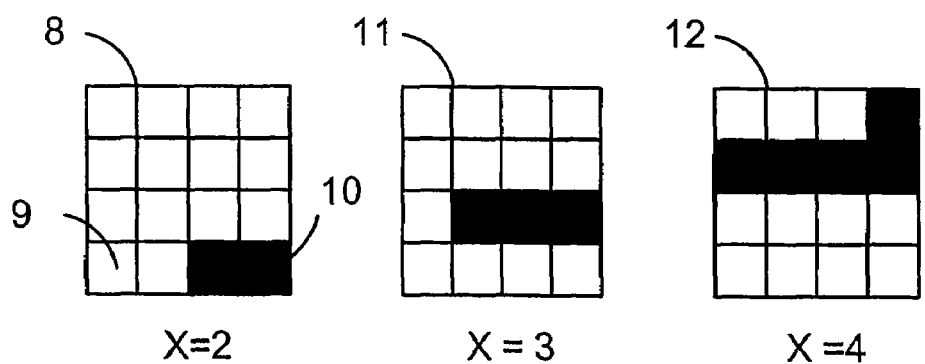

A description of how Edge Processing 239 uses the additional resolution is now given with reference FIGS. 1(*a*) to 1(*c*). FIG. 1(*a*) shows an active edge 0 entering a scan line 1 of display pixels currently being rendered. In FIG. 1(*b*), this scan line is divided into four sub-pixel lines (spel-lines) 3, 4, 5 and 6, representing the additional sub-pixel resolution provided by an additional 2 bits in the Y-ordinate of the edge data. The X position of the edge is then determined iteratively, with sub-pixel accuracy, for each of the four spel-lines using the appropriate one of the edge tracking techniques described previously. For each display pixel in which the edge being tracked intersects at least one spel-line, a 4×4 bitmask representation of how the edge affects that pixel is produced. Such bitmasks are often referred to in the art as A-buffers, first described in "The A-buffer, an Anti-aliased Hidden Surface Method," Carpenter, L., Computer Graphics, Vol. 18, No. 3, July 1984 (hereinafter "Carpenter"). A-buffers are used to indicate which spels within a display pixel are affected by an edge, and are included in the crossing messages passed from the Edge Processing Module 614 to the Z-level Activation Module 613. In this example, three A-buffers are generated a seen FIG. 1(*c*), those being A-buffers 8, 11 and 12, and corresponding to the current scan line pixels X=2, X=3 and X=4. As seen in FIG. 1(*c*), a spel 9 is not affected by the edge, whereas a spel 10 is affected by the edge.

Generation of crossing messages and their associated A-buffers is performed for an active edge in step 252 of FIG. 23. This step is now described in more detail with reference to FIG. 3.

Figure 3:
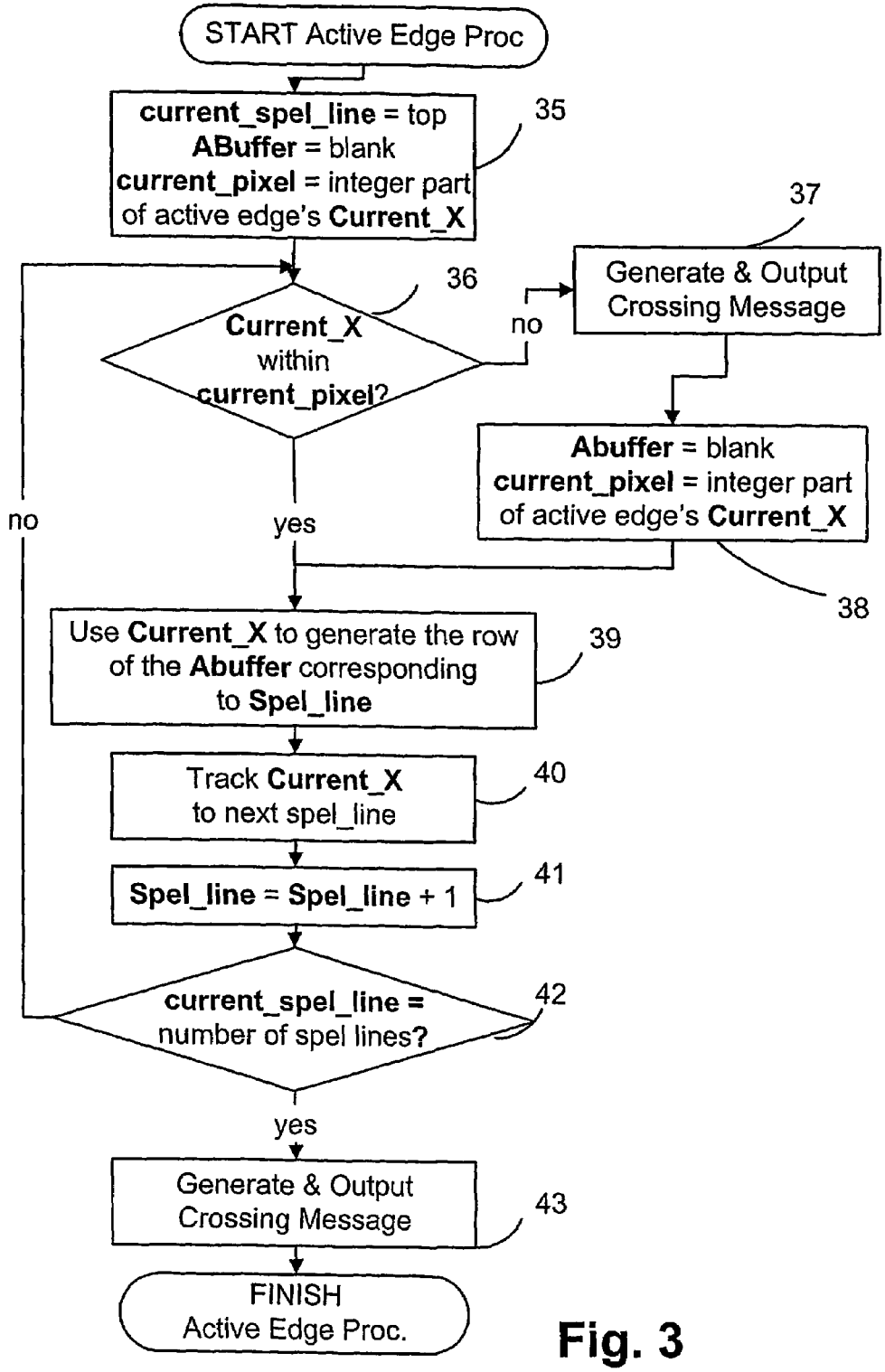
FIG. 3 is a flowchart of a method of step 252 of FIG. 23 for generating crossing messages.

In the first step 35 of FIG. 3, a current_spel_line value is initialized to 0, indicating that the top-most spel-line of the current scan line is to be processed first. An A-buffer is initialized as being blank, and a current_pixel value is initialized with an X value corresponding to the display pixel into which the active edge enters the current scan line. This X value is the non-fractional part of the active edge's current_X ordinate.

Next in step 36, the current_X ordinate of the active edge being processed is compared with the current_pixel value to see if current_X is within the display pixel represented by current_pixel. This will be true on the first iteration as a result of step 35.

The next step 39 operates to modify a single row of the A-buffer corresponding to the current_spel_line, where topmost row of the A-buffer corresponds to a current_spel_line=0. The fractional data of current_X is used to determine how many spels should be "set" on the row of the A-buffer corresponding to the current_spel_line. If two bits of sub-pixel accuracy are provided by current_X, for example, then A-buffers can be generated that represent four spels per row as shown in the A-buffers 8, 11 and 12. TABLE 5 shows how two bits of fractional data can be used to determine how to set the row of the A-buffer corresponding to the current_spel_line.

TABLE 5

| Fractional bits of current_X | A-buffer Row | | | |
|---|---|---|---|---|
| | Left-most spel | 2$^{nd}$ spel | 3$^{rd}$ spel | Right-most spel |
| 00$_b$ | 1 | 1 | 1 | 1 |
| 01$_b$ | 0 | 1 | 1 | 1 |
| 10$_b$ | 0 | 0 | 1 | 1 |
| 11$_b$ | 0 | 0 | 0 | 1 |

Referring back to the example in FIG. 1(*b*), during processing for the top-most spel-line 3, (current_spel_line=0), the current_X value for the active edge 0 has a non-fractional component of 4 (100$_b$), and a fractional component of 0.75 (fractional bits are 11$_b$). In this case, only the right-most spel of the top row of the A-buffer 12 is set in accordance with TABLE 5.

After the A-buffer has been modified, as seen in FIG. 3 a new current_X is calculated in step 40 corresponding to where the active edge intersects the following spel-line 4. This is achieved by applying one of the tracking techniques described previously to the data for the active edge. The current_spel_line is incremented in step 41 and if there are more spel-lines to be processed, (step 42=no), then the process returns to the step 36 of comparing current_X of the active edge with current_pixel.

If current_X indicates that the active edge intersects the current_spel_line within a different display pixel to that indicated by current_pixel, then step 37 is performed which generates a crossing message containing, at least:

An X-ordinate=current_pixel
A-buffer
An activated z-level reference (copied from the left z-level reference of the active edge)
A de-activated z-level reference (copied from the right z-level reference of the active edge).
Note, the z-level references can be to a null fill.

The generated crossing message is passed as output to the Z-level Activation Module 613 via a sorting means (e.g., a sort buffer). The sorting means is necessary to ensure that the Z-level Activation Module 613 receives crossing messages in scan-order (i.e., sorted by increasing X-ordinate).

The A-buffer is then re-initialized to be blank, and the current_pixel is set to be the non-fractional part of the current_X value for the active edge (O). The A-buffer is then modified to be the A-buffer 11 as previously described to indicate the effect of the active edge on the current_spel_line 5 of the current_pixel.

Processing continues for the remaining spel-line 6, which causes the crossing message containing A-buffer 11 to be output.

Once all spel-lines have been processed (step 42=yes), then a final crossing message containing A-buffer 8 is generated and output at step 43 as described previously.

5.8.1. Generating Crossing Messages for Glyphs

Each row of a rendered glyph is split into byte-wide (or 8 pixel wide) blocks that are processed in turn. Each byte is used as an index into a 256-entry look-up table (LUT), with each entry occupying 32 bits. A single entry in the LUT identifies at which pixels in an 8 pixel row crossing messages must be generated.

Each entry is processed in nibbles—the first nibble records the number of crossings generated by the byte, and each subsequent nibble records the position of a crossing relative to the beginning of the region. A special entry recording eight crossings but no positions is used for the unique case of a byte with a crossing at every pixel.

Figure 26:
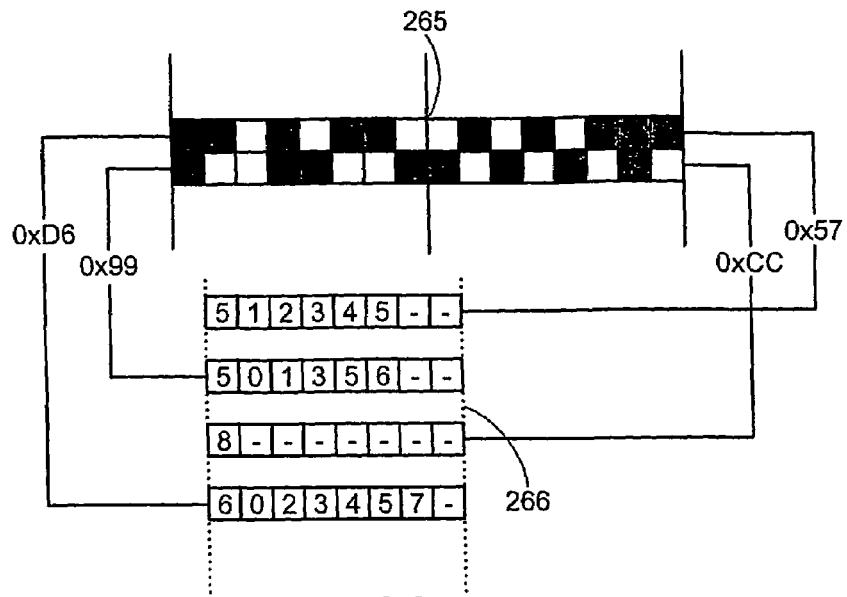
FIG. 26 illustrates generating crossing messages for glyphs.

Referring to FIG. 26, an example with a bitmap 265 of width 16 and height 2 is shown. The binary representation 265 would be {0xD6, 0x54, 0x99, 0xCC} (note that bit '7' within each byte refers to the leftmost pixel in the corresponding pixel block). Taking the first byte of this bitmap, and looking up its unsigned value in a LUT 266, it is seen that there are 6 crossings at positions 0, 2, 3, 4, 5 and 7. Assuming that the LUT 265 is placed at screen coordinates (100, 100), this would mean that crossing messages must be generated for (100, 100), (102, 100), (103, 100), (104, 100), (105, 100), (107, 100). A byte that generates 8 crossing messages can also be observed in this figure.

After the LUT 266 has been indexed and a set of crossings for the byte obtained, an extra crossing may be inserted or an incorrect crossing deleted. This is governed by a flag that is initialized to 0 at the beginning of each row of the bitmap. When this bit is cleared, crossings are unmodified. When the bit is set, if a crossing corresponding to the left-most position in the pixel block (a "zero crossing") does not exist, one is inserted. Conversely, if a zero crossing exists, it is deleted.

The status of the flag is updated at the end of processing of each byte in the row. An odd number of crossing messages inverts the flag, whereas an even number of crossing messages maintains the current value of the flag. If the flag is set at the end of a row, then a final crossing message is output to terminate the row correctly. The position of this message is at the start of the pixel block immediately to the right of the current pixel block.

Referring back to FIG. 26, it is possible to trace the status of this flag across the four bytes in the bitmap. At the beginning of the first row, the flag is initialized to 0. The first byte resolves to an even number of crossings, so the flag is not toggled at the end of this byte. The second byte, however, resolves to an odd number of crossings. As a result, the flag is toggled to 1. The second byte is the last in the row, and hence a final crossing message is generated to finish the row.

Moving now to the second row, the flag is initialized to 0. The third byte resolves to an odd number of crossing messages, resulting in the flag being set to 1 at the end of this byte. The fourth byte resolves to 8 crossing messages, at 0, 1, 2, 3, 4, 5, 6, and 7. However, the flag is set. As a zero crossing message exists, this message is deleted, resulting in 7 crossing messages being output. As this is an odd number of crossings, the flag is again toggled to 0. As processing is now at the end of the row and the flag is not set, no final crossing message is output.

The crossing messages in all cases are provided with S-buffers that have all sub-pixels set to −1. As a result, glyphs should always be rendered using the odd-even winding rule.

Figure 66:
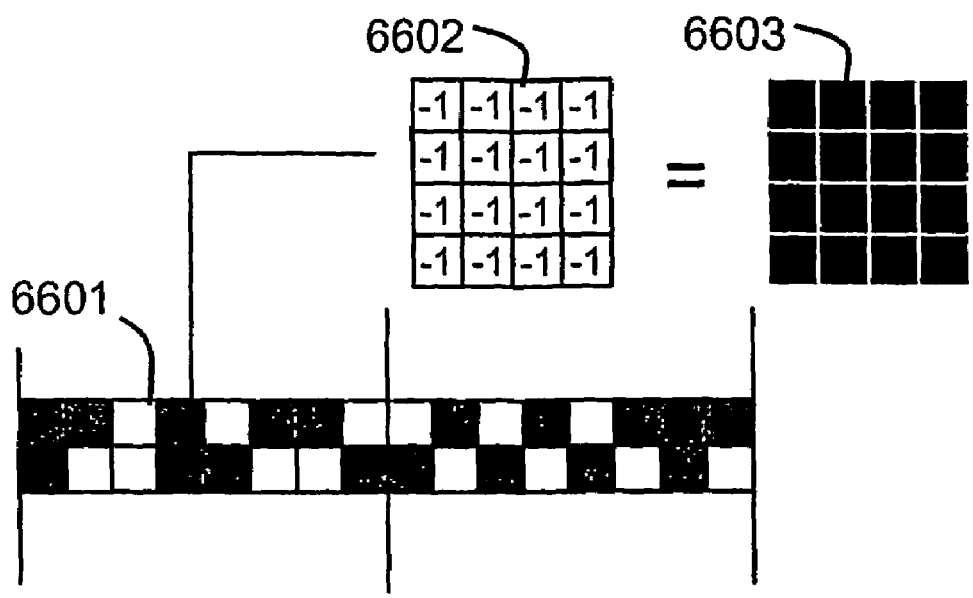
FIG. 66 illustrates crossing-message generation for a glyph edge.

5.8.1.1. Generating Glyph Crossing Messages and Anti-aliasing FIG. 66 shows the same scan lines as shown in FIG. 26. Considering a single pixel 6601, on that scan line, a crossing message 6602 is generated. The crossing message 6602 has all sub-pixels set to −1. This crossing message will result in a whole pixel 6603 on output. In effect, glyphs are not anti-aliased and sub-pixels are not considered. This is true for all crossing messages generated for a glyph, including those added in consideration of a "zero-crossing" flag.

5.9. Example of Crossing Messages

Continuing the example shown in FIG. 2(c), shows crossing messages produced by the Edge Processing Module 614 for the active edges as shown in FIG. 2(b). In this example, 4×4 anti-aliasing is used, where active edge coordinates are described with an additional 2-bits of resolution corresponding to sub-pixels (spels) within display pixels. Processing of the edge 19 will be performed first and therefore a corresponding crossing message 23 will be generated first. Since the active edge will have had a left Z-level reference describing the fill for the rectangle, then the activated Z-level reference of the generated crossing message 23 will have an activated z-level reference describing the fill for the rectangle.

Processing of the active edge 20 occurs next. As the module 614 (outlined in FIG. 3) iterates through the first three of the four spel-lines for active edge 20, the crossing message 25 is generated. Because the active edge intersects the fourth (bottom-most spel-line) on a different pixel, a different crossing message needs to be generated for this, and so crossing message 24 is generated next. Both these crossing messages have activated z-level references describing the fill for the triangle shape.

Similarly, the crossing messages 26 and 27 are generated for active edge 21, and these have deactivated Z-level references to the fill for the triangle shape (copied from the right z-level reference of the original active edge 21). Crossing message 28 is generated last from the edge 22, and has a deactivated z-level reference to the fill for the rectangle shape.

5.9.1. Another Example

Figure 70:
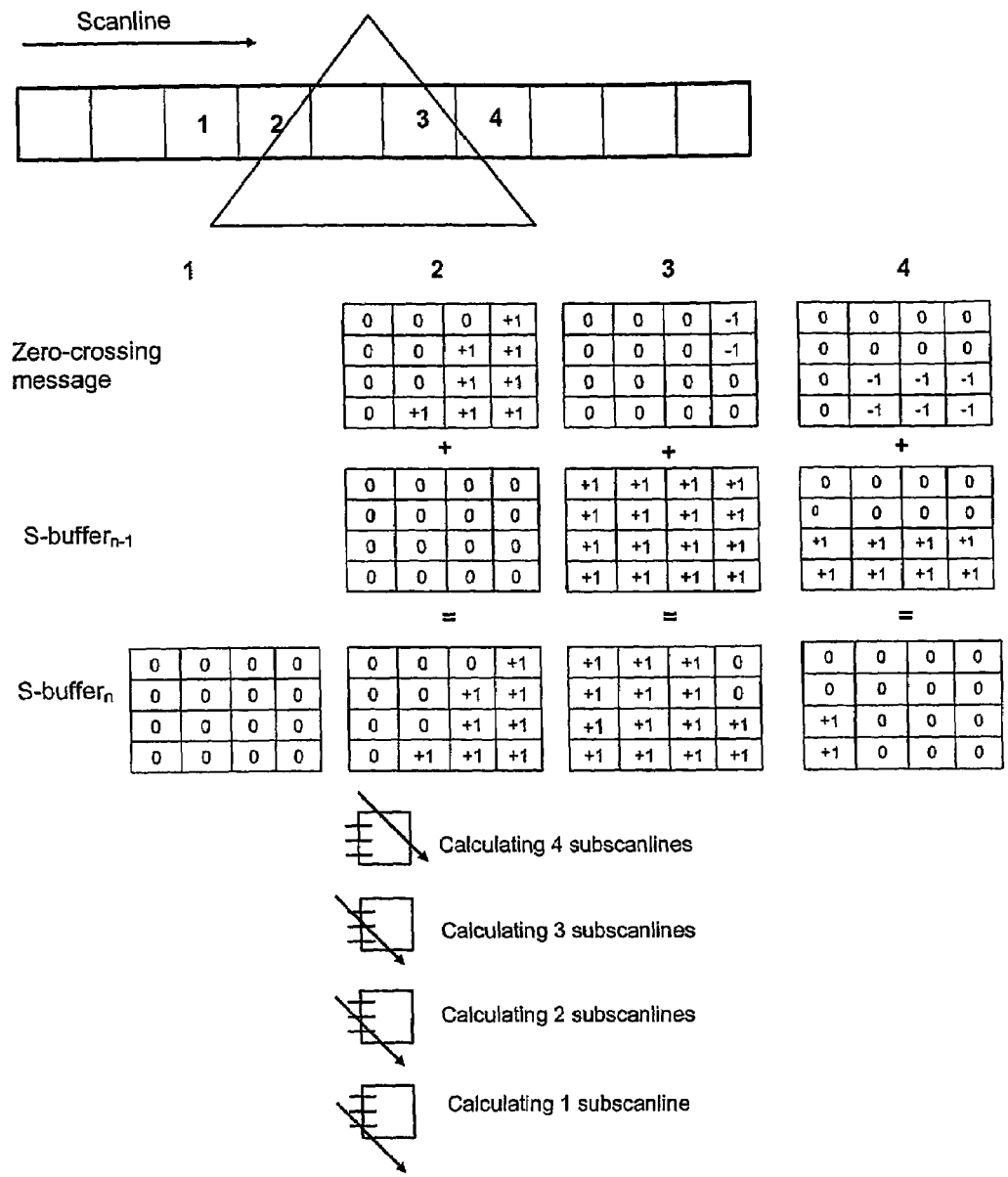
FIG. 70 illustrates the updating of S-buffers for zero-crossing messages.

FIG. 70 shows a further example that illustrates the updating of S-buffers with receipt of zero-crossing messages. Initially, for a pixel #1 in a scan line, there are no edges crossing and hence there is no crossing message or S-buffer$_n$ for that pixel. As such, for that pixel #1, an S-buffer$_n$ is set populated with zeros. The most right-hand column of this S-buffer$_n$ is then copied to the first (ie. left-most) column of an S-buffer$_{n-1}$ for the next pixel #2. That column, is then copied across the columns of that S-buffer$_{n-1}$ which, in this case, results in that buffer also being populated with zeros. As illustrated, an edge crosses pixel #2 and, according to the illustrated rules for crossings of sub-lines (for crossing 4, 2 or 1 sub-line), a zero-crossing message for pixel #2 is determined. As seen, that message is populated with +1's in its lower right-hand quarter, thus complementing the edge crossing the scan line. For pixel #2, the zero-crossing message and the S-buffer$_{n-1}$ are summed to give the S-buffer$_n$ for that pixel. In this case, such is merely the crossing message since the buffer was null. For the next pixel #3, again the right-most column is copied from the S-buffer$_n$ and populated in the S-buffer$_{n-1}$, in this case by ones. The crossing message at pixel#3 is determined according to the crossing rules where it is seen the relevant edge crossed only 2 sub-lines in the top-right quadrant of the pixel. Again, the crossing message and the S-buffer$_{n-1}$ are summed to give the S-buffer$_n$ for pixel #3. For pixel #4, again the right-most column is copied and populated across the S-buffer$_{n-1}$. A crossing message is again determined using the rules and summed to give the S-buffer$_n$ for pixel #4. This described approach to using crossing messages and S-buffers to effect antialiasing affords the ability to accurately determine an active level for a pixel location on a scan line without a need to composite levels on a sub-pixel basis. All sub-pixel processes occurs using S-buffers and crossing indicators, thus leaving compositing duties at the pixel level.

5.10. Re-ordering of Active Edges and Crossing Messages

Although active edges for a scan line are processed in scan-order, the corresponding crossing messages may not necessarily be generated and output in scan-order (increasing X). For example, when the edge 20 is processed in FIG. 2(b), a crossing message 25 is generated and output first, followed by message 24. Crossing message 25 has a higher X-ordinate than the message 24 and so the crossing messages are not output in scan-order. Further, the result of calculating the new current_X during operation of the Edge Processing Module 614 may cause a first active edge to have a lower scan position than a second active edge already processed on this scan line.

Figure 21:
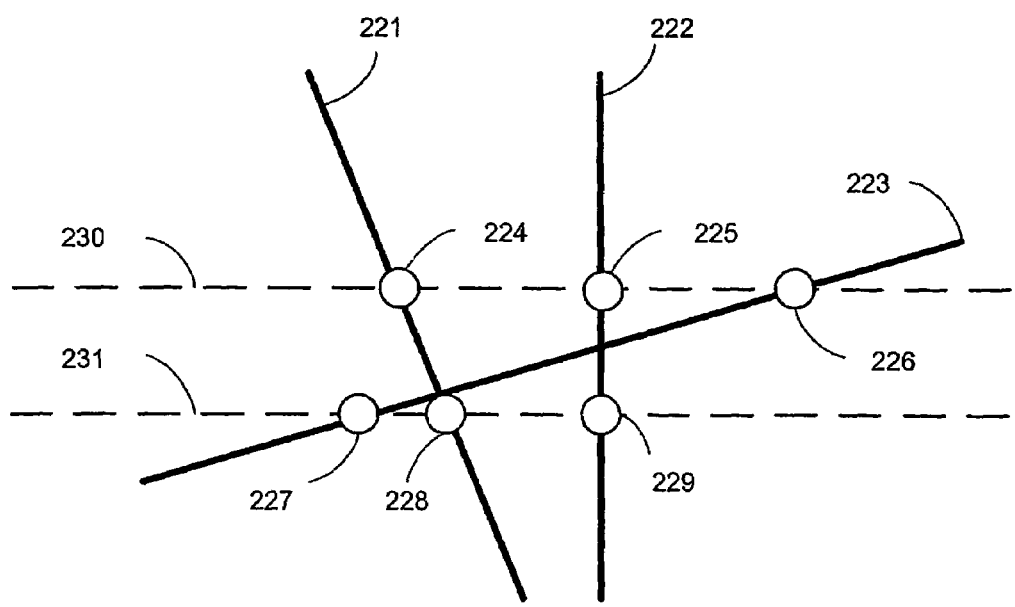
FIG. 21 is an example of re-ordering active edges at crossings.

An example of this situation is given in FIG. 21. There, the two dashed horizontal lines 230 and 231 represent scan lines of the output display. The upper dashed line 230 represents a scan line currently being processed by the Edge Processing Module 614, and the lower dashed line 231 represents a next scan line to be processed. FIG. 21 shows three active edges 221, 222 and 223 that intersect the current scan line 230 at crossings 224, 225 and 226 respectively. The current_X field of the active edges indicates the position of the intersection. The Edge Processing Module 614 calculates a new current_X value for each of the active edges corresponding to the intersections 227, 228, 229 on the next scan line 231. In this example, these modified active edges are no longer in scan-order because active edge 223 has crossed active edge 221 and active edge 222. The modified active edges therefore require re-sorting before they are placed in the ordered set of active edges for the next scan line. In the example, the desired order of active edges in the ordered set of active edges for the next scan line is first 223, then 221, then finally 222.

The Edge Processing Module 614 inserts the modified active edges into a sorting means (e.g., a sort buffer) such that they are in scan-order before they are transferred into the ordered set of active edges for the next scan line. It is also necessary to pass outgoing crossing messages (as generated in step 252 of FIG. 23) through a sorting means (e.g. a sort buffer) so that the Z-level Activation Module 613 receives crossing messages in scan-order.

6. The Z-level Activation Module

The Z-level Activation Module 613 uses the edge intersection data passed to it from the Edge Processing Module 614 to keep track of which z-levels contribute to the output color as the frame is rendered. A stream of output pixels is to be generated by the rendering engine 610 in scan order. Each crossing message from the Edge Processing Module 614 represents a display coordinate for which the required output color changes when produced in scan-order. In the following description, one or more scan-order contiguous pixels starting at a specified raster space location are referred to as a run of pixels. The description assumes that A-buffers are generated for edge crossings, that is, for the case when the rendering system 610 is performing anti-aliasing.

6.1. The Ordered Set of Interesting Z-levels

Figure 59:
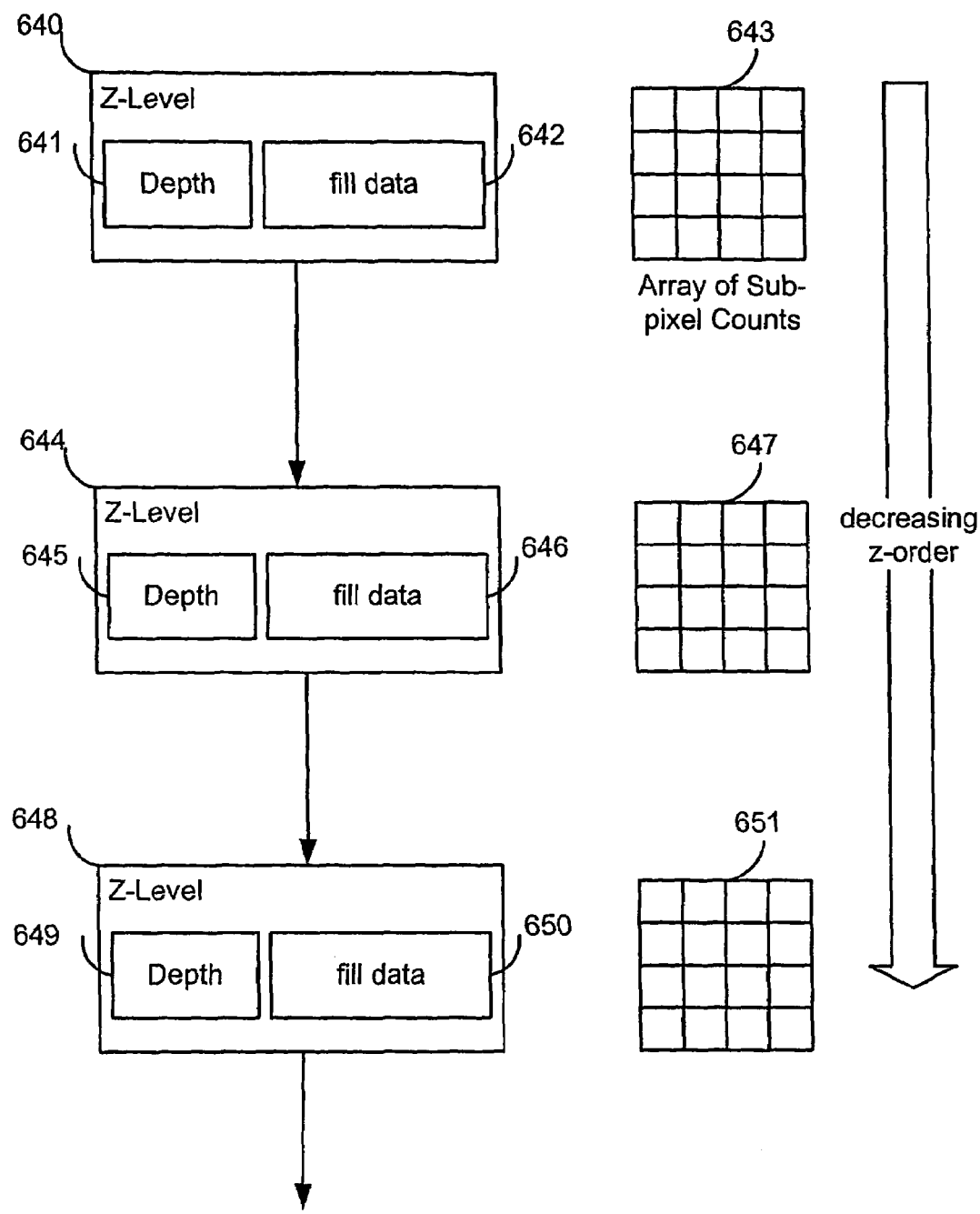
FIG. 59 shows a list of interesting Z-levels maintained by the Z-level Activation Module.

The Z-level Activation Module 613 maintains a list of "interesting" z-levels, seen generally in FIG. 59. By interesting, it is meant that the z-level in question must be considered by the Z-level Activation Module 613. The Z-level Activation Module 613 uses the ordered set of interesting z-levels to convert the input of crossing messages into an output of region messages indicating which z-levels contribute to the output color for runs of pixels along a current scan line. That is, the runs lie within the points described by two adjacent crossing messages.

The operation of the Z-level Activation Module 613 can also be seen in terms of converting a stream of crossing messages to an output of region messages which indicate which depths are present on the span and what their relative depth ordering is over the span. Span in this regard means the interval on the scan line bounded by crossing messages. Since z-levels bind depths to fills, such an ordered set of depths can be used to determine which z-levels contribute to the output color for runs of pixels along a current scan line. This is the role of the compositor, to be considered later. Conversely, determining the set of z-levels present on a span is equivalent to determining the depths present on a span.

6.2. The Flow of Control in the Z-level Activation Module

As with the Edge Processing Module 614, the Z-level Activation Module 613 considers the task of rendering on a scan line by scan line basis, and expects to receive input (crossing messages) in scan-order. The functionality of the Z-Level Activation Module 613 for a single scan line is summarized by FIG. 58. Processing for a scan line begins by initializing the list of active z-levels to be empty, and setting a Current_X value to 0 in step 628. Current_X is used to indicate the pixel currently being processed, and a value of 0 represents the first (left-most) pixel of the scan line.

Crossing messages for the scan line are processed in left-to-right order (increasing X).

If there are no edge crossing messages for this scan line, as determined by "no" at step 627, then immediately the Z-level Activation Module 613 will request rendering of the entire scan line at step 629. Because at this stage the list of interesting z-levels is empty, this will result in the scan line being rendered with a default background color only.

If crossing messages for the current scan line do exist (step 627=yes), then the X ordinate of the next available crossing message is compared with the Current_X value at step 630. If Current_X and the X ordinate of the crossing message are not equal, then the Z-Level Activation Module 613 must request the rendering of the run of pixels between Current_X and the X ordinate of the crossing message before processing this crossing message. This request causes, at step 631, a Compositing Module 612 in the rendering engine 610 to generate output colors for this region of pixels, using the contents of the ordered set of interesting z-levels.

In the case that Current_X and the X ordinate of the crossing message are equal ("yes" in step 630), then the crossing message corresponds to color generation for the current pixel, and so processing of the crossing message proceeds.

6.3. Activating and Deactivating Z-levels: Winding Counts

To facilitate rendering of self-intersecting objects, the Z-level Activation module 613 utilizes winding-rules. Rather than storing just a Boolean indication of whether or not a z-level has been activated, the module stores a small winding count integer value per active z-level. Winding counts are well known to one skilled in the art. Two of the winding rules that can be used are commonly described in prior art: non-zero and odd-even rarity). A third rule (less common, but still described in the prior art) that can be used is negative winding, described in Section 6.7—Converting S-buffers to A-buffers; Winding Rules, below.

Crossing messages may contain a reference to a z-level that is to be 'activated', i.e., the z-level must have its winding count decremented. Crossing messages may also contain a reference to a z-level that is to be 'de-activated', i.e., the z-level must have its winding count incremented. This incrementing and/or decrementing of the z-levels only applies to the portion of the pixel indicated in the A-Buffer of the crossing message, as shown in FIG. 2(*d*). A-buffers 29, 30 and 31 are examples of the sub-pixels that are activated by the crossing messages 23, 24 and 25, 32, 33 and 34 are examples of the sub-pixels that are deactivated by the crossing messages 26, 27 and 28.

The effect of these activations and deactivations to the contribution of a z-level to the output pixels depends on which winding rule is used with that z-level.

6.4. The Ordered Set of Interesting Z-levels—Continued

A 2-dimensional array of winding counts is stored by the Z-level Activation Module 613 for each z-level in the list of interesting z-levels, as seen in FIG. 59. A 2-dimensional array of winding counts is termed an 'S-buffer'. Each winding count represents the state of the z-level for one of the sub-pixels within the current pixel being rendered (643, 647 and 651). This allows the Z-level Activation Module 613 to keep track of which portion of the current pixel each z-level is active over. The order of the Ordered Set of Interesting Z-levels is depth order. In the example shown in FIG. 59, z-levels 640, 644 and 648 are ordered by their depths; 641, 645 and 649. The fill data 642, 646 and 650 define the color of the z-levels 640, 644 and 648.

6.5. Adding New Z-levels to the Ordered Set of Interesting Z-levels

Returning to FIG. 58, if a new crossing message does not have an activate z-level (step 638=no), then processing steps related to the activate z-level are not performed. Similarly, if a crossing message does not have a deactivate z-level (step 639=no), then processing steps related to the deactivate z-level are not performed.

If a new crossing message activates a z-level, and that z-level is not already in the list of interesting z-levels (step 632=no), then in step 640*a* the list of interesting Z-levels is checked. If full, a Z-level with all zero winding counts is removed from the list. After this, a new entry, corresponding to that detected in step 638, is inserted into this list such that the list maintains z-level depth order, as shown in step 634. The A-buffer of the crossing message is used to initialize an array of sub-pixel counts (i.e., the z-level's S-buffer) that is to be associated with the newly inserted z-level. The sub-pixels indicated by the A-buffer correspond to sub-pixel counts in the S-buffer that should be initialized with a value of minus one. The remaining sub-pixel counts are initialized with a value of 0. Examples of this conversion from an A-Buffer to an array of winding counts are shown in FIG. 2(*d*).

If a new crossing message activates a z-level that is already in the Ordered Set of Interesting Z-levels (632=yes), then the A-buffer of that crossing message is used to determine which sub-pixel counts in the S-buffer associated with that z-level are to be decremented.

Figure 58:
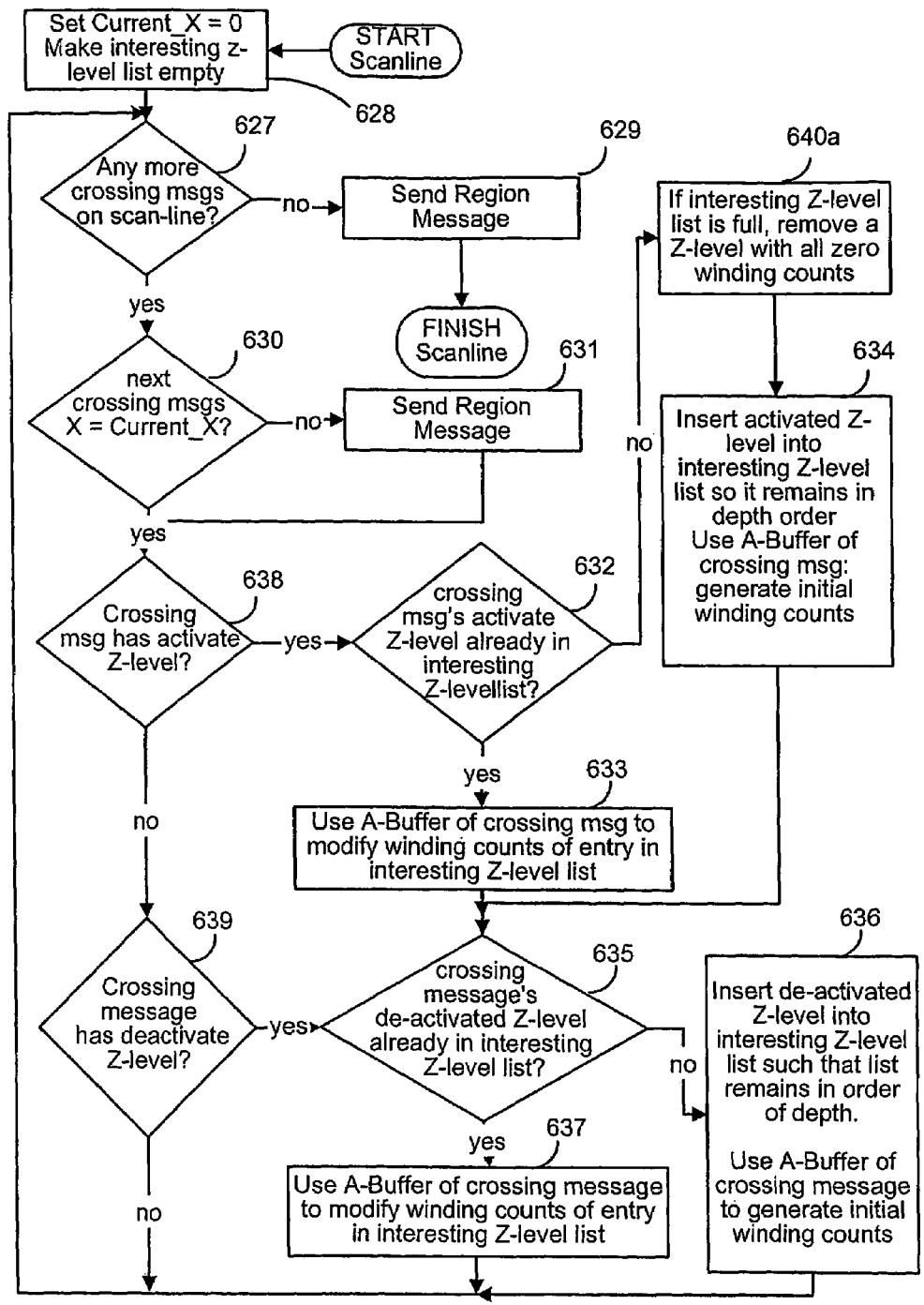
FIG. 58 is a flowchart illustrating operation of the Z-Level Activation module.

Still with reference to FIG. 58, if a new crossing message deactivates a z-level that is not already in the list of interesting z-levels, then a corresponding new entry is inserted at step 636, into this list such that the list maintains z-level depth order. The A-buffer of the crossing message is used to initialize an array of sub-pixel counts (i.e., the z-level's S-buffer) that is to be associated with the newly inserted z-level. The sub-pixels indicated by the A-buffer correspond to sub-pixel counts in the S-buffer that should be initialized to plus one. The remaining sub-pixel counts are initialized with a value of 0. Examples of this conversion from an A-Buffer to an array of winding counts, S-buffers, are shown in FIG. 2(*d*), where the crossing messages with X=14, X=15, and X=15 are crossing messages that deactivate a z-level.

If a new crossing message deactivates a z-level that is already in the list of interesting z-levels (635=yes), then the A-buffer of that crossing message is used to determine which of the sub-pixel counts in the S-buffer of that z-level are to be incremented. For each sub-pixel indicated in the A-buffer, the winding count of the corresponding sub-pixel in the S-Buffer is incremented at step 637.

Figure 71:
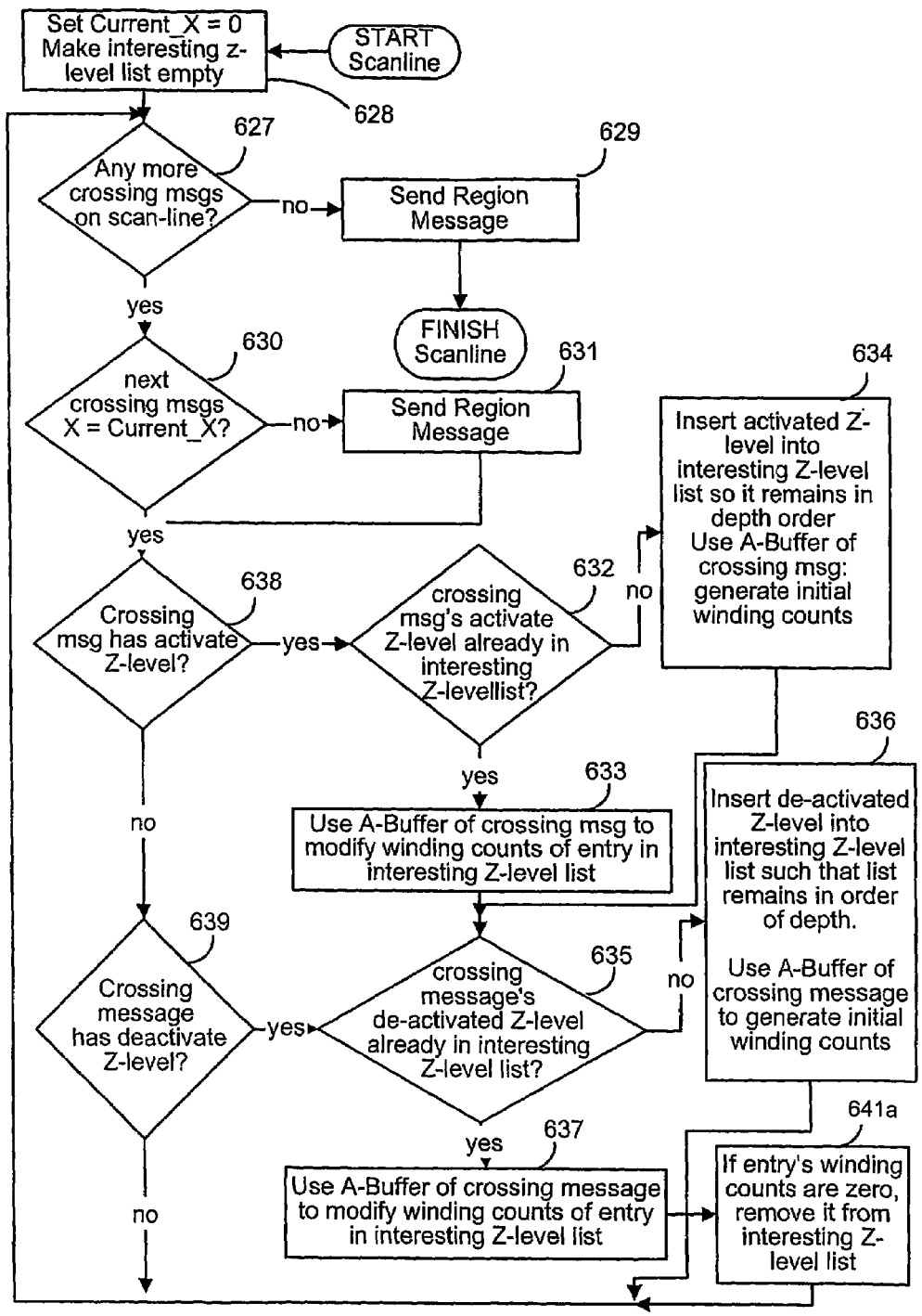
FIG. 71 is a flowchart similar to FIG. 58 but showing operation of the Z-level activation module to discard levels from the list.

FIG. 71 illustrates an alternate approach to handling crossing messages to that shown in FIG. 58. In FIG. 71, all reference numerals that correspond with those shown in FIG. 58 have the same function. FIG. 71 differs from FIG. 58 in that step 640a of FIG. 58 has been removed, such that step 634 follows directly from a "no" indication of step 632. FIG. 71 also includes an additional step 641a which operates following step 637 to check if an entry in the list of interesting Z-levels has winding counts that are all zero. If so, that entry will no longer be effective and thus is removed from the list. As such the method of FIG. 71 operates to remove entries from the list when they can no longer contribute to the image being rendered, and contrasts FIG. 58 where entries are removed only when space is required in the list for new entries.

6.5.1. Maintaining an Ordered Set of Interesting Z-levels in Hardware

Figure 52A:
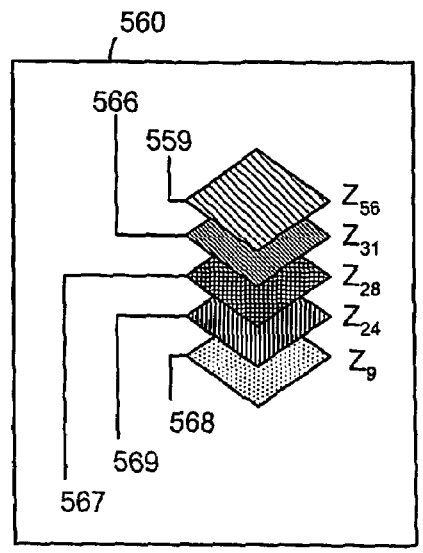
FIGS. 52(a) and 52(b) illustrate operation of the Z-level activation table.
Figure 52B:
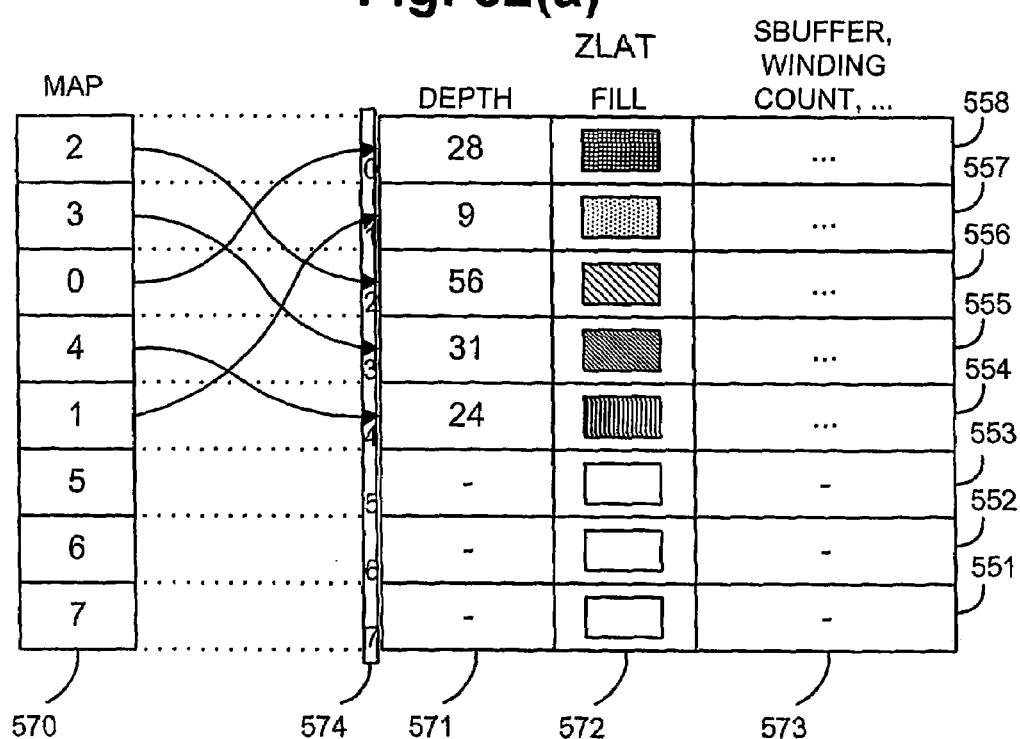

Discussion can now turn to that of a hardware implementation, such as an ASIC. The Z-level Activation Module 613 manages Z-levels, on a scan line basis, in a Z-level Activation Table (ZLAT), as shown in FIG. 52(b). As a scan line is processed from left to right, Z-levels referenced by crossing messages are gradually introduced to the ZLAT. Each incoming Z-level is assigned a ZLAT entry to store an S-buffer 573, fill information 572, and is addressable by Z-level depth 571.

Z-level entries in the ZLAT are not ordered by depth. Rather, they are most likely to be arranged in the order they were received in crossing messages. FIG. 52(a) shows an example of 5 Z-levels that are active at a particular X-ordinate, and their relative depths, while FIG. 52(b) illustrates that the respective 5 Z-level entries in the ZLAT are not ordered by depth. Z-level entries are maintained in the Z-level Activation Module 613 in order of decreasing depth by means of a map 570. The map 570 is a table containing the same number of entries as the ZLAT, and is an ordered list of local depths that each include a mapping reference to respective entries in the ZLAT. For example, Z-level 555 has a local depth of 1 (it is the second highest Z-level, where a local depth of 0 is the highest) and is mapped to ZLAT entry 3; that is, Z-level 555. Also illustrated is an updated map 574.

Using this mechanism, Z-level entries can be accessed in two ways. The ZLAT of the present disclosure is implemented as a content addressable memory, such that supplying a Z-level depth will return a corresponding Z-level entry. This enables the size of the ZLAT to be varied according to the number of objects active in a span whilst permitting ready inclusion and removal of Z-levels from the ZLAT. The ZLAT is accessed in this manner when updating an S-buffer's state as crossing messages are received. Conversely, ZLAT entries are also addressable by local depth via a map table. That is, the Z-level present at a particular local depth can be determined by applying the map to the local depth. The ZLAT is accessed in this manner when determining the ordered subset of depths that are active on a particular span for compositing.

6.5.1.1. Adding a new Z-level Entry in Hardware

Z-levels are added to the ZLAT the first time they are referenced by a crossing message on a scan line. On subsequent references, the respective entry only requires updating, and it remains in the same location within the ZLAT. An input counter is maintained to track the location in the ZLAT that the next new Z-level entry will be inserted in to. The counter is initially reset to position 0 at the beginning of a scan line and is incremented as each new Z-level is added to the ZLAT. Therefore, up until the ZLAT becomes full, Z-level entries will be maintained in the order they were received in crossing messages.

At the beginning of a scan line, the ZLAT is initially empty. The map 570 is also in an initial state such that local depth 0 contains a mapping to ZLAT entry 0, and local depth 1 contains a mapping to ZLAT entry 1, and so on. When a new Z-level is then added as an entry to the ZLAT, it is inserted in the position pointed to by the input counter, the map 570 is updated to reflect any changed ordering of Z-levels, and the input counter is incremented. To update the map, the local depth of the incoming Z-level must be determined relative to the local depths of the Z-levels currently being maintained in the ZLAT. That is, determining which Z-levels have a local depth above the incoming Z-level and those having a local depth below the incoming Z-level.

Figure 53A:
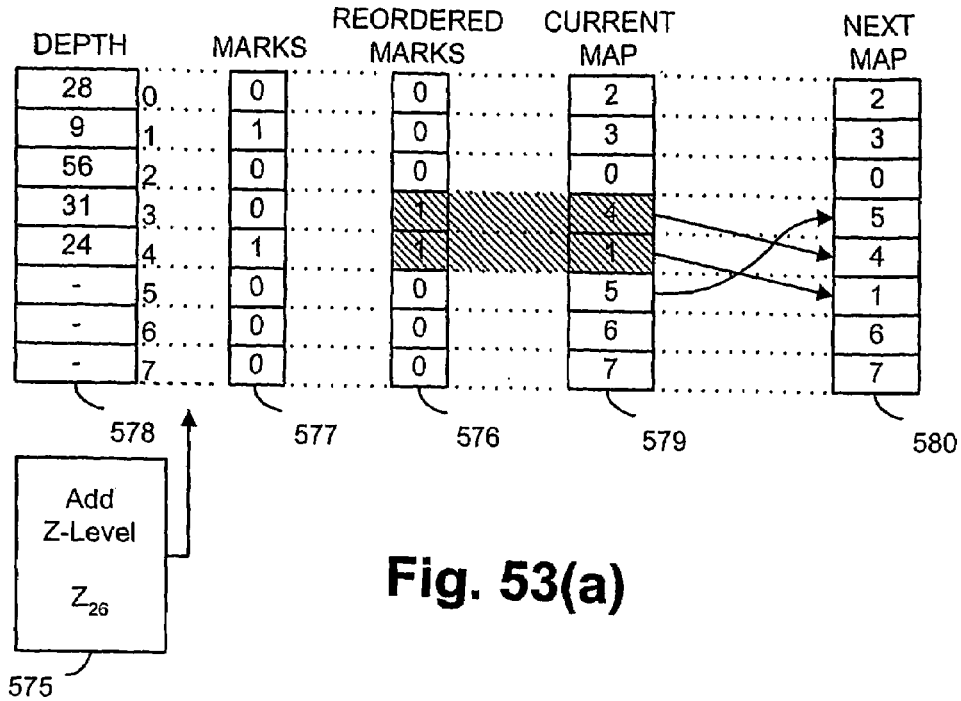
FIGS. 53(a) and 53(b) show an example of reconfiguring the Z-level activation table.
Figure 53B:
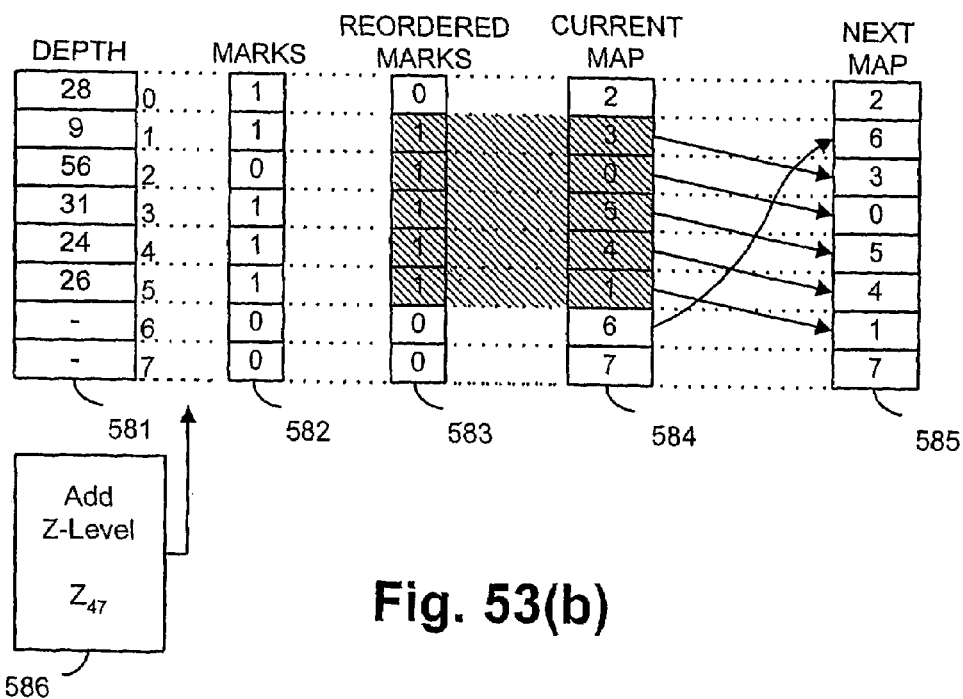

This process is illustrated in FIGS. 53(a) and 53(b). As a first step in this process, seen in FIG. 53(a), Z-level entries currently being maintained in the ZLAT 578 are compared with the Z-level to be added. ZLAT entries are marked as being locally above or below the incoming Z-level by comparing their Z-level depths. In FIG. 53(a), the ZLAT entries are marked as being above (mark=0) or below (mark=1) the Z-level 575 being added in the list 577.

The second step is to reorder markings in the order of their associated local depths as determined by the map 579. This has the effect of discriminating between local depths in the map that are above or below the local depth of the incoming Z-level. Using the reordered markings 576, the map 579 is updated to reflect the new ordering of local depths due to the addition of the new Z-level.

To update the map 579, local depths that are marked as being below that of the Z-level to be added, seen at 575, are demoted in order, while the new local depth is promoted to produce the next map 580. Note that the local depths of respective ZLAT entries change, however, as ZLAT entries are maintained statically within the ZLAT, their mappings remain unchanged. For example, in the ZLAT 578, Z-level of depth 9 has a local depth of 4 in the current map 579 before the new Z-level 575 is added. Its mapping is to position 1 in the ZLAT 578, and this mapping remains unchanged even after its local depth is demoted to 5 in the next map 580 after the new Z-level 575 is added.

FIG. 53(b) illustrates another example of adding a further Z-level 586 to the ZLAT 581 arising from FIG. 53(a) and the steps for updating the map 584, 585 appropriately.

6.5.1.2. Re-Sorting a Z-level Entry in Hardware

As an extension, Z-level entries can be maintained in the ZLAM in order of interest followed by decreasing Z-level depth. Interesting Z-levels are those for which application of their Fill Rule on their S-buffer results in a non-zero A-buffer. That is, an interesting Z-level is a potentially contributing one. While it is not possible for a Z-level's depth to change, there are circumstances where a Z-level's state changes from interesting to not interesting, and vice versa. This occurs in two possible scenarios. It can occur when the Z-level Activation Module 613 receives a crossing message that references a Z-level that already resides within the ZLAT, and the A-buffer also associated with the crossing message, causes the Z-level to change its state of interestingness. It can also occur at the completion of processing a span in which the right-most spels of S-buffers of ZLAT entries must be copied across the entire S-buffer. This step can have the effect of making an interesting Z-level uninteresting.

The event of a Z-level changing its state of interest has no effect on entries in the ZLAT, except the updating of the S-buffer of the respective Z-level. It does, however, is require the map to be updated to reflect the new local depth ordering. Thus, local-depths, maintained by the map, need to be resorted rather than insertion-sorted.

Figure 54A:
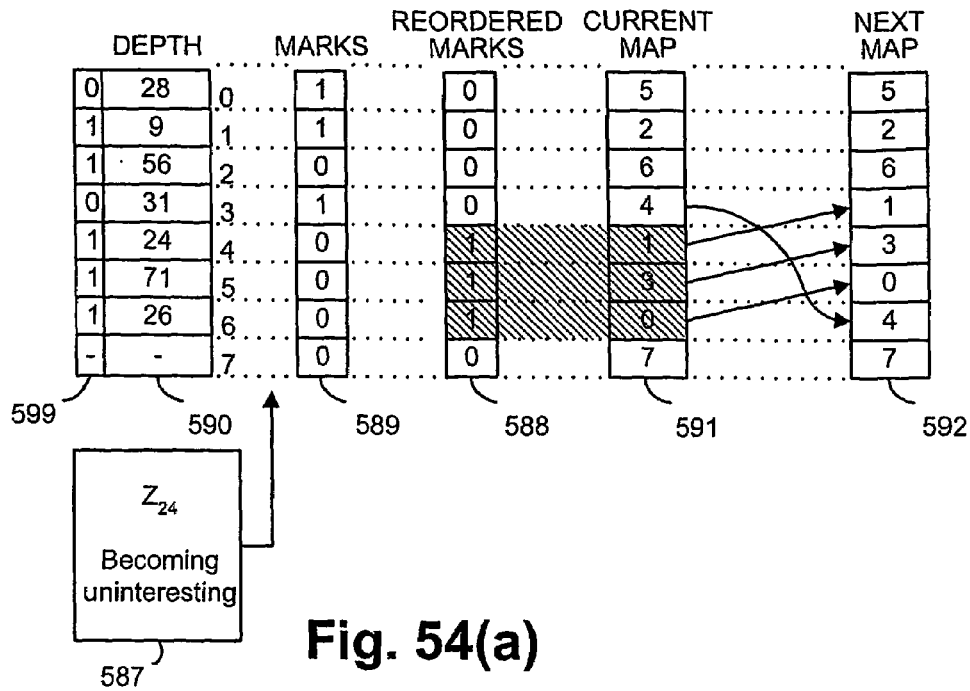
FIGS. 54(a) and 54(b) are examples of updating the Z-level activation table for Z-levels of changing interest.

FIG. 54(a) illustrates a scenario where a Z-level 587 residing in the ZLAT 590 becomes uninteresting. The current state 599 of the ZLAT 590 shows where some depths are interesting and some are not, and the current map 591 reflects the current local depth ordering. This can be used to form a partitioning of the ZLAT 590. To update the map 591, marks are made against entries in the ZLAT 590 in a similar manner as to the process of adding a new Z-level. Entries are marked as being above or below the Z-level changing state, with respect to the local depth ordering. In the marks column 589, entries are marked with a 1 if their local depth ordering will be above the changing Z-level once it has been updated. The markings are also similarly reordered to reflect local depth statuses 588, and the map 591 is updated to the map 592 by promoting local depth mappings that are above the changing Z-level, and demoting the mapping of the changing Z-level to a lower local depth.

Figure 54B:
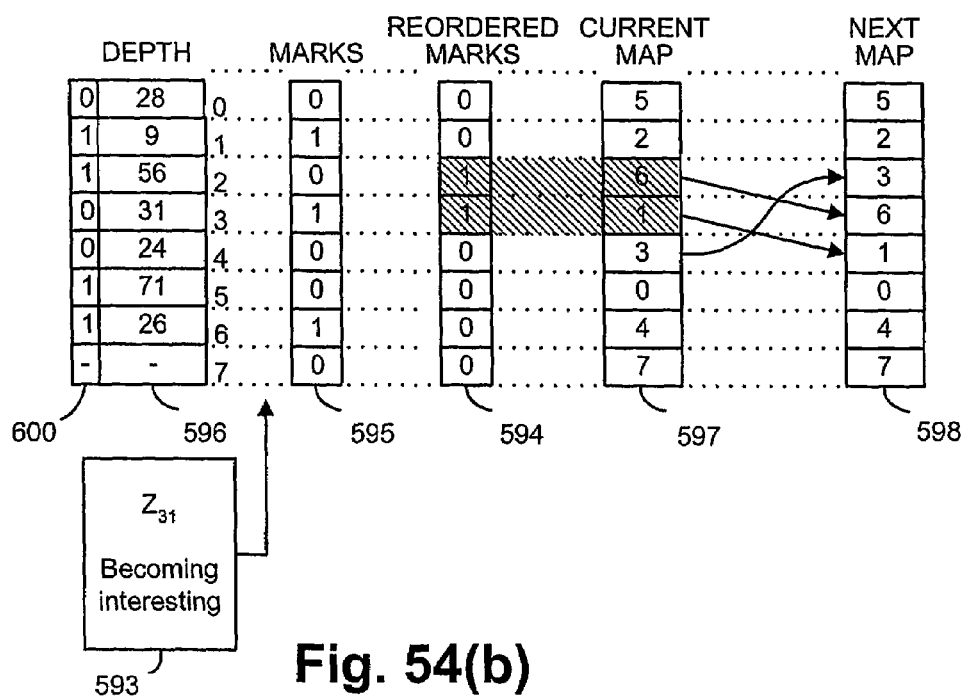

FIG. 54(b) illustrates this process when an entry 593 is becoming interesting 600. In this example, entries in the ZLAT 596 are marked with a 1, as shown in the marks column 595, if their local depth will be below that of changing Z-level 593. Marks are reordered 594 similarly, and the map 597 is updated to 598 so that marked local depth mappings are demoted to lower local depths, and the changing Z-level's local depth is promoted.

6.5.1.3. Replacement of a Z-level Entry

A mechanism is not required for removing inactive ZLAT entries on the current scan line. A lazy policy can be implemented whereby inactive entries are ignored unless a new Z-level is to be added and there is no longer room in the ZLAT, given its finite size. In such situations, the Z-level entry mapped to by the lowest local depth is removed and the Z-level being added takes its entry in the ZLAT. The map table is updated as if the entry in the ZLAT being claimed was empty.

6.5.1.4. Simplified ZLAM Management on a Single Scan Line

Figure 65A:
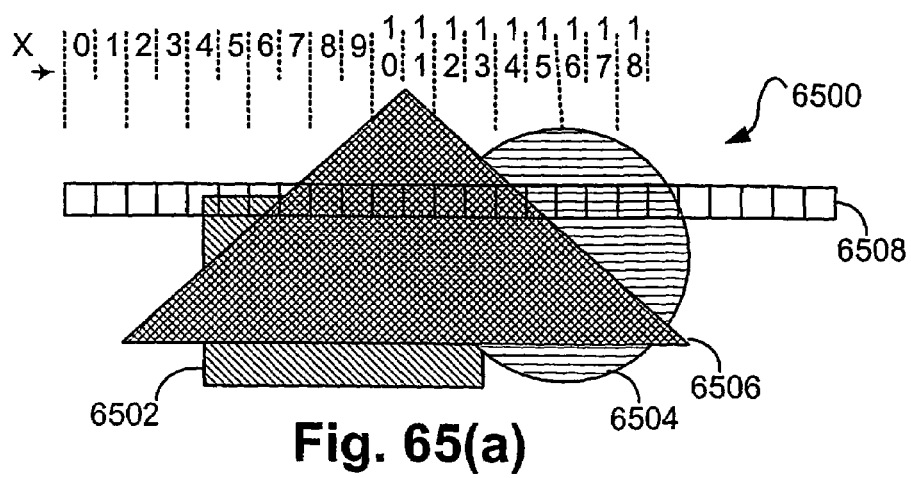
FIGS. 65A and 65B depict an update of the z-level activation table across a scan line.
Figure 65B:
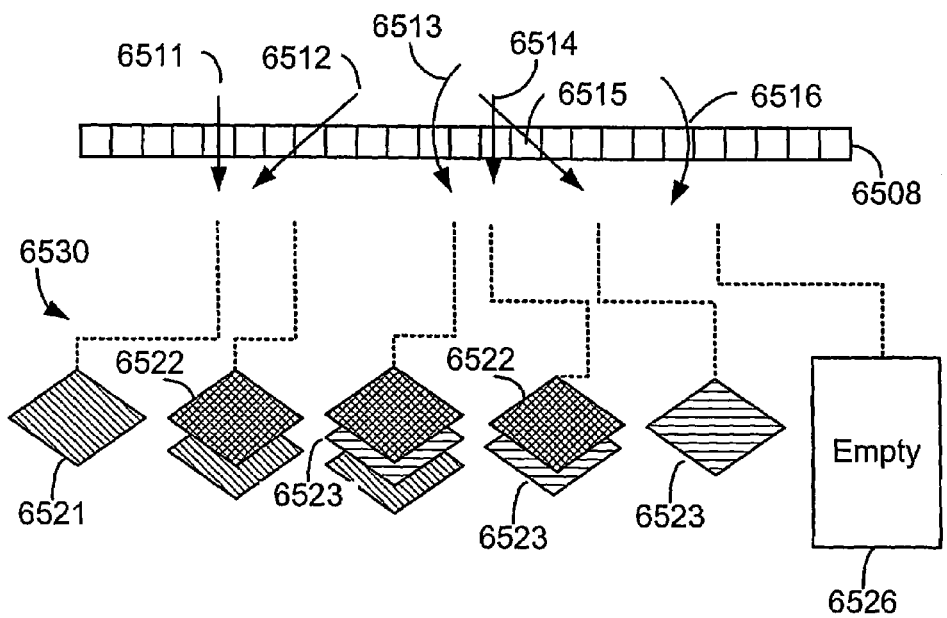

FIGS. 65A and 65B provides an overview of how the ordered set of interesting z-levels changes over a scan line, as it is updated by the method described in FIG. 58. For clarity, optional lazy policy of inactive z-level reclamation is described in Section 6.5.1.3 is not shown—inactive z-levels are removed from the table.

FIG. 65A represents an image 6500 formed of a rectangle 6502, a circle 6504 and a triangle 6506 being rendered on a particular scan line 6508 having x-ordinates on the range [0,18]. FIG. 65B shows, with respect to edges active on the scan line 6508, an ordered set of interesting levels 6530 forming the z-level activation table upon encountering each of the edges.

At 6511, the left hand edge associated with the rectangle 6502 intersects pixel #4 on the scan line 6508 and a crossing message is generated. This crossing message leads to the z-level 6521 associated with the rectangle 6502 being added to the ordered set 6530.

At 6512, the left hand edge associated with the triangle 6506 intersects pixel #6 and a crossing message is generated. This crossing message leads to the z-level 6522 associated with the triangle 6506 being added to the ordered set 6530 of interesting z-levels. In this case it is seen that the application of the method of FIG. 58 results in the fill for the triangle 6504 being inserted topmost in the ordered set 6530. Fills are inserted such that the set 6530 is maintained in depth order, and the triangle 6506 lies able the rectangle 6502.

Similarly at 6513, the z-level or fill 6523 for the circle 6504 is inserted between the z-levels 6522 and 6521 of the triangle 6506 and rectangle 6502, respectively. At 6514, the removal of the fill 6521 of the rectangle 6502 as such becomes inactive does not effect the ordering of the ordered set 6530. At 6515, the circle 6504 becomes inactive and its fill 6521 is removed from the ordered set 6530 which then becomes empty.

6.6. Processing Runs

This description now returns from the discussion of issues more pertinent to hardware, and continues the more general method description from Section 6.5.

Processing of crossing messages continues until there are no further crossing messages corresponding to Current_X (630). When this happens, the Z-level Activation Module 613 must request the Compositing Module 612 to generate output color 631 for the run of pixels before proceeding to process any further crossing messages, as illustrated in FIG. 40.

Figure 40:
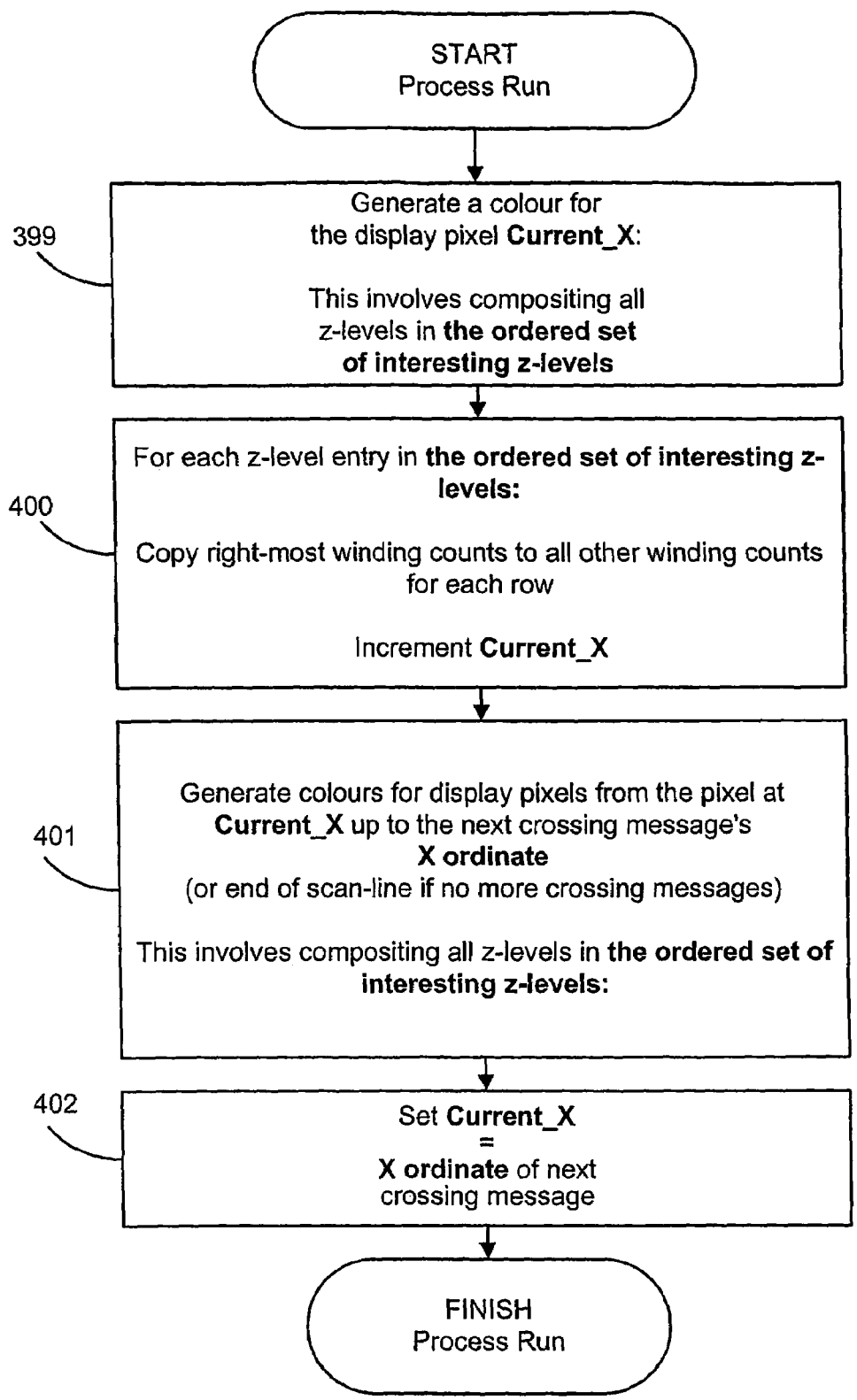
FIG. 40 is a flowchart of the processing of a run of pixels to generate output color.

FIG. 40 illustrates outputting run data to the Compositing Module 612 and the associated tracking of runs of pixels where the set of interesting z-levels does not change.

Firstly, generation of the color for the display pixel Current_X must be requested at step 399. At this time, the contents of the ordered set of interesting z-levels describes all the z-levels which contribute to the color of this pixel, and sub-pixel coverage information is provided for each z-level by its S-buffer. The remainder of FIG. 40 will be described in Section 6.8.

6.7. Converting S-buffers to A-buffers: Winding Rules

Figure 57A:
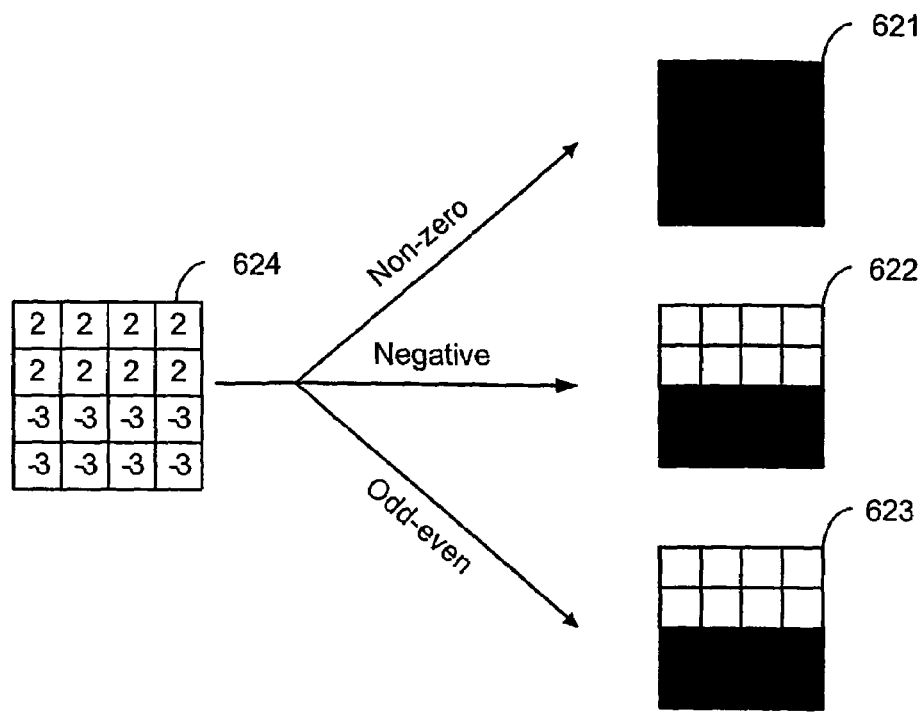
FIGS. 57(a) and 57(b) show conversion of S-buffers to A-buffers according to the three winding rules.
Figure 57B:
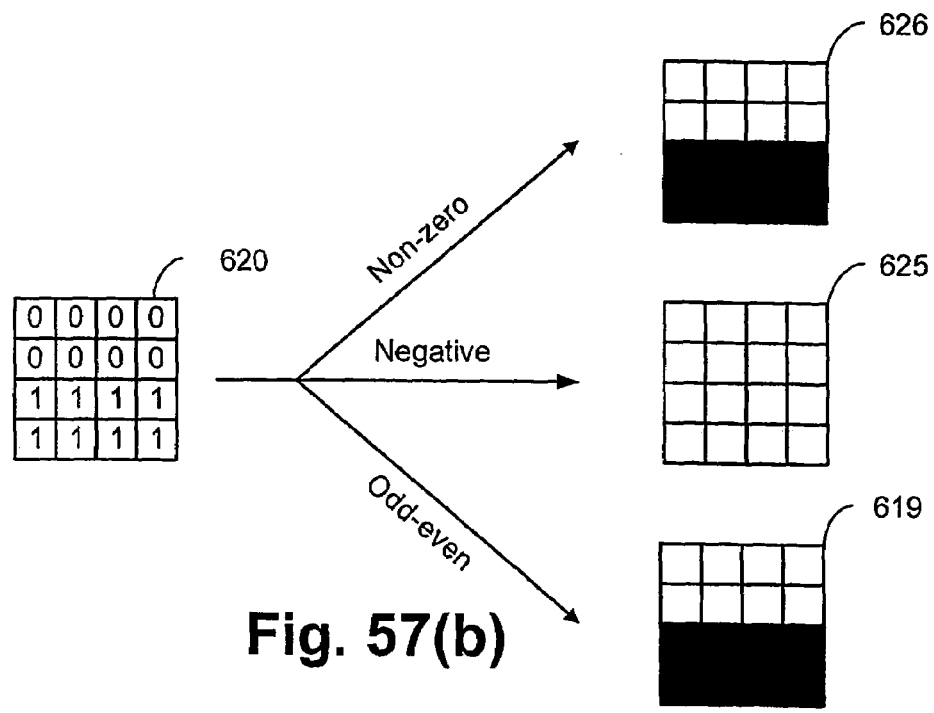

The Compositing Module 612 takes A-buffers associated with each interesting z-level as input. Therefore the Z-level Activation Module 613 converts the S-buffer associated with each interesting Z-level into an A-buffer before passing run data to the Compositing Module 612. In doing so, the Z-level Activation Module 613 utilizes a winding rule. The three winding rules mentioned above are illustrated in FIG. 57(a) and FIG. 57(b) where S-buffers 624 and 620 are converted to A-buffers 621, 622, 623 and 626, 625, 619 by each winding rule, respectively:

Odd-even: the fill contributes to the sub-pixel when winding counts are odd, as shown in the A-buffers 623 and 619;

Non-zero: the fill contributes to the sub-pixel when winding counts are other than zero, as shown in the A-buffers 621 and 626; and Negative winding: the fill contributes to the sub-pixel when winding counts are negative, as shown in the A-buffers 622 and 625.

Figure 43A:
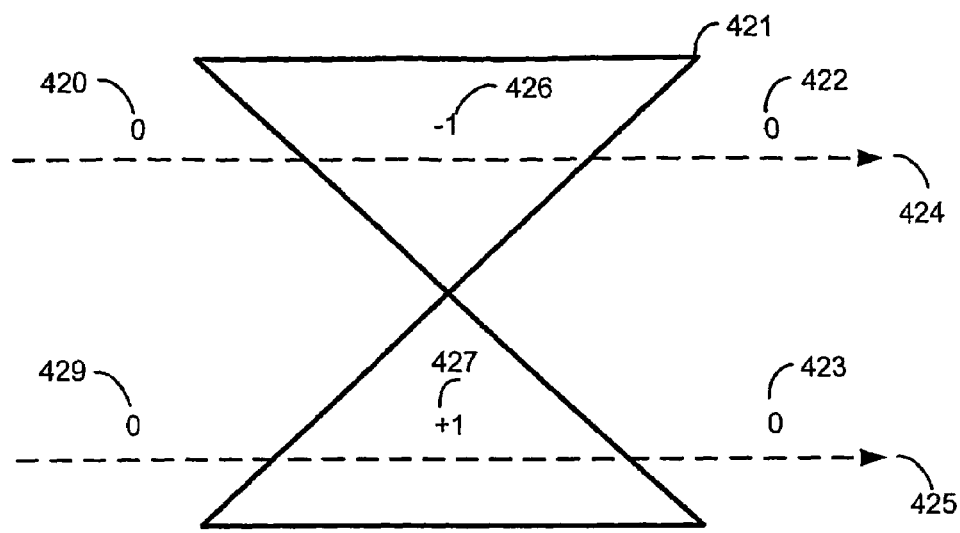
FIGS. 43(a) and 43(b) illustrate different fill results arising from the non-zero winding, negative winding and odd-even fill rules.
Figure 43B:
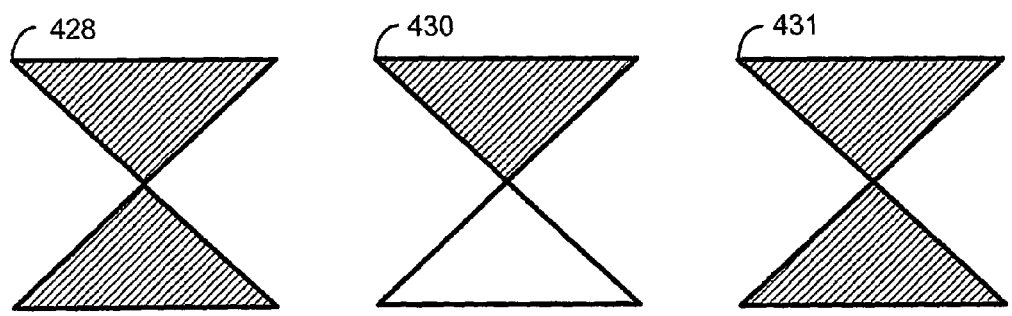

The results of these winding rules over a whole shape 421 are illustrated in FIG. 43(a). In FIG. 43(a) a number of winding counts 420, 426 and 422 over the scan line 424 are shown. Similarly, winding counts 429, 427 and 423 exist over a scan line 425. In FIG. 43(b) the results of applying Non-zero winding 428, Negative winding 430 and Odd-even 431 rules, given that the edges of the shape define the hatched fill, seen in the representations of FIG. 43(b), within the bounds of the shape.

Figures 36A, 36B:
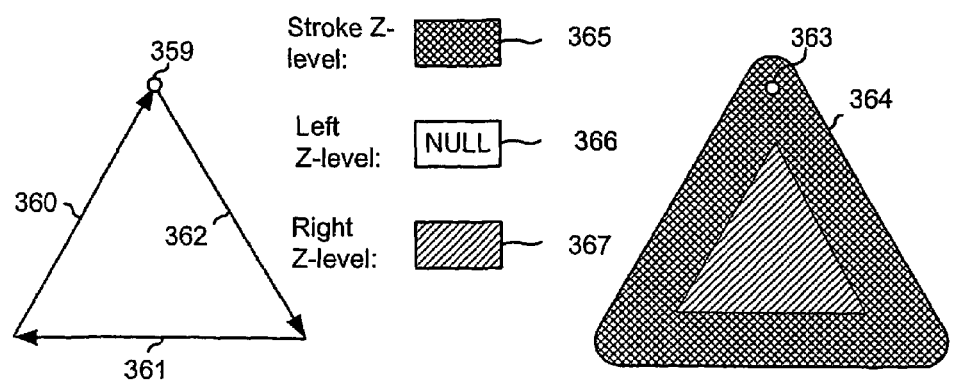
FIGS. 36(a) to 36(c) show an example of a stroked path.
Figure 36C:
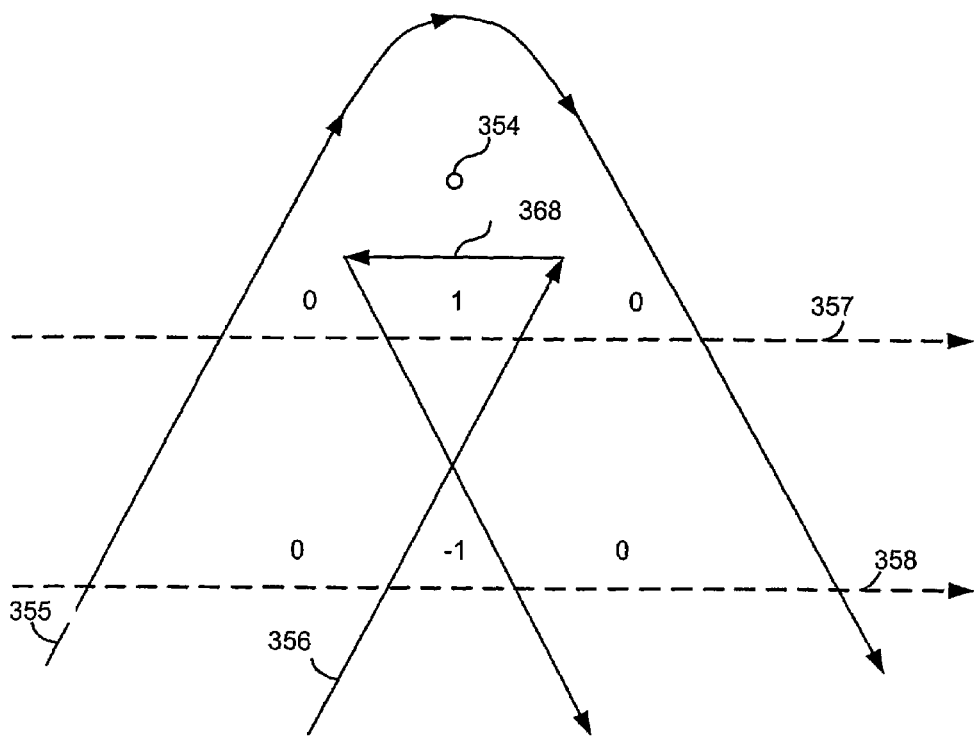

The negative winding rule is particularly useful for producing and rendering stroked edges using a minimal amount of calculation. The process of stroking a path has been described herein as part of the Transform, Morph and Stroking Module 616 (see Section 3.4). An example of part of a stroked path is shown in FIGS. 36(a) to 36(c). FIG. 36(a) shows an ordered set of three edges 362, 361 and 360 that are to be stroked and which form a clockwise triangular path from an origin 359. The ordered set of edges to be stroked are provided along with a 'null' left z-level 366, a right z-level 367 and a stroke z-level (i.e., a pen color) 365. An example of the desired output for the shape represented by the ordered set of three edges and associated z-levels is given in FIG. 36(b). To achieve edges that describe the desired output shown in FIG. 36(b), the Transform Morph and Stroking Module 616 will have produced left-hand stroke edges 355 and right-hand stroked edges 356, drawn in FIG. 36(c), which shows a large scale representation of the top-most join at the origin 354. In the case where the stroke z-level 365 does not have transparency, then the stroking process will have assigned:

- the null left z-level 366 to the left z-level reference of all left-hand stroke edges 355;
- the stroke z-level 365 to the right z-level reference of all left-hand stroke edges 355;
- the stroke z-level 365 to the left z-level reference of all right-hand stroke edges 356; and
- the right z-level 367 to the right z-level reference of all right-hand stroke edges 356.

FIG. 36(c) depicts two scan lines 357 and 358. Above each of the two scan lines are numbers representing the winding count of the right z-level reference 367 of the original set of edges at different points along the scan line. If either odd-even or non-zero winding rules are used, then as can be seen in FIG. 36(c), an undesired triangular area 368 formed by self-intersecting edges is enclosed by the right-hand stroke edges would be rendered with the z-level 367 active since the winding count in this region is '1'. By using the negative winding rule, a winding count of '1' is considered inactive and therefore the join will be rendered correctly.

6.8. Processing Runs, Continued

Returning to the discussion of FIG. 40—Processing Runs, using the A-buffers and the ordered set of interesting fills, the Compositing Module 612 in step 399 calculates an antialiased color for the single pixel.

The list of interesting z-levels is also used to generate color for subsequent pixels along the scan line up to the X ordinate of the next crossing message. However, the array of winding counts (the S-buffer) for each z-level must first be modified to indicate the correct coverage of each z-level for the subsequent pixels, since it may not be the same as for pixel Current_X. For these subsequent pixels, the coverage of each z-level does not change until the X ordinate of the next crossing message.

Figure 8:
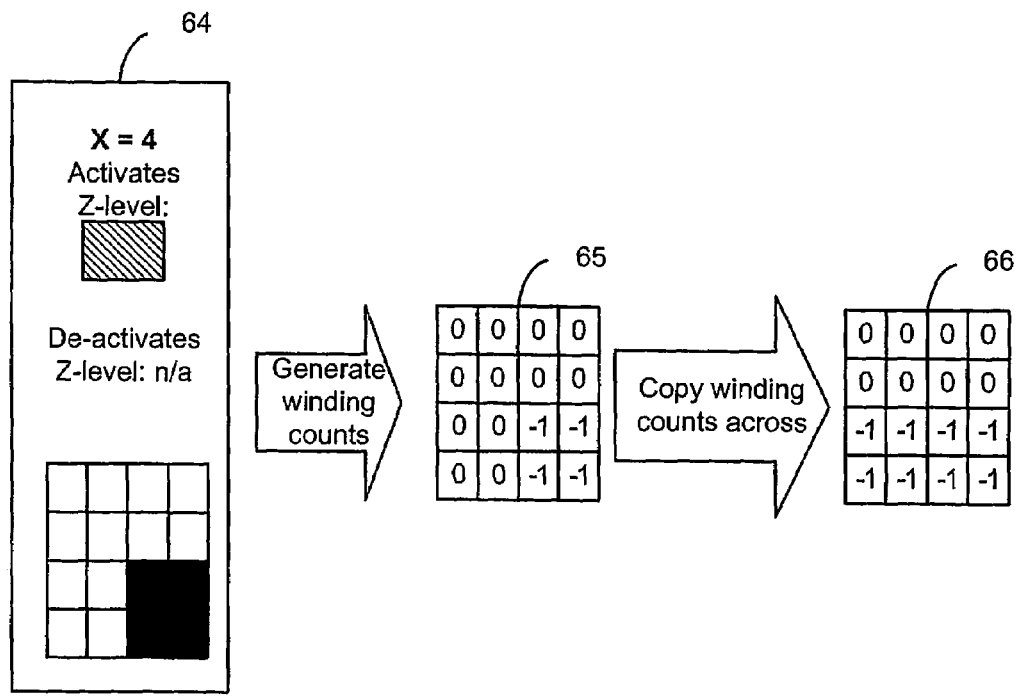
FIG. 8 depicts the coping of winding counts for sub-pixel values in the example of FIG. 2.

Referring again to the example FIG. 2, the left edge of the rectangle 14 caused the Edge Processing Module 614 to generate the crossing message 23 (X=4). The A-buffer indicates that for the pixel X=4, the z-level used to fill the rectangle is active for the four sub-pixels in the bottom-right corner of the output pixel. However, to correctly render the rectangle, this z-level should also remain active for the lower two sub-scan lines on all subsequent pixels along the scan line until the right hand edge at X=15, where the z-level is deactivated. A correct S-buffer representing the contribution of the z-level to display pixels X=5 up to but not including X=15 can be generated by copying the right-most sub-pixel value to all other sub-pixel values on the same row, as shown in FIG. 8. FIG. 8 shows an S-buffer 65 corresponding to the crossing message 64 for the pixel X=4 in FIG. 2. An S-buffer 66 represents the result of copying across the right-most winding counts to all other winding counts for each row. This result correctly represents the winding counts for the z-level used for rendering the rectangle for pixels X=5 up to X=14 inclusive.

Referring back to FIG. 40, step 400 operates to copy across the right-most winding counts for all z-levels in the ordered set of interesting z-levels, and Current_X is incremented. The Compositing Module 612 can now be invoked for the remaining pixels in the run, according to step 401. If no crossing messages remain for the current scan line, the Compositing Module 612 is requested to generate pixels from Current_X to the end of the current scan line.

Note that the color generated for these pixels may still vary across the run, such as in the case where one or more of the active z-levels is a blend or bitmap. It is only the coverage information and the z-levels involved that remain constant over the run. The details of pixel color generation based on the contents of the list of interesting z-levels are in the description of the Compositing Module 612 (see Section 7). The last step 402 of FIG. 40 is to modify Current_X to be that of the X ordinate of the next available crossing if there is one available.

The procedure for generating an A-buffer from the S-buffer of each of the z-levels in the ordered set of interesting z-levels is the same as that for compositing single pixels and has been described in section Converting S-buffers to A-buffers; Winding Rules, above.

Finally, to return to FIG. 58, edge crossing messages are processed for the current scan line until none remain, this being determined at step 627. The operation of FIG. 58 repeats for all scan lines to be rendered.

7. Compositing Module

The compositing module 612 takes as its input each of the following:

- the ordered set of z-levels and their respective A-buffers as produced by the Z-level Activation module 613,
- coordinates in the output display space defining the length of the run of output pixels to be produced, and produces as its output:

- a run of pixels suitable for presentation on the output display device.

The ordered set of input z-levels is sorted in depth order. The concept of z-level depths has been previously described. In the following discussion, the terms top and bottom are used. Given two z-levels, A and B, if the final output portrays z-level A as obscuring z-level B, then z-level A is considered to be on top of, or above z-level B. Conversely, z-level B is considered to be below or beneath z-level A. In addition, the topmost z-level is the one that is considered to be conceptually 'on top' of all the others, in that it may obscure all of the others, and in turn be obscured by none of the others. Conversely, the bottom-most z-level is the one that can obscure no other z-levels, but can be obscured by all other z-levels. In addition, there is always present a background z-level, which is considered to be below the bottom-most z-level in the input set. The background z-level is not included in the ordered set of input z-levels, and any discussion of z-levels that are part of the input set does not include the background z-level. If the background z-level is required, it will be explicitly referred to as such.

7.1. Intermediates

During the compositing process, access to an intermediate composite buffer is required. This buffer may be large enough to hold any intermediate compositing results for a run of maximal size—i.e. the width of the output device. One skilled in the art will see that the composite buffer can be of any size, and may thus require repeated applications of the described processes.

The compositing module 612 also makes use of a work buffer, which is large enough to store any intermediate compositing results for a single pixel. These buffers may be formed within an ASIC, for hardware implementation, or alternatively in general memory for software implementations, and typically have red, green, blue and alpha (transparency) components.

7.2. Z-level Fills

Each z-level contains a reference to a fill, which may be one of the following types.

A solid fill is one where the color values and the alpha values remain constant over the length of the run. Examples of solid fills are an opaque red fill, or a blue fill with a 50% alpha.

An x-dependent fill is one where the color values are not necessarily constant over the run of pixels. In this definition, an x-dependent fill has a constant alpha value over the run. Examples of an x-dependent fill include a linear or radial blend with the same alpha at all blend control points, or a bitmap texture fill (with a constant alpha).

A variable alpha fill is one where the alpha can vary over the run. Examples of a variable alpha fill include a linear or radial blend where alpha is not the same at each blend control point, or a bitmap texture fill with a non-constant alpha.

7.3. Basic Flow

Figure 13:
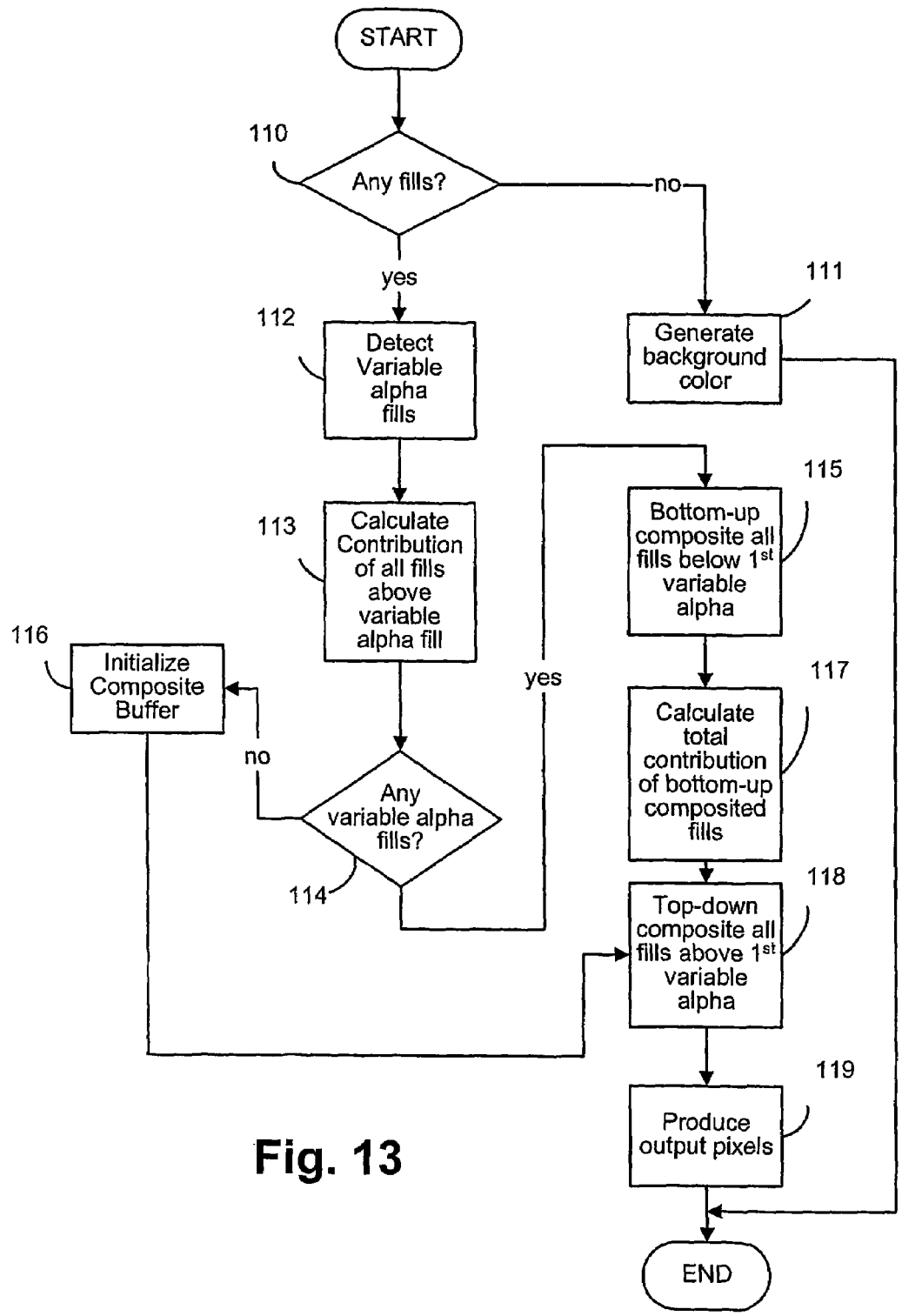
FIG. 13 is a high-level flowchart of a compositing approach used herein.

The basic flow of the compositing algorithm is shown in FIG. 13. This is a high-level overview, and a more detailed description for some steps will be provided later.

The first step 110 is to test to see if the input set is empty. If the set is empty, this means that there are no fills present, and it is the background fill that should be drawn, this being generated at step 111. The compositing process is then finished.

If the input set is non-empty, then the next step 112 is to determine whether the input ordered set of z-levels contains any fills that are classified as variable alpha. In the compositing algorithm, it is the topmost variable alpha fill that is of interest. This check is performed by iterating through the ordered set of input z-levels one by one, testing for a variable alpha fill. The preferred order is to iterate through the ordered set such that the first element checked is the topmost fill. The check terminates when the first variable alpha fill has been found, or the entire set has been checked and no variable alpha fill was found.

The next step 113 performs a contribution calculation on all fills that are above the topmost variable alpha fill that was discovered in step 112. If no variable alpha fills are present, then this contribution calculation is performed on all of the fills present in the input ordered set.

A decision 114 is the next step. If variable alpha fills were discovered in step 112, then execution moves to step 115. Otherwise, execution moves to 116.

In the case that there are no variable alpha fills present, step 116 initializes the composite buffer as being empty.

Step 115 performs a bottom-up composite of all fills below and including the topmost variable alpha fill. Next, in step 117, the total contribution of all the fills bottom-up composited in step 115 is calculated.

The step 118 uses a top-down composite to composite all fills above the topmost variable alpha fill.

The final step 119 produces the output pixels as suitable for presentation on the output display device.

7.4. Graphical Overview

Figure 10:
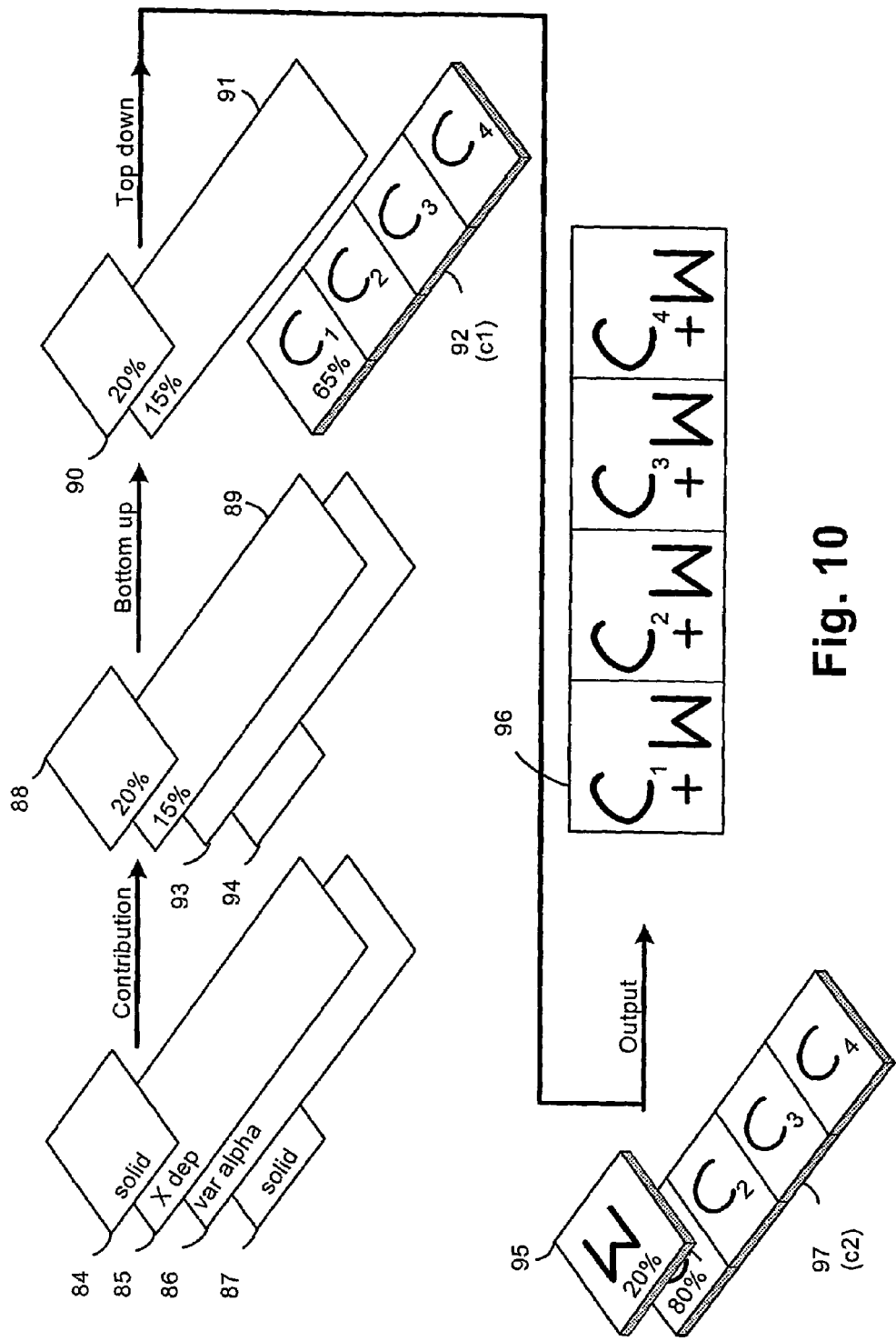

The stages of the processing are illustrated graphically in FIGS. 9(a) and 9(b) and FIG. 10. These figures demonstrate different compositing scenarios.

FIG. 9(a) shows a simple example. An ordered set of input fills 70, 71, 72 is shown. Each of these fills is solid. The contribution calculation is performed, and respective example contributions are shown at 67, 68 and 69. There are no variable alpha fills present, so the next process is the top-down compositing. The results are stored in the work buffer 73, which is then replicated the necessary number of times to generate the required output pixel run 74. In this example, a run of four pixels is produced.

The second scenario FIG. 9(b) involves an x-dependent fill. Fills 75 and 77 are both solid, while fill 76 is x-dependent. The contribution calculation is performed, and the results are shown by 80, 81 and 82. Since there are no variable alpha fills present, the next process performed is the top-down composite. The pixels for the x-dependent fill 76 are generated and composited into the composite buffer 79, while the color for the solid fills 75 and 77 is generated and composited into the work buffer 78. The contributions of both the work buffer and the composite buffer are shown. The final step is to produce the output pixels by compositing the single pixel of the work buffer into each pixel of the composite buffer, generating the output pixels 83.

The final example of FIG. 10, is more complex, and includes a variable alpha fill. Fill 84 is a solid fill, fill 85 is an x-dependent fill, fill 86 is a variable alpha fill, and fill 87 is a solid fill. After the contribution calculation, fills 84 and 85 have contribution values associated with them (as shown by 88 and 89 respectively), and everything below and including the variable alpha fill 86 does not. The next process to be executed is the bottom up compositing. Fills 86 and 87 are bottom-up composited, and the results stored in the composite buffer 92 (c1). After the bottom up composite, it is possible to work out the contribution of the results stored in the composite buffer, by simply subtracting the contributions of fills 88 and 89 from 100%. The next step is the top-down composite. The topmost fill 84 is solid, and so is composited into the work buffer 95. Fill 85 is x-dependent, and so is composited into the composite buffer 97 (c2). After the top-down composite step, it can be seen that the work buffer 95 contains the compositing results for a single fill 84, and the composite buffer 97 (c2) contains the compositing results for fills 85, 86 and 87. The final stage is to generate the output pixels. The single pixel of the work buffer is composited into each pixel of the composite buffer to generate the output pixels 96.

7.5. Contribution Calculation

Figure 11:
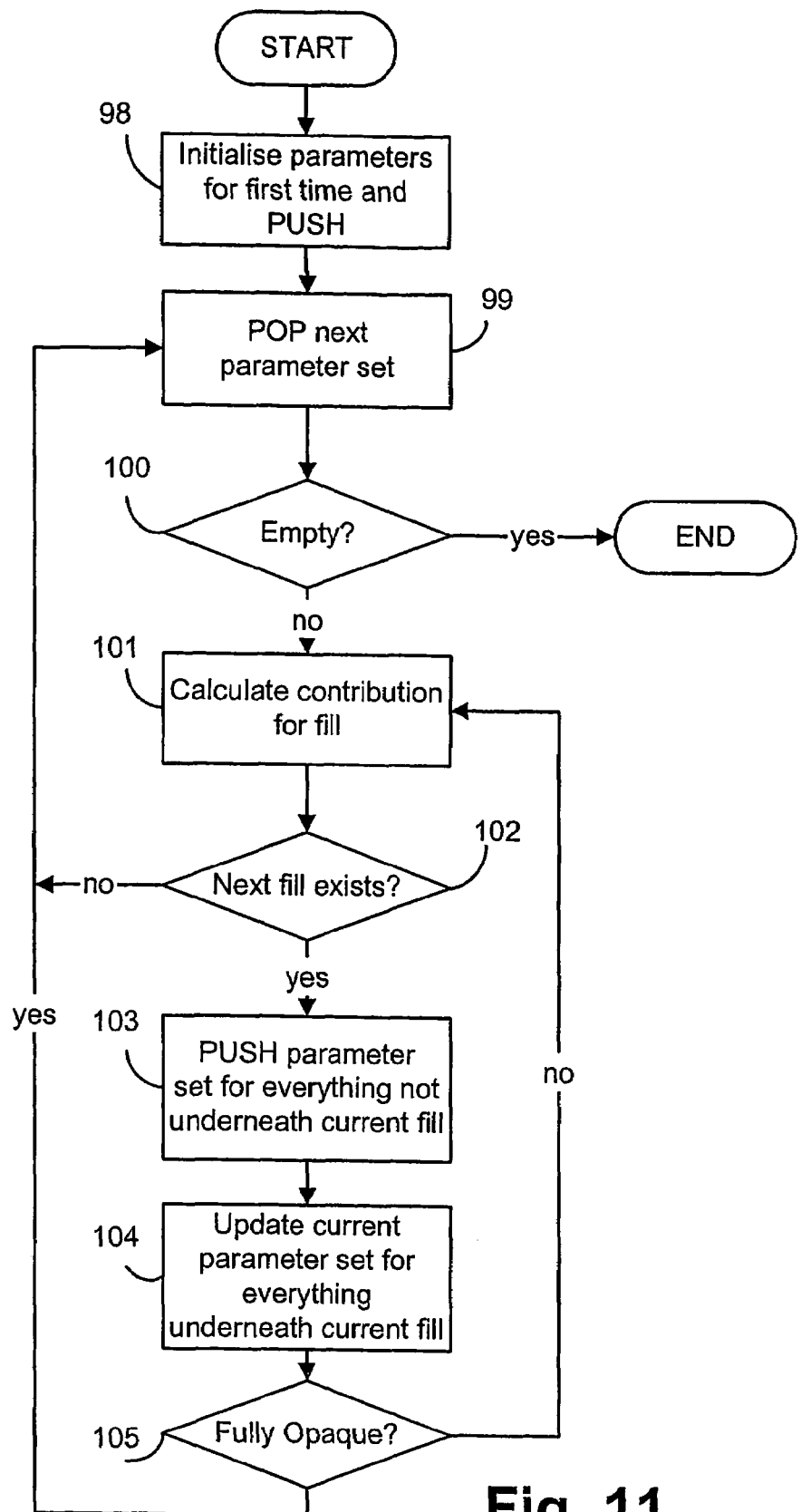
FIG. 11 is a flowchart of step 113 of FIG. 13.
Figure 12A:
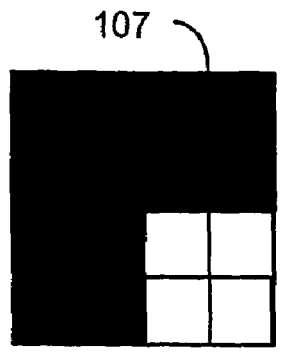
FIGS. 12(a) to 12(d) provide a graphical indication of coverage and A-buffer operations.
Figure 12B:
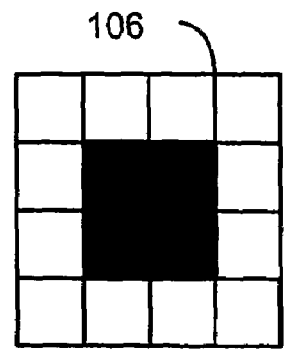
Figure 12C:
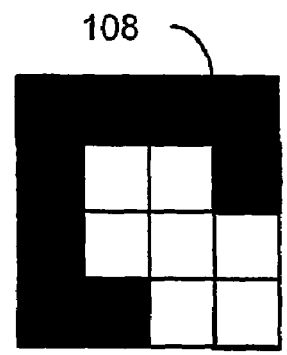
Figure 12D:
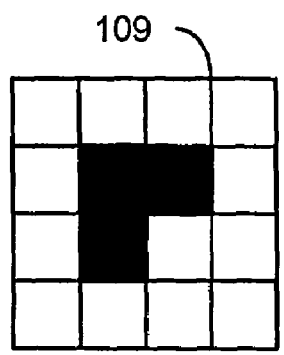

The step 113 of FIG. 13 is examined in more detail with reference to FIG. 11. Recall that this process is performed on all fills in the ordered set of input z-levels that are above the topmost variable alpha fill as found in step 112. If no variable alpha fill exists in the input set, then this process is performed on all fills in the input set. If the topmost variable alpha fill is also the topmost fill in the input set, then the contribution calculation does not need to be performed.

The contribution calculation introduces a new variable for each fill that is to be subject to this process. This is the contribution_value of a fill. This is always initialized to represent a contribution of zero. For example, it is possible to use an 8-bit integer to store the contribution, with 0 representing zero contribution, and 255 representing 100% contribution. The purpose of the contribution calculation is to determine how much each fill contributes to the output pixels.

Two variables, accumulated_opacity and coverage are introduced here. Coverage is a description of which spel elements of the A-buffer associated with the fill being processed are currently under consideration. It is convenient to express coverage as an A-buffer. Accumulated_opacity is a measurement of the extent that the spels under consideration are obscured by fills above the current fill. In the following discussion, an accumulated_opacity of zero percent refers to full transparency, and an accumulated_opacity of one hundred percent refers to full opacity. These two variables, along with an indication of the current_fill being processed, form a set of parameters that describe the state of the contribution calculation algorithm. The concept of a stack, as known in the art, is used to store sets of these three parameters that can be read in by the contribution calculation algorithm and acted upon. In the following discussion, the term push means to add a set of parameters to the top of the stack, and pop means that the set of parameters on top of the stack is removed. The stack will be referred to as the Parameter Stack.

Figure 48:
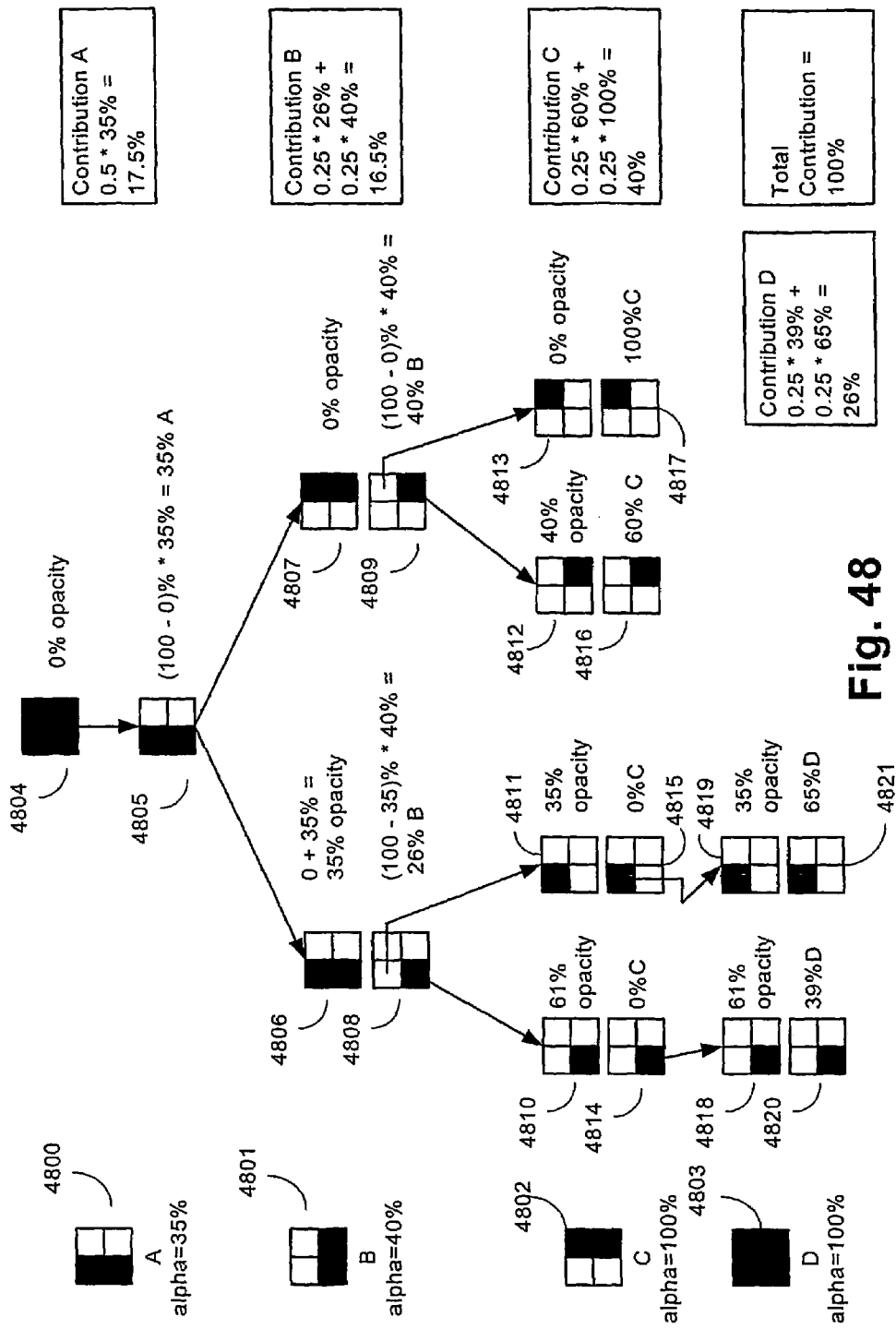
FIG. 48 illustrates the contribution of opacity at sub-pixel levels.

FIG. 48 shows the effect of accumulated_opacity in an A-buffer when rendering, from top to bottom in order. Portions of objects A 4800, B 4801, C 4802 and D 4803 each have an opacity value applicable to certain spels in the corresponding A-buffer. It is noted that an opacity of 100% means that the object is fully opaque. The objects are being rendered over a background object 4804 having 0% opacity (ie. 100% transparent). In FIG. 48, the black shading indicates coverage by the object over the relevant subpixel of the A-buffer. Initially, applying the object A 4800 to the background 4804 reveals a result 4805. Since only two spels of A are 35% opaque, the contribution of object A 4800 is only 17.5% to the resultant pixel value. Note that 0% opacity gives 0% contribution. The accumulated opacity resolves as illustrated to a tree where the number of branches is limited to the number of subpixels in the mask, in this case four. Two results 4806 and 4807 of the application of object A 4800 to the background 4804 are shown. Next when object B 4801 is applied, such only operates on the lower two spels of the A-buffer. As the lower left spel 4808 intersects with that of object A, the two contributions will accumulate, whereas for the lower right spel 4809, object A 4800 had no contribution so the result at this stage for that spel will be limited to that of object B 4801. The net contributions of object B are determined to be 16.5% from the calculations shown. Accordingly, after applying object B, the spels have respective opacity levels of 61% at 4810, 35% at 4811, 40% at 4812 and 0% at 4813. Object C 4802 has opacity=100% and impacts on the right two spels giving results 4814, 4815, 4816 and 4817 thereby indicating a contribution of 40% to the pixel. Since object C is fully opaque, it is not necessary to consider any lower objects (object D) where such may intersect with object C. Hence, for the right spels, the tree branches stop at object C. Object D 4803 has 100% opacity and as seen at 4818, 4819, 4820 and 4821 provides a 26% contribution to the pixel. It is seen from FIG. 48 that the accumulated contributions determined from the opacity values for the active graphic objects sum to 100%.

For the A-buffer of FIG. 48, the resulting contributions may be expressed as follows:

| | |
|---|---|
| A = 35% | A = 0% |
| B = 0% | B = 0% |
| C = 0% | C = 100% |
| D = 65% | D = 0% |
| A = 35% | A = 0% |
| B = 26% | B = 40% |
| C = 0% | C = 60% |
| D = 39% | D = 0% |

From FIG. 48 it is apparent that a tree is traversed in which the number of levels is determined by the size of the sub-pixel mask (A-buffer). Further as seen with respect to the object C 4802, traversal of any branch of the tree can be halted as soon as 100% opacity is reached, as no further contribution may be made to that sub-pixel.

Returning now to the actual processing, the first step 98 of the process of FIG. 11 is to initialize the parameters. Current_fill is initialized to be the topmost fill in the input set. Accumulated_opacity is initialized to zero percent, and coverage is initialized to represent total coverage of the A-buffer. This initial set of parameters is pushed onto the Parameter Stack. In addition, all the contribution_values of all the fills that are to be processed are initialized to zero.

An initial step 99 of a main process loop pops the next set of parameters from the Parameter Stack. This is checked for an empty result in step 100. If it is the case that no more parameter sets exist on the stack, then the contribution calculation ends. If a parameter set was successfully popped from the stack, the next step 101 is to calculate the contribution of the current_fill given the current accumulated_opacity and coverage, and add this to total contribution_value of the current_fill. The calculation is performed according to the following equation:

$$\text{current\_contrib} = \text{current\_alpha} * (1 - \text{accumulated\_opacity}) * \text{coverage\_ratio}$$

where current_alpha=the alpha value of current_fill accumulated_opacity=the accumulated_opacity as given in the current parameter set coverage_ratio=active_ratio(coverage∩A-buffer)

A-buffer=the A-buffer associated with the current_fill, and

Active_ratio(A-buffer)=ratio of the number of active spels in the given A-buffer, over the total number of spels in the given A-buffer.

Note that all elements of the main equation are intended as values expressed as a real number with a range [0 . . . 1]. This is for simplicity of expression of this equation, and it will be clear to one skilled in the art how to manipulate the equation in order to accommodate other means of expression of these elements. In the case of current_coverage ratio, the [0 . . . 1] range represents the ratio of the number of 'active' spels in the intersection of the coverage A-buffer with the current_fill's A-buffer versus the total number of spels in an A-buffer.

This calculated current_contrib value is then added to the contribution_value of the current_fill.

The next step 102 of the process of FIG. 11 checks to see if there is a next fill to process. If the current_fill is either the last fill in the input set, or if the next fill is a variable alpha fill, this check will have a negative result. Execution of the process then returns to step 99. If the check result is positive, then the current_fill is updated to identify this next fill.

In the next step 103, a set of parameters is pushed onto the Parameter Stack. These parameters are:

current_fill ← current_fill accumulated_opacity ← accumulated_opacity coverage ← coverage ∩ $\overline{(\text{coverage} \cap \text{A-buffer})}$ The next step 104 updates the current parameter set as per:

current_fill ← current_fill accumulated_opacity ← (1−current_alpha)*(1−accumulated_opacity)

coverage ← coverage ∩ A-buffer

Note that accumulated_opacity and current_alpha are intended as values expressed as a real number with a range [0 . . . 1].

A graphical indication of the operations applied to coverage can be seen in FIGS. 12(a) to 12(d). An A-buffer 107 provides an example representing coverage. A second example A-buffer 106 represents the A-buffer of a fill. When the operation to generate a new coverage A-buffer as given in step 103 is applied, the result is the A-buffer 108. When the operation to generate a new coverage A-buffer given in step 104 is applied, the result is the A-buffer 109.

Once this update has happened, accumulated_opacity is tested to see if a sufficient degree of opaqueness has been achieved. An example threshold is 255/256 of full opaqueness. If sufficient opaqueness has been reached, then execution of the process moves back to step 99. Otherwise, execution of the process continues from step 101.

7.6. Bottom Up Composite

Referring back to FIG. 13, if variable alpha fills have been detected in the input set in step 114, then the bottom up compositing step 115 will be performed.

The bottom up compositing process composites fills in order from the bottom-most up to and including the topmost variable alpha fill. When the following discussion mentions a 'next' fill, this refers to the fill immediately above the current_fill.

Figure 6:
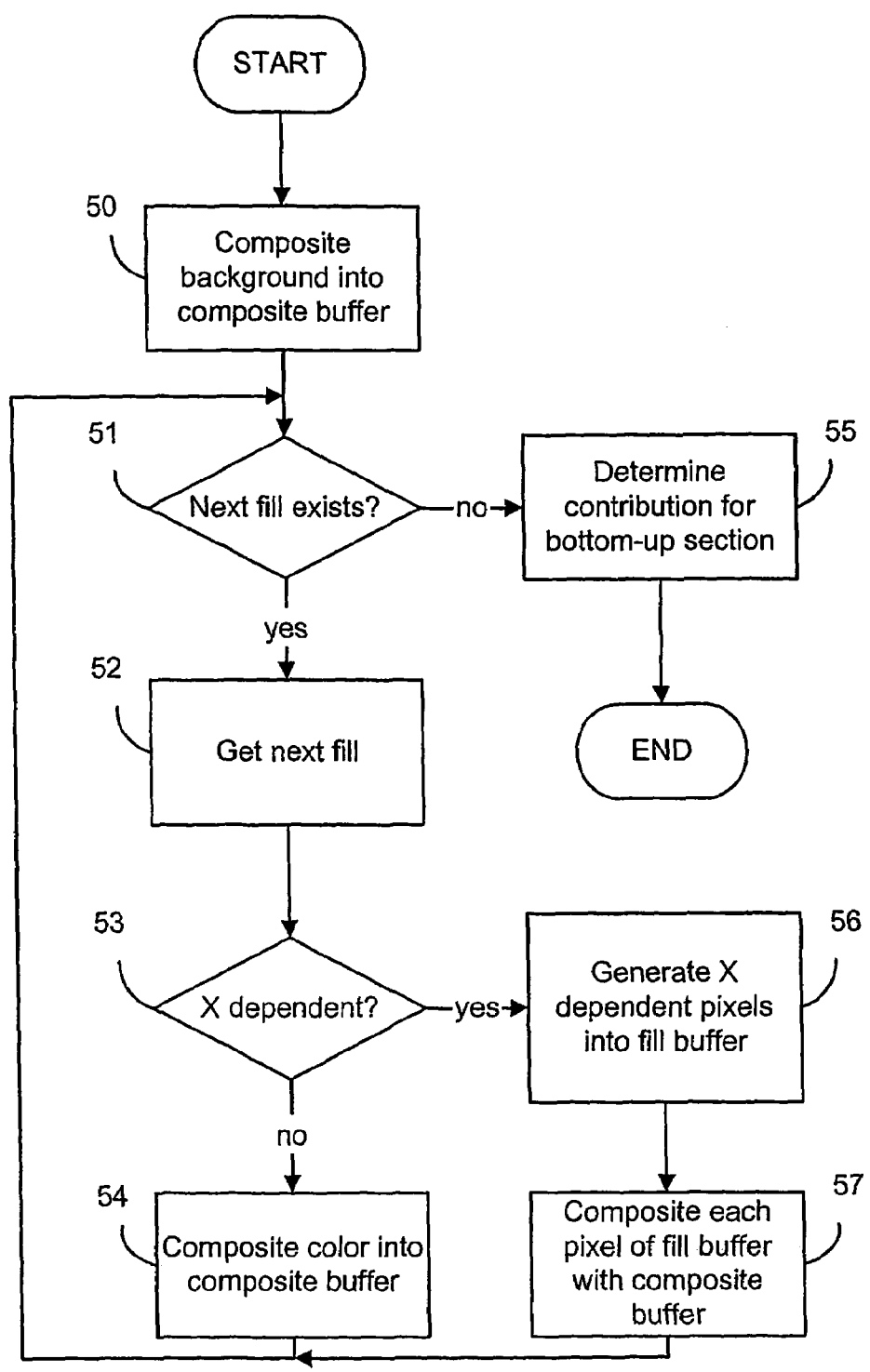
FIG. 6 is a flowchart of a bottom-up compositing process.

The bottom up composite process requires access to a fill generation buffer. This buffer must be able to store at least as many pixels as the composite buffer. For example, this buffer may be realized by utilizing half of the composite buffer. This halves the size of the composite buffer, and in the case of an output run that is longer than half the original length of the composite buffer, a second application of the compositing module 612 will be required Referring to FIG. 6, the bottom up compositing process is depicted in which a first step 50 is to composite the background fill into the composite buffer. Because this is guaranteed to be the first fill composited into the composite buffer, no special calculation is required. The fill color is just copied in. For the purposes of the first execution of the next step, the current_fill is considered to be the background fill.

The next step 51, is a test to see if there is a next fill that requires bottom up compositing. If the current_fill is the topmost variable alpha fill, then there are no further fills to bottom-up composite, and the bottom up composite process moves to the penultimate step 55.

The determining of the contribution of the bottom up composite result at step 55 is performed according to the following algorithm:

total_contrib=0 for each fill above topmost variable alpha fill total_contrib=total_contrib+fill[$n$].contrib bottom_up_contrib=1−total_contrib where
fill[n].contrib=contribution value of the n'th fill above the topmost variable alpha fill, as calculated in step 113 of the flowchart FIG. 13.

Once the contribution value for the bottom up composite result has been calculated, it is multiplied into the composite buffer, according to the following algorithm:

for each pixel in composite buffer $$cb[n]=cb[n]*bottom\_up\_contrib$$

where cb[n]=n'th pixel of composite buffer.

The above expression of a scalar value (bottom_up_contrib) multiplied by a color value (cb[n]) refers to a multiplication by the scalar of all the components of the color.

If step 51 determines that there are further fills to be bottom up composited, then the current_fill is set to be the next fill via step 52. The current_fill is then tested to see if it is an x-dependent fill in step 53. If the fill is not x-dependent, then the fill color is generated into the work buffer according to step 54. The contents of the work buffer are then repeatedly composited into the composite buffer using the following algorithm:

for each pixel in composite_buffer $$cb[n]=cb[n]+work\_alpha*(cb[n]-work)$$

where
cb[n]=n'th pixel of composite buffer,
work_alpha=the alpha of the pixel in the work buffer,
work=the pixel in the work buffer Execution of the bottom up composite then returns to step 51.

If the fill is x-dependent, then all pixels for the run are generated in step 56 into the fill generation buffer. The fill generation buffer is then composited into the composite buffer in step 57 using the following algorithm:

for each pixel in composite and fill buffers $$cb[n]=cb[n]+fb[n].alpha*(cb[n]-fb[n]) \qquad \text{Eqn. 1}$$

where
cb[n]=n'th pixel of composite buffer
fb[n]=n'th pixel of fill buffer
fb[n].alpha=the alpha of the n'th pixel in the fill buffer.

Execution of the bottom up composite then continues to 51.

7.7. Top Down Composite

The top-down compositing process, shown at step 118 in FIG. 13, is now described in detail with reference to FIG. 55. It is applied to all the fills above the topmost variable alpha fill as determined in step 112. If no variable alpha fills are present in the input set, then the top down alpha process is applied to every fill in the input set.

The top down process utilizes the contribution_values for the fills as calculated in step 113. It should be noted that in the top down compositing process, the order in which the fills are processed is unimportant in terms of the final result. In the example below, the fills are processed in the same order as they appear in the input set, beginning with the topmost fill in the set.

Figure 55:
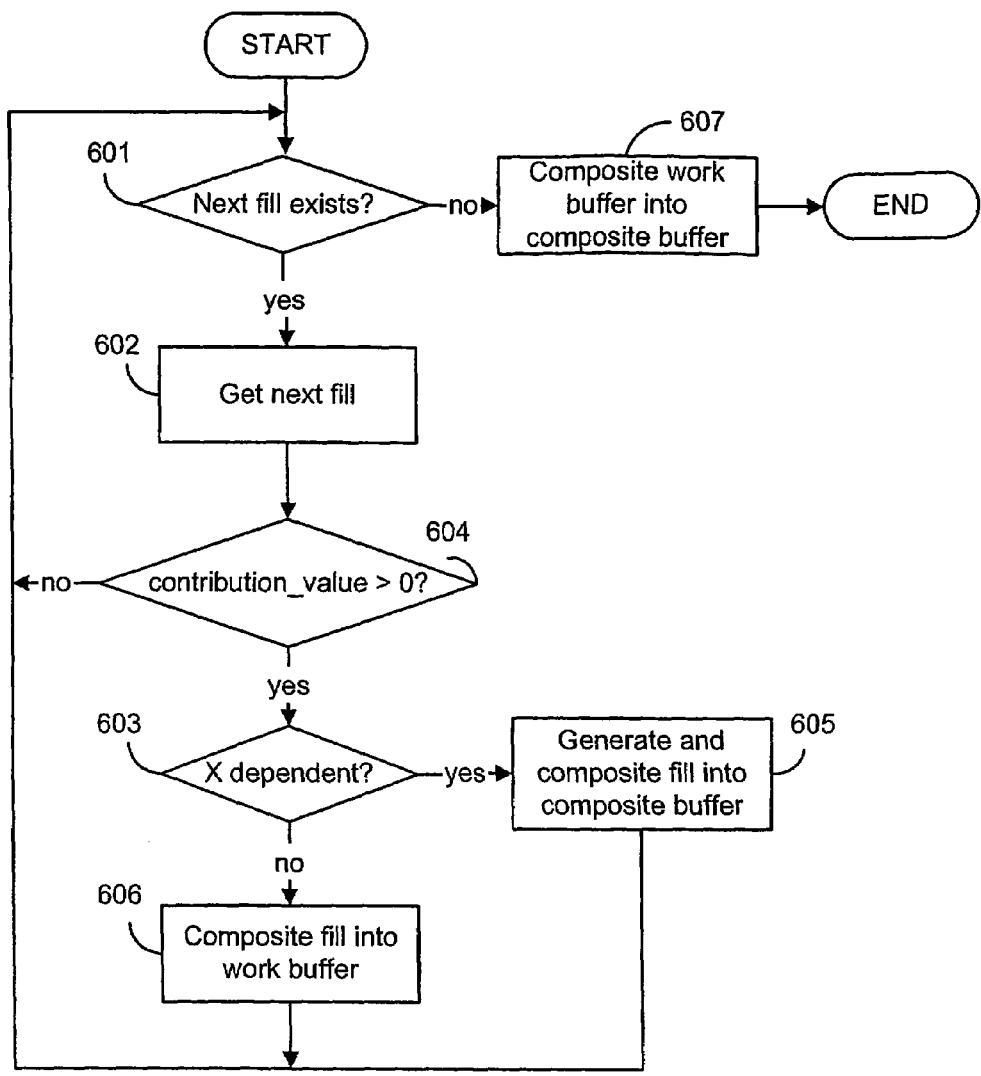
FIG. 55 is a flowchart of a top-down compositing process.

As seen in FIG. 55, the first step 601 of the top down compositing process is to determine whether there are further fills to be processed. If there is no next fill to process, or the next fill is the topmost variable alpha fill as determined in step 112, then the process moves to step 607.

If there are further fills to be processed, the current fill is stored in a variable current_fill in step 602. The next step 604 is to check the contribution_value of the current_fill to see if it is greater than zero. If this test returns false, execution moves to step 601.

If the contribution_value is greater than zero, execution moves to step 603. Step 603 tests the current_fill as to whether it describes an x-dependent fill. If the fill is not x-dependent, execution moves to step 606. Otherwise, if step 603 returns a positive result, execution moves to step 605.

A non x-dependent fill is handled in step 606, proceeding as follows. The color for the fill is generated, and composited into the work buffer, according to the following algorithm:

$$wb=wb+current\_fill.contrib*current\_fill.color \qquad \text{Eqn. 2}$$

where
wb=work buffer,
current_fill.contrib=contribution_value of current_fill,
current_fill.color=color value of current_fill.

An x-dependent fill is handled in step 605, proceeding as follows. As each pixel of the x-dependent fill is generated, it is immediately composited into the composite buffer, according to the following algorithm:

$$cb[n]=cb[n]+current\_fill.contrib*gp$$

where
cb[n]=n'th pixel of composite buffer,
Current_fill.contrib=contribution_value of current_fill, and
gp=generated fill pixel currently under consideration.

After either step 605 or step 606 has completed, execution moves back to step 601.

If step 601 determines that there are no more fills left to process, execution moves to step 607. In this step, the work buffer is composited into the composite buffer, to produce the final result. This step is performed according to the following algorithm:

for each pixel in composite_buffer $$cb[n]=cb[n]+wb$$

where
cb[n]=n'th pixel of composite_buffer,
wb=work buffer.

The top down composite is now complete, and the composite_buffer contains the fully composited pixels of the output run.

7.8. Alternative Compositing Approaches

An alternative approach of the compositing process is described below. This alternative eliminates the need to do potentially large bottom up composites when a variable alpha layer is encountered; instead using the top-down compositing process wherever possible, thus maximizing the benefits that top-down compositing provides.

The contribution calculation process, as described above, stops when it encounters a topmost variable alpha layer. The alternative compositing method checks to see if there is a layer existing below this topmost variable alpha layer. If so, then the compositor is invoked recursively, with this layer below the topmost variable alpha layer being the topmost layer in the new invocation. This new invocation, and any subsequent invocations, process the layers as normal, and when they reach full opacity, pixels are generated into the work and composite buffers as normal. When any recursive invocation returns to the parent, the result in the composite buffer is then composited with the variable alpha layer discovered in the parent. The contribution of the results in the work buffer and composite buffer are then calculated as in step 55 of FIG. 6, and the pixel values in both these buffers are adjusted accordingly.

One generalization of these compositing approaches is as follows, for a run of pixels:

(i) divide the layers into groups, with each group being separated by a variable-alpha layer;
(ii) perform a top-down composite for each group to determine a group pixel value, thereby resolving the original layers into a reduced number comprising group pixel values separated by the variable alpha layers;
(iii) where the contribution of any one group is within a predetermined threshold of 100% (ie. fully opaque), all variable alpha layers and groups beneath that threshold group can be ignored as non-contributing; and
(iv) for each pixel in the run, perform a bottom-up composite of those contributing groups and variable alpha layers to determine the corresponding pixel value.

A further implementation of the compositing processes can be accomplished using two buffers in the following fashion:

(i) commencing with the topmost layer and using a first buffer, perform a top-down composite down to and including the first variable alpha layer;
(ii) using a second buffer, perform a top-down composite of those layers down to and including the next variable alpha layer;
(iii) composite the first buffer over the second buffer and retain the result in the first buffer; and
(iv) repeat steps (ii) and (iii) until all layers have been composited. As before, where the contribution of any one group of layers above a variable alpha layer reaches is within a predetermined threshold of 100% (ie. almost or fully opaque), all variable alpha layers and groups beneath that threshold group can be ignored as non-contributing and compositing can cease.

It is noted that the further implementation described above will not accurately depict the image as the progressive inclusion of the variable alpha layers incorrectly accounts for the contributions of layers from lower groups. For example, if the contribution of all top layers down to but not including the first variable alpha layer is 80%, then the contribution of the first variable alpha layer and all lower layers should be 20%. Compositing the first variable alpha layer with those above will distort the balance of contibutions to give inaccurate, but faster compositing. Whilst such may not be desireable for final image rendering, such may be sufficient for previewing stages of image construction where accurate detail of all layers is not necessary.

The predetermined threshold is typically dependent upon a desired precision of the composite result and the number of operations to be performed. Such may for example be within a least significant bit of a color channel, which for 8-bit color gives a contribution of 255/256 (99.6%). Other thresholds may be chosen.

Figure 61A:
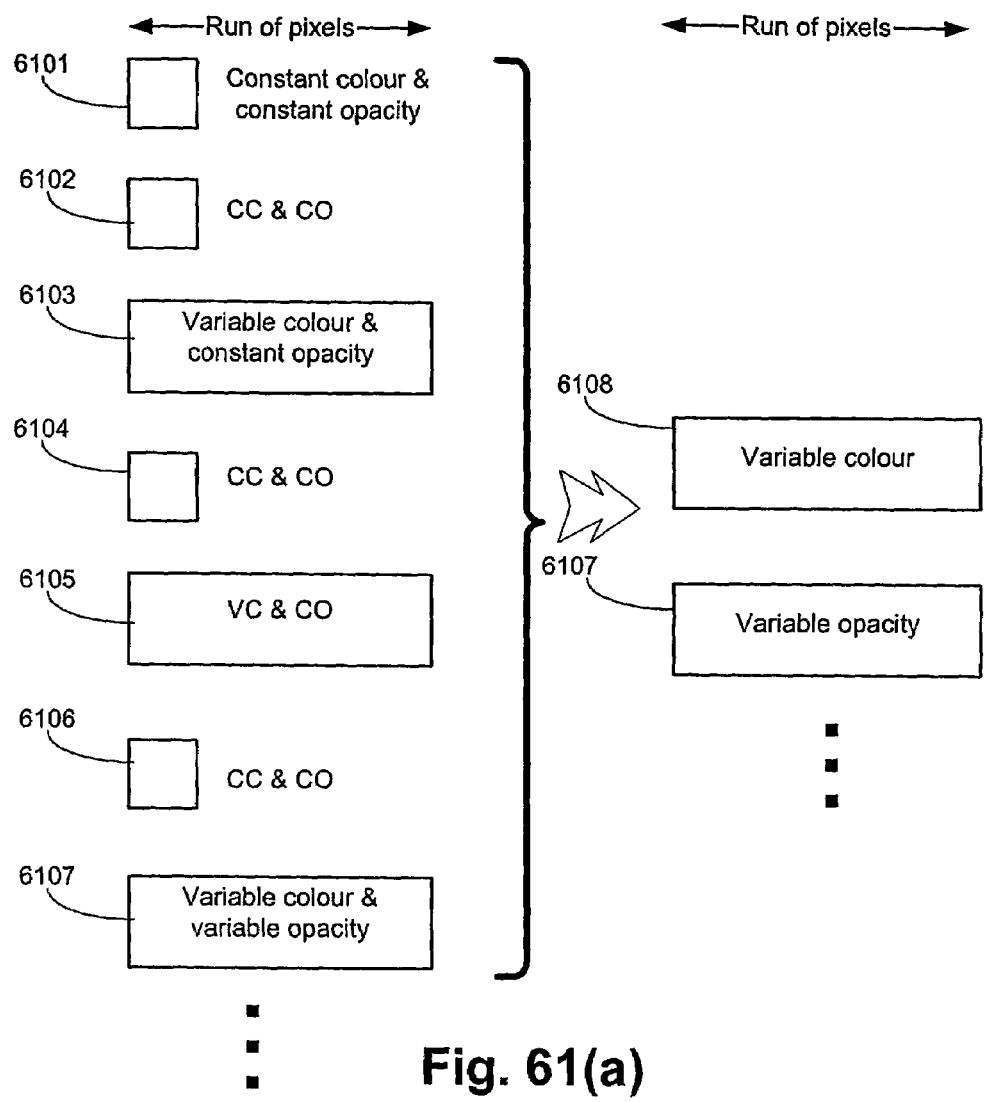
FIGS. 61(a), 61(b) and FIG. 62 depict compositing approaches using top-down and bottom-up sectionalization of a compositing stack.

FIG. 61(a) illustrates a generalization that can be performed for a top-down composite of a number of layers within a run of pixels. As shown, a number of layers 6101-6107 are shown which have different types. One type is a constant color level which, by its very nature, can include a constant alpha component. These are levels 6101, 6102, 6104, and 6106. Another type of level is a variable color level but having constant alpha. An example of this is a linear blend that occurs over the run of pixels. Again, because the alpha value is constant, it may be considered as a single variable color and examples of this are the levels 6103 and 6105. The final type of level, an example of which is level 6107, is a level which includes both variable color and variable alpha. By virtue of its nature, this level may be generalized as a variable alpha level and operates to change the contribution of all levels below that level in the rendering of the span of pixels.

The generalization of FIG. 61(a) is that with a top-down composite, all levels above a variable alpha level, each of which having constant alpha, may be top-down composited to provide a single color level which, depending on the original source levels, may be a variable color level. This generalization is shown by virtue of a new color level 6108 representing a top-down composite of the levels 6101-6106. The level 6108 is placed above the previous variable alpha level 6107.

FIG. 61(a) as such indicates that any number of levels having a constant alpha component may be top-down composited to provide a single level (eg: 6108) of constant alpha which may be then composited over a level having a variable alpha.

Figure 61B:
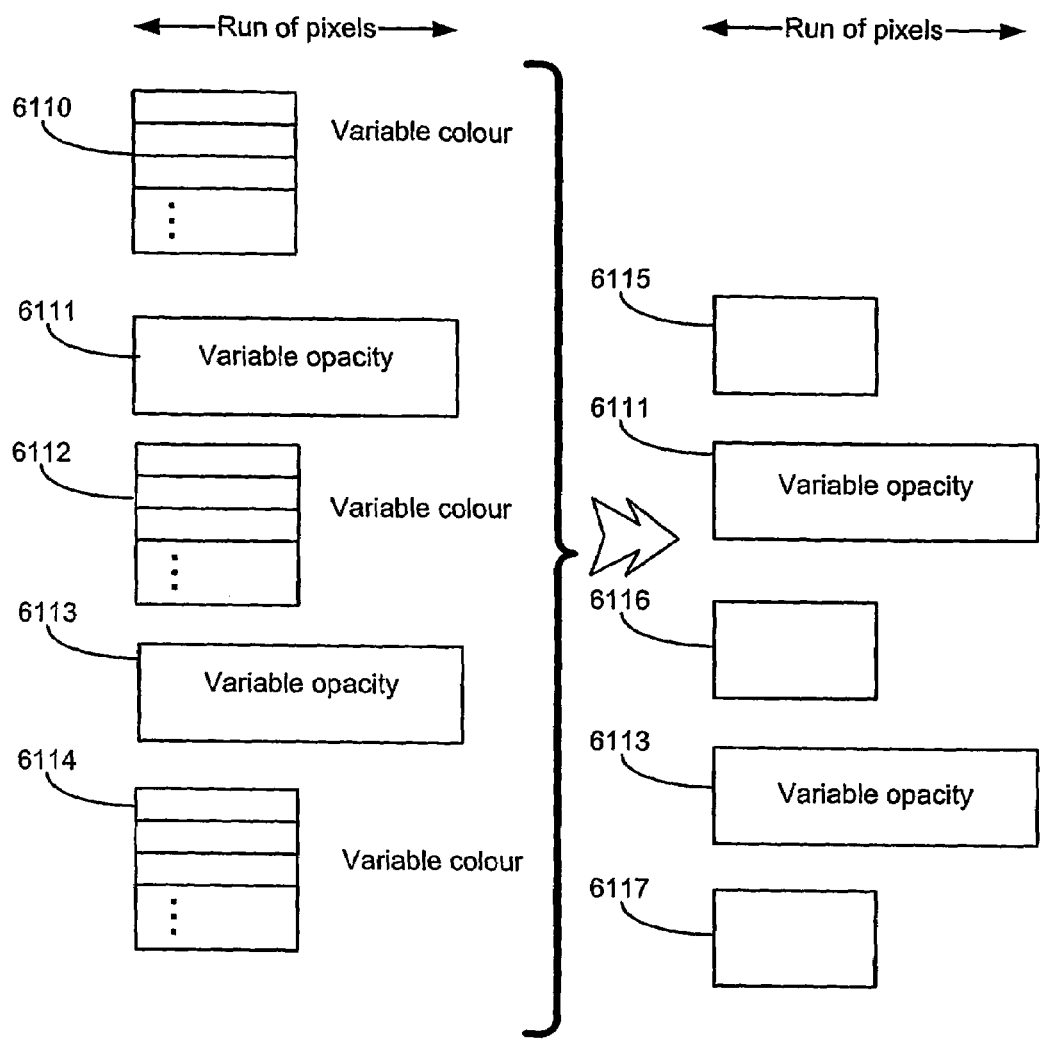

FIG. 61(b) shows how this generalization can be applied to a compositing stack incorporating numerous layers in which groups 6110, 6112, and 6114 of layers of variable color are each separated by layers 6111 and 6113 of variable alpha. In such an arrangement, each of the groups of layers having variable color constant alpha can be top-down composited to produce a corresponding single layer of constant alpha, these being illustrated as new layers 6115, 6116, and 6117. Each of these new layers can then be composited with their respective interposed variable alpha layers 6111 and 6113 in a bottom-up composite to provide an accurate composite of the run of pixels. Most significantly, by dividing the compositing operations into as many top-down composites as possible, the number of compositing operations are minimized over the run of pixels. In this regard, because of the operation of any variable alpha level, such necessitates a composite at each pixel in the run of pixels. As such, the combination of top-down composites followed by a bottom-up composite provides optimizations previously not available.

Figure 62:
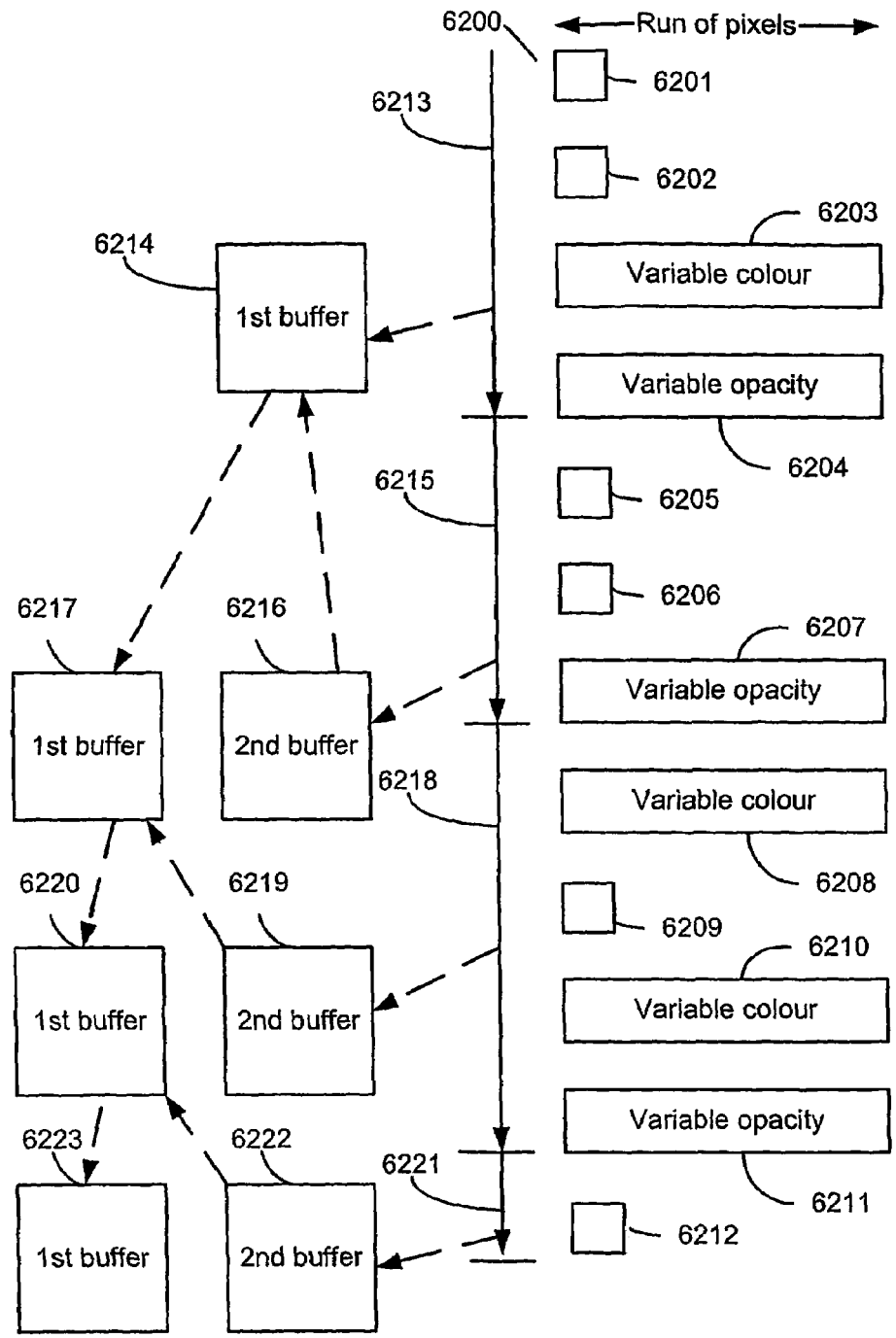

An extension of this principle is shown in FIG. 62 where a compositing stack 6200 for a span of pixels is formed using various layers 6201-6212 which include combinations of constant color, variable color and variable alpha layers. According to the variation, the compositing stack 6200 is composited using only top-down composite operations to provide pixel values for the run of pixels. Essentially, the stack 6200 is divided into sections, each delineated by a variable alpha layer. In this arrangement, a top-down composite 6213 is performed on the first group of layers up to and including the first variable alpha layer, this group being the layers 6201-6204. The result of the composite is retained in a first buffer 6214. A second top-down composite 6215 is then performed on the next group of layers up to and including the next variable alpha layer, this group being the layers 6205-6207. The result of the composite 6215 is then stored in a second buffer 6216. The composite results contained in the buffers are then composited together with the first buffer 6214 being composited over the second buffer 6216, and the result of that composite being written back into the first buffer as indicated at 6217 in FIG. 62. The next group of layers 6208-6211 is then top-down composited 6218 with again the composite value being stored in the second buffer 6219. Again, the first buffer 6217 is composited over the second buffer 6219 to give a result 6220 stored in the first buffer. Finally, in the example of FIG. 62, the last group of layers, which includes only the constant color layer 6212 is then top-down composited 6221. In this case, since the group of layers contains only a single constant color, the composite operation is effectively a null and the value of the layer 6212 is copied into the second buffer 6222. Again, the buffers are composited together with the final result 6223 being retained in the first buffer.

It will be appreciated from the description of FIG. 62, that reliance upon top-down compositing only does not necessarily guarantee that the final composite result will be entirely accurate for the particular span of pixels. However, the present inventors have determined that a desired level of precision may be established for the compositing operation such that the final composite result can be created to a determinable level of accuracy. Such has implications where very fast compositing is necessary, possibly at the expense of image quality. Examples of this may be in previewing the image creation process, for example as performed by a graphic artist. Other implementations may be where the compositing process is able to be performed on a number of different platforms of varying processing capacity. Particularly, where a compositing time requirement is specified (eg: in real time operations) the complexity of the compositing stack may be used to trigger a particular type of composite (eg: FIG. 61(*a*)—accurate but slower, or FIG. 62—faster but possibly less accurate) in order to meet system requirements.

Figure 64:
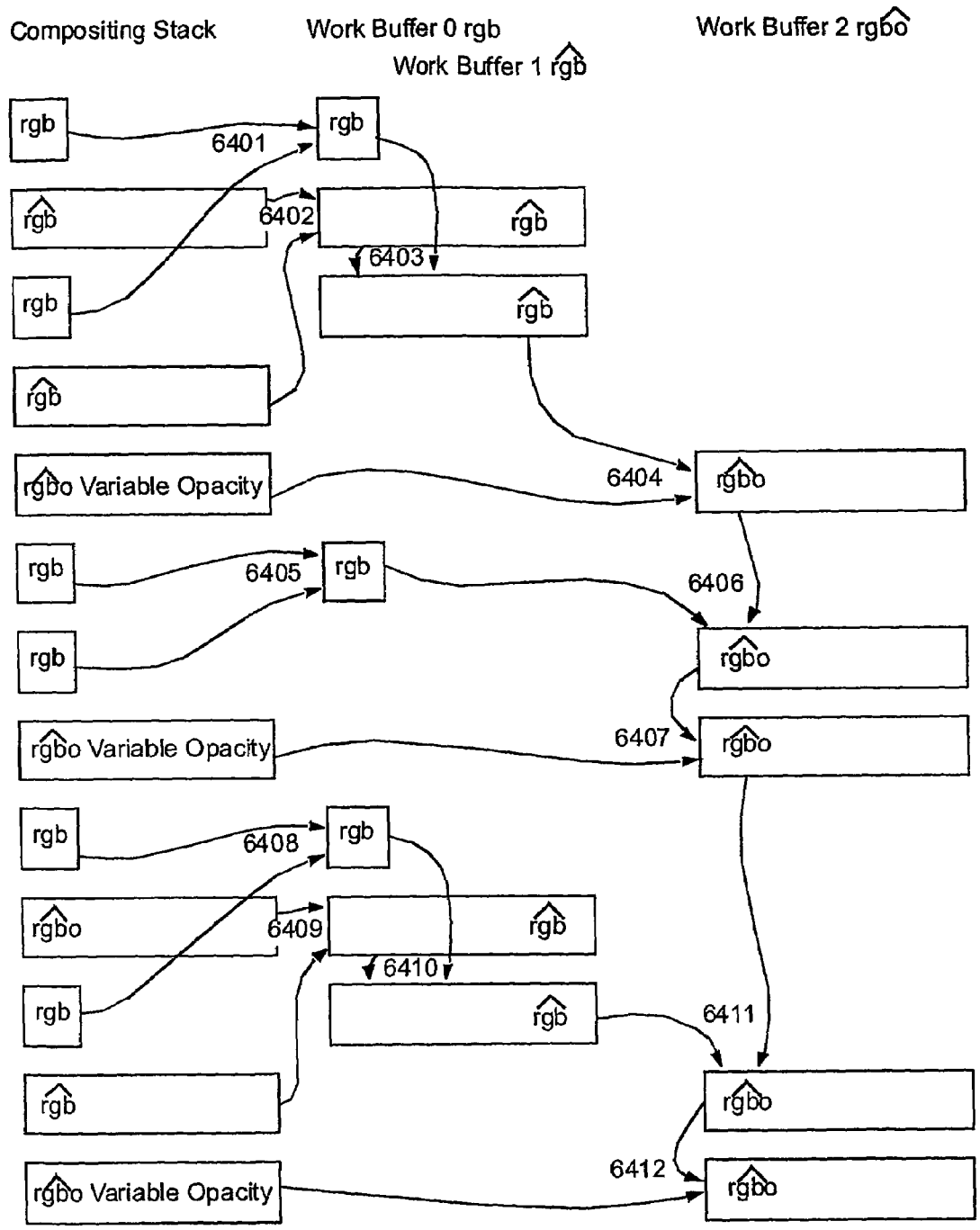
FIG. 64 shows an alternate form of top-down compositing.

A further alternative approach is shown in FIG. 64 and provides an improvement upon the previously described arrangements by removing the need for bottom-up compositing. The exclusive use of top-down compositing allows for increased exploitation of the benefit of top-down compositing, being early exit from the process when opacity is sufficiently close to 100% resolved. The cost of this alternate approach, in comparison to that of FIGS. 9 and 62, is an additional work buffer (here called "Work Buffer 2"). This new work buffer has the same elements as Work Buffer 1(eg. 78), but each element is an rgbo instead of rgb (r=red, g=green, b=blue, and o=opacity).

In operation, the compositing stack is partitioned into sections separated by variable opacity layers. Work Buffer 0 (eg. 73) and Work Buffer 1 are used on the uppermost section as with the previous implementation. Work Buffer 1 is then composited over the first variable opacity layer and the result stored in Work Buffer 2. Work Buffers 0 and 1 are then applied to the next lowest section in the same fashion as they were applied to the topmost section, except that at the conclusion:

(a) Work buffer 2 over Work Buffer 1 is stored in Work Buffer 2, and (b) Work Buffer 2 over the next variable opacity layer is stored in Work Buffer 2.

With reference to the compositing approach 6400 shown in FIG. 64, step 6401 composites fixed colors from the compositing stack to form a fixed color in Work Buffer 0. Step 6402 composites two variable colors into Work Buffer 1. Step 6403 composites Work Buffer 0 over Work Buffer 1 and stores the result in Work Buffer 2. These steps essentially correspond with those of the previous approach. In step 6404, Work Buffer 1 is composited over a first variable opacity layer with the result being stored in Work Buffer 2. Step 6405 operates in the previous fashion to composite the next two fixed colors, expect that their contributions are retained locally within Work Buffer 0. Step 6406 then composites Work Buffer 2 over Work Buffer 0 with the result being stored in Work Buffer 2. Step 6407 the composites Work Buffer 2, which is a variable opacity color over the next variable opacity layer with the result be stored in Work Buffer 2. Step 6408-6410 effectively repeat steps 6401-6403. Step 6411 the composites Work Buffer 2 over Work Buffer 1 with the result again being retained in work Buffer 2. Step 6412 completes the compositing process by processing Work Buffer 2 over the next variable opacity layer, the final result be retained in Work Buffer 2.

As such, this approach is seen to accommodate variable opacity layers whilst maintaining a top-down traversal of the compositing stack. Early exit from the method 6400 can be achieved as described earlier when the accumulated opacity reaches a predefined threshold. In calculating accumulated opacity the opacity contribution of variable opacity layers can safely be taken as zero. Alternatively, the opacity contribution of each variable opacity layer may be assumed to be a minimum value, for example obtained by a search for a pixel within the variable opacity layer having a minimum opacity. A further extension of this principle is to track the opacity contribution across the whole composition of the stack as a vector (eg. on a per-pixel basis), such that the accumulated opacity of pixels will reach the predefined threshold on an individual basis thereby causing early exit.

7.9 Top-down Advantages

The top-down compositing techniques described above are preferred over the bottom-up techniques. The top-down techniques are more efficient in the amount of calculation required to composite two layers together. This can be seen with reference to the Eqns. 1 and 2 presented in Sections 7.6 and 7.7.

Top-down compositing also has the significant advantage of allowing the compositing process to terminate as soon as it is determined that subsequent compositing operations will have no visible effect on the output. This "early termination" happens very often in practice, and results in a performance increase.

8. Pixel Generation

The Pixel Generation Module 611 of FIG. 56 is concerned with generating a run of pixel values for a single Z-level.

The Compositing Module 612 combines color values of z-level fills in order to generate output pixels. The source color values that the compositing module 612 combines are either explicitly defined or must be generated from some form of fill description. Z-levels of solid color fill explicitly define a source color value that is ready for compositing. Z-levels of complex fill type, such as gradients (linear or radial) and bitmap image fills, require source color values to be generated in a manner that is dependent upon the raster space location of the pixel to generate. This process of determining the source color values for a z-level of complex fill is referred to as pixel generation, performed by the Pixel generation Module 611.

Figure 39:
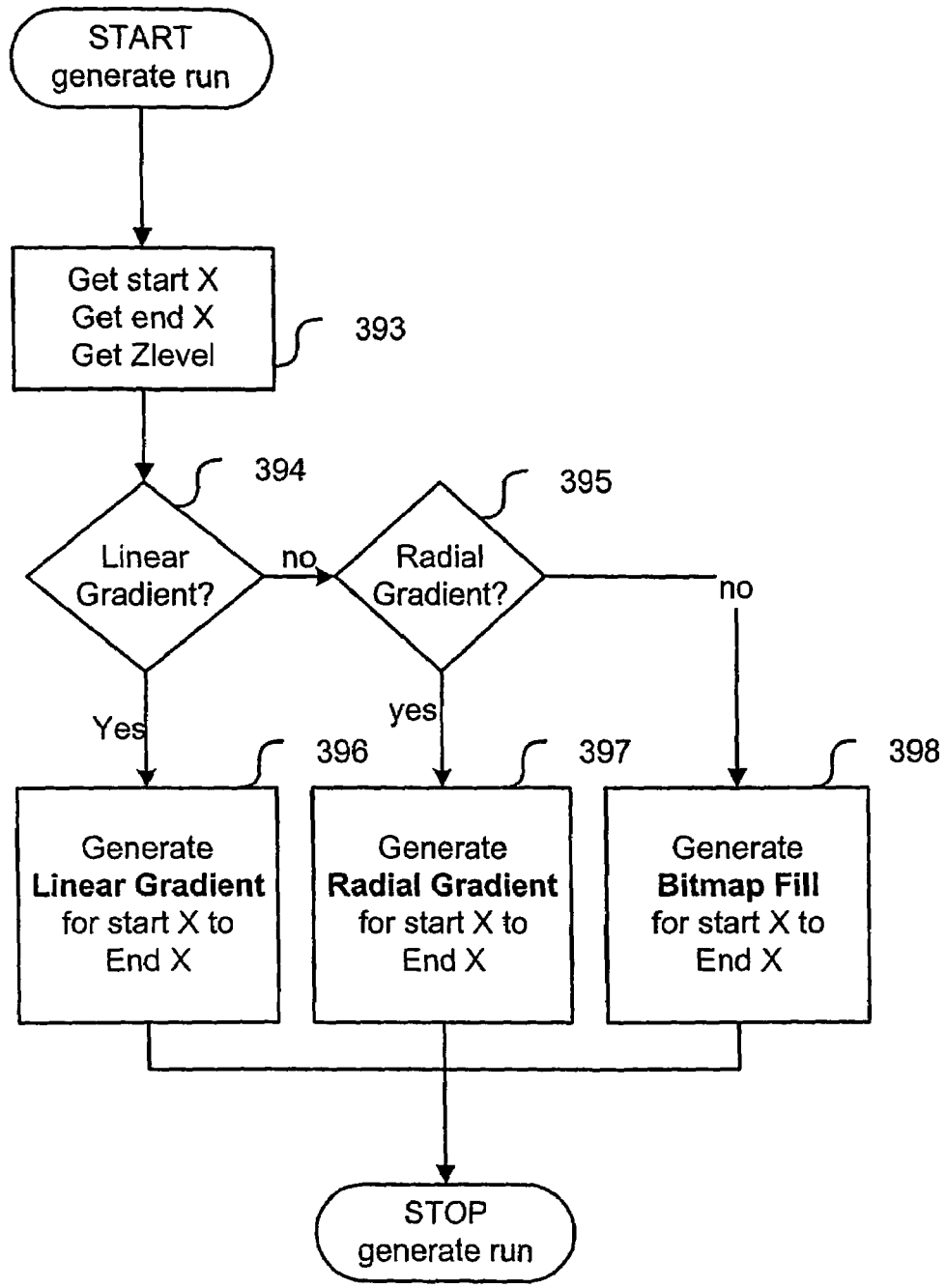
FIG. 39 is a processing flow representation of the Pixel Generation Module.

A processing flow of the Pixel Generation Module 611 is outlined in FIG. 39. As input, the module 611 is provided at step 393 with a start and end location in raster space, along with a reference to a complex Z-level containing the required fill description. Depending on the fill type of the Z-level, determined in steps 394 and 395, the compositor will generate a run of color values for either:
 a Linear Gradient in step 396;
 a Radial Gradient in step 397; and
 a Bitmap Fill in step 398.

Generated color values are stored into a compositing buffer or a fill generation buffer ready for compositing by the compositing module 612. Details of color generation for each fill type are now given.

8.1. Linear Gradient Pixel Generation

A z-level may have a linear gradient fill. In the art, linear gradient fills are often referred to as linear blends. A linear gradient fill involves shading a surface using color values that depend on the perpendicular distance of the point to be shaded from a specified imaginary line.

Linear gradients may be described using a gradient look-up table. A gradient look-up table defines color values for a gradient over some range of index values. A gradient look-up table may be implemented as an ordered set of one or more gradient look-up table entries. Each gradient look-up table entry comprises an index value and a corresponding color value, Gradient look-up table entries are ordered by index value from lowest to highest.

Figure 25:
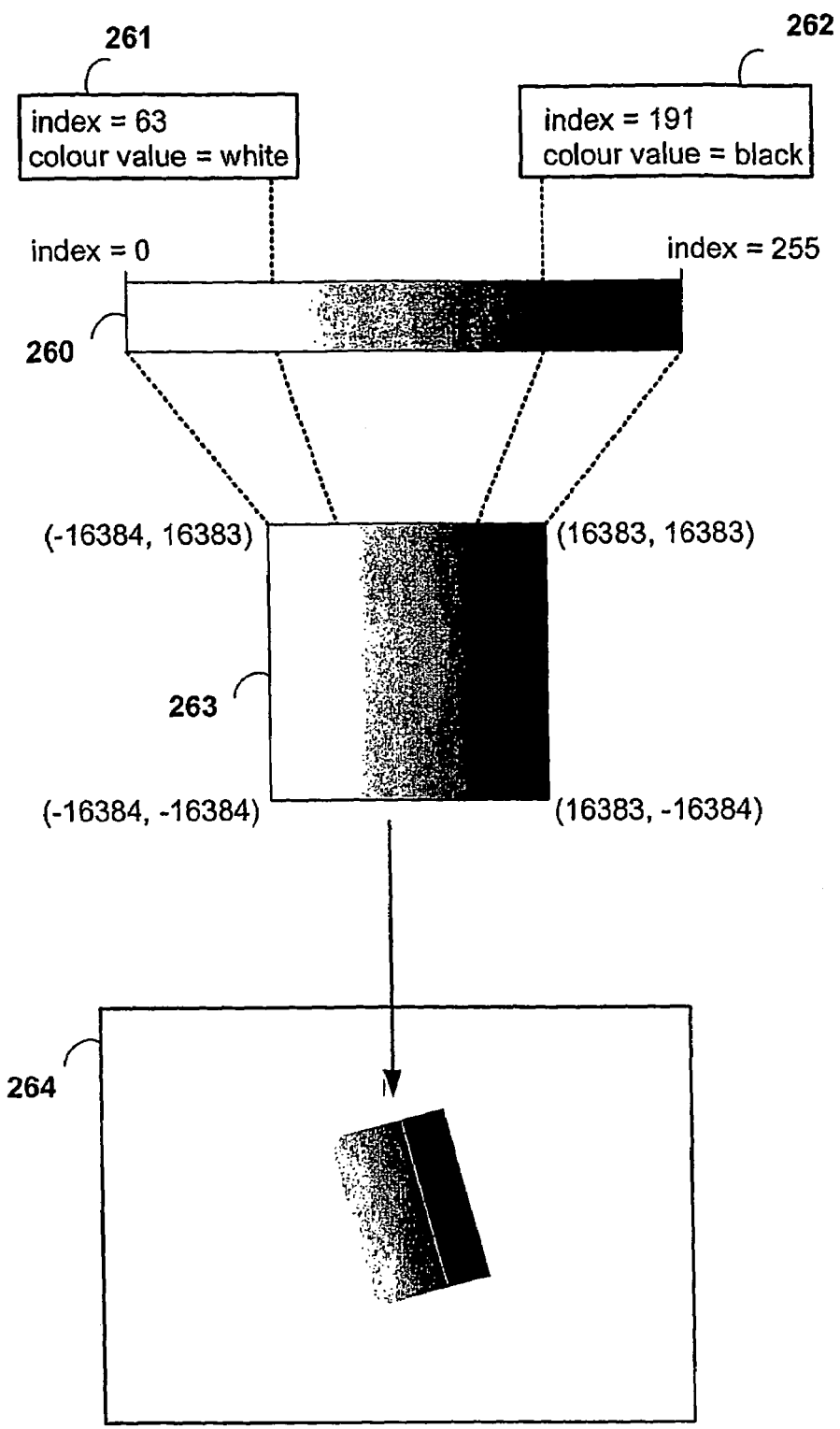
FIG. 25 illustrates operation of a gradient fill look-up.

Referring to FIG. 25, a gradient look-up table 260 is shown. The index value range of the gradient look-up table 260 can be seen to be from 0 to 255 inclusive. The gradient look-up table 260 comprises two gradient look-up table entries 261 and 262. The first of the gradient look-up table entries 261 defines a white color value at an index value of 63. The second of the gradient look-up table entries 262 defines a black color value at an index value of 191.

For an index value between two entries of a gradient look-up table, a corresponding color value may be calculated using linear interpolation of the color values of the two surrounding gradient look-up table entries. For an index value less than the minimum index value of all gradient look-up table entries, or for an index value greater than the maximum index value of all gradient look-up table entries, a corresponding color value may be determined by directly using the color value of the gradient look-up table entry with closest index.

For example, in FIG. 25, the color value corresponding to an index value between the two look-up table entries 261 and 262 is determined using linear interpolation of the white and black color values of the entries respectively. Continuing the example, for an index value below the index value of the first look-up table entry 261, say index value 50, the associated color value is that of the nearest look-up table entry hence a white color value). Conversely, for an index value above the index value of the last look-up table entry 262, say index value 255, the associated color value is that of the nearest look-up table entry (hence a black color value).

When generating a raster pixel color value from a gradient fill, it is necessary to calculate an index into a gradient look-up table corresponding to the location of the pixel. To do this, a transform of the pixel's raster space coordinate location into a gradient space is performed. In order to map the gradient space into the look-up table index range, it is useful to define a gradient space surface. Each point in a gradient space surface maps to a particular gradient look-up table index. A raster pixel's color value may be determined using the index value and a gradient look-up table.

For a linear gradient, the gradient space surface may map a point to an index value in a manner that depends only on the horizontal position of the point within the gradient space surface. This means that for a linear gradient, there is no need to calculate any vertical component of the position in gradient space. In order to change the appearance of a linear gradient in raster space, it may be desired to modify parameters such as the gradient's position, scale, and rotation. To achieve such effects, a transform of the linear gradient space surface into raster space using a gradient to raster space transform may be performed.

FIG. 25 also shows an example of a square gradient space surface 263 of width 32768 centred at the gradient space origin. Color values across this gradient space surface are shown using the technique for linear gradients described above, whereby, the color value only depends on the horizontal gradient space position. FIG. 25 illustrates this gradient space surface 263 being mapped onto a raster space device 264 for output. It can be seen that this mapping involves some rotation and scaling of the gradient space surface.

Figure 32:
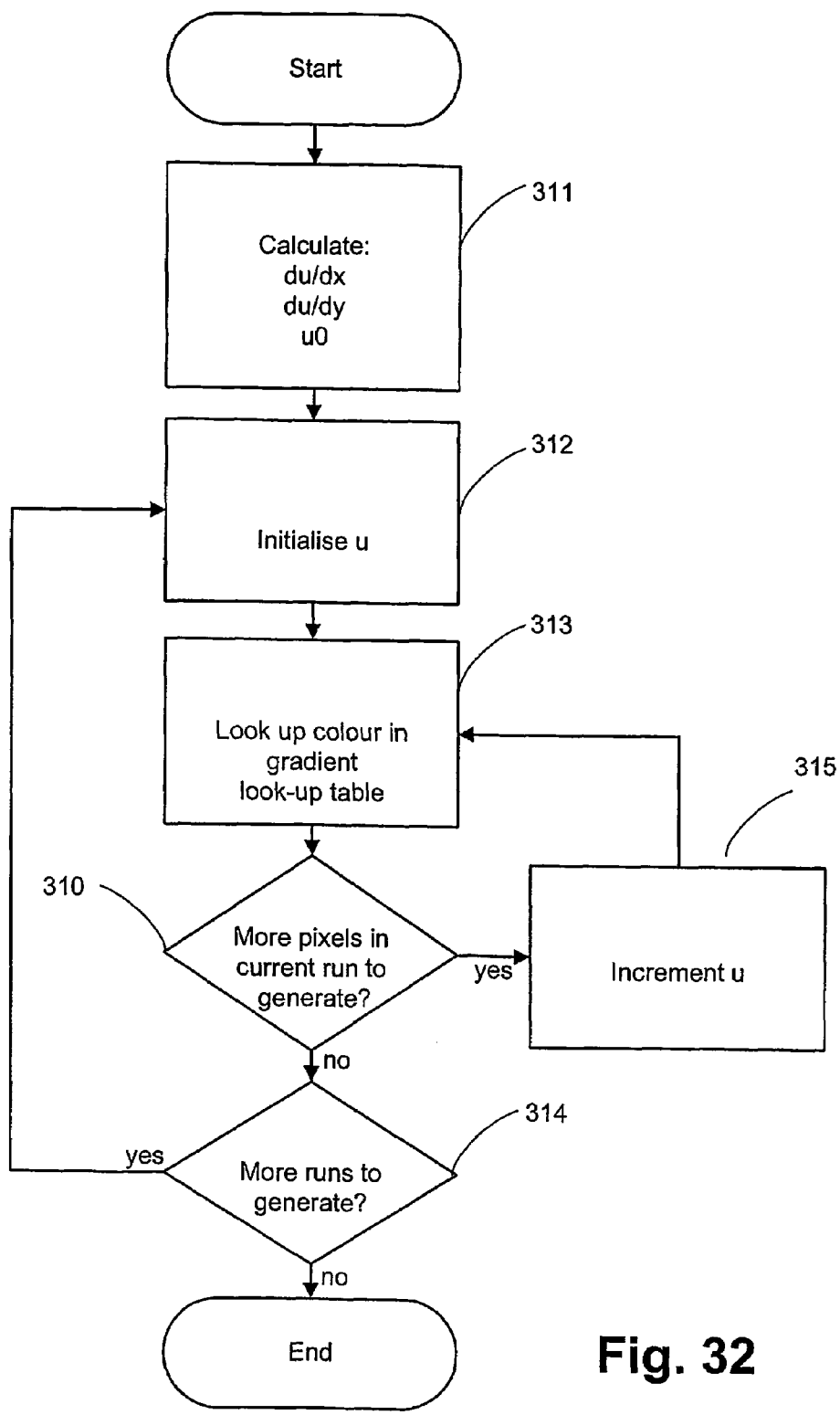
FIG. 32 is a flowchart for determining an index to a gradient look-up table.

Linear gradient fills may be rendered by incrementally tracking an index into a gradient look-up table. Such a technique involves pre-calculating three parameters that depend on the gradient to raster space transform. Referring to FIG. 32, given a linear gradient description comprising a gradient look-up table and a gradient to raster space transform, before calculating any output pixel color values, it is possible to calculate at step 311:

the change in gradient space horizontal position per pixel step in raster space horizontal direction $$\frac{\partial u}{\partial x};$$

the change in gradient space horizontal position per pixel step in raster space vertical direction $$\frac{\partial u}{\partial y};$$

and the gradient space position, $u_o$, corresponding to the raster space origin.

These pre-calculated values are dependent upon the gradient to raster space transform and only need recalculation when the transform is modified.

Figure 27:
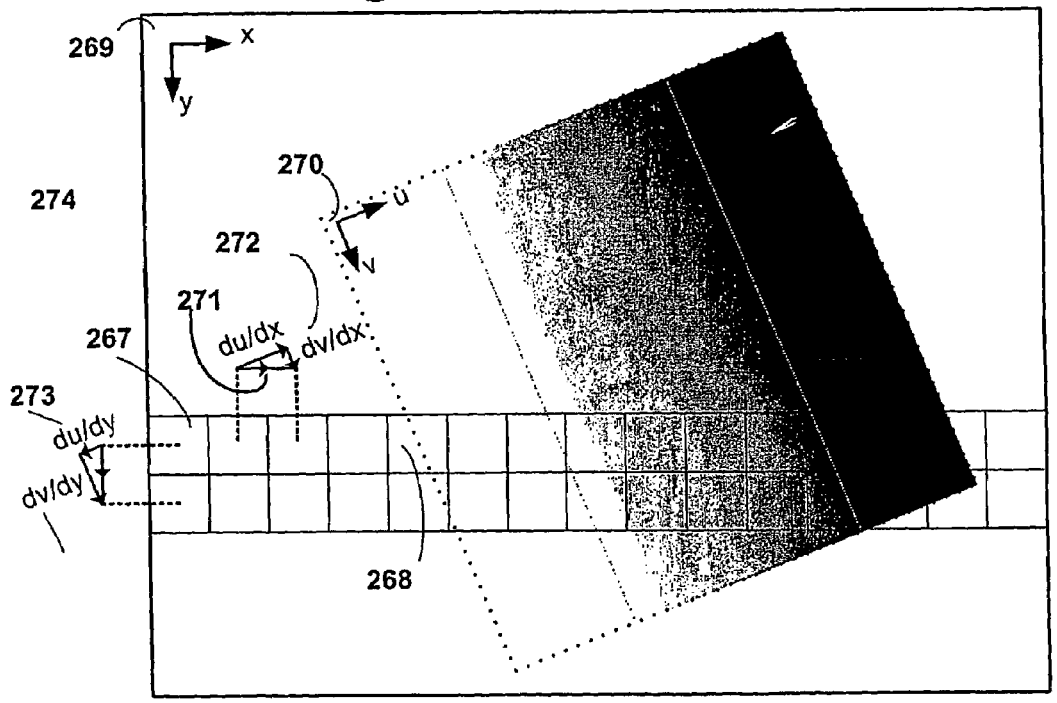
FIG. 27 illustrates various gradient tracking parameters.

A graphical representation of these gradient tracking parameters may be seen in FIG. 27. In FIG. 27, a display of a raster output device of raster space X-Y 269 may be seen. A gradient defined in gradient space U-V 270 is rasterized into the raster device space 269. A raster scan line 267 of the raster device is to contain a run of gradient filled pixels commencing at a start pixel 268 within the scan line. For a single raster pixel step in the positive horizontal raster space direction, the corresponding change in gradient space horizontal position, $$\frac{\partial u}{\partial x}$$

271, is shown. For a single raster pixel step in the positive vertical raster space direction, the corresponding change in gradient space horizontal position, $$\frac{\partial u}{\partial y}$$

273, is shown. In the figure, similar parameters 272, 274 corresponding to the vertical gradient space position are also shown. Calculation of these values is not required for linear gradients.

It is thus possible to proceed to generate linear gradient pixel color values for one or more contiguous pixels forming a run to be output to the fill generation buffer. Given the raster space coordinate location ($x_{start}, y_{start}$) of the left-most raster pixel in a run to be generated, it is necessary to first initialize the gradient space horizontal position, u at step 312 in FIG. 32. In FIG. 27, an example of the left-most raster pixel in a run to be generated is indicated at 268. The initial u value may be calculated using the following formula:

$$u = u_o + x_{start} \times \frac{\partial u}{\partial x} + y_{start} \times \frac{\partial u}{\partial y}.$$

It is therefore possible to determine an actual index into a gradient look-up table by directly using the u value. Using such an index value, a corresponding color value from a gradient look-up table can be determined as previously described in step 313.

After generating a pixel's color value, if there are still more pixel color values in the run to generate from the linear gradient, as determined in step 310, the gradient space horizontal position value, u may be incremented in step 315 according to the following recurrence relation:

$$u_n = u_{n-1} + \frac{\partial u}{\partial x}.$$

This process repeats until all required pixels in a run have been generated. Following this, if there are more runs requiring rendering using the same linear gradient as determined at step 314, then the same process may be repeated by firstly recalculating the initial gradient space horizontal position, u, at step 312 for the start pixel of the new run to render and then repeating the process at step 313 of generating pixel color values for each pixel of the run.

8.2. Radial Gradient Pixel Generation

A z-level may have a radial gradient fill. Radial gradient fills are also referred to as radial blends. A radial gradient fill can be thought of as shading a surface using a color value that depends on the distance of the point to be shaded from a specified centre point of the radial gradient. The process of generating radial gradient pixels is similar to the process of generating linear gradient pixels as previously described.

As with linear gradients, radial gradients may be described using a gradient look-up table implemented as an ordered set of one or more gradient look-up table entries. Radial gradients also make use of a gradient space surface. Again, each point in a gradient space surface maps to a particular gradient look-up table index. Again, the color values of two gradient look-up table entries may be linearly interpolated to obtain a color for an index that isn't explicitly defined in the look-up table.

For a radial gradient, the gradient space surface maps a point to an index value in a manner that depends on the distance of the point from the centre point of the gradient space surface. In order to change the appearance of a radial gradient in raster space, parameters may be modified, such as the centre point and the scale of the radial gradient. To achieve such effects, the radial gradient space surface may be transformed into raster space using a gradient to raster space transform.

Rendering radial gradients in the traditional fashion is computationally expensive. Typically, it would be necessary to transform each pixel's coordinate into gradient space, then calculate the distance of the gradient space point from the centre of the gradient space, and finally look up a corresponding color value. However, when generating a contiguous sequence of raster pixels from a radial gradient, it is possible to improve performance by using an incremental approach to calculation of the gradient look-up table index.

Figure 42:
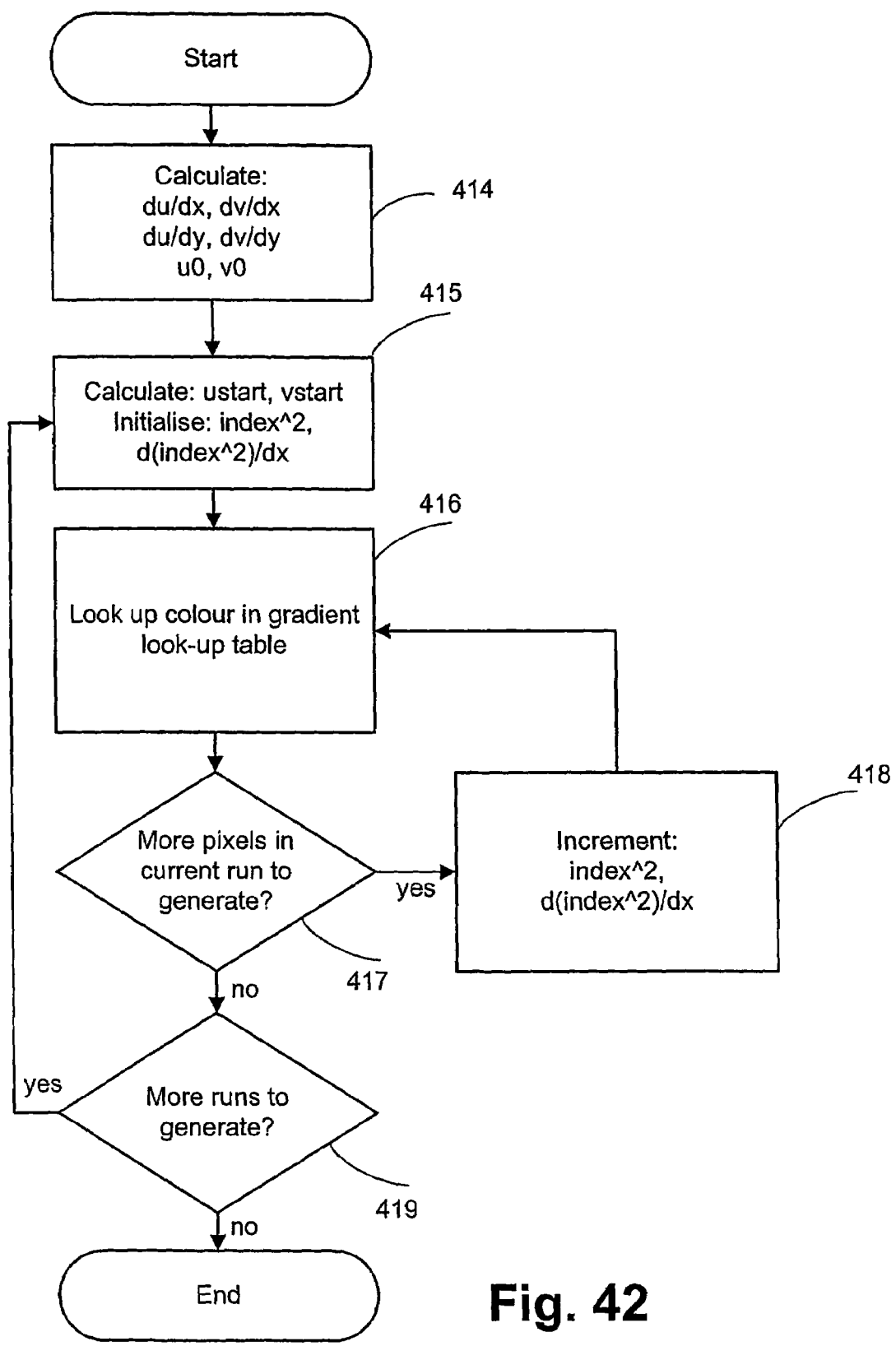
FIG. 42 is a flowchart of an incremental approach radial gradient determination.

Referring to FIG. 42, given a radial gradient description comprising a gradient look-up table and a gradient to raster space transform, before calculating any output pixel color values, the following may be calculated in step 414:

(i) the change in gradient space horizontal position per pixel step in raster space horizontal direction, $$\frac{\partial u}{\partial x};$$

(ii) the change in gradient space vertical position per pixel step in raster space horizontal direction $$\frac{\partial u}{\partial y};$$

(iii) the change in gradient space horizontal position per pixel step in raster space vertical direction $$\frac{\partial u}{\partial y};$$

(iv) the change in gradient space vertical position per pixel step in raster space vertical direction $$\frac{\partial v}{\partial y};$$

and (v) the gradient space position, $(u_o, v_o)$, corresponding to the raster space origin.

These pre-calculated values are dependent upon the gradient to raster space transform and only need recalculation when that transform is modified. Using these pre-calculated values allows for incremental tracking of the gradient look-up table index squared (index$^2$). In the specific implementation to a raster scan rendering, index is equivalent to the distance from the centre point of the radial gradient to the pixel location being rendered.

A graphical representation of these gradient tracking parameters may be seen in FIG. 27. It should be noted that although the figure depicts a linear gradient fill, its content is equally applicable to radial gradient generation. In FIG. 27, a raster output device of raster space X-Y 269 may be seen. A gradient defined in gradient space U-V 270 is rasterized into the raster device space 269. A raster scan line 267 of the raster device is to contain a run of gradient filled pixels commencing at a start pixel 268 within the scan line. For a single raster pixel step in the positive horizontal raster space direction, the corresponding change in gradient space horizontal position, $$\frac{\partial u}{\partial x}$$

271, and the corresponding change in gradient space vertical position, $$\frac{\partial v}{\partial x}$$

272, are shown. For a single raster pixel step in the positive vertical raster space direction, the corresponding change in gradient space horizontal position, $$\frac{\partial u}{\partial y}$$

273, and the corresponding change in gradient space vertical position, $$\frac{\partial v}{\partial y}$$

274, is shown.

It is possible to then proceed to generate pixel color values for one or more contiguous pixels forming a run to be output to the fill generation buffer. Given a raster space coordinate location $(x_{start}, y_{start})$ of a start pixel, initially a calculation of the corresponding initial gradient space position, $(u_{start}, v_{start})$ is made. In FIG. 27, an example of this start raster pixel is indicated at 268. The corresponding initial gradient space position may be calculated using the following formulae:

$$u_{start} = u_o + x_{start} \times \frac{\partial u}{\partial x} + y_{start} \times \frac{\partial u}{\partial y}$$

$$v_{start} = v_o + x_{start} \times \frac{\partial v}{\partial x} + y_{start} \times \frac{\partial v}{\partial y}.$$

From these calculations, initial tracking values used to maintain an index into a gradient look-up table are determined in step 415 of FIG. 42. More specifically, an initial squared gradient look-up table index (index$^2$) and an initial increment value for this squared index value $$\frac{\partial (index^2)}{\partial x}$$

are calculated as follows:

$$index^2 = u_{start}^2 + v_{start}^2$$

$$\frac{\partial (index^2)}{\partial x} = 2 \times \left( u_{start} \times \frac{\partial u}{\partial x} + v_{start} \times \frac{\partial v}{\partial x} \right) + \left(\frac{\partial u}{\partial x}\right)^2 + \left(\frac{\partial v}{\partial x}\right)^2.$$

Once an index$^2$ value has been calculated, its square root may be taken to allow the corresponding color value to be looked-up in step 416 using a gradient look-up table as previously described.

After generating a pixel's color value, if there are still more pixel color values in the run of pixels to generate from the radial gradient as determined in step 417, the index$^2$ and $$\frac{\partial (index^2)}{\partial x}$$

values may be incremented in step 418 according to the following recurrence relations:

$$index_n^2 = index_{n-1}^2 + \frac{\partial (index_{n-1}^2)}{\partial x}$$

$$\frac{\partial (index_n^2)}{\partial x} = \frac{\partial (index_{n-1}^2)}{\partial x} + 2 \times \left\{ \left(\frac{\partial u}{\partial x}\right)^2 + \left(\frac{\partial v}{\partial x}\right)^2 \right\}$$

It should be noted that the value $$2 \times \left\{ \left(\frac{\partial u}{\partial x}\right)^2 + \left(\frac{\partial v}{\partial x}\right)^2 \right\}$$

is constant and may be pre-calculated.

This process repeats until all required pixels in the current run of pixels have been generated. Following this, if there are further runs of pixels requiring generation using the same radial gradient, as determined in step 419, then the same process may be repeated by returning to step 415 and recalculating the initial index tracking values for the start pixel of the new run. In summary, once initial tracking values have been calculated, this technique allows a radial gradient to be rendered along a run of pixels by performing just two additions and a square root per pixel.

The square root calculation may be quickly performed using a single 65K entry look-up table or, more efficiently and to the same precision, using two 256 entry look-up tables, according to the processes described in "reciprocation, Square Root, inverse Square Root, and Some Elementary Functions Using Small Multipliers" M. D. Ercegovac et al, IEEE Transactions on Computers, Vol. 49, No. 7, July 2000.

The described method renders the pixels of a radial gradient in a raster scan order, from top left to bottom right. That is, it renders scan lines from the top of the display to the bottom of the display, and it renders pixels within a scan line from left to right. The same technique, with appropriate modifications, is equally applicable to other raster scan orders of operation. In this regard, a raster scan order may be defined as any 1 dimensional scanning of a 2 dimensional space. Preferably, the raster scan order is from top left to bottom right.

It should be observed that the described radial gradient generation method is suitable for use in alternate applications. In general, the described method is suitable for generating any set of result values from a set of 2 dimensional input values, where the sequence of input values all lie on a straight line, and each result value is a function of the magnitude of the vector described by the function input. More specifically, the described method is suitable for calculating values of a radial function at a discrete set of locations, where the discrete set of locations are of a raster scan order. A radial function may be defined as any function of 2 variables that maps to a result value (or value set) that is a function of the distance of the input from a specific location within 2D space.

8.3. Bitmap Image Pixel Generation

A z-level may have a bitmap image fill. By this, it is meant that a z-level's fill may be based on a digital image that comprises rows of pixel data that define point samples in a given color space. A bitmap image's pixel data may be updated before any frame. Such a technique facilitates an animated bitmap image fill effect resembling motion video. Rendering bitmap image fills involves a similar approach to that described for rendering gradient fills.

For the purposes of mapping raster space pixel locations to bitmap pixel values, it is appropriate to define a bitmap space surface to be a surface containing the bitmap image. The width and height of the bitmap space surface is defined as the width and height of the bitmap image in pixels. The origin of the bitmap space surface corresponds to the bitmap image's top left pixel. In the same way that a gradient space surface can be transformed into raster space, a bitmap space surface may be transformed into raster space. This allows the bitmap to be translated, scaled, rotated, and skewed.

For a bitmap image fill, each pixel location in the raster space maps to some color value. Raster space pixel locations that map to points within the bitmap image may use the corresponding pixel color value as defined by the bitmap image data. Raster space pixel locations that map to points outside the bitmap image may be defined to map to pixel color values using a variety of means. For example, raster space pixel locations that map to points outside the bitmap image may be defined to map to the bitmap image pixel that they are nearest to. Another example would be to map raster space pixel locations to bitmap pixels in a way that creates a tiled bitmap image effect, whereby the bitmap image is repeated infinitely across the raster space.

Figure 4:
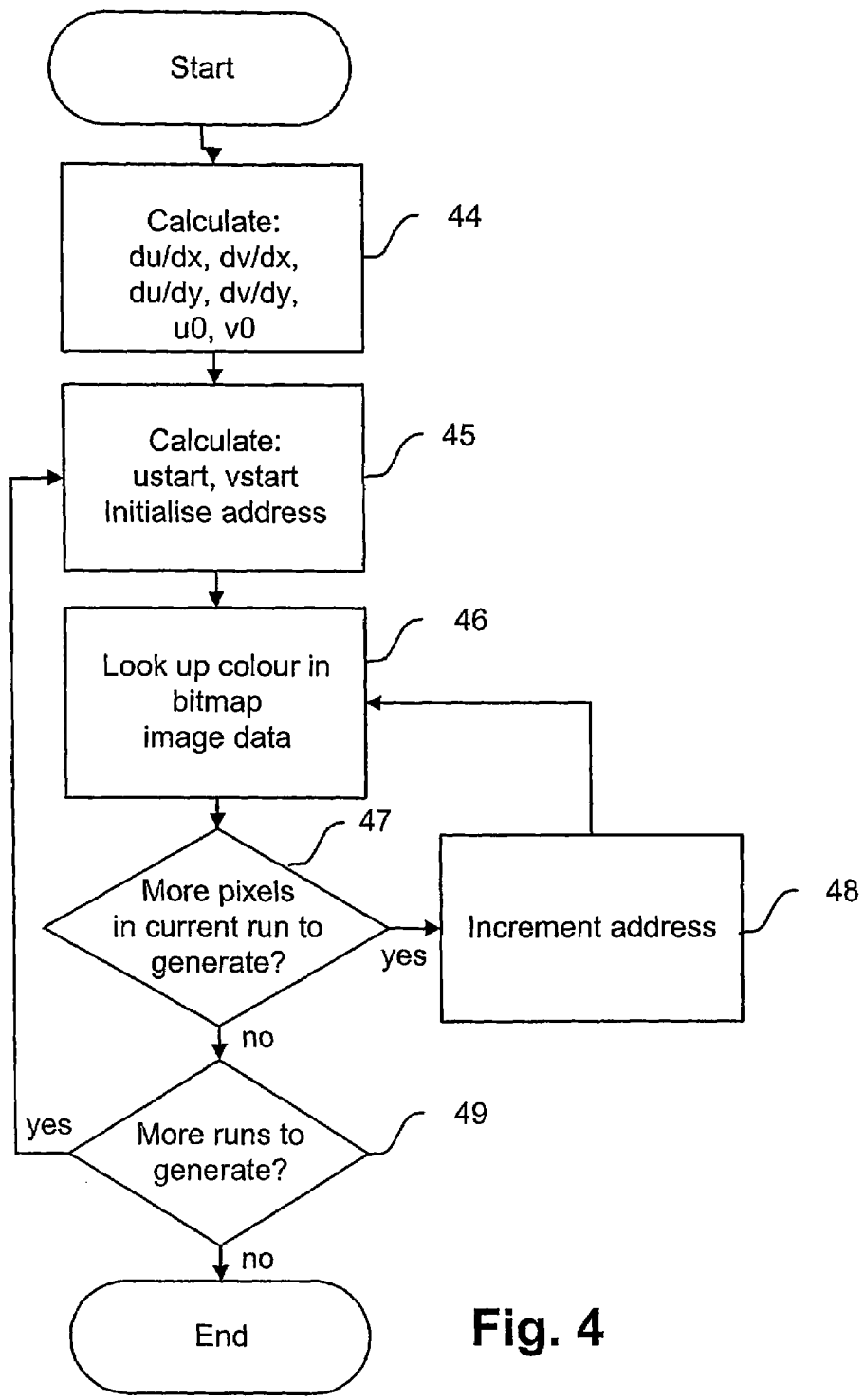
FIG. 4 depicting a method of bitmap image pixel generation.

Referring to FIG. 4, given a bitmap image description comprising of bitmap image pixel data and a bitmap to raster space transform, before calculating any output pixel color values, it is appropriate to calculate at step 44:

(i) the change in bitmap space horizontal position per pixel step in raster space horizontal direction $$\frac{\partial u}{\partial x};$$

(ii) the change in bitmap space vertical position per pixel step in raster space horizontal direction $$\frac{\partial v}{\partial x};$$

(iii) the change in bitmap space horizontal position per pixel step in raster space vertical direction $$\frac{\partial u}{\partial y};$$

(iv) the change in bitmap space vertical position per pixel step in raster space vertical direction $$\frac{\partial v}{\partial y};$$

and (v) the bitmap space position corresponding to the raster space origin $(u_o, v_o)$.

These pre-calculated values are dependent upon the bitmap to raster space transform and only need re-calculation when that transform is modified. Using these pre-calculated values allows for incremental tracking of the address of the current pixel in the bitmap image data (address).

The generation of pixel color values for one or more contiguous pixels forming a run to be output to the fill generation buffer may then proceed. Given a start pixel's raster space coordinate location $(x_{start}, y_{start})$, generation involves first calculation of the corresponding initial bitmap space position, $(u_{start}, v_{start})$. This is calculated using the following formulae:

$$u_{start} = u_o + x_{start} \times \frac{\partial u}{\partial x} + y_{start} \times \frac{\partial u}{\partial y}$$

$$v_{start} = v_o + x_{start} \times \frac{\partial v}{\partial x} + y_{start} \times \frac{\partial v}{\partial y}.$$

From these calculations, an initial address (address) into the bitmap image data is determined at step 45. For a bitmap image with scan order data commencing at address bitmapbase, where the bitmap image data is of bpp bytes per pixel with row stride of rowstride bytes, the initial address into bitmap image data may be calculated as follows:

$$\text{address} = \text{bitmapbase} + v_{start} \times \text{rowstride} + u_{start} \times bpp.$$

Once an address value has been calculated, the pixel color value at that address may be used at step 46 as the output pixel color value for the current output raster pixel. After generating a color value of the pixel, if there are more pixel color values in the current run of pixels to generate from the bitmap image, as determined at step 47, the address value may be incremented at step 48 according to the following recurrence relation:

$$\text{address}_n = \text{address}_{n-1} + \frac{\partial v}{\partial x} \times \text{rowstride} + \frac{\partial u}{\partial x} \times bpp.$$

It should be noted that the value by which address increases may be pre-calculated as a constant. This process repeats until all pixels in the current run of pixels have been generated. Following this, if there are further runs of pixels requiring rendering using the same bitmap image as determined at step 49, then the same process may be repeated by recalculating at step 45 the initial index address for the start pixel of the next run of pixels. In summary, this module allows a bitmap image to be rendered along a run of output pixels by performing just two additions per pixel.

9. Pixel Extraction

The Pixel Extraction Module 618 of FIG. 56 performs the last step in the rasterization process and outputs finished pixels. These pixels can be output directly to a display device, or stored into a frame buffer memory in order to allow output to a display device at a later time. The target of pixel output is a system design choice. Some systems may use only one of the pixel output targets, while other systems may be run time configurable with regard to output target(s).

In systems where the precision of output pixels is less than the precision of the color values supplied to the Pixel Extraction Module 618, the Pixel Extraction Module 618 may also perform the optional step of half toning. For example, in a system where the Pixel Extraction Module 618 receives color information with eight bits per channel (RGB 8:8:8) but outputs pixels with five bits per channel (RGB 5:5:5), half toning may be performed.

9.1. Input Data

The pixel extraction module 618 accepts "spans" as input data. A span is a series of contiguous pixels, in display device scan order, which have the same color. The length of a span can be as little as one pixel and as much as a full display of pixels. Each span is input to the pixel extraction module 618 as two values, the color of the span and its length in pixels.

9.2. Output to Frame Buffer

In this mode of operation the Pixel Extraction Module 618 outputs pixels to a frame buffer memory. Operation of this mode is now described with reference to the flowchart FIG. 37. In step 370 processing begins. In step 371 the frame buffer position variables X and Y are both initialized to zero, indicating an output position of the top left of the frame buffer. In step 378 the Pixel Extraction Module 618 accepts the next span to be displayed. In step 377 the variables N and C are assigned the length and color of the span, respectively. Step 376 follows where the Pixel Extraction Module 618 sets the color of the pixel at position (X,Y) in the frame buffer to color C. In step 375 the frame buffer position X variable is incremented. In step 379 the frame buffer variable X is compared with the width of the frame buffer. If X has reached or exceeded the width of the frame buffer then processing transfers to step 374, otherwise processing continues with step 369. In step 369 the span length counter variable N is decremented. In step 380 the span length counter variable N is compared with zero. If it is zero then processing is transferred to step 378, otherwise it is transferred to step 376.

In step 374 of FIG. 37 the frame buffer variable X is set to zero and the frame buffer variable Y is incremented. In step 373 the frame buffer variable Y is compared with the frame buffer height. If Y is greater than or equal to the height then processing terminates at step 372, otherwise processing continues with step 369.

9.3. Output Direct to Display

In this mode of operation the Pixel Extraction Module 618 outputs pixels directly to a display device. Because the arrival of span information to the Pixel Extraction Module 618 is likely to be asynchronous to the rate that pixels will be displayed on the display device, the Pixel Extraction Module 618 uses a FIFO (First In first Out) buffer to queue spans prior to outputting them to the display device. The FIFO buffer provides a measure of elasticity between the timings of incoming spans and outgoing pixels, providing tolerance of timing differences.

Operation of this mode is now described with reference to the flowcharts shown in FIGS. 38(*a*) and 38(*b*). The process of accepting spans, into the FIFO buffer, is described by steps 388 to 389 of FIG. 38(*a*), while the process of outputting spans, from the FIFO buffer, is described by steps 382 to 383 of FIG. 38(*b*). The timing of these two steps is kept largely asynchronous by the FIFO buffer.

As seen in FIG. 38(*a*), in step 388 the process of accepting spans (runs of pixels) begins. In step 392 a span is accepted by the Pixel Extraction Module 618. In step 391 the fullness of the FIFO buffer is tested. If it is full then processing is transferred to step 390, but otherwise processing continues with step 389. In step 390 processing waits for the FIFO buffer full condition to pass. In step 389 the span accepted in step 392 is stored into the FIFO buffer.

As seen in FIG. 38(*b*), in step 382 the process of outputting pixels begins. In step 387 a span is read from the FIFO. In step 386 the length and color of the span are stored into variables N and C, respectively. In step 385 a test is made to determine whether it is time for the next pixel to be output. If it is not yet time for this, then processing repeats the current step. If it is time for the next pixel to be output then processing is transferred to step 384. In step 384 a pixel of color C is output to the display. In step 381 the variable N is decremented. In step 383 the variable N is compared with zero. If equal to zero then processing is transferred to step 387, otherwise processing continues with step 385.

9.4. Half Toning

Figure 29A:
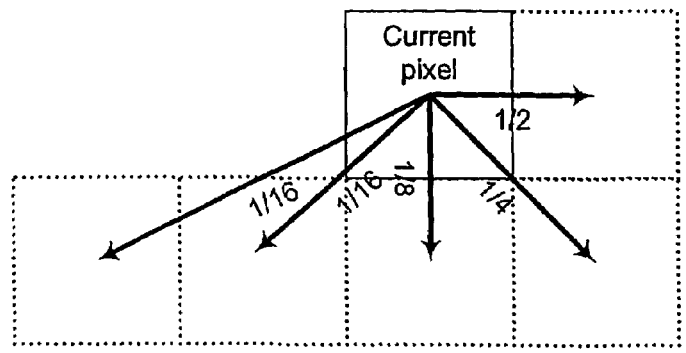
FIGS. 29(a) to 29(c) illustrate respectively two prior art error diffusion approaches and an error diffusion approach used by the pixel extraction module of FIG. 56.
Figure 29B:
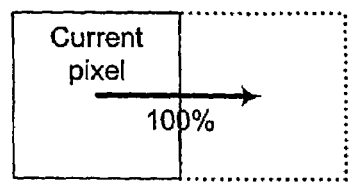
Figure 29C:
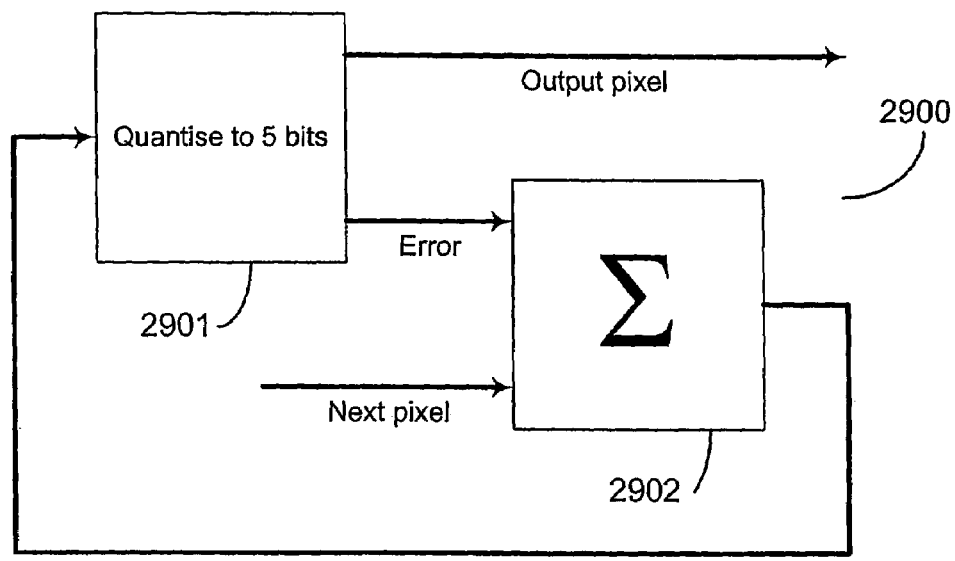

FIG. 29 illustrates the half toning technique used by the Pixel Extraction Module 618. This technique is a variety of error diffusion. FIG. 29(*a*) illustrates a prior art error diffusion technique that diffuses the quantization error of a pixel to five neighboring pixels, including four pixels on the next scan line. FIG. 29(*b*) illustrates the error diffusion technique of the Pixel Extraction Module 618, which diffuses the quantization error of a pixel to only one neighboring pixel, on the same scan line as that current pixel. FIG. 29(*c*) shows a system block diagram of the error diffusion system 2900 of the Pixel Extraction Module 618. The system 2900 is a simple first order negative feedback control system. Error introduced by the quantization of the current pixel down to 5-bit precision is added to the next pixel, providing the negative feedback. The system 2900 may be configured in hardware using a quantizer 2901 and an adder 2902 coupled as illustrated in FIG. 29(*c*). Alternatively the error diffusion system may be configured in software using the method illustrated in FIG. 30. The error diffusion algorithm is described for one color channel only, to simplify explanation. In the actual system, all three color channels are processed in the same way.

Figure 30:
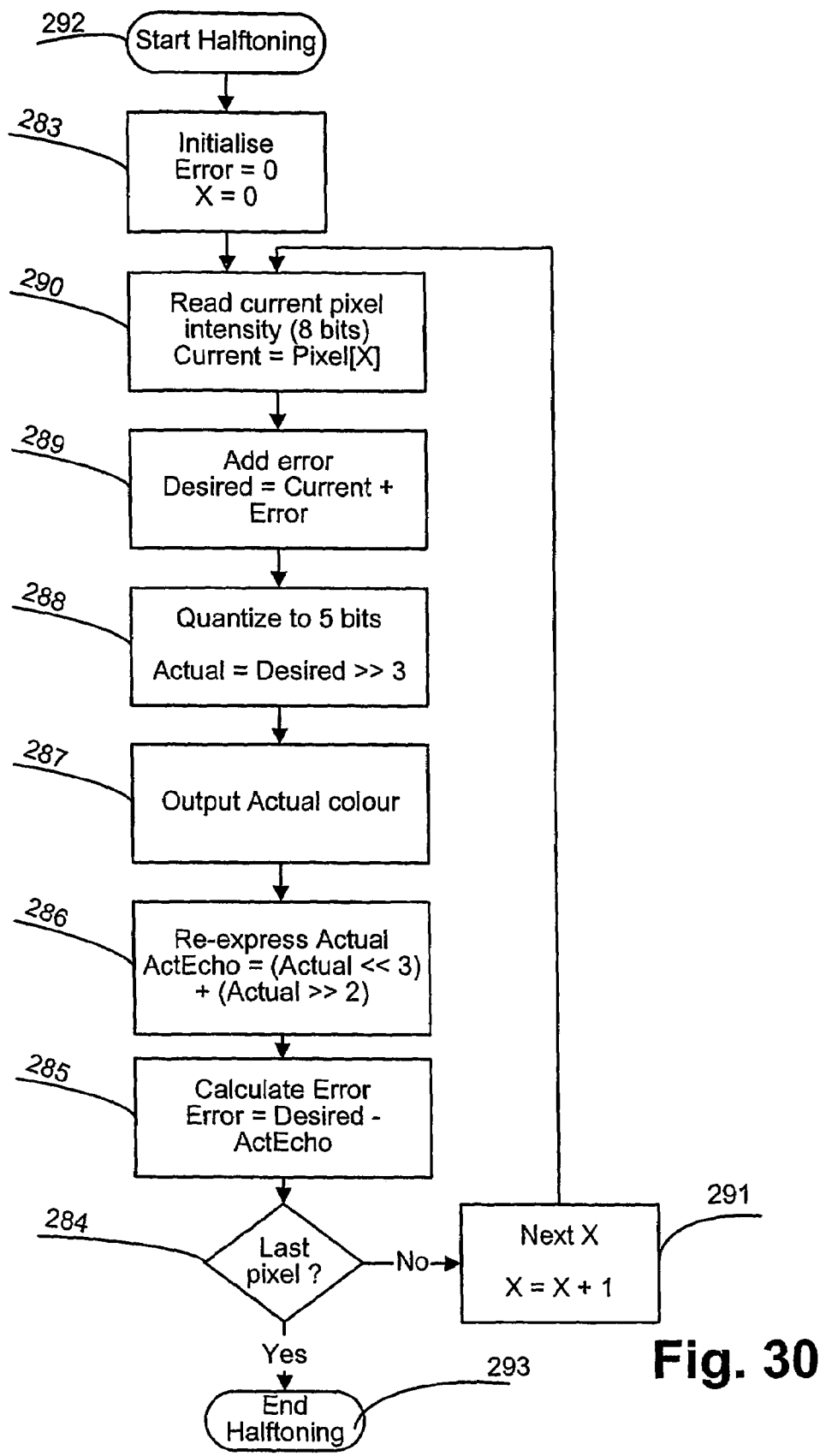
FIG. 30 is a flowchart of the error diffusion process (half toning) of the module 618.

FIG. 30 provides a flowchart description of the half toning algorithm. In step 292 the half toning processing begins. In step 283 variables are set to their initial values, and a pixel intensity of 8-bit precision is read at step 290. In step 289, the pixel intensity read at step 290 has the Error variable added to it. The result is stored in the variable Desired. This is followed by step 288 where the variable Desired is quantized down to five bit precision, and stored into the variable Actual. Quantization from eight bits down to five bits is achieved by logical shifting right three bits. In step 287 the quantized color value, Actual, is output. Next, in step 286, the actual output color, Actual, is re-expressed as an eight bit value. This is achieved by adding Actual left shifted three bits to Actual logically right shifted two bits. The resulting value is stored in the variable ActEcho. In step 285 the quantization error is calculated by subtracting ActEcho from Desired. The result is stored into variable Error. In step 284 a test is made to see if the last pixel has been reached. If this is the case then processing ends with step 293. In step 291 the variable X is incremented.

10. Implementation

The TCIE system 699 described above may be implemented in either hardware or software, or a combination of the two. In a hardware implementation, the modules of FIG. 56 may be integrated onto one or more ASIC devices and incorporated into the target device, such as a mobile telephone handset. In software implementations, such software may be configured to operate on a general purpose, but typically limited capacity processor often found in use in limited computing systems. Hybrid implementations lend themselves to the Display List Compiler 608 being implemented in software and the Rendering Engine 610, or parts thereof being implemented in hardware, such typically affording greater versatility of data (image) input and faster rendering rates. Further, in spite of the system 699 being developed for use on thin clients, such does not prevent the same imaging and rendering approaches being applied to devices with significant computing resources, such a desktop computers, set-top boxes and the like.

Figure 60:
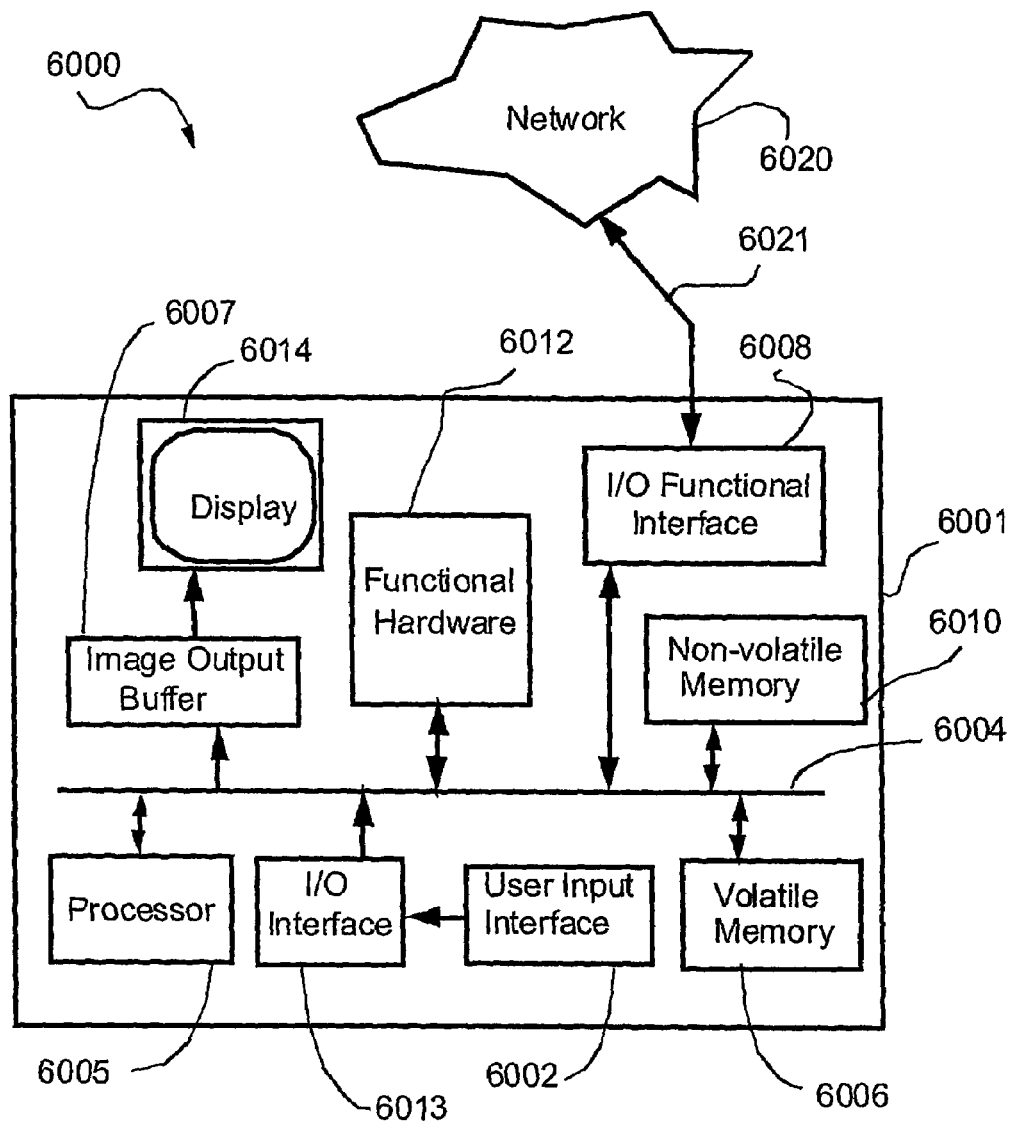
FIG. 60 is a schematic block is a schematic block diagram of a computer arrangement upon which some arrangements described can be practiced.

The methods of thin client imaging described above can be practiced using a system 6000, such as that shown in FIG. 60 wherein the described processes are implemented entirely as software, such as an application program executing within the system 6000. In particular, the steps of method of FIG. 56 are effected by instructions in the software that are carried out by the computing device 6001. The instructions may be formed as one or more code modules, each for performing one or more particular tasks. The software may also be divided into two separate parts, in which a first part performs the specific imaging and rendering methods and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for thin client imaging.

The system 6000 includes the computing device 6001 and a network 6020 interconnected by a communication link 6021. The device 6001 may for example be a cellular telephone handset, in which case the network 6020 would be subscriber telephone network, such as a cellular network. Where the device 6001 is a copier or printing machine for example, the network 6020 may be the Internet, or another network system, such as a Local Area Network (LAN) or a Wide Area Network (WAN). The computing device 6001 includes a user input interface 6002 which may incorporate a keyboard, a touch panel, and a pointing device such as a mouse or a trackball. The computing device 6001 incorporates functional hardware 6012, such as cellular telephone transceiver electronics or a copier engine depending on the example above being implemented. A functional interface 6008 is used by the computing device 6001 for communicating to and from the network 6020 and typically for performing a primary functional role of the device 6001.

The computing module 6001 typically includes at least one processor unit 6005, and memory units 6006 and 6010 which act as volatile and non-volatile memories. The volatile memory 6006 may be formed from semiconductor random access memory (RAM) whereas the non-volatile memory may be formed from semiconductor read only memory (ROM), a hard-disk drive or an optical memory platform. For example the memory 6006 may operate as the memory 609 of FIG. 56. The module 6001 also includes a number of input/output (I/O) interfaces including an image output buffer 6007 that couples to a display 6014, and an I/O interface 6013 for the user interface 6002. The modules 6002 to 6014 of the computing device 6001 typically communicate via an interconnected bus 6004 and in a manner which results in a conventional mode of operation of the computing device 6001 known to those in the relevant art.

Typically, the application program for thin client imaging is resident on the non-volatile memory 6010 and is read and controlled in its execution by the processor 6005. Intermediate storage of the program and any data fetched from the network 6020 may be accomplished using the volatile memory 6006, possibly in concert with the non-volatile memory where for example such includes a hard disk drive. In some instances, the application program may be supplied to the user encoded in the non-volatile memory 6010 or alternatively may be read by the user from the network 6020 via the interface 6008. Still further, the software can also be loaded into the computing device system 6001 from other computer readable media. The term "computer readable medium" as used herein refers to any storage or transmission medium that participates in providing instructions and/or data to the computer system 6000 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computing device 6001. Examples of transmission media include radio or infra-red transmission channels as well as a network connection to another computer or networked device, and the Internet or Intranets including e-mail transmissions and information recorded on Websites and the like.

For the example of mobile cellular telephone handset, such may be used to play graphics-based animated games such that the network 6020 transmits to the device 6001 a display list for each frame of the game to be rendered and which is then manipulated by the display list compiler 608 according to user inputs such as personal settings and real-time game play input, the result of which is delivered to the rendering engine 610 which delivers an output pixel image to the buffer 6007 and in turn to the display 6014. The compiler 608 and renderer 610 may be formed by respective software modules that are called and executed by the processor 6005.

INDUSTRIAL APPLICABILITY

The arrangements described are applicable to the computer and data processing industries and in particular those instances where image reproduction is necessary, and significantly when computing resources for image generation and rendering are limited.

The foregoing describes only some embodiments of the present invention, and modifications and/or changes can be made thereto without departing from the scope and spirit of the invention, the embodiments being illustrative and not restrictive. (Australia Only) In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of rendering a scan line of a graphic object image in a scan line renderer for spans of pixels lying between consecutive x-ordered edges intersecting said scan line, said method comprising the steps of:

maintaining a set of depths present in the rendering of said scan line, where the set of depths is maintained using a content addressable memory, said set being maintained in depth order, and for each span, said set containing at least those depths that are active in said span, and said set being subject to removal of at least one depth at a subsequent span on said scan line where the corresponding depth is no longer active on said scan line, where said content addressable memory is addressed by at least depth, and references fill information related to graphic objects active in said span;

partitioning said set of depths into those that potentially contribute to the raster data output of the current span and those depths that presently do not, said set of depths being maintained in said depth order, where said depth ordering is separately imposed on said contributing partition and said non-contributing partition;

forming a combined index for each said depth in said span, each said combined index having a most significant part that indicates a corresponding one of said partitions and a least significant part indicating said separately imposed depth ordering;

ordering of said combined indices to provide said partitioning and said depth ordering, said ordering of said combined indices being achieved by means of a map;

associating said combined index of each said depth in said set of depths with a corresponding further depth, said further depth indicating both said partitioning by contribution and the relative ordering of depths in each partition on said span;

mapping, using said map from each said further depth to said associated combined index of each depth in said set of depths; and reusing said set of depths and said map from said span to span in increasing x order, wherein said set of depths and said map maintaining an ordered state during addition and removal changes in contribution status of a depth in said set of depths.

2. A method according to claim 1 wherein said set of depths is updated on a per-span basis.

3. A method according to claim 1 wherein said depth order of said set of depths is maintained using a map according to the steps of:

associating said depths in said set of depths with a corresponding second depth indicating a relative ordering of depths on said span;

using said map to map from each said second depth to each associated depth in said set of depths;

reusing said set of depths and said map from span to span in increasing x order; and maintaining an ordered state of said set of depths and said map during addition and removal of depths from said set of depths.

4. A method according to claim 3 wherein when a depth is being added to said set of depths, said maintaining comprises the steps of:

marking each depth in said set of depths as being either above or below said added depth, thereby producing a set of marks;

ordering said set of marks in the same order as that of said set of depths stored in said content addressable memory;

reordering said set of marks in the order of their associated second depths as determined by said map; and reordering said map to reflect the new ordering of said depths as stored in the content addressable memory by their associated second depth, including said added depth, said reordering of said map uses said reordered set of marks.

5. A method according to claim 1 wherein when a depth is being added to said set of depths, said method further comprising:

tagging said added depth as being contributing or not contributing, thereby providing said combined index for the added depth;

marking each depth in said set of depths as being above or below said added depth, in terms of said corresponding combined index, thereby producing a set of marks, said set of marks being ordered in the same order as said set of depths and being stored in said content addressable memory;

reordering said set of marks in the order of each corresponding said combined index as determined by said map; and reordering said map to reflect the new ordering of said depths as stored in the content addressable memory by their associated further depth, including said added depth, wherein said reordering of said map is dependent on said reordered set of marks.

6. A method according to claim 1 wherein when a depth in said set of depths is changing from contributing to non-contributing, said method comprises the steps of:

marking each depth in said set of depths in the contributing partition if it is below the changing depth, and similarly marking each depth in said set of depths in the non-contributing partition if it is above the changing depth, thereby producing a set of marks, said set of marks being ordered in the same order that said subset of depths are stored in said content addressable memory;

reordering said set of marks in the order of their said combined indices as determined by said map; and reordering said map to reflect the ordering of said depths as stored in the content addressable memory by their associated further depth, including the change in contribution status of said changing depth, said reordering of said map using said reordered set of marks.

7. A method according to claim 1 wherein said rendering determines the raster data output for said span and wherein each depth is associated with a corresponding fill, said method further comprising the step of:

using said set of depths and said fill associated with each depth in said set of depths to produce a subset of fills wherein said depth order of said set of depths provides a depth ordering of said subset of fills.

8. A method according to claim 1 wherein said method provides input to a raster image processor and said input is in the form of a tree of graphic objects, said tree being ordered by local depths, each said graphic object being associated with one or more fills, each fill in each said graphic object being associated with a local depth such that the local depth of fills are local to their graphic object and each graphic object is associated with a local depth, and wherein the local depth of each said graphic object is local to a corresponding parent graphic object, said method comprising the steps of:

determining each of the depth associated with a corresponding said graphic object by traversing said tree of graphic objects in a depth first traversal of the tree; and traversing the fills associated with each said graphic object in local depth order; and assigning a sequential depth to fills as they are encountered in said traversal.

9. A method according to claim 1 wherein said content addressable memory is formed in hardware.

10. A method according to claim 1 wherein said content addressable memory is implemented by software.

11. A computer readable storage medium having a program recorded thereon and adapted to make a computer device render a scan line of a graphic object image in a scan line renderer for a span of pixels lying between consecutive x-ordered edges intersecting said scan line, said program comprising:

- code for maintaining a set of depths present in the rendering of said scan line, where the set of depths is maintained using a content addressable memory, said set being maintained in depth order, and for each span, said set containing at least those depths that are active in said span, and said set being subject to removal of at least one depth at a subsequent span on said scan line where the corresponding depth is no longer active on said scan line, where said content addressable memory is addressed by at least depth, and references fill information related to graphic objects active in said span;
- code for partitioning said set of depths into those that potentially contribute to the raster data output of the current span and those depths that presently do not, said set of depths being maintained in said depth order, where said depth ordering is separately imposed on said contributing partition and said non-contributing partition;
- code for forming a combined index for each said depth in said span, each said combined index having a most significant part that indicates a corresponding one of said partitions and a least significant part indicating said separately imposed depth ordering;
- code for ordering of said combined indices to provide said partitioning and said depth ordering, said ordering of said combined indices being achieved by means of a map;
- code for associating said combined index of each said depth in said set of depths with a corresponding further depth, said further depth indicating both said partitioning by contribution and the relative ordering of depths in each partition on said span;
- code for mapping, using said map from each said further depth to said associated combined index of each depth in said set of depths; and
- code for reusing said set of depths and said map from said span to span in increasing x order, wherein said set of depths and said map maintaining an ordered state during addition and removal changes in contribution status of a depth in said set of depths.

12. A computerized apparatus for rendering a scan line of a graphic object image in a scan line renderer for a span of pixels lying between consecutive x-ordered edges intersecting said scan line, said apparatus comprising a processor adapted to perform the steps of:

- maintaining a set of depths present in the rendering of said scan line, where the set of depths is maintained using a content addressable memory, said set being maintained in depth order, and for each span, said set containing at least those depths that are active in said span, and said set being subject to removal of at least one depth at a subsequent span on said scan line where the corresponding depth is no longer active on said scan line, where said content addressable memory is addressed by at least depth, and references fill information related to graphic objects active in said span;
- partitioning said set of depths into those potentially contribute to the raster data output of the current span and those depths that presently do not, said set of depths being maintained in said depth order, where said depth ordering is separately imposed on said contributing partition and said non-contributing partition;
- forming a combined index for each said depth in said span, each said combined index having a most significant part that indicates a corresponding one of said partitions and a least significant part indicating said separately imposed depth ordering;
- ordering of said combined indices to provide said partitioning and said depth ordering, said ordering of said combined indices being achieved by means of a map;
- associating said combined index of each said depth in said set of depths with a corresponding further depth, said further depth indicating both said partitioning by contribution and the relative ordering of depths in each partition on said span;
- mapping, using said map from each said further depth to said associated combined index of each depth in said set of depths; and
- reusing said set of depths and said map from said span to span in increasing x order, wherein said set of depths and said map maintaining an ordered state during addition and removal changes in contribution status of a depth in said set of depths.

* * * * *